(12) United States Patent
Northrup et al.

(10) Patent No.: US 10,360,760 B2
(45) Date of Patent: Jul. 23, 2019

(54) SYSTEM AND METHOD FOR PLACING VIRTUAL GEOGRAPHIC ZONE MARKERS

(71) Applicant: Zonal Systems, LLC, Dallas, TX (US)

(72) Inventors: James L. Northrup, Dallas, TX (US); Robert L. Pierce, II, Dallas, TX (US)

(73) Assignee: Zonal Systems, LLC, Dallas, TX (US)

( * ) Notice: Subject to any disclaimer, the term of this patent is extended or adjusted under 35 U.S.C. 154(b) by 0 days.

(21) Appl. No.: 15/728,350

(22) Filed: Oct. 9, 2017

(65) Prior Publication Data
US 2018/0033244 A1 Feb. 1, 2018

Related U.S. Application Data

(63) Continuation-in-part of application No. 15/277,915, filed on Sep. 27, 2016, now Pat. No. 9,786,176, which
(Continued)

(51) Int. Cl.
*H04W 24/00* (2009.01)
*G07F 17/32* (2006.01)
(Continued)

(52) U.S. Cl.
CPC ..... *G07F 17/3241* (2013.01); *G06Q 30/0238* (2013.01); *G06Q 30/0261* (2013.01);
(Continued)

(58) Field of Classification Search
CPC .................. G07F 17/3241; G06Q 30/0238
(Continued)

(56) References Cited

U.S. PATENT DOCUMENTS 3,990,067 A 11/1976 Van Dusen et al.
5,120,942 A 6/1992 Holland et al.
(Continued)

FOREIGN PATENT DOCUMENTS

AU 2007216729 11/2007
AU 2010212278 9/2010
(Continued)

OTHER PUBLICATIONS

Johnson, "6 Parking Apps That Save You Time and Money", http://www.forbes.com/sites/emmajohnson/2014/12/18/5-parking-apps-that-help-you-save-time-and-money/#22835b974c0c, Dec. 18, 2014.
(Continued)

*Primary Examiner* — Nghi H Ly
(74) *Attorney, Agent, or Firm* — Schultz & Associates, P.C.

(57) ABSTRACT

A system and method for user interaction includes a network, a server connected to the network, a supervisor device receiving information from a global positioning system and connected to the network, a user device receiving information from the global positioning system and connected to the network. The supervisor, having the supervisor device, defines a set of virtual geographic zones and sub-zones in which the user device is tracked, and saves the set of virtual geographic zones and sub-zones to a supervisor account on the server. The user downloads a user application, sets-up a user account, and downloads the set of virtual geographic zones and sub-zones. As the user, having the user device, moves through the virtual geographic zones and sub-zones the location of the user device is determined and a set of supervisor-defined actions are executed on the user device based on the location of the user device.

30 Claims, 94 Drawing Sheets

Related U.S. Application Data is a continuation-in-part of application No. 15/131,965, filed on Apr. 18, 2016, which is a continuation of application No. 14/209,049, filed on Mar. 13, 2014, now Pat. No. 9,317,996, which is a continuation-in-part of application No. 14/102,238, filed on Dec. 10, 2013, now Pat. No. 9,319,834, which is a continuation-in-part of application No. 13/924,395, filed on Jun. 21, 2013, now Pat. No. 9,398,404.

(60) Provisional application No. 61/778,874, filed on Mar. 13, 2013, provisional application No. 61/735,402, filed on Dec. 10, 2012, provisional application No. 61/662,980, filed on Jun. 22, 2012.

(51) Int. Cl.

| | | |
|---|---|---|
| *H04W 4/021* | (2018.01) | |
| *G06Q 30/02* | (2012.01) | |
| *H04L 29/08* | (2006.01) | |
| *H04L 29/06* | (2006.01) | |
| *H04W 4/02* | (2018.01) | |
| *H04W 4/21* | (2018.01) | |
| *G08G 1/14* | (2006.01) | |
| *G08G 1/017* | (2006.01) | |
| *G08G 1/02* | (2006.01) | |
| *G08G 1/04* | (2006.01) | |
| *G08G 1/042* | (2006.01) | |
| *G08G 5/00* | (2006.01) | |
| *H04W 4/48* | (2018.01) | |

(52) U.S. Cl.
CPC ...... *G07F 17/3225* (2013.01); *G07F 17/3244* (2013.01); *G08G 1/0175* (2013.01); *G08G 1/02* (2013.01); *G08G 1/04* (2013.01); *G08G 1/042* (2013.01); *G08G 1/144* (2013.01); *G08G 1/149* (2013.01); *G08G 5/006* (2013.01); *G08G 5/0013* (2013.01); *G08G 5/0026* (2013.01); *G08G 5/0069* (2013.01); *G08G 5/0082* (2013.01); *H04L 63/08* (2013.01); *H04L 67/22* (2013.01); *H04W 4/02* (2013.01); *H04W 4/021* (2013.01); *H04W 4/21* (2018.02); *H04W 4/48* (2018.02); *H04L 63/0428* (2013.01)

(58) Field of Classification Search
USPC ...... 455/456.3, 421, 423, 456.1, 406, 414.1, 455/418
See application file for complete search history.

(56) References Cited

U.S. PATENT DOCUMENTS

| | | |
|---|---|---|
| 5,572,192 A | 11/1996 | Berube |
| 5,610,596 A | 3/1997 | Petitclerc |
| 6,716,101 B1 | 4/2004 | Meadows et al. |
| 6,894,617 B2 | 5/2005 | Richman |
| 6,944,679 B2 | 9/2005 | Parupudi et al. |
| 7,164,986 B2 | 1/2007 | Humphries et al. |
| 7,200,566 B1 | 4/2007 | Moore et al. |
| 7,203,752 B2 | 4/2007 | Rice et al. |
| 7,289,023 B2 | 10/2007 | Schneider et al. |
| 7,345,577 B2 | 3/2008 | O'Flaherty et al. |
| 7,363,196 B2 | 4/2008 | Markwitz et al. |
| 7,366,522 B2 | 4/2008 | Thomas |
| 7,385,516 B2 | 6/2008 | Contractor |
| 7,443,298 B2 | 10/2008 | Cole et al. |
| 7,466,244 B2 | 12/2008 | Kimchi et al. |
| 7,510,474 B2 | 3/2009 | Carter, Sr. |
| 7,525,484 B2 | 4/2009 | Dupray |
| 7,637,810 B2 | 12/2009 | Amaitis et al. |
| 7,689,229 B2 | 3/2010 | Geary et al. |
| 7,777,648 B2 | 8/2010 | Smith et al. |
| 7,778,802 B2 | 8/2010 | O'Flaherty et al. |
| 7,787,872 B2 | 8/2010 | Minborg et al. |
| 7,843,490 B2 | 11/2010 | Wixson et al. |
| 7,848,765 B2 | 12/2010 | Phillips et al. |
| 7,853,786 B1 | 12/2010 | Fultz et al. |
| 7,864,047 B2 | 1/2011 | Aninye et al. |
| 7,920,072 B2 | 4/2011 | Smith et al. |
| 7,995,996 B2 | 8/2011 | Link, II et al. |
| 8,009,037 B2 | 8/2011 | Staton et al. |
| 8,019,532 B2 | 9/2011 | Sheha et al. |
| 8,031,114 B2 | 10/2011 | Kellermeier |
| 8,046,168 B2 | 10/2011 | Wang et al. |
| 8,099,109 B2 | 1/2012 | Altman et al. |
| 8,103,445 B2 | 1/2012 | Smith et al. |
| 8,104,672 B2 | 1/2012 | Mitchell, Jr. et al. |
| 8,108,144 B2 | 1/2012 | Forstall et al. |
| 8,126,478 B2 | 2/2012 | Northway et al. |
| 8,131,585 B2 | 3/2012 | Nicholas et al. |
| 8,170,580 B2 | 5/2012 | Dingier et al. |
| 8,185,131 B2 | 5/2012 | Wood |
| 8,200,186 B2 | 6/2012 | Ashley, Jr. et al. |
| 8,204,654 B2 | 6/2012 | Sachs et al. |
| 8,204,684 B2 | 6/2012 | Forstall et al. |
| 8,223,012 B1 | 7/2012 | Diem |
| 8,229,473 B1 | 7/2012 | De La Rue |
| 8,244,468 B2 | 8/2012 | Scalisi et al. |
| 8,249,559 B1 | 8/2012 | Meiss et al. |
| 8,254,961 B2 | 8/2012 | Moon et al. |
| 8,255,392 B2 | 8/2012 | Melton |
| 8,275,352 B2 | 9/2012 | Forstall et al. |
| 8,290,513 B2 | 10/2012 | Forstall et al. |
| 8,290,515 B2 | 10/2012 | Staton et al. |
| 8,292,741 B2 | 10/2012 | Burman et al. |
| 8,295,855 B2 | 10/2012 | Narayan et al. |
| 8,326,315 B2 | 12/2012 | Phillips et al. |
| 8,355,862 B2 | 1/2013 | Matas et al. |
| 8,359,643 B2 | 1/2013 | Low et al. |
| 8,368,531 B2 | 2/2013 | Staton et al. |
| 8,369,867 B2 | 2/2013 | Van Os et al. |
| 8,374,623 B2 | 2/2013 | Vellanki et al. |
| 8,396,485 B2 | 3/2013 | Grainger et al. |
| 8,428,867 B2 | 4/2013 | Ashley, Jr. et al. |
| 8,451,131 B2 | 5/2013 | Ghazarian |
| 8,471,701 B2 | 6/2013 | Yariv et al. |
| 8,493,207 B2 | 7/2013 | Diem |
| 8,494,564 B2 | 7/2013 | Narayan et al. |
| 8,494,581 B2 | 7/2013 | Barbosa et al. |
| 8,496,530 B2 | 7/2013 | Dean |
| 8,502,672 B1 | 8/2013 | Crossno |
| 8,504,061 B2 | 8/2013 | Grainger et al. |
| 8,509,803 B2 | 8/2013 | Gracieux |
| 8,521,131 B1 | 8/2013 | Ramalingam et al. |
| 8,548,735 B2 | 10/2013 | Forstall et al. |
| 8,549,028 B1 | 10/2013 | Alon et al. |
| 8,554,243 B2 | 10/2013 | Klassen et al. |
| 8,560,557 B1 | 10/2013 | Poe |
| 8,577,391 B2 | 11/2013 | Parker et al. |
| 8,616,967 B2 | 12/2013 | Amaitis et al. |
| 8,630,768 B2 | 1/2014 | McClellan et al. |
| 8,635,290 B2 | 1/2014 | Ellanti et al. |
| 8,644,506 B2 | 2/2014 | Zellner |
| 8,644,856 B2 | 2/2014 | Kim et al. |
| 8,650,072 B2 | 2/2014 | Mason et al. |
| 8,666,373 B2 | 3/2014 | Dessouky et al. |
| 8,666,436 B2 | 3/2014 | Ellanti et al. |
| 8,671,143 B2 | 3/2014 | Lewis |
| 8,682,300 B2 | 3/2014 | Stopel |
| 8,682,349 B2 | 3/2014 | Sayed |
| 8,682,356 B2 | 3/2014 | Poe et al. |
| 8,684,828 B1 | 4/2014 | Coronel et al. |
| 8,694,026 B2 | 4/2014 | Forstall et al. |
| 8,731,813 B2 | 5/2014 | Sheha et al. |
| 8,744,480 B2 | 6/2014 | Daly |
| 8,751,311 B2 | 6/2014 | Liu |
| 8,755,824 B1 | 6/2014 | Wang et al. |
| 8,761,799 B2 | 6/2014 | Meredith et al. |
| 8,768,294 B2 | 7/2014 | Reitnour et al. |

(56) References Cited

U.S. PATENT DOCUMENTS

| | | |
|---|---|---|
| 8,768,319 B2 | 7/2014 | Ramer et al. |
| 8,774,825 B2 | 7/2014 | Forstall et al. |
| 8,774,839 B2 | 7/2014 | Busch |
| 8,781,965 B2 | 7/2014 | Huster |
| 8,799,361 B2 | 8/2014 | Ross et al. |
| 8,810,454 B2 | 8/2014 | Cosman |
| 8,825,085 B1 | 9/2014 | Boyle et al. |
| 8,825,369 B2 | 9/2014 | Jin |
| 8,833,650 B1 | 9/2014 | McGhie et al. |
| 8,838,138 B2 | 9/2014 | Modali et al. |
| 8,838,477 B2 | 9/2014 | Moshfeghi |
| 8,838,481 B2 | 9/2014 | Moshfeghi |
| 8,849,931 B2 | 9/2014 | Linner et al. |
| 8,862,150 B2 | 10/2014 | Phillips et al. |
| 8,862,378 B2 | 10/2014 | Curatolo et al. |
| 8,868,443 B2 | 10/2014 | Yankovich et al. |
| 8,880,047 B2 | 11/2014 | Konicek et al. |
| 8,890,685 B1 | 11/2014 | Sookman et al. |
| 8,890,717 B2 | 11/2014 | McClellan et al. |
| 8,903,426 B2 | 12/2014 | Tholkes et al. |
| 8,909,248 B2 | 12/2014 | Phillips et al. |
| 8,924,144 B2 | 12/2014 | Forstall et al. |
| 8,930,134 B2 | 1/2015 | Gu et al. |
| 8,949,434 B2 | 2/2015 | Vellanki et al. |
| 8,956,231 B2 | 2/2015 | Amaitis et al. |
| 8,963,740 B2 | 2/2015 | Koukoumidis et al. |
| 8,963,956 B2 | 2/2015 | Latta et al. |
| 8,965,401 B2 | 2/2015 | Sheshadri et al. |
| 8,974,302 B2 | 3/2015 | Amaitis et al. |
| 8,983,762 B2 | 3/2015 | Davidson |
| 8,996,030 B2 | 3/2015 | Grainger et al. |
| 9,003,500 B2 | 4/2015 | Oglesbee et al. |
| 9,008,698 B2 | 4/2015 | Meredith et al. |
| 9,037,337 B1 | 5/2015 | Cudak et al. |
| 9,067,565 B2 | 6/2015 | McClellan et al. |
| 9,088,866 B2 | 7/2015 | Narayan et al. |
| 9,098,545 B2 | 8/2015 | Abhyanker |
| 9,137,636 B2 | 9/2015 | Sheha et al. |
| 9,140,569 B2 | 9/2015 | Ellanti et al. |
| 9,165,288 B2 | 10/2015 | Gordon et al. |
| 9,171,293 B2 | 10/2015 | Ellanti |
| 9,208,626 B2 | 12/2015 | Davidson |
| 9,219,983 B2 | 12/2015 | Sheshadri et al. |
| 9,240,006 B2 | 1/2016 | White et al. |
| 9,255,810 B2 | 2/2016 | Van Wiemeersch et al. |
| 9,256,992 B2 | 2/2016 | Davidson |
| 9,280,867 B2 | 3/2016 | Froy et al. |
| 9,280,868 B2 | 3/2016 | Froy et al. |
| 9,282,161 B1 | 3/2016 | Hill |
| 9,295,908 B2 | 3/2016 | Froy et al. |
| 9,305,196 B2 | 4/2016 | Schoner et al. |
| 9,311,685 B2 | 4/2016 | Harkey et al. |
| 9,313,326 B2 | 4/2016 | Dessouky et al. |
| 9,329,597 B2 | 5/2016 | Stoschek et al. |
| 9,342,884 B2 | 5/2016 | Mask |
| 9,363,635 B2 | 6/2016 | Finlow-Bates et al. |
| 9,395,132 B2 | 7/2016 | Stewart et al. |
| 9,400,902 B2 | 7/2016 | Schoner et al. |
| 9,413,805 B2 | 8/2016 | Sainsbury |
| 9,426,303 B1 | 8/2016 | Edwards et al. |
| 9,430,783 B1 | 8/2016 | Sehn |
| 9,430,901 B2 | 8/2016 | Amaitis et al. |
| 9,432,806 B2 | 8/2016 | Zises |
| 9,444,805 B1 | 9/2016 | Saylor et al. |
| 9,451,402 B2 | 9/2016 | Srivastava et al. |
| 9,454,889 B2 | 9/2016 | Kerning |
| 9,473,904 B2 | 10/2016 | Bennett |
| 9,489,793 B2 | 11/2016 | Williams et al. |
| 9,521,521 B2 | 12/2016 | Hillary et al. |
| 9,536,378 B2 | 1/2017 | Gadher et al. |
| 9,544,075 B2 | 1/2017 | Altman et al. |
| 9,547,872 B2 | 1/2017 | Howard et al. |
| 9,554,244 B2 | 1/2017 | Lerenc |
| 9,558,619 B2 | 1/2017 | Froy et al. |
| 9,558,620 B2 | 1/2017 | Froy et al. |
| 9,558,625 B2 | 1/2017 | Gadher et al. |
| 9,569,920 B2 | 2/2017 | Froy et al. |
| 9,589,435 B2 | 3/2017 | Finlow-Bates |
| 9,600,645 B2 | 3/2017 | Fadell et al. |
| 9,609,022 B2 | 3/2017 | Gupta et al. |
| 9,613,468 B2 | 4/2017 | Davidson et al. |
| 9,626,841 B2 | 4/2017 | Fadell et al. |
| 9,633,496 B2 | 4/2017 | Van Wiemeersch et al. |
| 9,638,537 B2 | 5/2017 | Abramson et al. |
| 9,640,055 B2 | 5/2017 | Fadell et al. |
| 9,652,912 B2 | 5/2017 | Fadell et al. |
| 9,654,908 B2 | 5/2017 | Schoner et al. |
| 9,654,923 B2 | 5/2017 | Phillips et al. |
| 9,658,012 B2 | 5/2017 | Stewart et al. |
| 9,668,096 B2 | 5/2017 | Philips et al. |
| 9,668,097 B2 | 5/2017 | Myllymaki et al. |
| 9,688,288 B1 | 6/2017 | Lathrop et al. |
| 9,691,061 B2 | 6/2017 | Deitiker et al. |
| 9,710,873 B1 | 7/2017 | Hill |
| 9,711,036 B2 | 7/2017 | Fadell et al. |
| 9,721,262 B2 | 8/2017 | Krone |
| 9,721,342 B2 | 8/2017 | Mask |
| 9,721,427 B2 | 8/2017 | Hilbert et al. |
| 9,727,910 B1 | 8/2017 | Wu |
| 9,749,931 B2 | 8/2017 | Hillary et al. |
| 9,767,418 B2 | 9/2017 | Reimer |
| 9,773,018 B2 | 9/2017 | Cheung |
| 9,773,020 B2 | 9/2017 | Kerr et al. |
| 9,773,364 B2 | 9/2017 | Kerning et al. |
| 9,773,413 B1 | 9/2017 | Li et al. |
| 9,792,434 B1 | 10/2017 | Li et al. |
| 9,961,614 B2 | 5/2018 | Hillary et al. |
| 2002/0065713 A1 | 5/2002 | Awada et al. |
| 2003/0225621 A1 | 12/2003 | Nurchaya et al. |
| 2004/0192337 A1 | 9/2004 | Hines et al. |
| 2004/0214629 A1* | 10/2004 | Walker .................. G07F 17/32 463/20 |
| 2004/0243308 A1 | 12/2004 | Irish et al. |
| 2005/0159883 A1* | 7/2005 | Humphries ............ B60R 25/00 701/517 |
| 2005/0256781 A1 | 11/2005 | Sands et al. |
| 2006/0003828 A1 | 1/2006 | Abecassis |
| 2006/0046712 A1 | 3/2006 | Shamp et al. |
| 2006/0200305 A1 | 9/2006 | Sheha et al. |
| 2008/0125965 A1 | 5/2008 | Carani et al. |
| 2008/0162034 A1 | 7/2008 | Breen |
| 2008/0183485 A1 | 7/2008 | Drabble et al. |
| 2008/0207296 A1 | 8/2008 | Lutnick |
| 2008/0312946 A1 | 12/2008 | Valentine et al. |
| 2009/0055691 A1 | 2/2009 | Ouksel et al. |
| 2009/0137255 A1 | 5/2009 | Ashley et al. |
| 2009/0163216 A1 | 6/2009 | Hoang et al. |
| 2009/0208059 A1* | 8/2009 | Geva ..................... G06K 9/3258 382/105 |
| 2009/0264201 A1* | 10/2009 | Ross ................................ 463/42 |
| 2009/0307067 A1 | 12/2009 | Obermeyer |
| 2010/0042940 A1 | 2/2010 | Monday et al. |
| 2010/0268465 A1 | 10/2010 | Hegde |
| 2010/0287011 A1 | 11/2010 | Muchkaev |
| 2010/0312633 A1 | 12/2010 | Cervenka |
| 2010/0312646 A1 | 12/2010 | Gupta |
| 2011/0047009 A1 | 2/2011 | Deitiker et al. |
| 2011/0099070 A1 | 4/2011 | Eliason |
| 2011/0112768 A1 | 5/2011 | Doyle |
| 2011/0148626 A1 | 6/2011 | Acevedo |
| 2011/0187505 A1 | 8/2011 | Faith et al. |
| 2011/0238476 A1 | 9/2011 | Carr et al. |
| 2011/0244798 A1 | 10/2011 | Daigle et al. |
| 2011/0269480 A1 | 11/2011 | Fong et al. |
| 2011/0294515 A1 | 12/2011 | Chen et al. |
| 2012/0001928 A1 | 1/2012 | Sheha et al. |
| 2012/0077594 A1 | 3/2012 | Carter, Sr. |
| 2012/0088524 A1 | 4/2012 | Moldaysky et al. |
| 2012/0109752 A1 | 5/2012 | Strutton et al. |
| 2012/0126974 A1 | 5/2012 | Phillips et al. |
| 2012/0129553 A1 | 5/2012 | Phillips et al. |
| 2012/0130796 A1 | 5/2012 | Busch |
| 2012/0158508 A1 | 6/2012 | Kilroy et al. |
| 2012/0172027 A1 | 7/2012 | Partheesh |

(56) References Cited

U.S. PATENT DOCUMENTS

| | | |
|---|---|---|
| 2012/0176242 A1 | 7/2012 | Schneider et al. |
| 2012/0202584 A1 | 8/2012 | Amaitis et al. |
| 2012/0233351 A1 | 9/2012 | Gorgens |
| 2012/0270563 A1 | 10/2012 | Sayed |
| 2012/0276928 A1 | 11/2012 | Shutter |
| 2012/0284769 A1 | 11/2012 | Dixon et al. |
| 2012/0323664 A1 | 12/2012 | Klems |
| 2012/0329555 A1 | 12/2012 | Jabara et al. |
| 2012/0330844 A1* | 12/2012 | Kaufman ............ G06Q 20/027 705/67 |
| 2012/0330930 A1 | 12/2012 | Gorgens |
| 2013/0024471 A1 | 1/2013 | Mitrovic |
| 2013/0030931 A1* | 1/2013 | Moshfeghi ............ G01S 19/48 705/16 |
| 2013/0060627 A1 | 3/2013 | Harrison |
| 2013/0073377 A1 | 3/2013 | Heath |
| 2013/0085860 A1 | 4/2013 | Summers et al. |
| 2013/0091452 A1 | 4/2013 | Sorden et al. |
| 2013/0110624 A1 | 5/2013 | Mitrovic |
| 2013/0124360 A1 | 5/2013 | Mitrovic |
| 2013/0141232 A1 | 6/2013 | Richman |
| 2013/0150086 A1 | 6/2013 | Caralis et al. |
| 2013/0151506 A1 | 6/2013 | Dessouky et al. |
| 2013/0158860 A1 | 6/2013 | Gum |
| 2013/0172013 A1 | 7/2013 | Dessouky et al. |
| 2013/0173377 A1 | 7/2013 | Keller et al. |
| 2013/0173467 A1 | 7/2013 | Nuzzi et al. |
| 2013/0173470 A1 | 7/2013 | Nuzzi et al. |
| 2013/0189946 A1 | 7/2013 | Swanson |
| 2013/0218463 A1 | 8/2013 | Howard et al. |
| 2013/0218912 A1 | 8/2013 | Howard et al. |
| 2013/0225282 A1 | 8/2013 | Williams et al. |
| 2013/0246175 A1 | 9/2013 | Bilange et al. |
| 2013/0253832 A1 | 9/2013 | Nallu et al. |
| 2013/0275221 A1 | 10/2013 | Zeto, III et al. |
| 2013/0281189 A1 | 10/2013 | Gagner et al. |
| 2013/0288778 A1 | 10/2013 | Johnson |
| 2013/0324166 A1 | 12/2013 | Mian et al. |
| 2013/0337895 A1 | 12/2013 | Froy et al. |
| 2013/0346233 A1 | 12/2013 | Caralis et al. |
| 2014/0028456 A1 | 1/2014 | Sadhu |
| 2014/0035726 A1 | 2/2014 | Schoner et al. |
| 2014/0057648 A1 | 2/2014 | Lyman et al. |
| 2014/0066101 A1 | 3/2014 | Lyman et al. |
| 2014/0066179 A1 | 3/2014 | Froy et al. |
| 2014/0067564 A1 | 3/2014 | Yuan |
| 2014/0068658 A1 | 3/2014 | Chen et al. |
| 2014/0074617 A1 | 3/2014 | Mukherji et al. |
| 2014/0094277 A1 | 4/2014 | Guinn et al. |
| 2014/0155094 A1 | 6/2014 | Zises |
| 2014/0156410 A1 | 6/2014 | Wuersch et al. |
| 2014/0156420 A1 | 6/2014 | Chow et al. |
| 2014/0162692 A1 | 6/2014 | Li et al. |
| 2014/0164118 A1 | 6/2014 | Polachi |
| 2014/0167961 A1 | 6/2014 | Finlow-bates |
| 2014/0167963 A1 | 6/2014 | Ferragne |
| 2014/0180864 A1 | 6/2014 | Orlov et al. |
| 2014/0180867 A1 | 6/2014 | Zises |
| 2014/0195421 A1 | 7/2014 | Lozito |
| 2014/0201849 A1 | 7/2014 | Earley |
| 2014/0206436 A1 | 7/2014 | French |
| 2014/0207499 A1 | 7/2014 | Fliess et al. |
| 2014/0215588 A1 | 7/2014 | Sayed |
| 2014/0278860 A1 | 9/2014 | Lee et al. |
| 2014/0279123 A1 | 9/2014 | Harkey et al. |
| 2014/0279503 A1 | 9/2014 | Bertanzetti et al. |
| 2014/0292511 A1 | 10/2014 | Sheha et al. |
| 2014/0295944 A1 | 10/2014 | Faircloth |
| 2014/0308915 A1 | 10/2014 | Reitnour et al. |
| 2014/0337123 A1 | 11/2014 | Nuernberg et al. |
| 2014/0344011 A1 | 11/2014 | Dogin et al. |
| 2014/0358724 A1 | 12/2014 | Nallu et al. |
| 2015/0039393 A1 | 2/2015 | Jain |
| 2015/0052171 A1 | 2/2015 | Cheung |
| 2015/0057020 A1 | 2/2015 | Moldaysky et al. |
| 2015/0058324 A1 | 2/2015 | Kauwe |
| 2015/0065177 A1 | 3/2015 | Phillips et al. |
| 2015/0148078 A1 | 5/2015 | Phillips et al. |
| 2015/0163632 A1 | 6/2015 | Phillips et al. |
| 2015/0227553 A1 | 8/2015 | Dobre et al. |
| 2015/0330806 A1 | 11/2015 | Nallu et al. |
| 2015/0365799 A1 | 12/2015 | Sheha et al. |
| 2016/0012509 A1 | 1/2016 | Howard et al. |
| 2016/0014567 A1 | 1/2016 | Arney-Cimino |
| 2016/0041000 A1 | 2/2016 | Nallu et al. |
| 2016/0048905 A1 | 2/2016 | Yuan |
| 2016/0055215 A1 | 2/2016 | Kauwe |
| 2016/0148299 A1 | 5/2016 | Caralis et al. |
| 2016/0189251 A1 | 6/2016 | Dessouky et al. |
| 2016/0330583 A1 | 11/2016 | Zises |
| 2016/0360338 A1 | 12/2016 | Lyman et al. |
| 2017/0034289 A1 | 2/2017 | Theobald et al. |
| 2017/0122746 A1 | 5/2017 | Howard et al. |
| 2017/0131113 A1 | 5/2017 | Nallu et al. |
| 2017/0180932 A1 | 6/2017 | Zises |
| 2017/0255918 A1 | 9/2017 | Deitiker et al. |
| 2017/0262924 A1 | 9/2017 | Caralis et al. |
| 2017/0280271 A1 | 9/2017 | Lyman et al. |

FOREIGN PATENT DOCUMENTS

| | | |
|---|---|---|
| CA | 2422693 | 3/2002 |
| EP | 2589232 | 5/2013 |
| JP | 2000292182 | 10/2000 |
| JP | 2004080554 | 3/2004 |
| JP | 2006053646 | 2/2006 |
| JP | 2007042006 | 2/2007 |
| JP | 2007188150 | 7/2007 |
| JP | 2009199498 A * | 9/2009 |
| WO | 2001014954 | 3/2001 |
| WO | 2002015086 | 2/2002 |
| WO | 2005048199 | 5/2005 |
| WO | 2006009704 | 1/2006 |
| WO | 2008083105 | 7/2008 |
| WO | 2009035469 | 3/2009 |
| WO | 2010078616 | 7/2010 |
| WO | 2010080938 | 7/2010 |
| WO | 2011077449 | 6/2011 |
| WO | 2012106075 | 8/2012 |
| WO | 2013023283 | 2/2013 |
| WO | 2013108224 | 7/2013 |
| WO | 2014113882 | 7/2014 |
| WO | 2014130072 | 8/2014 |
| WO | 2014130090 | 8/2014 |
| WO | 2014144760 | 9/2014 |
| WO | 2015006858 | 1/2015 |

OTHER PUBLICATIONS

Krzyzek, "Algorithm for Modeling Coordinates of Corners of Buildings Determined with RTN GNSS Technology Using Vectors Translation Method", Artificial Satellites, vol. 50, No. 3—2015, Jul. 7, 2015, pp. 115-125.

Mapbox, "Mapbox | Design and publish beautiful maps", https://www.mapbox.com/, accessed on Dec. 19, 2016.

MOXTIONX, MotionX-GPS Overview, http://gps.motionx.com/iphone/overview/, Jun. 21, 2013, pp. 1-3.

Navarro, et al., "Wi-Fi Localization Using RSSI Fingerprinting", http://digitalcommons.calpoly.edu/cgi/viewcontent.cgi?article=1007 &context=cpesp, accessed on Dec. 19, 2016.

Parkmobile, "Parkmobile | Parking Made Simple", http://us.parkmobile.com/#how-it-works, accessed on Dec. 19, 2016.

Roberts, M., "Science Fiction Becomes Farming Fact," Profi International—The Farm Machinery Magazine, May 2007, pp. 36-38, Agri Publishing International Ltd., Halsham, East Sussex, United Kingdom.

Shaker, et al., "Building Extraction from High Resolution Space Images in High Density Residential Area in the Great Cairo Region," MDPI Journal Remote Sensing ISSN 2072-4292 pp. 781-791, Apr. 12, 2011.

(56) References Cited

OTHER PUBLICATIONS

"Siuru, B., ""Guard Tour: It's All About Attention to Detail."" CorrectionsTechnology and Management, vol. 5, Issue:1, Dated:Jan./Feb. 2001, pp. 14 to 17. https://www.ncjrs.gov/App/Publications/abstract.aspx?ID=187028".

"Thompson, M., ""New Electronic Monitors Turn the Clock Ahead for Guard TourTechnology."" Security, vol. 24, Issue:9, Dated:(Sep. 1987),pp. 100-102, 104, 105. https://www.ncjrs.gov/App/Publications/abstract.aspx?ID=107246".

Trimble, "Trimble—GPS Tutorial—Code-Phase GPS vs. Carrier-Phase GPS", http://www.trimble.com/gps_tutorial/sub_phases.aspx, accessed on Dec. 19, 2016.

Trimble, "Trimble—GPS Tutorial—Surveyors Do It Differently", http://www.trimble.com/gps_tutorial/sub_adv.aspx, accessed on Dec. 19, 2016.

Trimble, "Trimble—GPS Tutorial—Why we need Differential GPS", http://www.trimble.com/gps_tutorial/dgps-why.aspx, accessed on Dec. 19, 2016.

U.S. Coast Guard, "NDGPS General Information", http://www.navcen.uscg.gov/?pageName=dgpsMain, accessed on Dec. 19, 2016.

"Vuorinen, P., ""Applying the RFID technology for field force solution."" Proceedings of the 2005 joint conference on Smart objects and ambient intelligence: innovative context-aware services: usages and technologies,ACM, Oct. 2005. http://www.soc-eusai2005.net/proceedings/articles_pagines/6.pdf".

Wikipedia, "iBeacon—Wikipedia", https://en.wikipedia.org/wiki/IBeacon, accessed on Dec. 19, 2016.

ACE Investments, "mapsco.jpg", http://www.aceinvestments.com/properties/swfreeway/mapsco.jpg, accessed on Dec. 19, 2016.

Apple, "Apple Pay—Apple", http://www.apple.com/apple-pay/, accessed on Dec. 19, 2016.

Arrow, "Raspberry PI3 by Raspberry Pi Foundation | Microcontrollers and Processors | Arrow.com", https://www.arrow.com/en/products/raspberrypi3/raspberry-pi-foundation?=&wm_g_phyloc=9026903&wm_g_intloc=&gclid=CMqlolWC284CFQEFaQodZ5gOFQ&utm_source=&utm_medium=cpc&utm_term=&utm_campaign, accessed on Dec. 19, 2016.

Depriest, "DGPS on Garmin Receivers", http://www.gpsinformation.org/dale/dgps.htm, Mar. 15, 2006.

Expert GPS, Calculating Area with a GPS: Calculate Acreage with a Garmin GPS, http://www.expertgps.com/calculating-area-with-a-gps.asp, Jun. 21, 2013, pp. 1-3.

Geocaching, The Official Global GPS Cache Hunt Site, http://www.geocaching.com/, Jun. 21, 2013, p. 1.

GPS Source, GCommercial—Retail GPS Retransmission, Re-radiator, GPS Repeating, GPS Retran, L1 Antennas, L1/L2 Antennas, GPS Antenas, et al., http://www.gpssource.com/commercial/retail, Jun. 21, 2012, pp. 1-2.

GPS Visualizer, GPS Visualizer: Do-It-Yourself Mapping, http://www.gpsvisualizer.com/, Jun. 21, 2013, pp. 1-2.

GPSHopper, Mobile Applications and Websites for Retailers, http://www.gpshopper.com/, Jun. 21, 2013, pp. 1-2.

InstaMapper, InstaMapper Free Real-Time GPS Tracking, http://www.instamapper.com/, Jun. 21, 2013, p. 1.

David Martin, Aurkene Alzua, Carlos Lamsfus, A Contextual Geofencing Mobile Tourism Service, Enter 2011 Research Track, 2011, 34 Pages, Innsbruck, Austria, available at https://pdfs.semanticscholar.org/cafa/ffe83a9ba1e73156088577ccc7dc6ababa51.pdf.

Fabrice Reclus, Kristen Drouard, Geofencing for Fleet & Freight Management, IEEE Xplore Digital Library, Jan. 29, 2010, Lille, France, available at http://ieeexplore.ieee.org/abstract/document/5399328/.

Axel Kupper, Ulrich Bareth, Behrend Freese, Geofencing and Background Tracking—The Next Features in LBSs, Oct. 2011, 14 Pages, TU Berlin—Deutsche Telekom Laboratories, TEL 19, Ernt-Reuter-Platz 7, 10583 Berlin, available at http://citeseerx.ist.psu.edu/viewdoc/download?doi=10.1.1.259.1629&rep=rep1&type=pdf.

Jonathan P. Munson, Vineet K. Gupta, Location-Based Notification as a General-Purpose Service, Workshop Mobile Commerce, 2002, available at https://pdfs.semanticscholar.org/1bb5/6ae0a70b030e2f2376ed246834bddcabd27b.pdf.

Anthony Lamarca, Eyal De Lara, Location Systems, An Introduction to the Technology Behind Location Awareness, Copyright Morgan & Claypool 2008, available at http://pooh.poly.asu.edu/Mobile/ClassNotes/Papers/Location/LocationSystemsAnIntroToTechLocationAwareness.pdf.

Sixten Sidfeldt, Bachelor Thesis, Mobile advertising and Marketing, Luea University of Technology Department of Business Administration, Technology and Social Sciences, Apr. 25, 2012, 68 Pages, available at http://www.diva-portal.org/smash/get/diva2:1018709/FULLTEXT02.

* cited by examiner

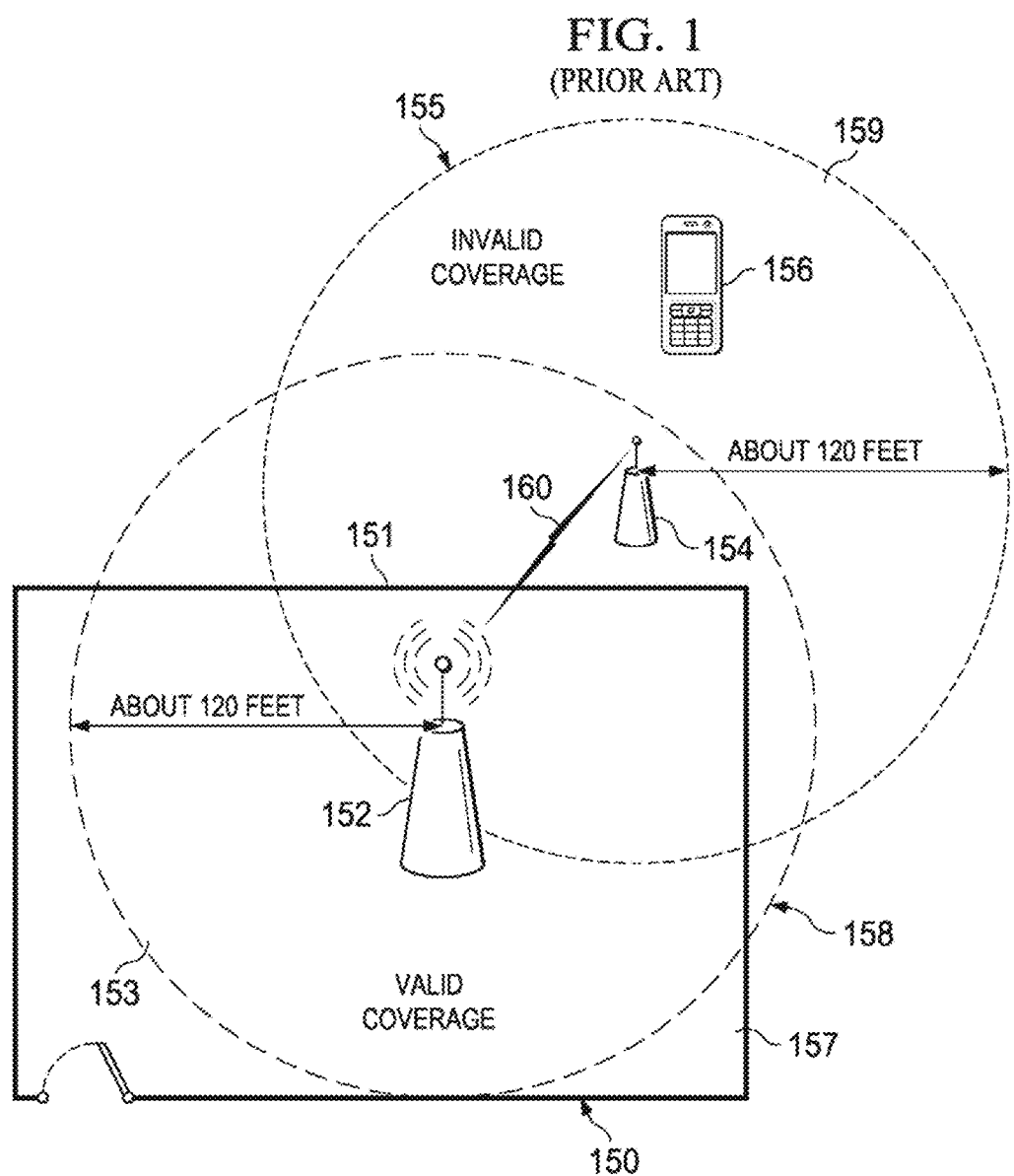

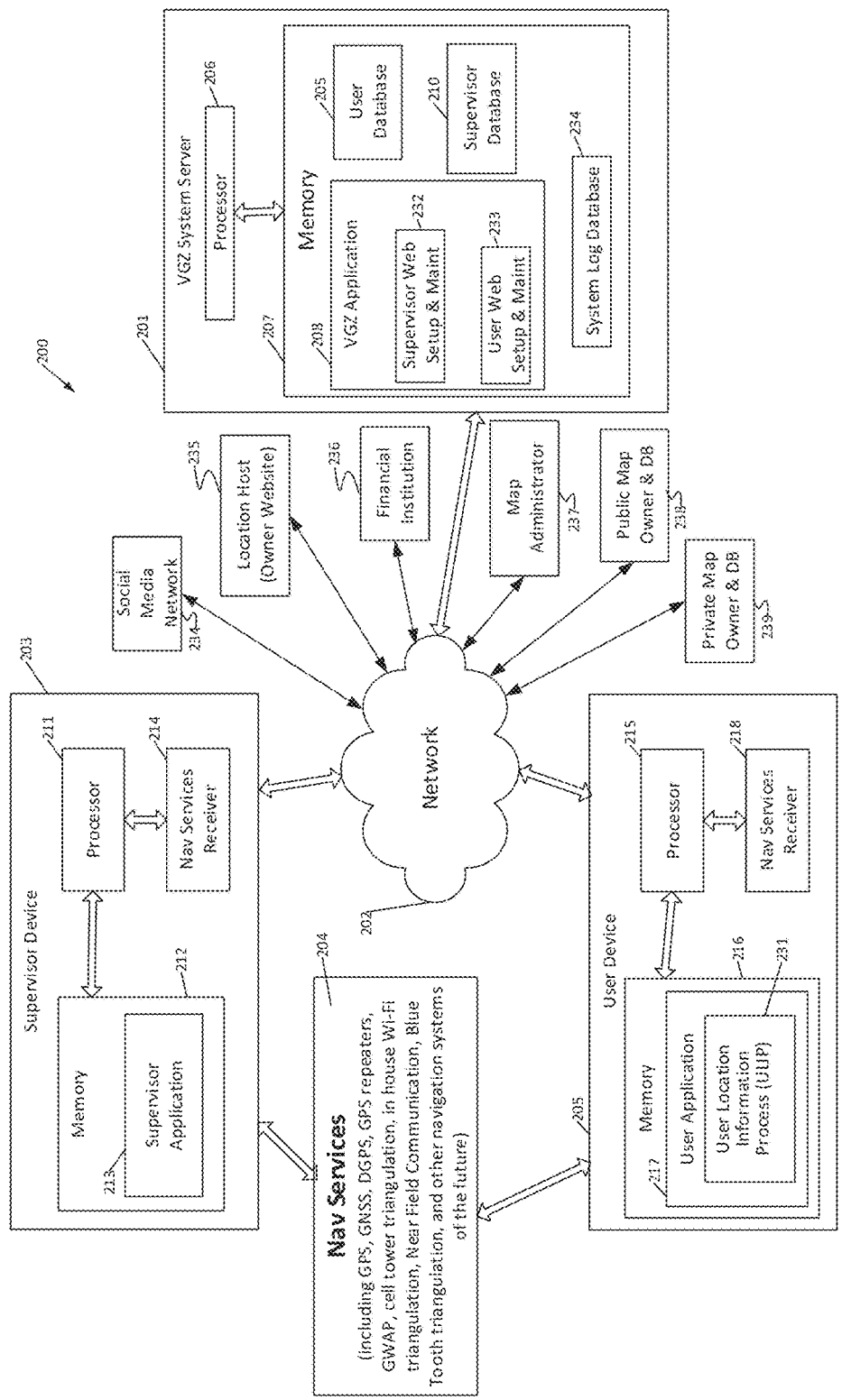
Figure 2A – Virtual Geographic Zone System Overview

DATABASES

BUILDING LAYOUT FOR SECURITY TOUR

GAMING ZONE THAT INCLUDES
A HOTEL AND CASINO

GAMING ZONE COVERAGE OF A 100
SQUARE MILE LARGE LAND AREA WITH
INCLUDED AND EXCLUDED GAMING
ZONES (NOT DRAWN TO SCALE)

PERSON TO PERSON (P2P) GAMING IN
THREE DIFFERENT GAMING ZONES
(NOT DRAWN TO SCALE)

SUPERVISOR SETUP

ESTABLISH ZONE/SUB-ZONE

DEFINE ZONE/SUB-ZONE

USER SETUP

MONITOR USER
LOCATIONS FOR
ZONE ENGAGEMENT

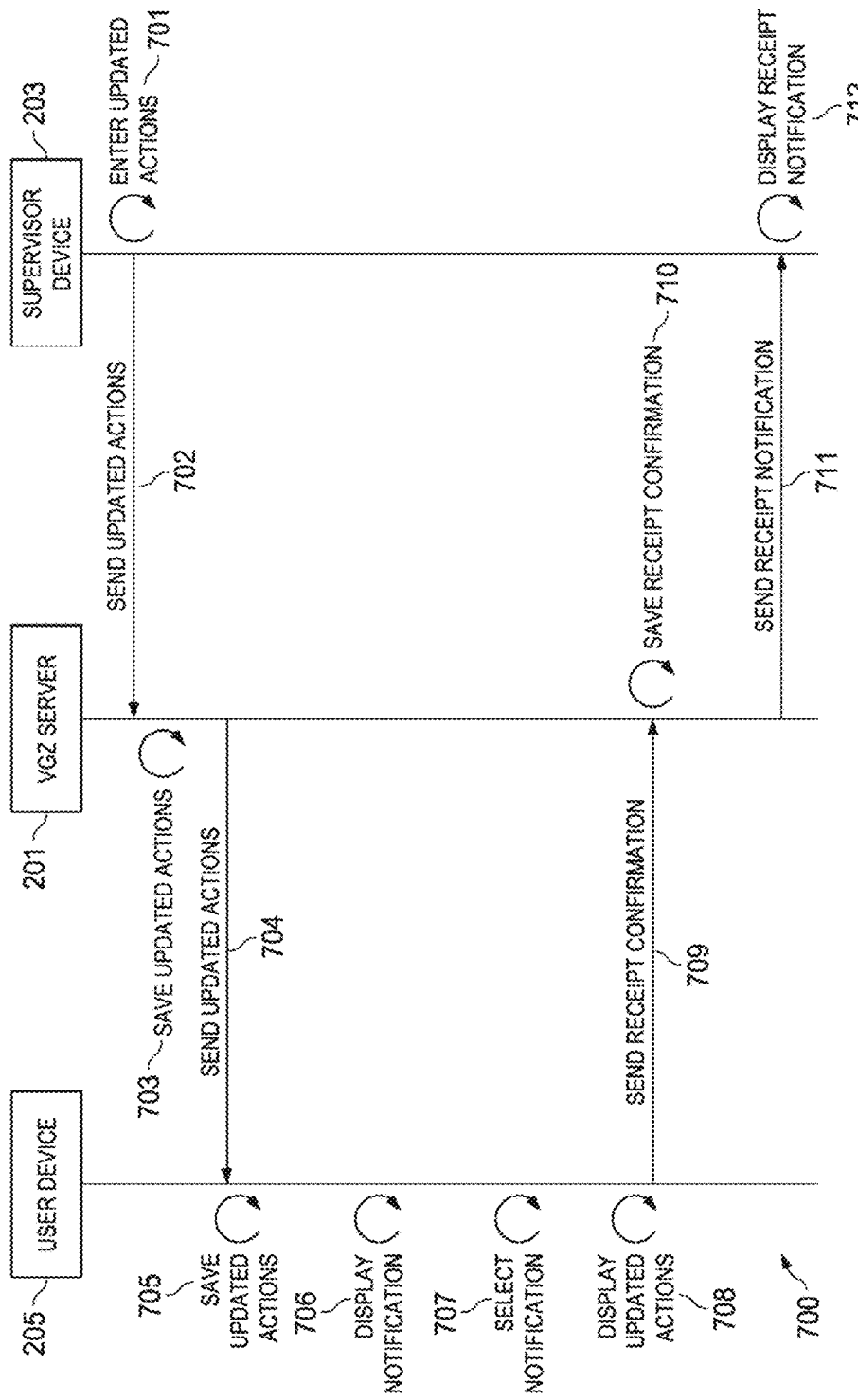

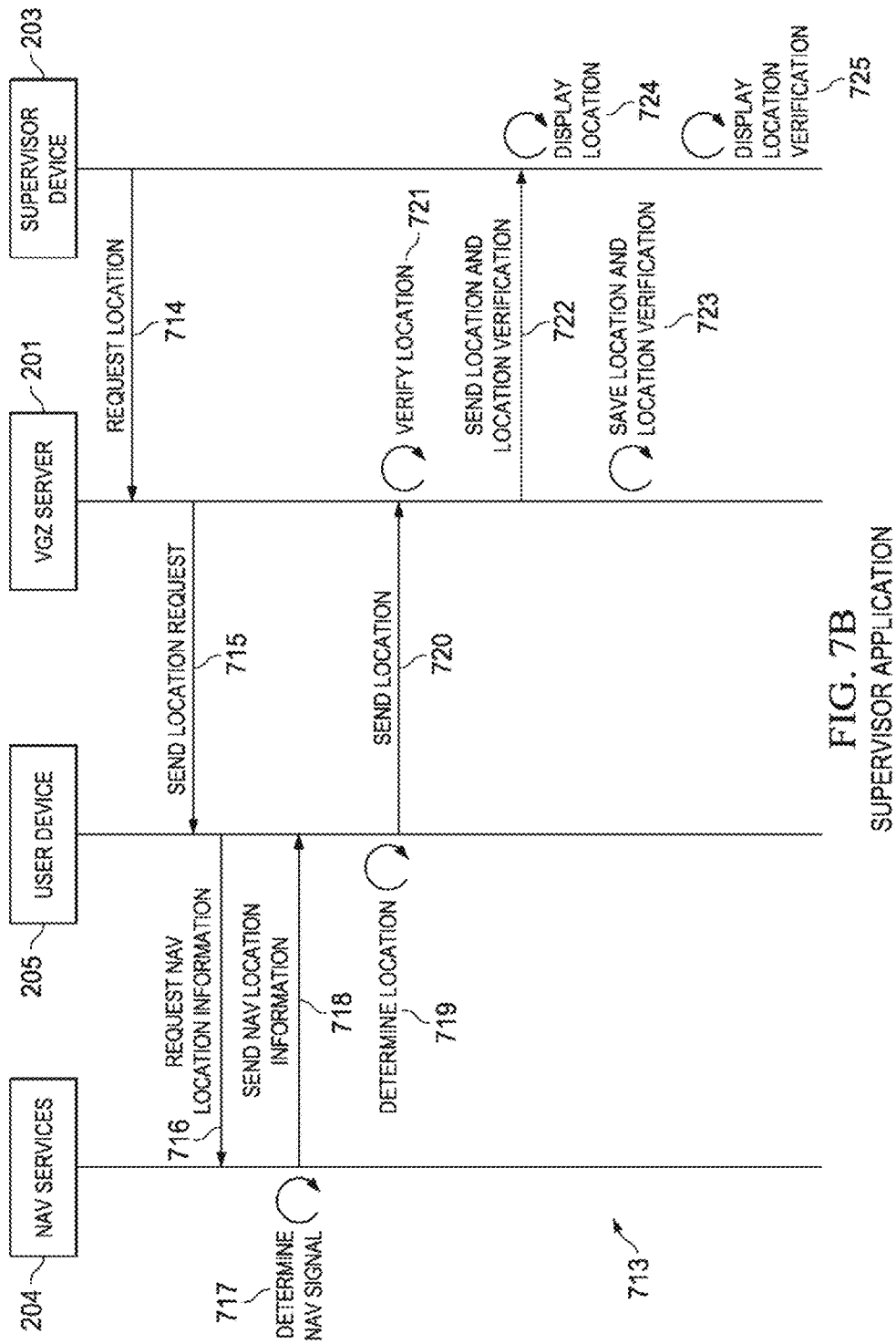

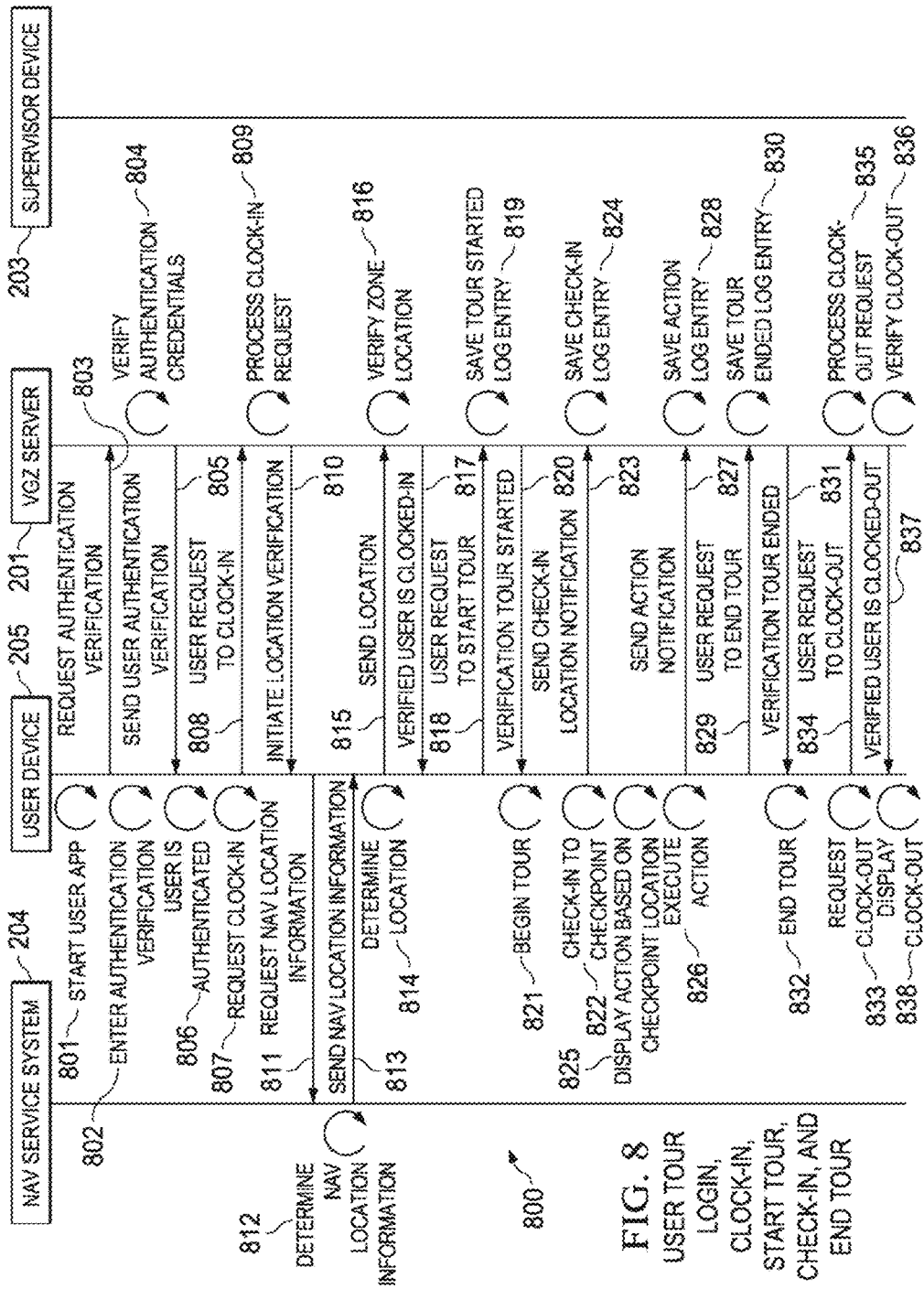
FIG. 8 USER TOUR LOGIN, CLOCK-IN, START TOUR, CHECK-IN, AND END TOUR

TOUR SCHEDULE
ON-TIME

USER APPLICATION WITH ULIP

USER APPLICATION
TRANSFER PROCESS

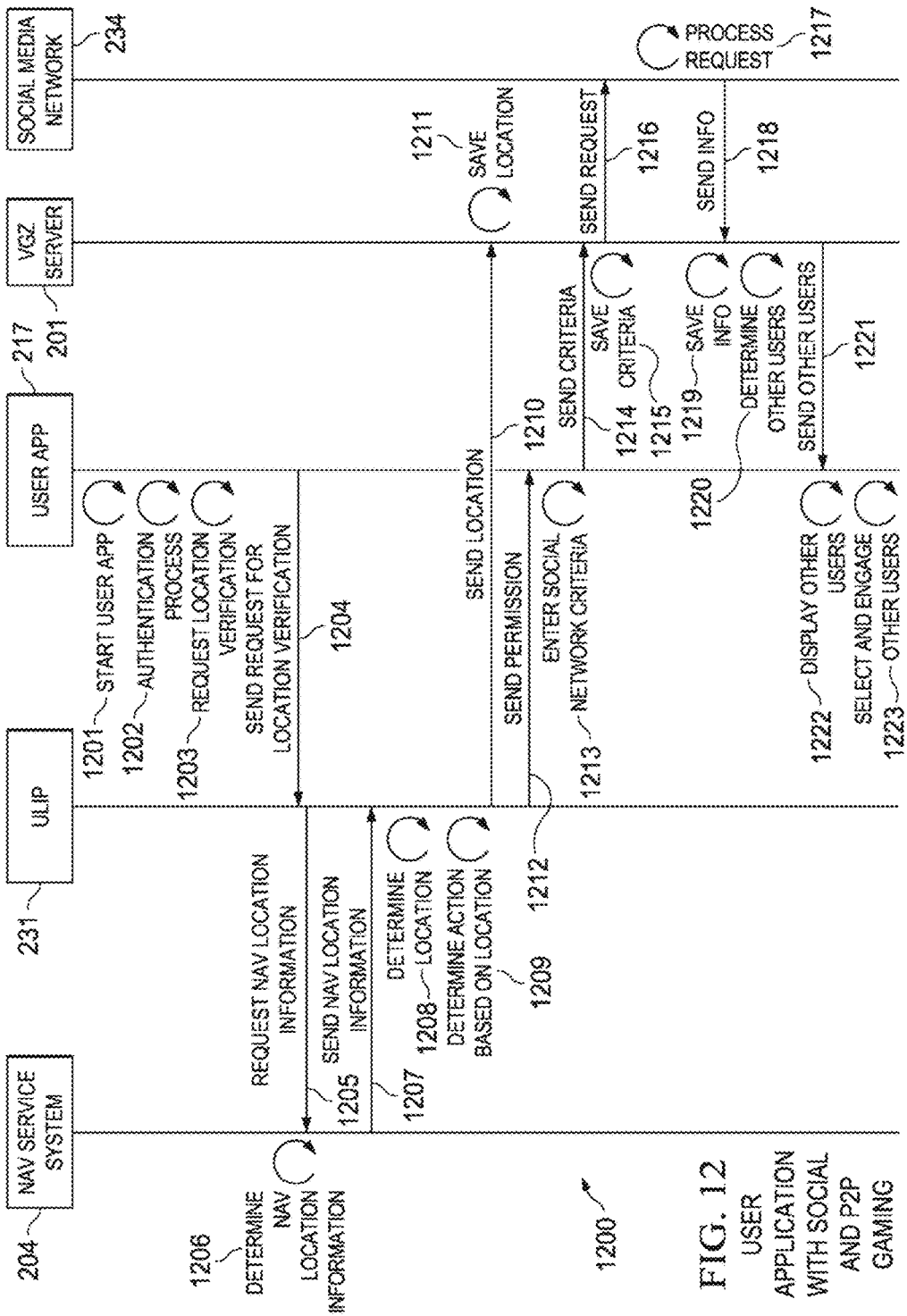
FIG. 12 USER APPLICATION WITH SOCIAL AND P2P GAMING

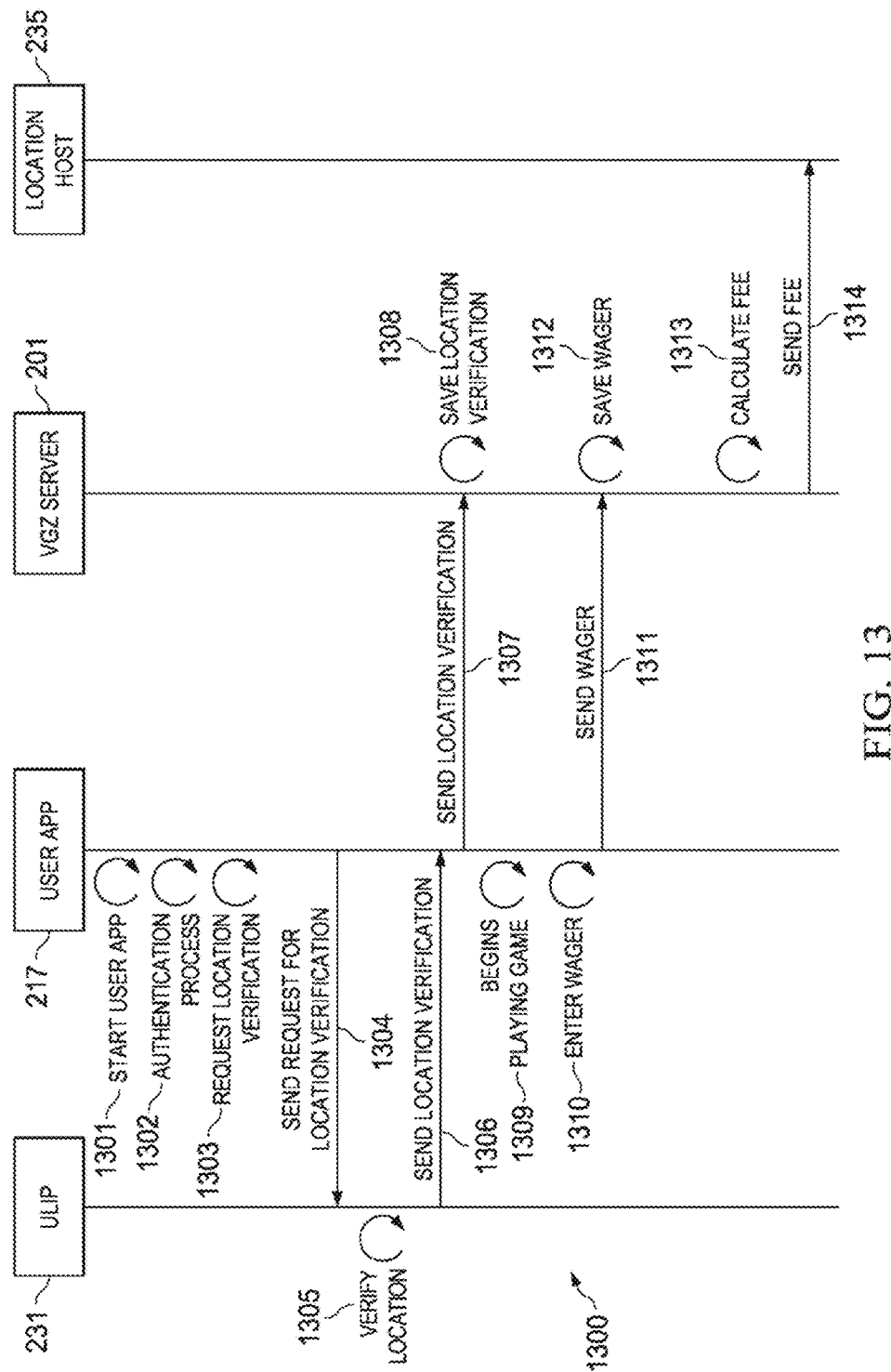

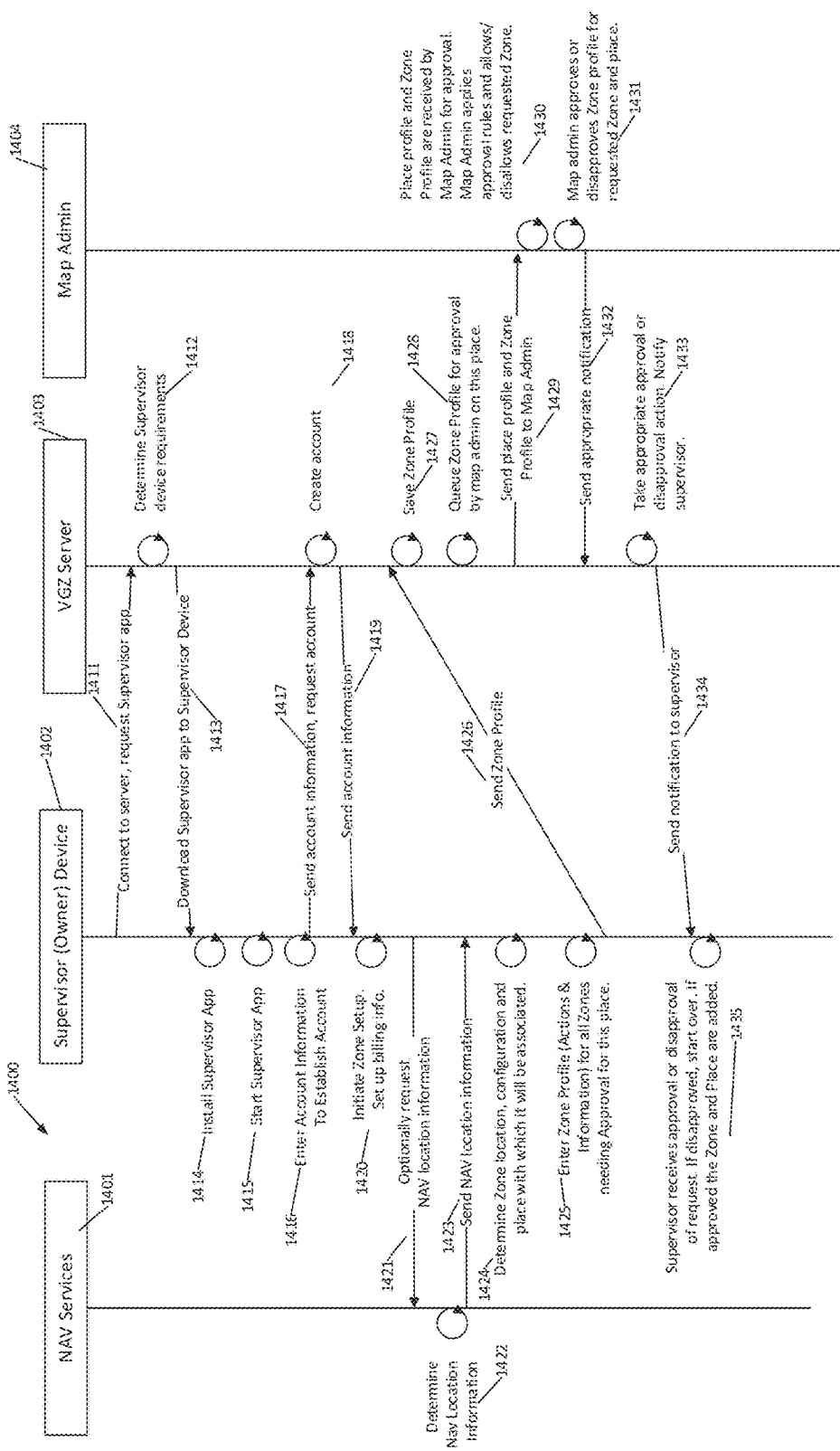
Fig 14A — Owner/Supervisor Setup and Zone Profile Request Operation

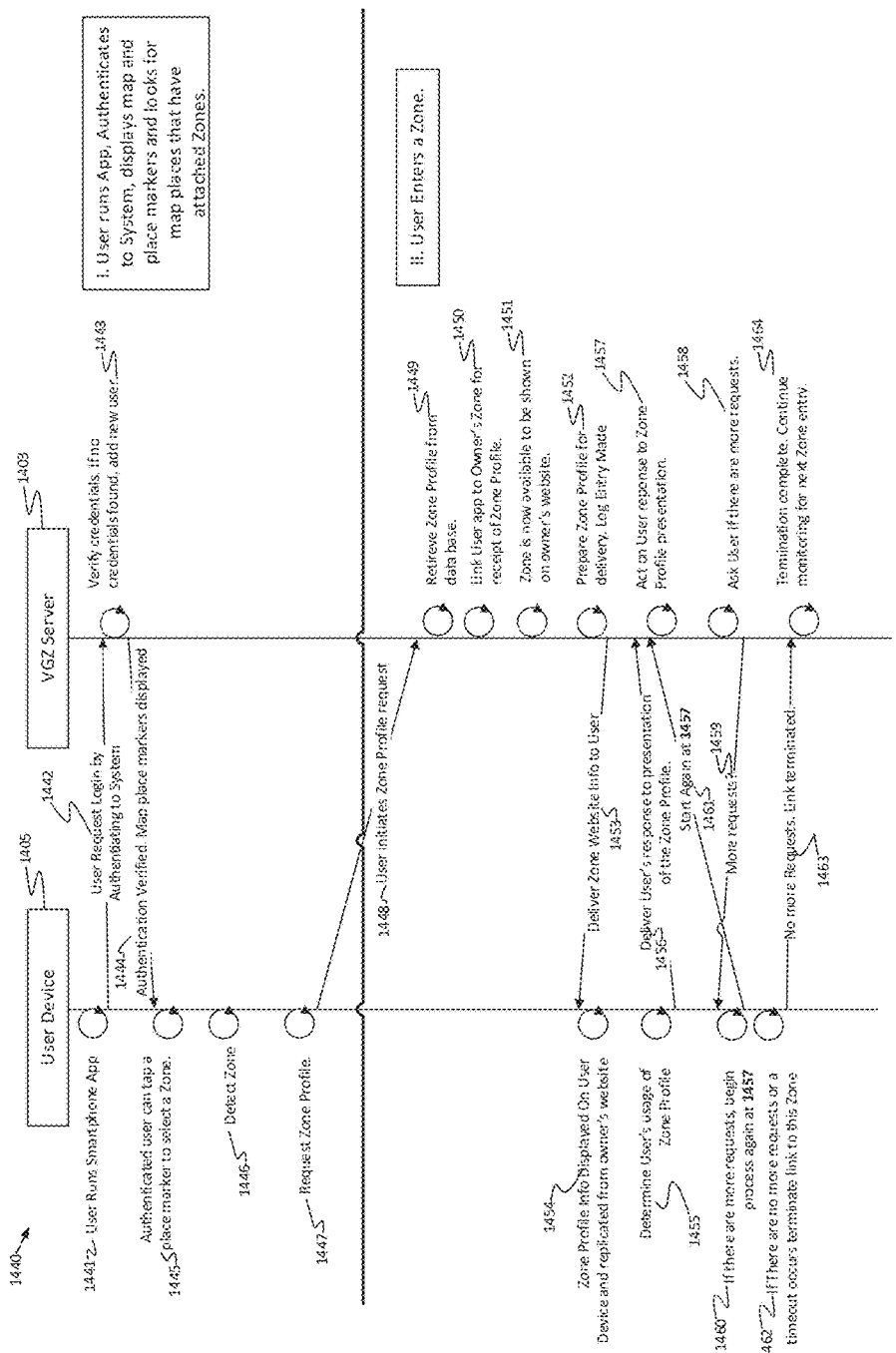

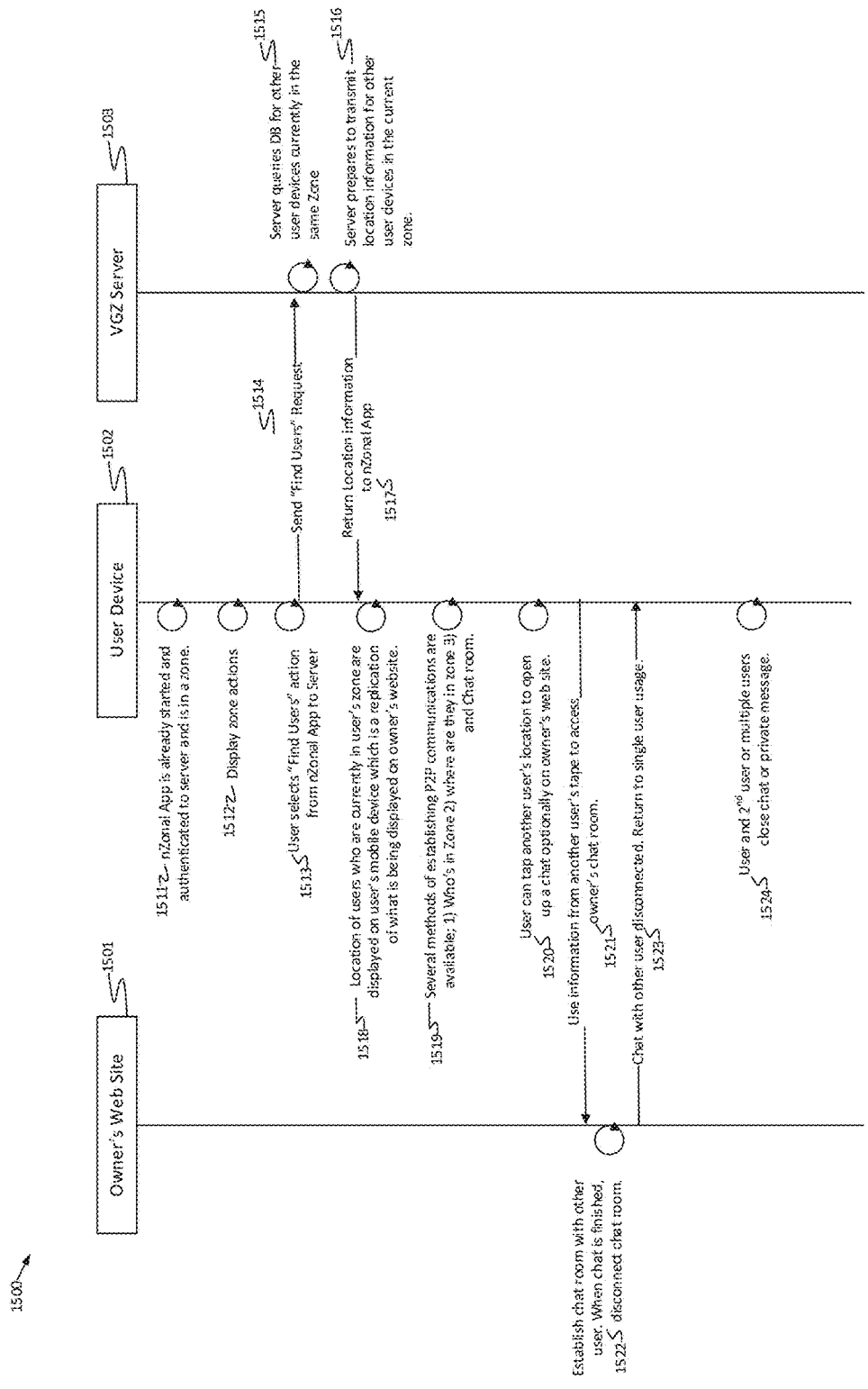
Fig 15 — User Person to Person Interaction
Via nZonal App while in Owner's Web Site Chat Room.

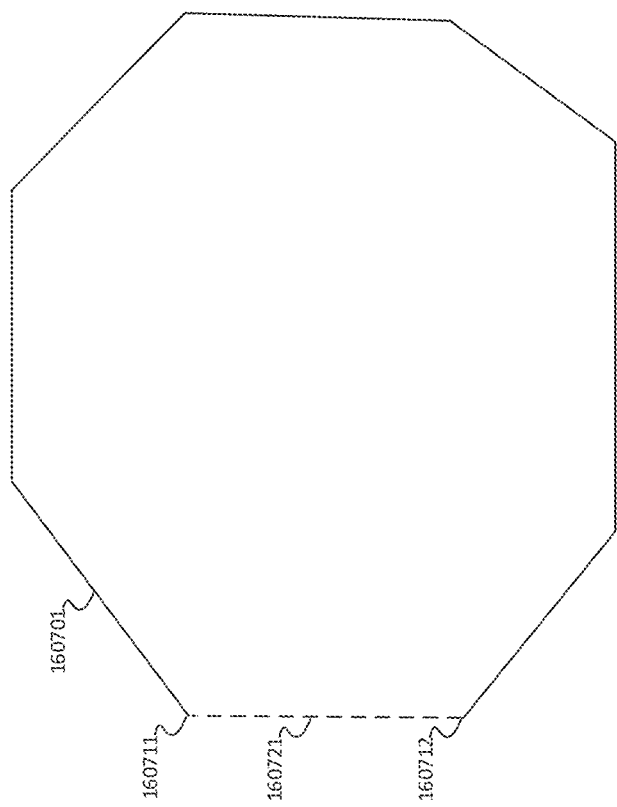
FIG. 16G – Virtual Gate to a Place Zone

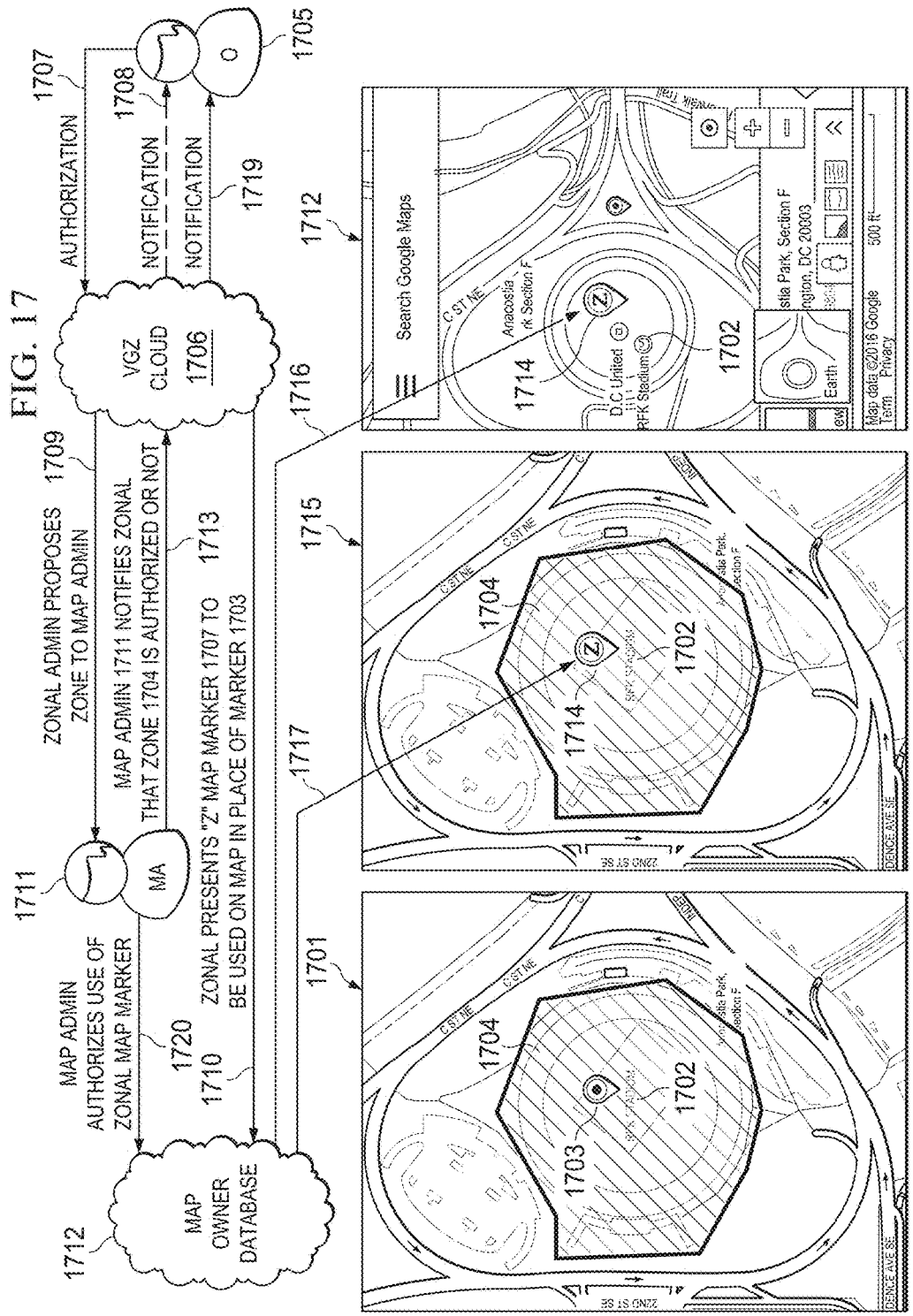

Owner/Supervisor Setup and Zone request Process
and
Owner Zone Map Marker links to Owner Web Site Owner Creates Zone with Active Marker User Access Method #1
Mobile Device to Website - Authorized User Access Method #2
Mobile Device to Website – Active Marker User Access Method #3
Mobile Device to VGZ 201 Cloud
(No Owner Website)

User Access Method #4
User is in Zone
No Map Showing Zone

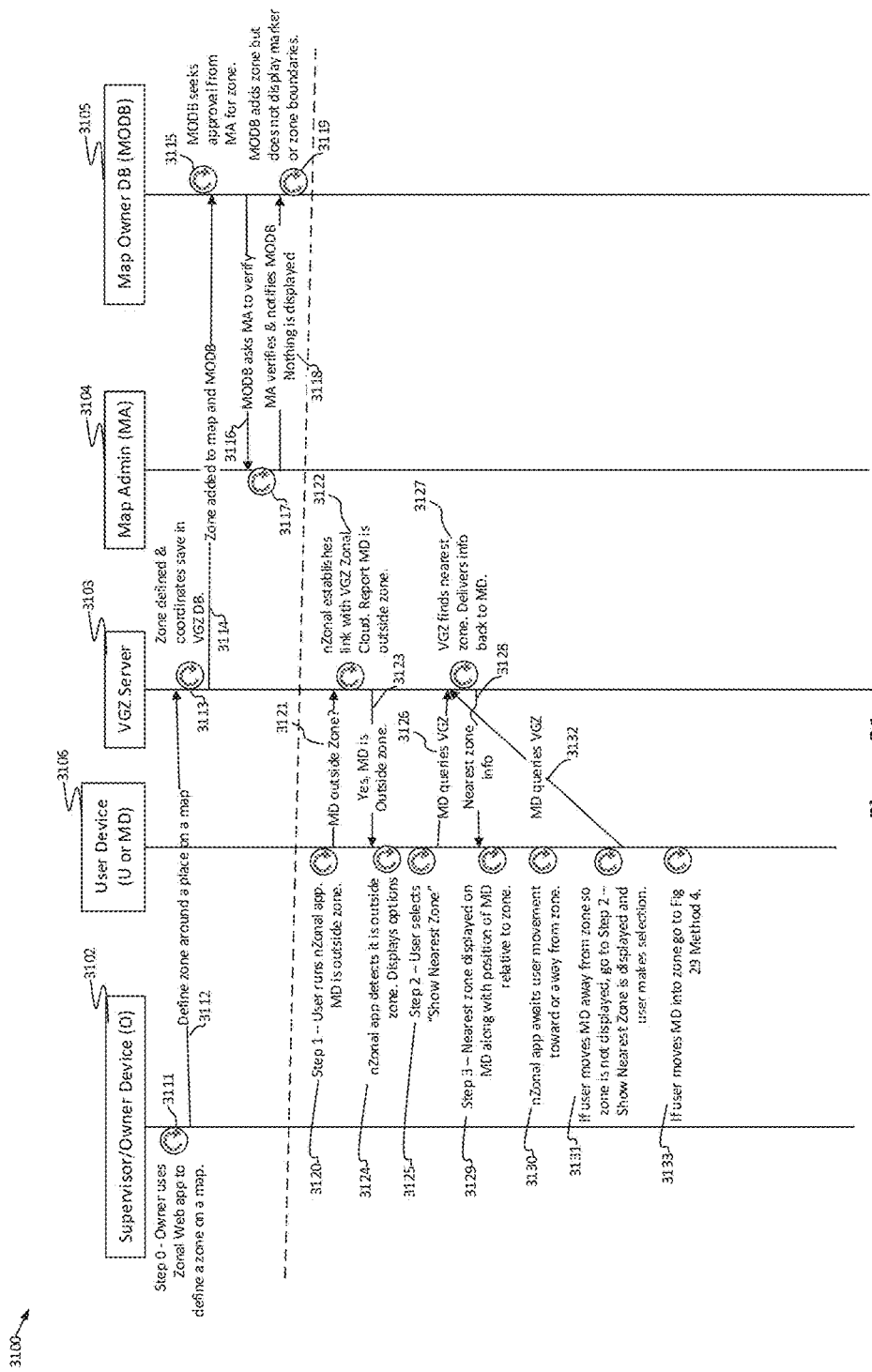

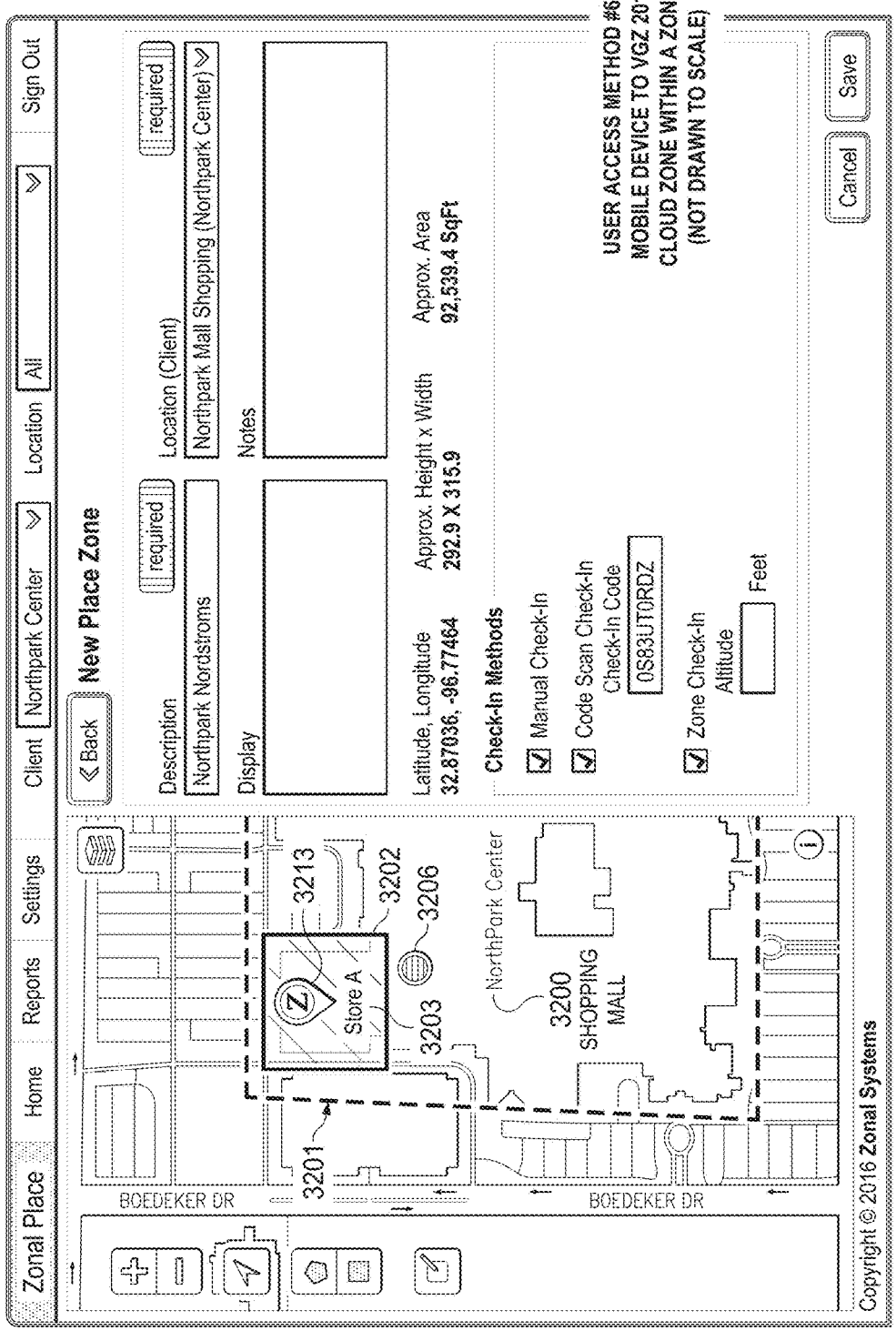
FIG. 32A  OWNER UI SHOWING INNER AND OUTER ZONES

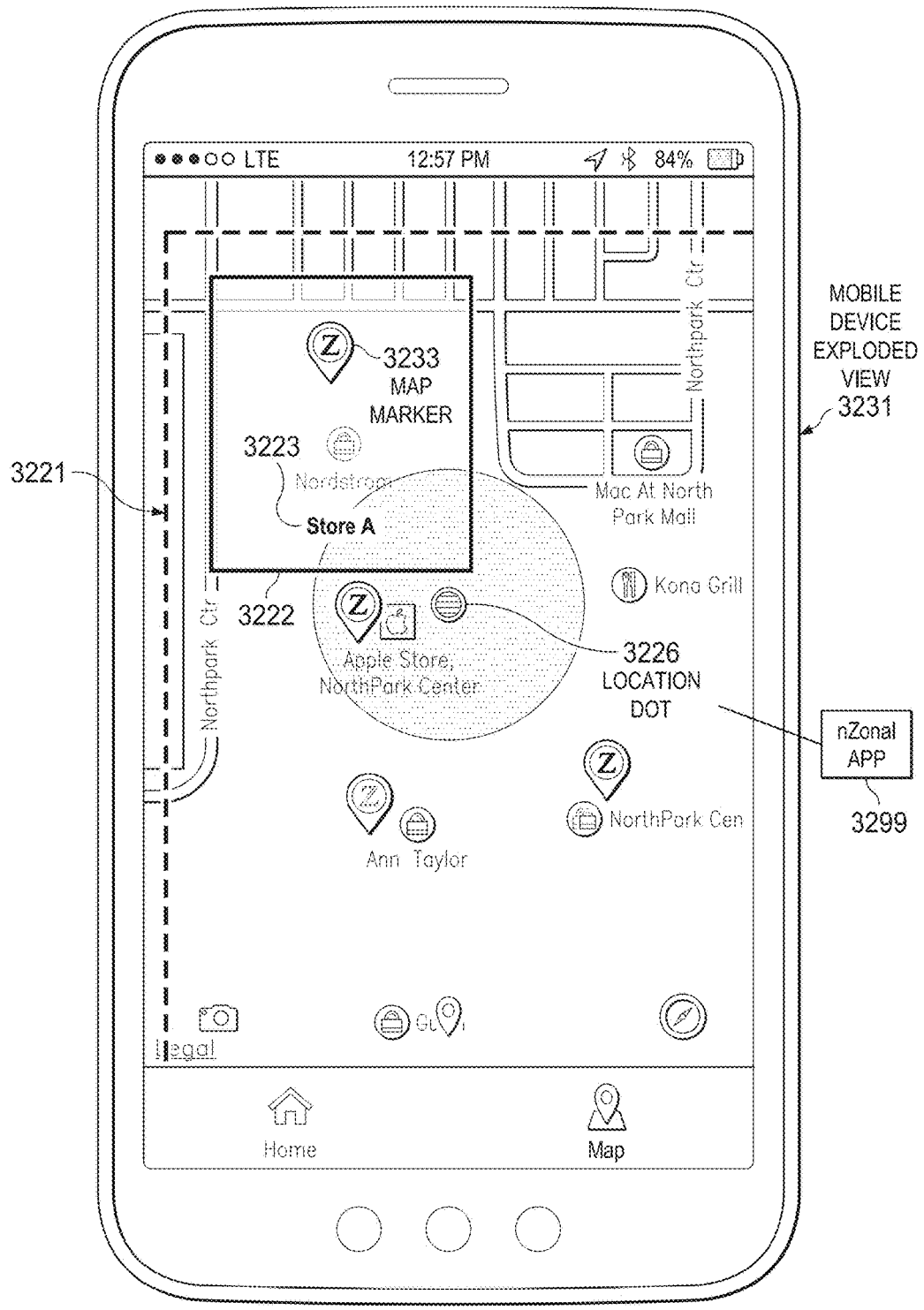

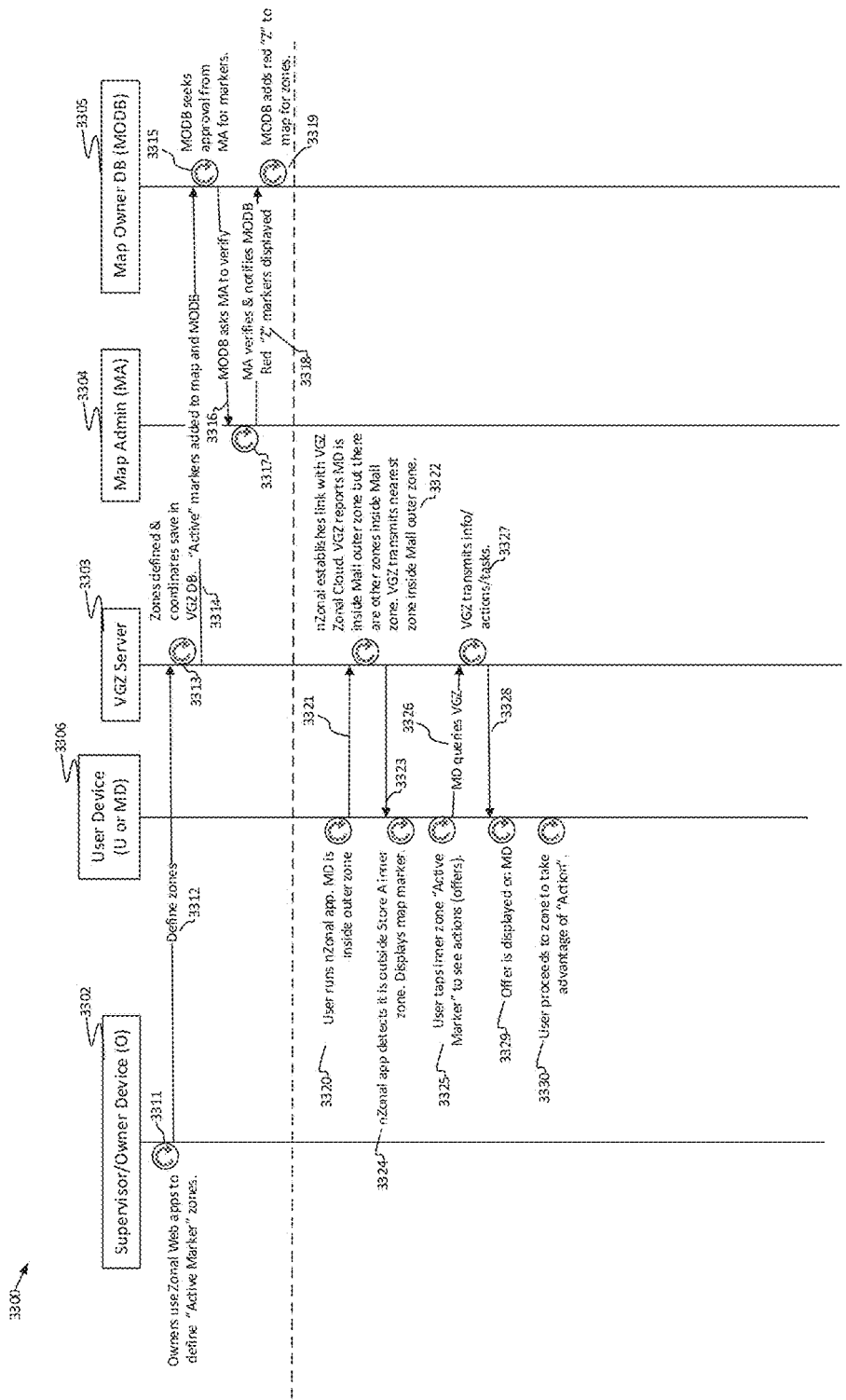

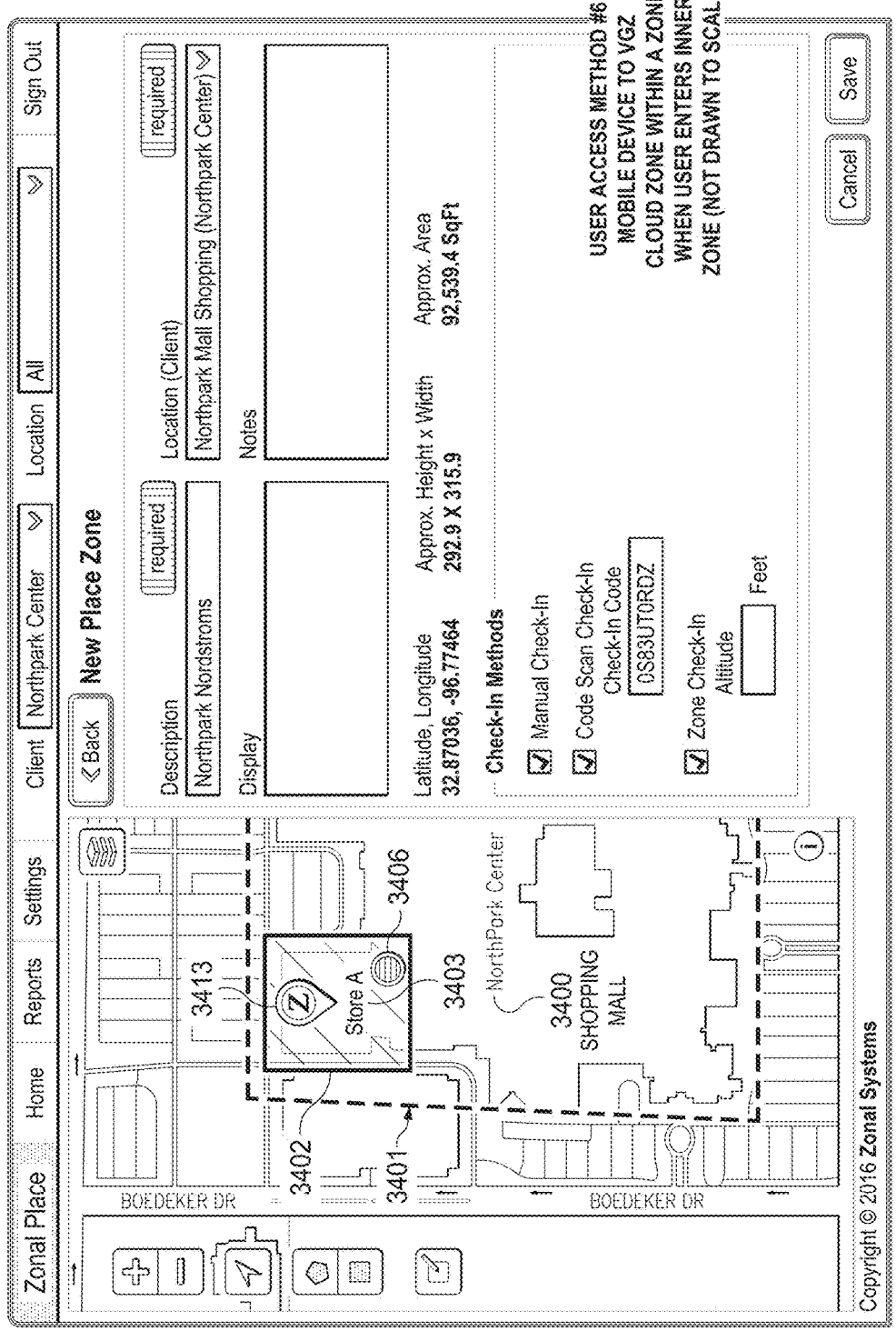
FIG. 34A  OWNER UI SHOWING INNER AND OUTER ZONES

User Access Method #7
User Movement in Nested Zones

Figure 36 Social Zone at a Hotel Courtyard

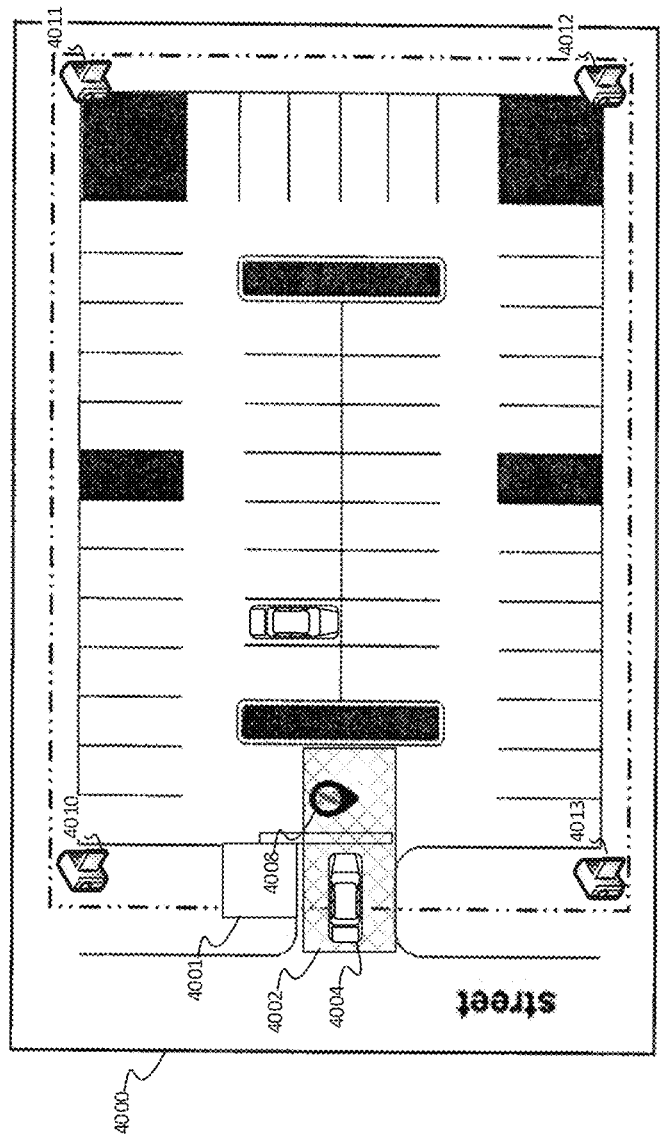
Figure 40A – Parking Lot Embodiment

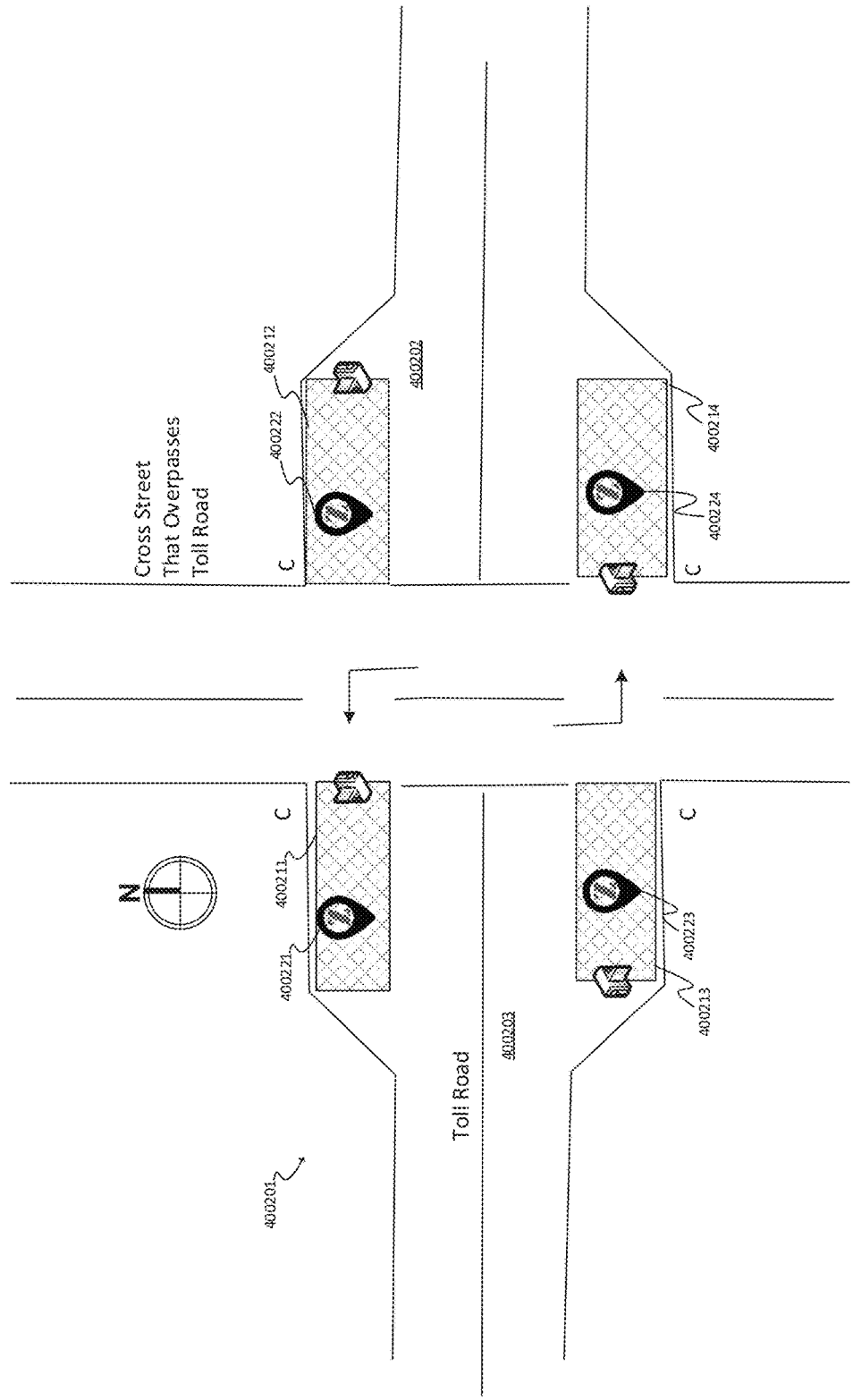

Tracking or Control of Aircraft with Zones Along a Flight Path (Not drawn to scale – All vertical lines are parallel to longitudinal Cartesian coordinates and equidistance apart. Likewise all horizontal lines are parallel to Latitudinal Cartesian coordinates and are equidistance apart.)

Tracking or Controlling an Aircraft's Flight Path with Polyhedral Zones (Not drawn to scale – All vertical lines are parallel and equidistance apart as are all horizontal lines)

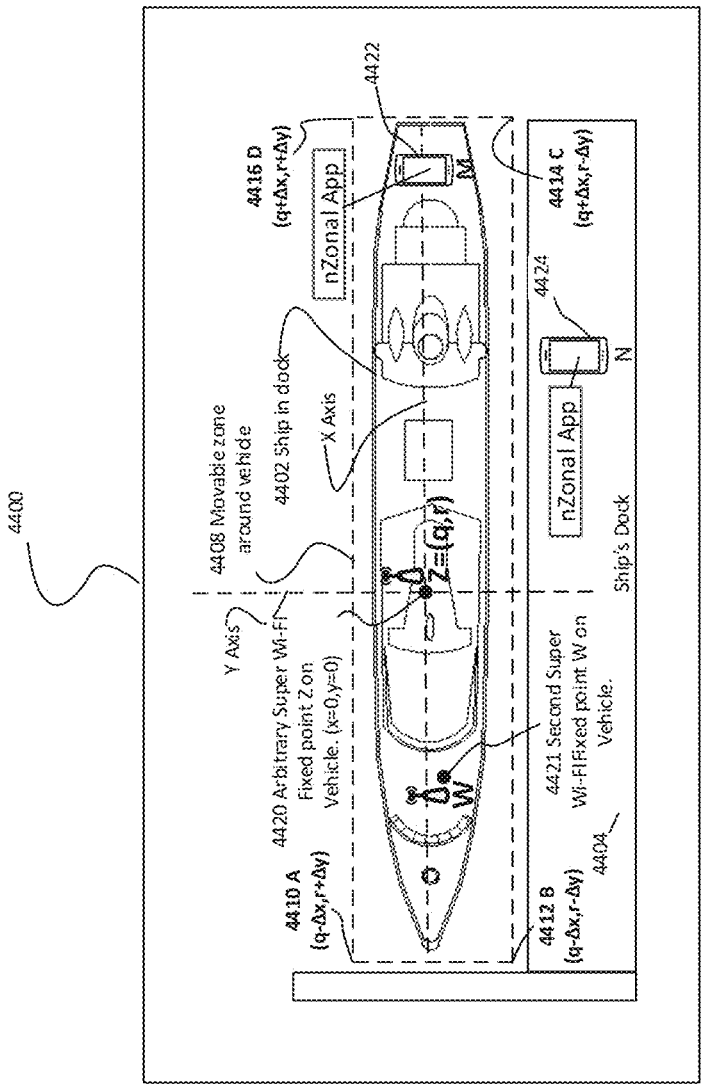
Figure 44 – Movable Zone

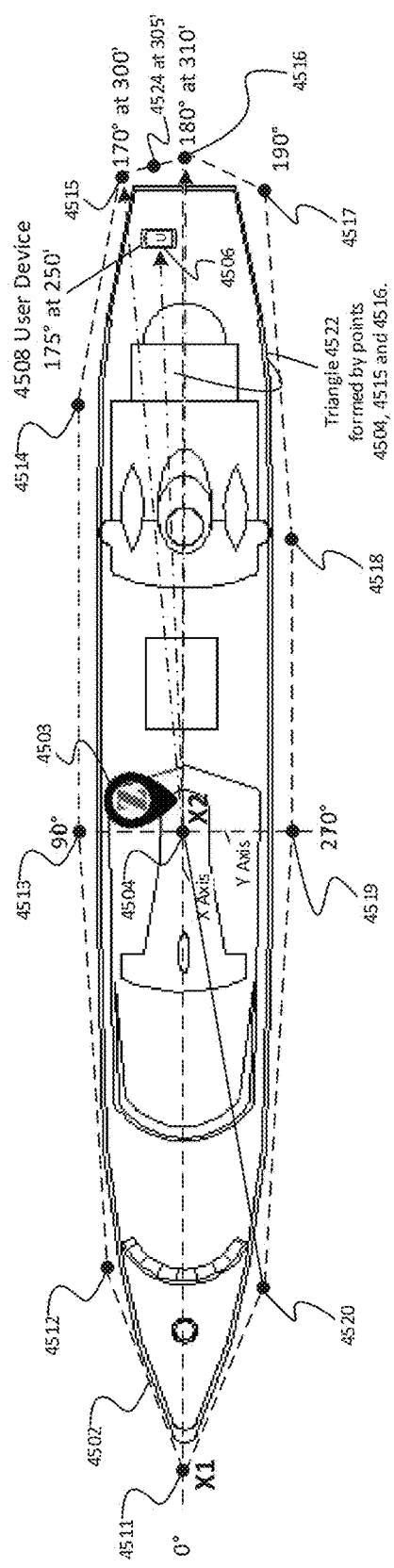
Figure 45A – Movable Zone
Using Polar Coordinates for Inclusion

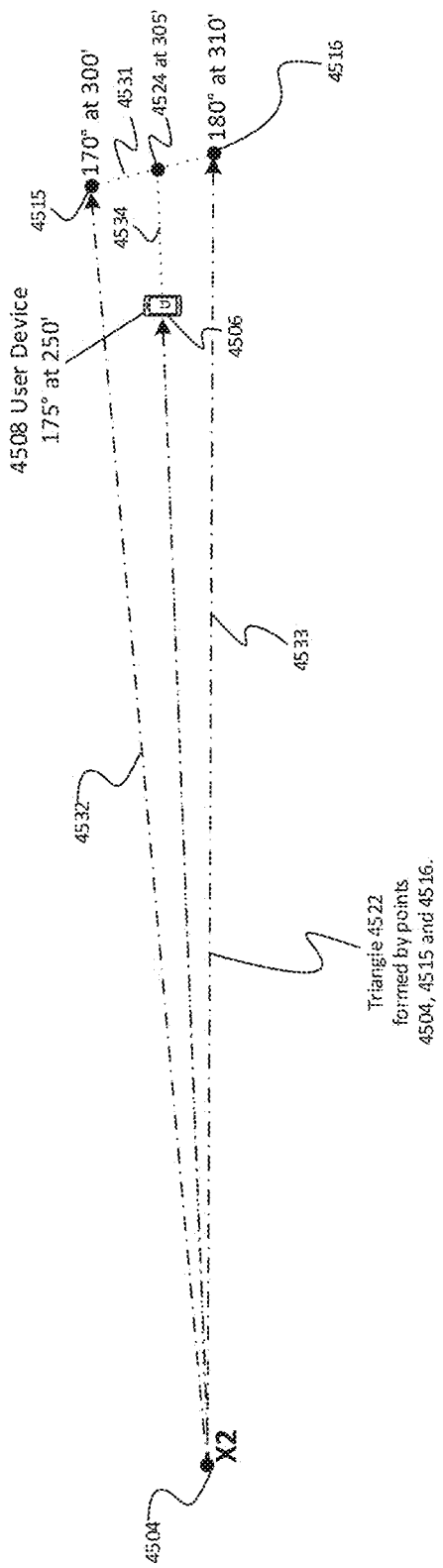
Figure 45B – Movable Zone
Using Polar Coordinates for Inclusion

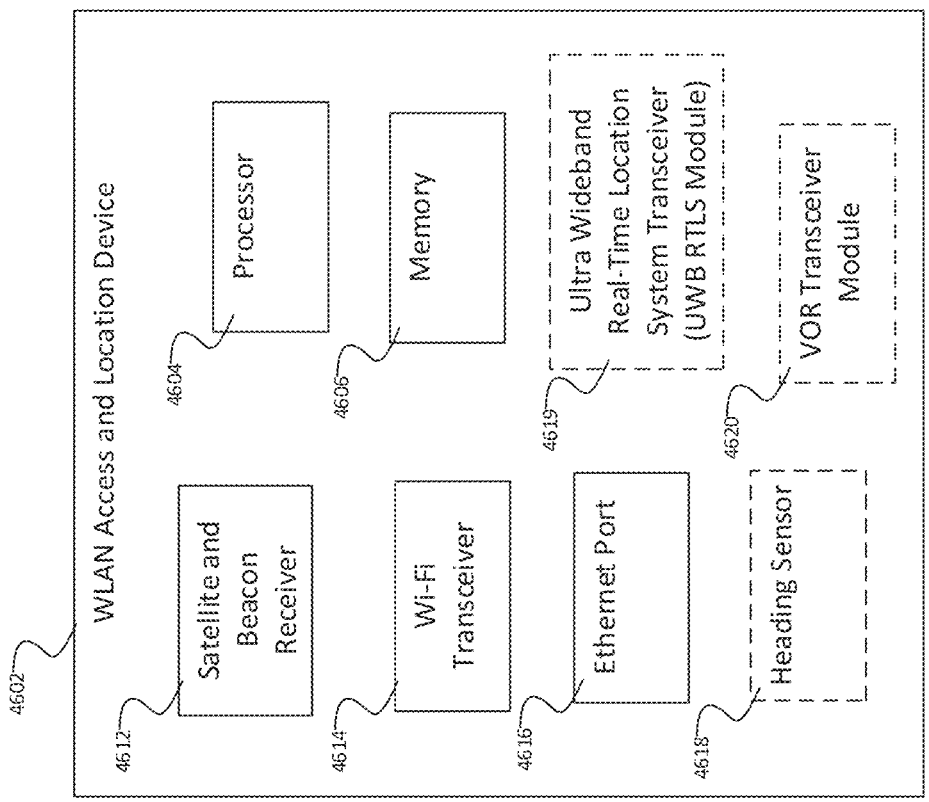
Figure 46 – WLAN Access and Location Device

Figure 48 – Flochart of Method of Processing Satellite Images for Building Recognition

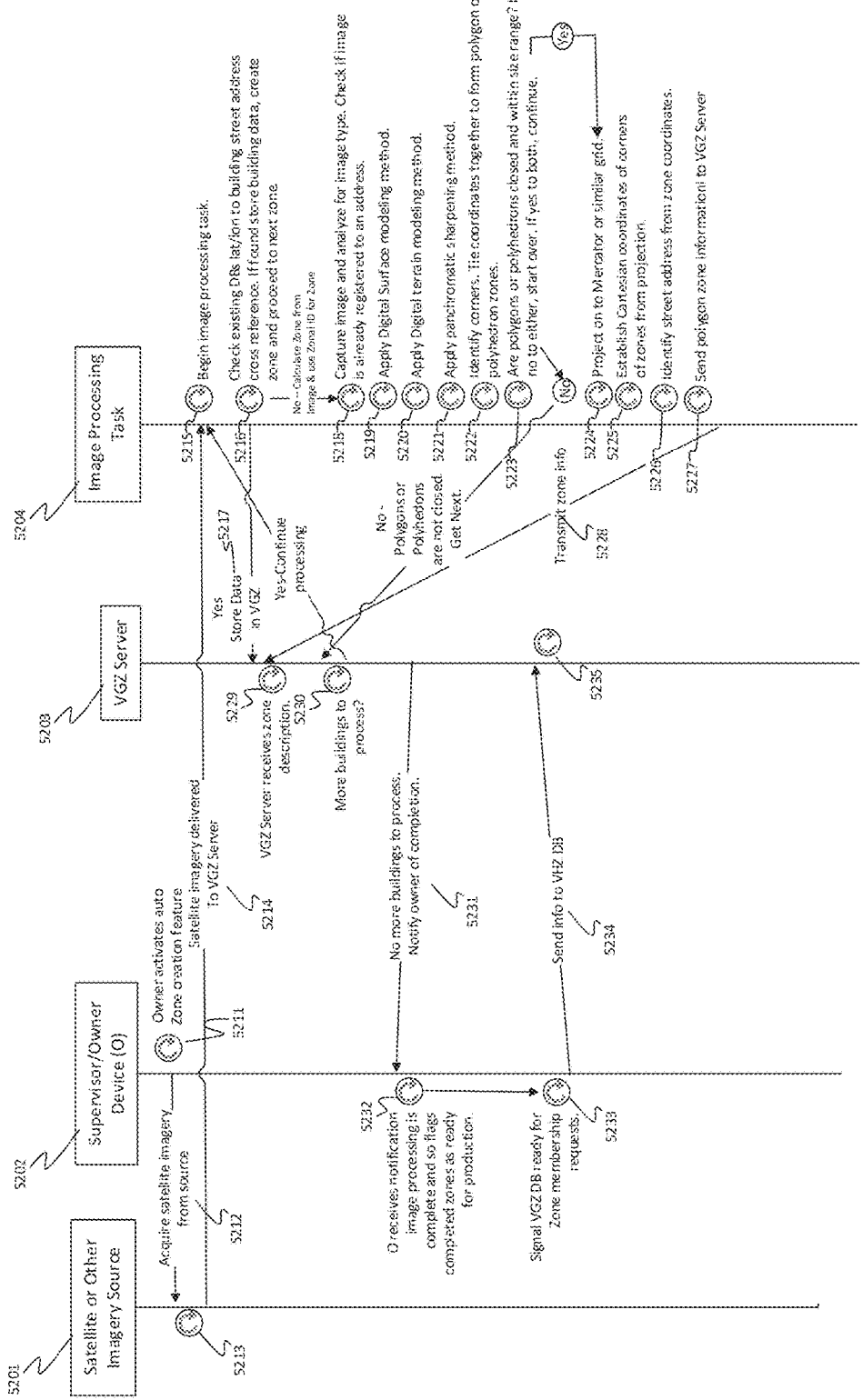
Figure 52 – Flow Chart of
Automatic Zone Creation from Satellite or Other Imagery GEOLOCATED Wi-Fi ACCESS POINT
(GWAP) FUNCTIONAL DIAGRAM

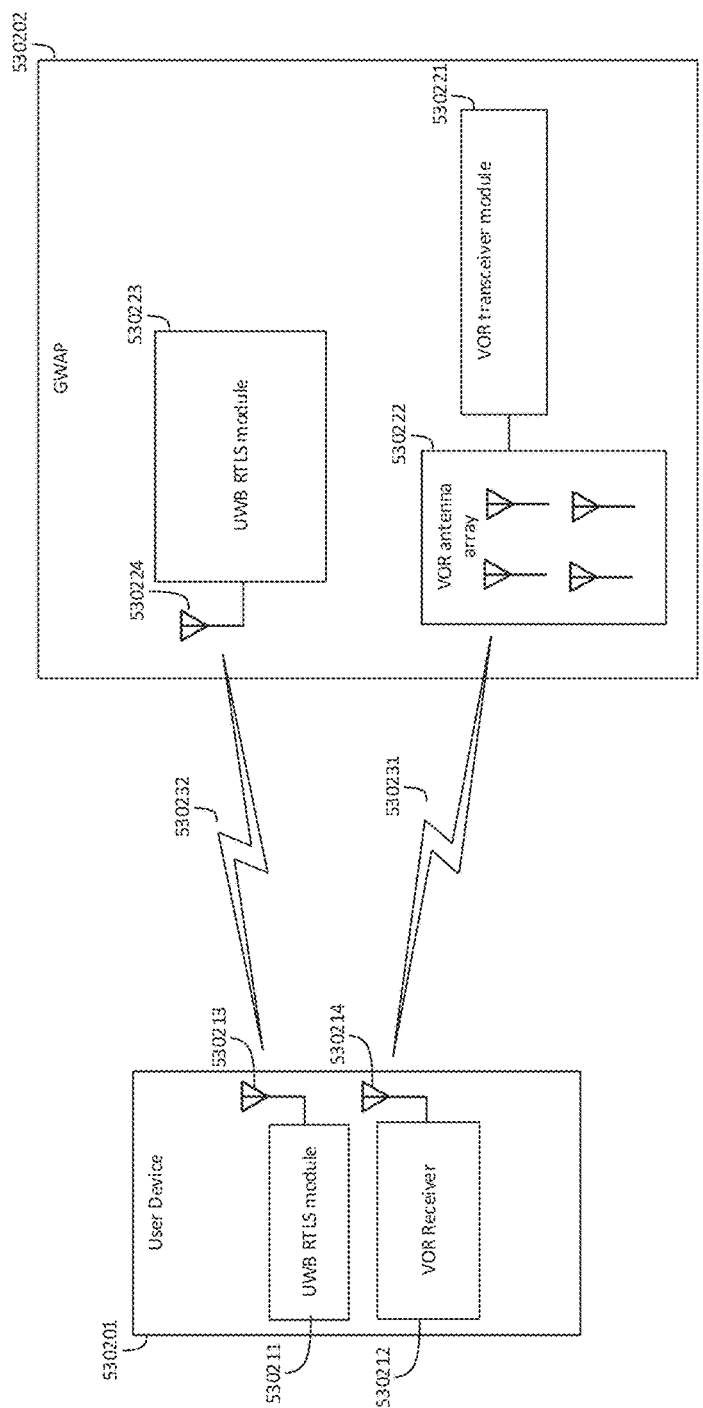
Figure 53B Geo-positioning of a User Device by GWAP

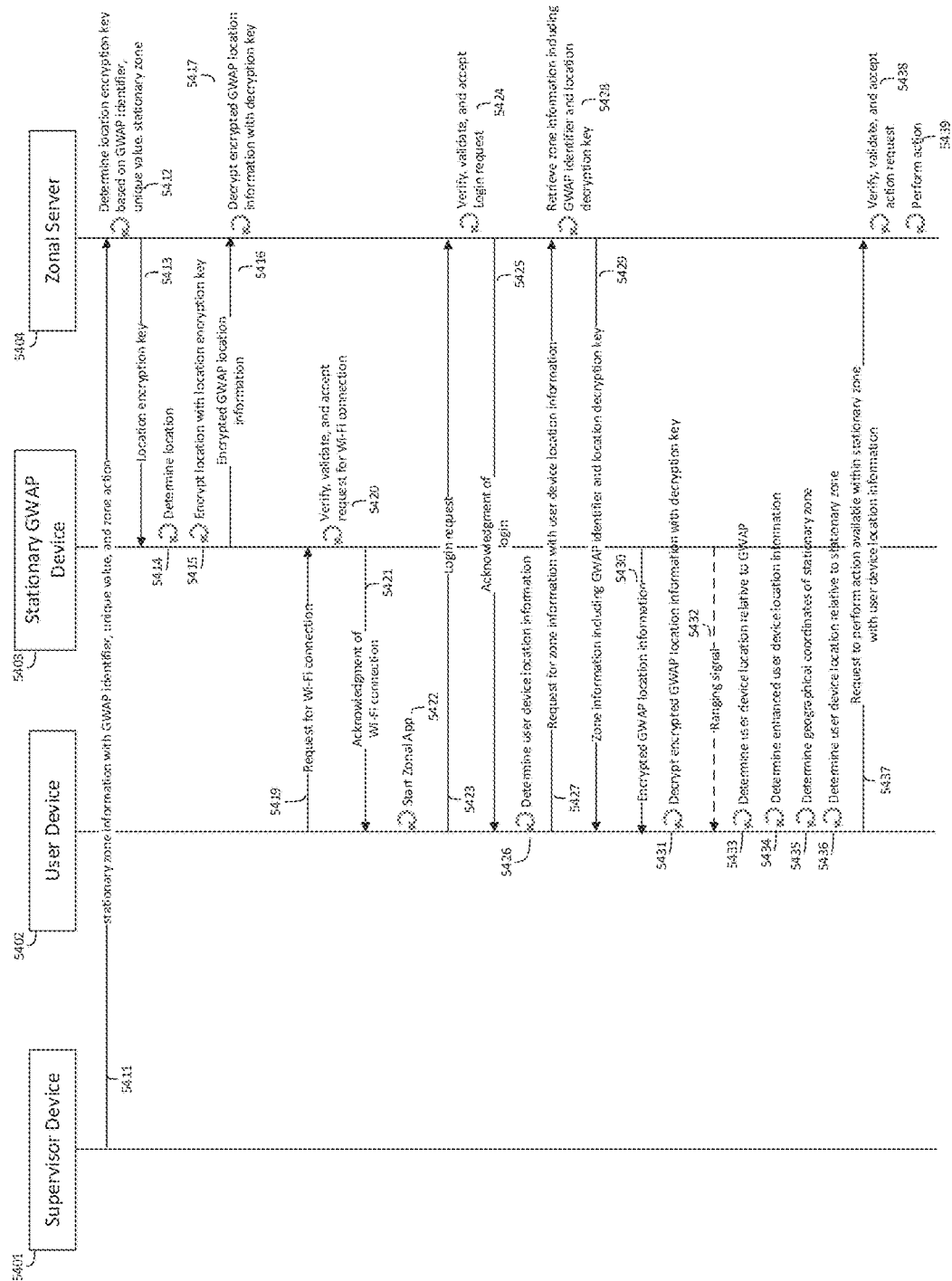
Figure 54 Stationary Zone

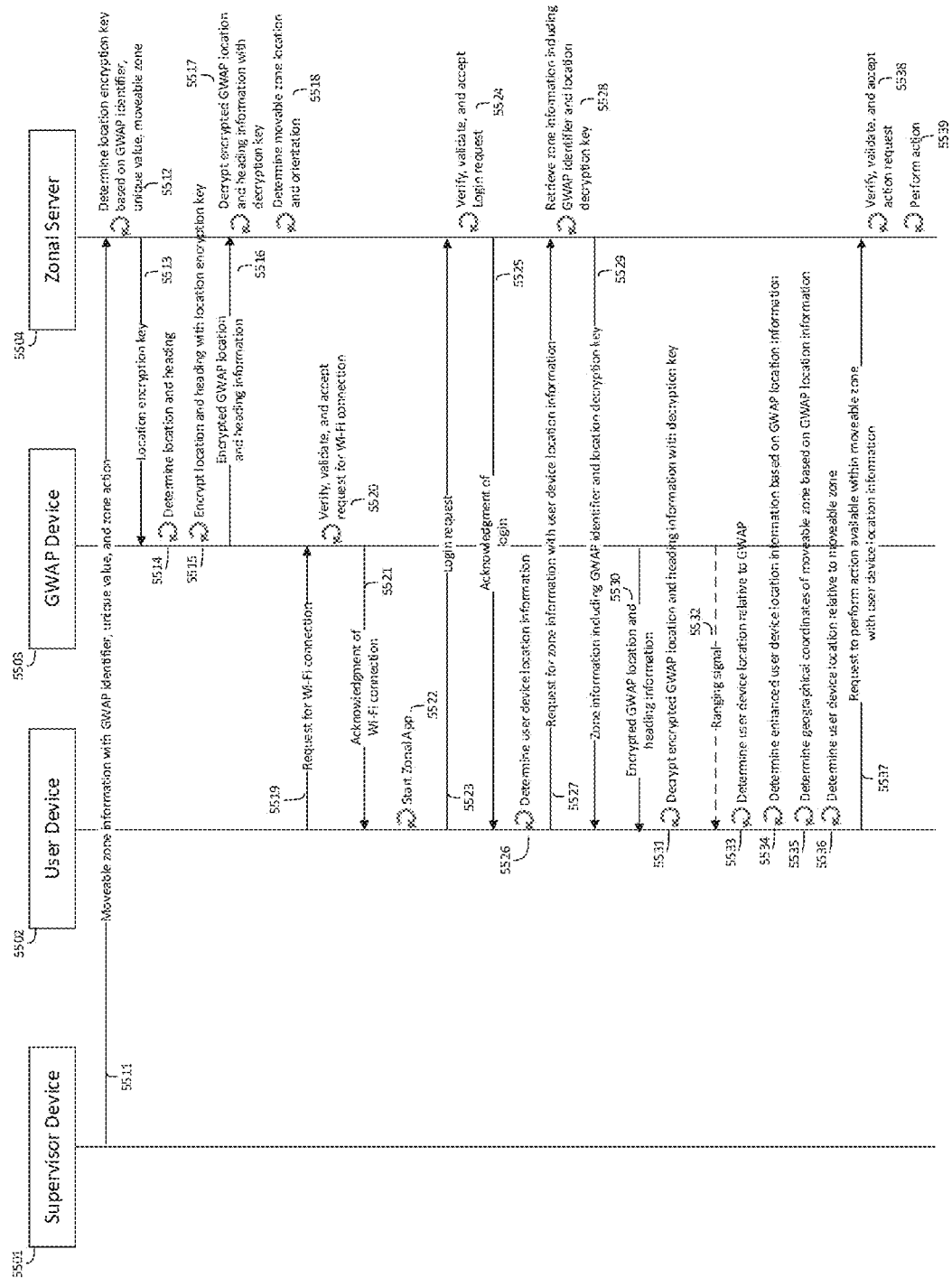
Figure 55 Movable Zone

Use of a Geo-located Wi-Fi Access Point (GWAP) and UWB Transceivers for Geo-Positioning of a Mobile Device Use of a Geo-located Wi-Fi Access Point (GWAP) and
UWB Transceivers for Geo-Positioning of a Mobile Device

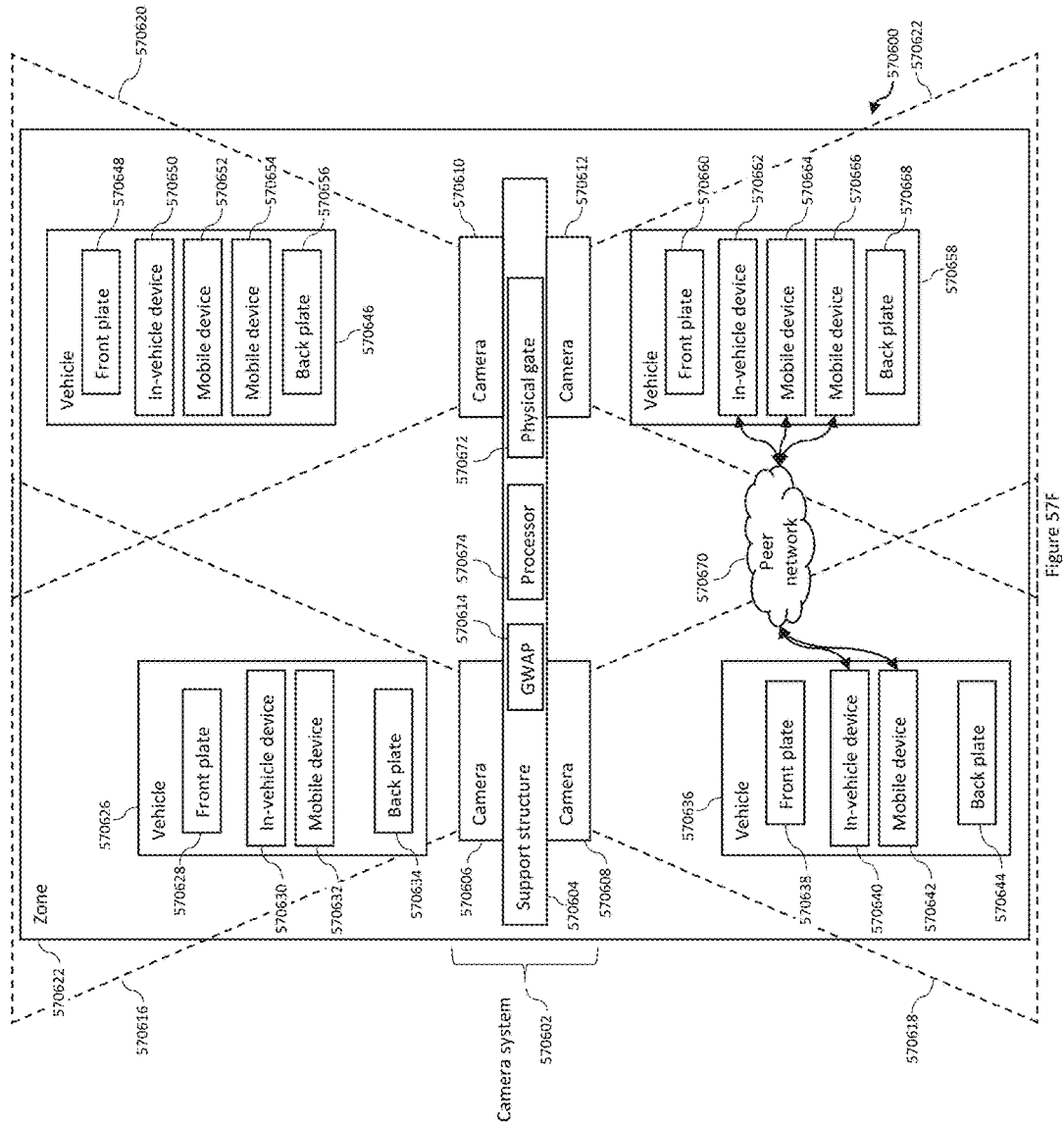

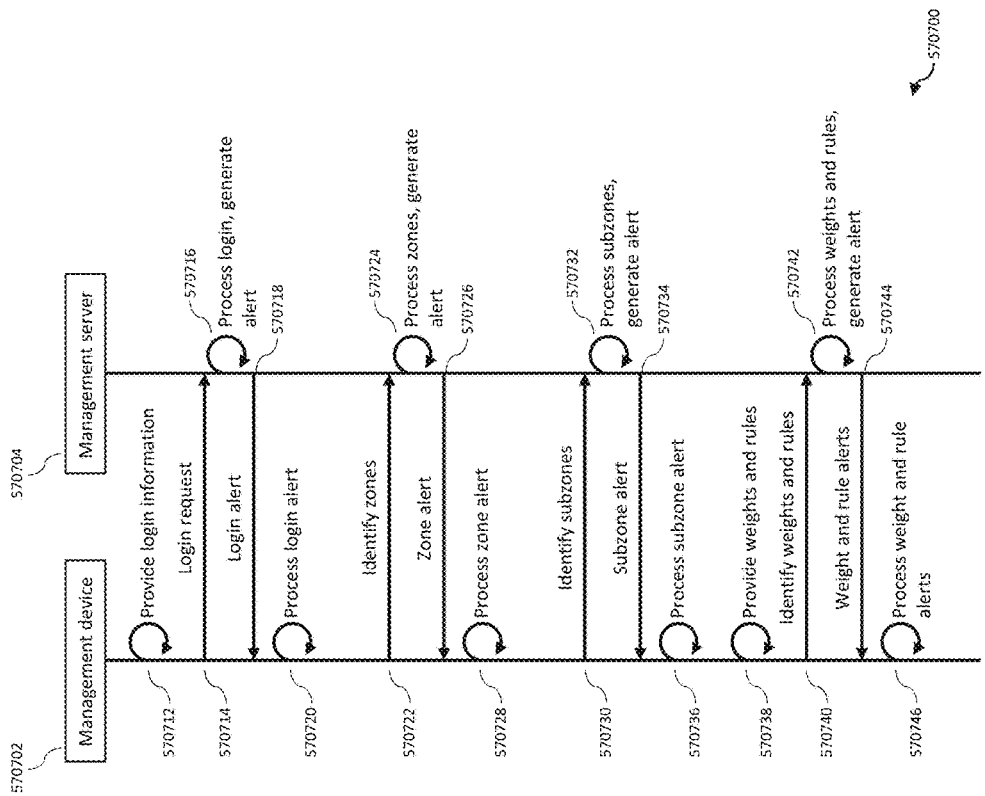
Figure 57G, Management setup

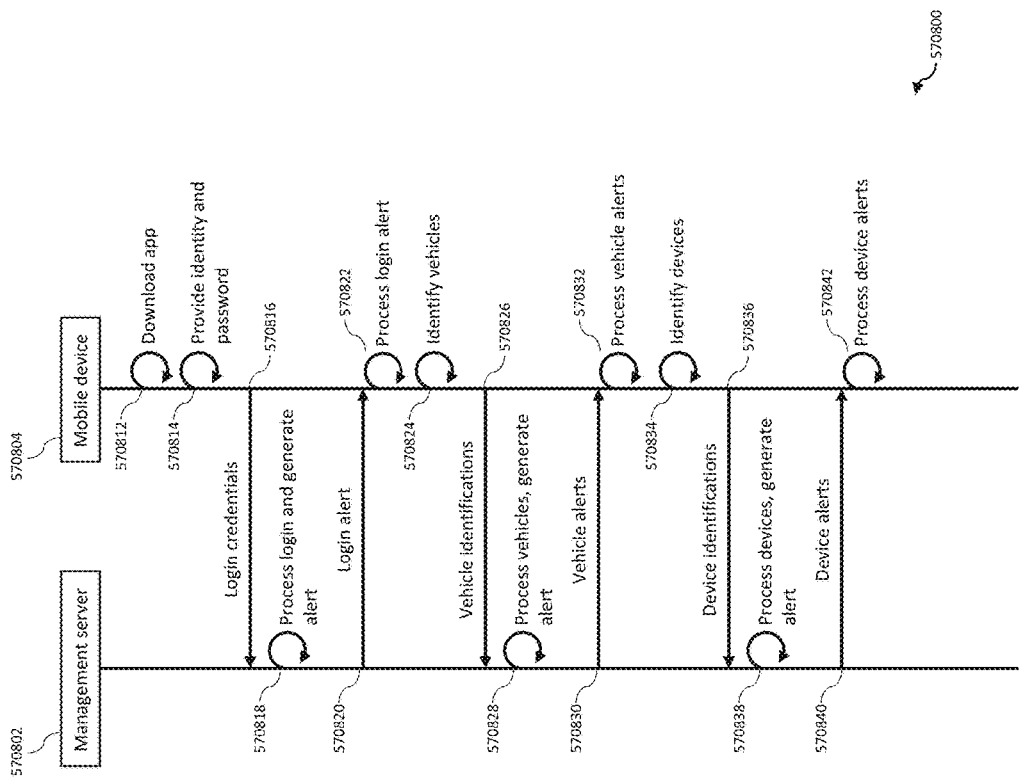
Figure 57H, User account setup

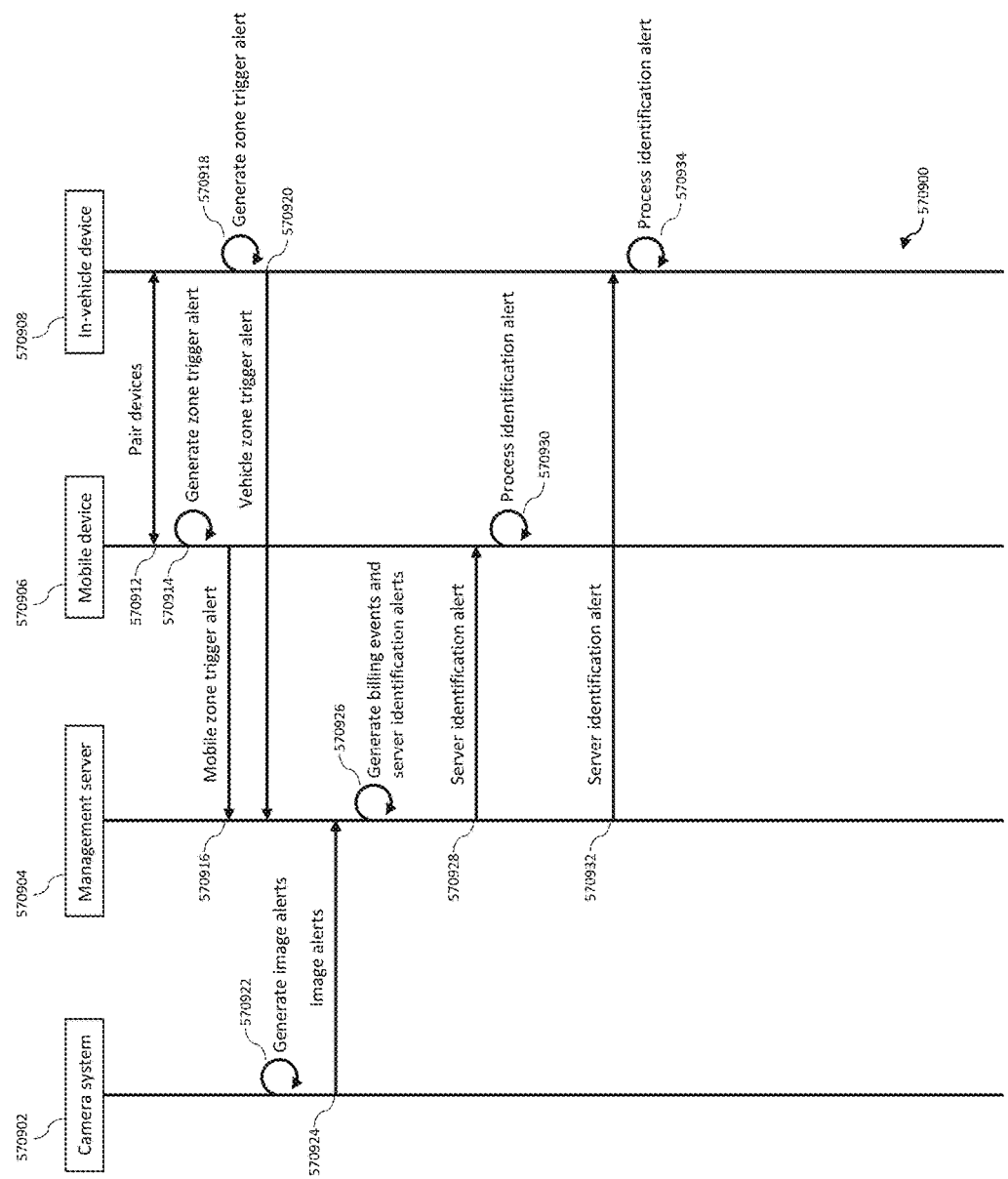
Figure 57I, Usage scenario with pairing

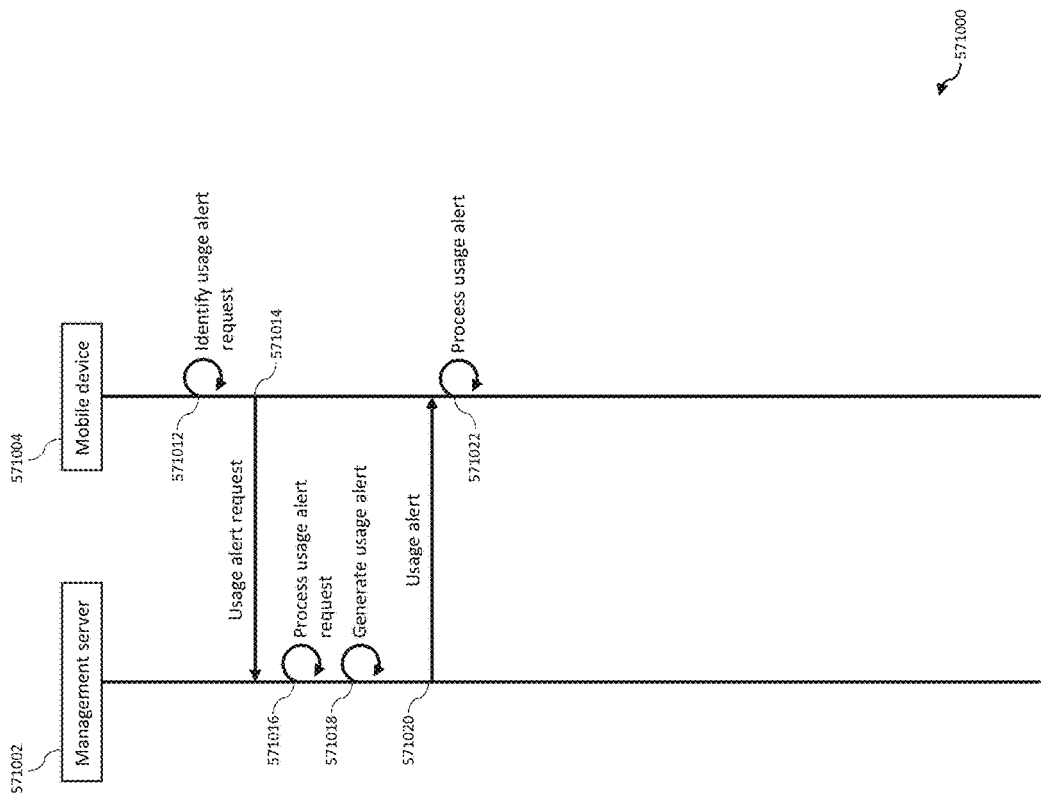
Figure 571, User statistics

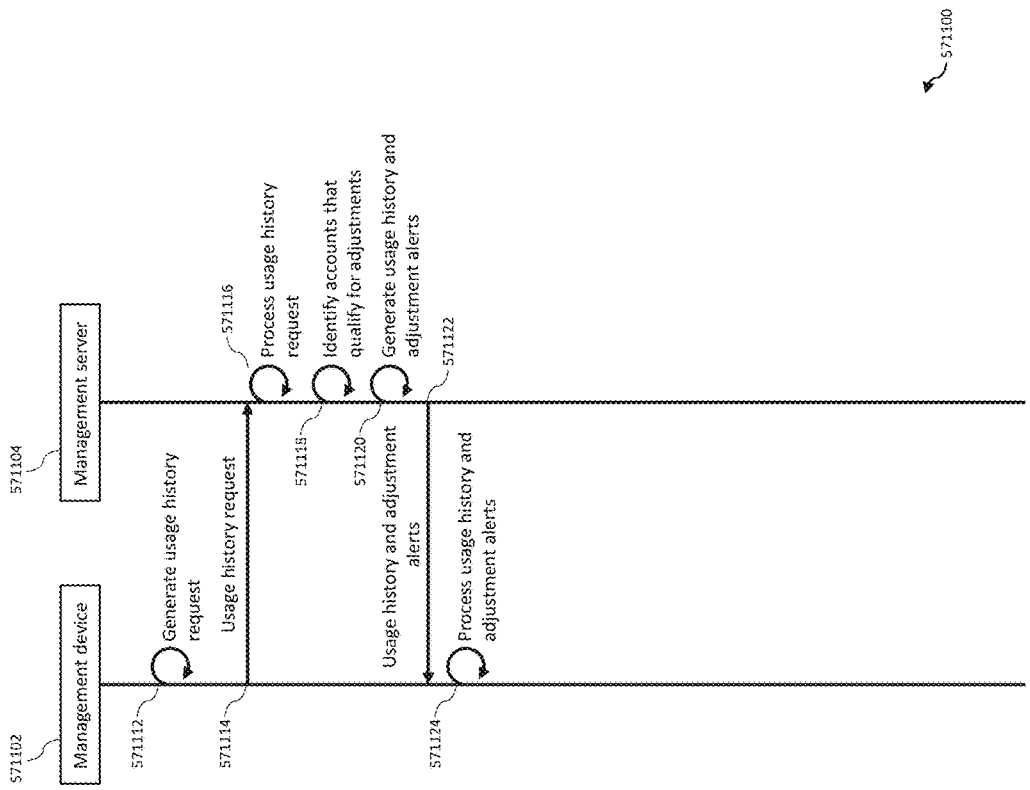
Figure 57K, Management statistics

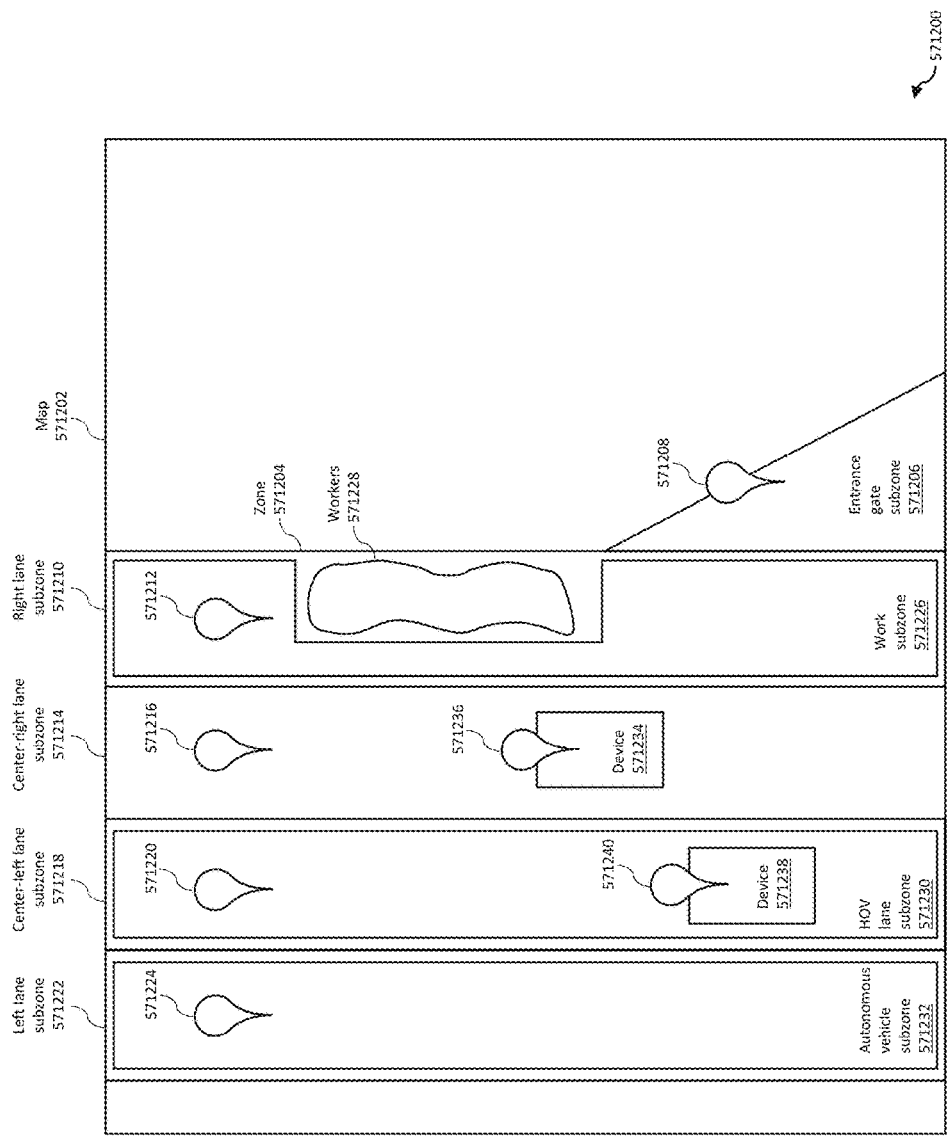
Figure 57L, User interface

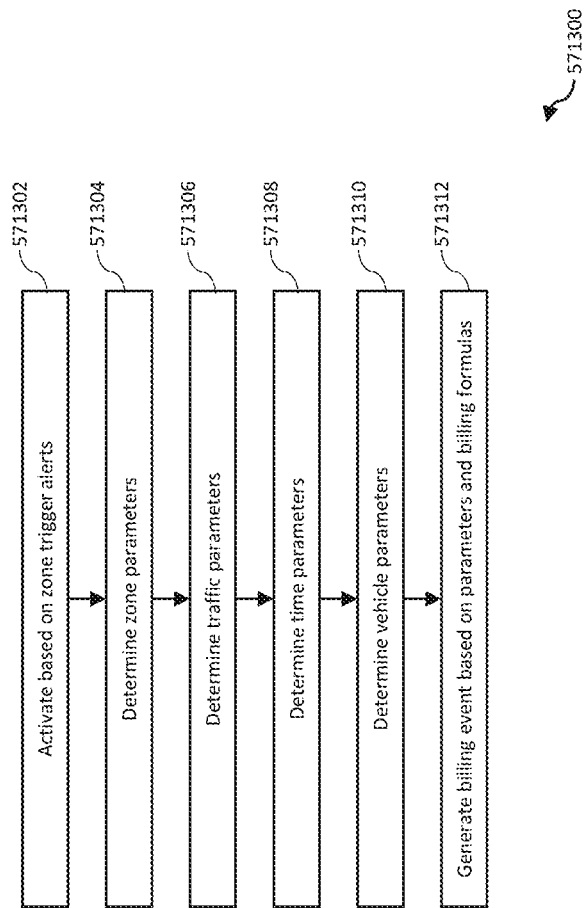
Figure 57M, Billing

SYSTEM AND METHOD FOR PLACING VIRTUAL GEOGRAPHIC ZONE MARKERS

CROSS-REFERENCE TO RELATED APPLICATIONS

This application is a continuation-in-part of U.S. application Ser. No. 15/277,915 filed Sep. 27, 2016, which is a continuation-in-part of U.S. application Ser. No. 15/131,965 filed Apr. 18, 2016, which is a continuation of U.S. application Ser. No. 14/209,049 filed Mar. 13, 2014 and granted as U.S. Pat. No. 9,317,996, which claims priority to U.S. Provisional Application No. 61/778,874 filed Mar. 13, 2013, and is a continuation-in-part of U.S. application Ser. No. 14/102,238 filed Dec. 10, 2013 and granted as U.S. Pat. No. 9,319,834, which claims priority to U.S. Provisional Application No. 61/735,402 filed Dec. 10, 2012 and is a continuation-in-part of U.S. application Ser. No. 13/924,395 filed Jun. 21, 2013 and granted as U.S. Pat. No. 9,398,404, which claims priority to U.S. Provisional Application No. 61/662,980 filed Jun. 22, 2012. Each of the patent applications identified above is incorporated herein by reference in its entirety to provide continuity of disclosure.

REFERENCE TO COMPUTER PROGRAM LISTING

This application includes multiple computer program listings that are grouped into Computer Program Listing Appendix I, Computer Program Listing Appendix II, Computer Program Listing Appendix III, and Computer Program Listing Appendix IV.

FIELD OF THE INVENTION

The present invention relates location-based data processing. The present invention relates in general to a method of creating defined virtual geographic zones around places of interest. More particularly, the present invention relates to evidencing the location of virtual geographic zones around places of interest on an online map with a marker so that they may be discoverable on mobile devices with a common app. Once such virtual geographic zones are mapped, registered and stored in a common accessible database, they become discoverable and actionable without further reference to a map from a common mobile device app. Such code may be part of a mobile device's operating system. These virtual geographic zones in turn can be used to control gates and autonomous vehicles, such as unmanned cars and drones.

BACKGROUND OF THE INVENTION

Though mobile phones have been prevalent in the marketplace for some time, they have not been widely used in the industries that must monitor movement of users or employees on a route, a journey or a tour through commander or supervisor defined zones, places or locations. For example, security patrol officers move from checkpoint to checkpoint on a tour defined by a commander. Prison guards move through areas of a prison while making "rounds" defined by a supervisor. Police officers move through areas or "beats" of their city as defined by a commander. Delivery trucks move from store to store making deliveries on a route defined by a supervisor or a manager. A gambler may be able to gamble in a casino but once the gambler moves out of the casino the gambler may no longer place a wager. Military missions move from location to location in the pursuit of accomplishing a mission or a journey defined by a commanding officer. A person can walk through a park or museum and see information about the sites in the park or displays in the museum. Similarly, shoppers move through aisles in a store that can be defined by zones.

With the increase in technological sophistication of wireless devices over time, there has been a rise in the use of these devices. However, while appearing unrelated at first glance, most development in the use of wireless devices is part of the development of wireless device technology. Early efforts were principally focused in marketing products to consumers. Marketers have attempted to find a solution in the prior art to target consumers using wireless devices with limited success.

For example, U.S. Pat. No. 7,321,773 to Hines, et al. discloses an area watcher wireless feature with a database of geographic areas triggering the wireless area watcher to display a message upon particular wireless device's entry into or exit from a watched area. A watched area may be defined by a postal code, principality, state or country, or by a particular cell site area. However, the system in Hines relies on the infrastructure of a wireless network service provider to implement the feature and to define the watched areas leading to an expensive system that cannot be customized.

U.S. Pat. No. 7,995,996 to Link, et al. discloses providing target advertisements over a wireless network from local advertisers pre-registered to advertise. Local advertisers register to advertise on wireless devices that are in close proximity to the advertiser. As a consumer enters a cell site that is near the location of the local advertiser, the wireless network delivers a message to the wireless device of the consumer that is specified by the local advertiser. However, the system in Link relies on the location and the range of cellular towers leading to an inaccurate location of the wireless device. Further, such reliance on the range of the cellular towers results in fixed areas within which the consumer must be and cannot be customized to suit the local advertiser.

WIPO Patent Publication No. 2010/078616 to Wood, et al. discloses a mobile device managing arrangement for service and product information by a wireless fidelity network through hand-held devices interacting with a precinct database. In Wood, the precinct database stores vendors, products, services, and information for each precinct. A precinct is a predefined region in which a customer with the mobile device can access information about the vendors, products, services within the precinct. The precinct is equipped with proximity short range wireless equipment, in the form of a pad or a gate. In order to access the information from the precinct database, the customer must place the mobile device within the range of the proximity pad or gate to access the information. However, the system in Wood relies on the wireless fidelity network and a cellular network to locate the mobile device leading to an inaccurate location because the range of the wireless fidelity network and the range of the cellular network cannot conform to the shape of the building in which the customer is desired to be located and cannot be customized. Further, the wireless fidelity network for the determination of the location can be compromised through the use of a wireless fidelity network repeater to extend the reach of the network to unauthorized areas.

U.S. Pat. No. 7,385,516 to Contractor discloses a location confirmation service for wireless devices. A central processor periodically receives position data from a wireless device via GPS or cellular network as a latitude and longitude point. The central processor compares the latitude and longitude point with a known location point to determine if the wireless device is within a predetermined distance from the known location point. However, the service is limited to comparing points and cannot compare a location of a device to a spatial area.

U.S. Pat. No. 7,864,047 to Aninye et al. discloses a monitoring system that tracks a location of a wireless personal tracking device. The system periodically tracks the location of the wireless personal tracking device using a cellular network or a GPS service. The system compares the location to a predetermined inclusion zone or a predetermined exclusion zone. If the wireless personal tracking device is in the predetermined exclusion zone, the system generates a message and sends the message as a notification. However, the zones in Aninye et al are limited to circular zones, each having a fixed radius and cannot be customized in shape or adapted to the conform to the shape of a structure.

U.S. Pat. No. 8,104,672 to Mitchell, Jr. et al. discloses a security system including a set of sensors connected to the security system. The security system receives a location of a mobile security device carried by a user via GPS or cellular network, compares the location of the mobile security device with a known location of an activated sensor and determines whether the activated sensor is within a predetermined distance from the mobile security device. If the sensor is within the predetermined distance from the mobile security device, then the activated sensor is graphically displayed on the mobile security device. The user can then respond to the activated sensor. However, the system in Mitchell, Jr. et al. can only determine whether a sensor is within a given radius from the mobile security device and is unable to create customized geographic zones.

U.S. Pat. No. 8,292,741 to Burman et al. discloses a system for facilitating mobile gaming. The system employs a set of base stations of a cellular network to define a set of geo-fences for a jurisdiction in which gaming is allowed. Each of the set of base stations is customized to allow the base station to send and receive gaming information. Each of the set of base stations has a range that must be wholly within a jurisdiction that allows gaming. Any base station having a range that is not wholly within the jurisdiction that allows gaming cannot send or receive gaming information. A gaming device that is within the range of any of the set of base stations is allowed to place a wager. However, the set of geo-fences cannot precisely define a gaming boundary. Due to the limited range of the set of base stations, the set of geo-fences enable "holes" located in the lawful gaming jurisdiction in which gaming functions on the gaming device that are otherwise lawful are denied.

U.S. Pat. No. 8,616,967 to Amaitis et al. discloses a system and method for convenience gaming. Like Burnam, the system employs a set of customized base stations of a cellular network to define a set of geo-fences for a jurisdiction in which gaming is allowed. The system further employs cell network triangulation using the set of base stations to determine the location of a gaming communication device. However, like Burnam, the system cannot precisely define a gaming boundary leading to denied gaming access on a gaming device that is otherwise lawful.

U.S. Publication No. 2012/0329555 to Jabara et al. discloses a system and method for gaming using wireless communication devices. The system employs a set of Wi-Fi access points distributed on the premises of a gaming facility in which gaming is allowed to define a geo-fence. Each Wi-Fi access point has a generally circular range. The set of Wi-Fi access points verifies the location of a wireless device by proximity to allow gambling on the premises of the gaming facility. However, the system does not allow remote gaming in another lawful area because the wireless communication device must be connected to the set of Wi-Fi access points. Further, the circular range of each of the Wi-Fi access points results in inconsistent coverage of the wireless communication device within the premises leading to inconsistent gaming access.

U.S. Publication No. 2012/0329555 to Froy et al. discloses system for multi-player remote gaming. The system employs a set of gaming machine terminals deployed throughout a casino. Each gaming terminal is connected to a set of mobile gaming devices through a Wi-Fi network throughout the casino. The Wi-Fi network includes a set of transceivers each of which has a proximity range. The proximity ranges defines a geo-fence around the casino. Each mobile gaming device can perform gaming functions, i.e. placing a wager, if the mobile gaming device is within the range of one of the transceivers. However, like Jabara, the system does not allow remote gaming in another lawful area because the mobile gaming device must be connected to the Wi-Fi network of the casino. Further, the circular ranges of the transceivers result in inconsistent gaming access on each of the mobile gaming devices.

European Publication No. 2589232 to Broscoe discloses a system and method for creating and modifying dynamic geo-fences. The system monitors a location of an electronic device using cell network triangulation to create a dynamic geo-fence. The dynamic geo-fence includes a set of fixed geo-fences. Upon first activation of electronic device, a first fixed geo-fence is automatically created having a fixed radius. As the electronic device moves outside of the first fixed geo-fence, the electronic device is temporarily disabled. Permission by a user is required in order to enable the electronic device. Once permission is granted, the electronic device creates a second fixed geo-fence. As the electronic device continues to move, successive fixed geo-fences are created in the same manner to create the dynamic geo-fence. However, the system relies on cell network triangulation to determine the location of the electronic device. Further, the system relies on user permission in a timely manner to create the dynamic geo-fence leading to holes in the geo-fence.

U.S. Pat. No. 8,374,623, to Vellanki discloses methods for controlling mobile computing devices such as laptops, PDAs and cellular telephones, based on their location. Mobile computing devices using such methods include a software-rendered map of defined geographic regions, location handlers for defining behavior of a mobile device in a given geographic region, and a location handling engine for determining when a new geographic zone has been entered and exited, and for executing and terminating location handlers accordingly.

U.S. Publication No. 2012/0276928, to Shutter discloses a method for providing advertisements to mobile devices located in a geographic region. The method obtains current weather condition information and data representing an advertisement and determines a size of an advertisement area for the advertisement based on the current weather information. The size of the advertisement area is decreased during a poor weather condition. The advertisement is provided to the first mobile device if the position of the first mobile device is located in the advertisement area.

U.S. Publication No. 2009/0163216, to Hoang discloses techniques for facilitating a hand-in using proximity-detection and dual-pilot operation. The method includes detecting a presence of a client device in proximity to a network-side device and transmitting a first signal over a first communication channel to the client device. The first signal enables the client device to access information transmitted in a second signal from the network-side device.

U.S. Pat. No. 7,848,765, to Phillips discloses methods and systems relating to location-based services such as social networking, providing demographic information, tracking mobile devices, providing business information, providing an adaptable user interface, remotely effecting a change on a portable electronic device, providing a geofence, outputting location-based information on a mobile device, varying transmissions to and from a mobile device, providing location-based alerts, verifying transactions, and tailoring information to the behavior of a user.

U.S. Pat. No. 8,862,150, to Phillips discloses methods and systems relating to location-based services such as providing a geofencing, outputting location-based information on a mobile device, varying transmissions to and from a mobile device, and providing location-based alerts. More specifically, a method can include receiving a selected location on a mobile device, monitoring a current location of the mobile device, determining when the current location of the mobile device is within the geofence, and initiating an action on the mobile device associated with the geofence and the selected location.

Most of the prior art belongs in a class of "proximity systems," geo-location tracking systems which do not recruit the device's GPS, or geo-enclosure systems that do not recruit a smart device's ability to report in or out of a geo-enclosure created and evidenced via an online map by the owner or supervisor of such geo-enclosure. While it is-necessary for a security officer to be "in the proximity of" a checkpoint or a vehicle to be near the entrance to a toll zone, it is not sufficient to be able to say they were "there". It is desirable to definitively say security officer or vehicle was inside specific predefined geographic coordinates (the virtual geographic zone set up by the owner or supervisor of the zone) and was therefore "there". Further, art that describes geofencing fails to disclose a flow-charted systemic process or method that can accurately and completely describe the processes and methods the prior art purports to claim. In some cases, prior art attempts to claim and preempt an abstract idea without showing process flow or method of achieving the end result. Prior art fails to show a process or relationship between the mobile device user and the owner or supervisor of the zone.

Referring to FIG. 1, a prior art example of a "proximity system" is shown. This example demonstrates the insufficiency of the "proximity system". The prior art proximity systems have several limitations. Building 150 has perimeter 151. Wi-Fi access point 152 is mounted in building 150 and has range 153. One limitation is that coverage of range 153 is indistinct and varies around perimeter 158. Further, some areas are excluded from coverage of range 153. For example, area 157 and coverage area 159 are not covered by range 153 of Wi-Fi access point 152. Further, undesired reception of the Wi-Fi signal occurs. For example, Wi-Fi repeater 154 broadcasts repeater coverage perimeter 155 by receiving signal 160 from Wi-Fi access point 152 and rebroadcasting it in coverage area 159 with coverage perimeter 155. This is a problem because wireless device 156 is able to access Wi-Fi access point 152 through Wi-Fi repeater 154 with coverage range 159, said coverage range 159 being beyond what is intended. Further, range 153 cannot be precisely determined due to the "fuzziness" of range 153, thereby allowing an unintended user of wireless device 156 to access range 153 of Wi-Fi access point 152 by being in coverage range 159 of Wi-Fi repeater 154.

Likewise, a geo-location tracking system of a device fails to recruit the mobile device's GPS to self-report its location in relation to a virtual geographic geo-enclosure that has been created by the owner of supervisor of that geo-enclosure. Absent such self-reporting, geo-locators would have to passively track the mobile device constantly in order to determine if the device were in or out a geo-enclosure, the coordinates of which, and the shape of which are unknown to the device user. Geo-located tracking would be an imprecise and ineffective way for an owner to create zones within zones, create and service moveable zones and useless at evidencing zone coordinates via an interactive marker on an online map, since the mobile device's GPS is not being recruited by the geo-locator. If the tracked device is beyond the geo-locator's range, it cannot be tracked.

The prior art fails to disclose or suggest a system and method for creating customizable virtual geographic zones to enable zone owners or zone supervisors to create discoverable zones, distribute zone information and accurately interact with users whose mobile devices are self-reporting in or out of the zone. Additionally, geo-fenced areas on publicly available maps are not associated with interactive map markers that contain zone coordinate information, do not alter the public map, and are not interactive with a common mobile device application that can discover publicly accessible zones via a map or by querying the closest zones. Therefore, there is a need in the prior art for a system and method for creating accurate virtual geographic zones that cannot be compromised to allow a supervisor to inexpensively and accurately interact with users by making the zones discoverable on a map and the coordinates interactively available.

The prior art, including proximity systems, geo-locating trackers, and geo-fencing, fail to describe how an owner and supervisor of a geo-enclosure would create a virtual gate into that geo-enclosure for purposes of channeling access and egress through defined areas for purposes of recording entry and exits, such as under the cameras at a toll lane entrance and exit. Likewise, the prior art fails to teach how a zone could be embedded within another zone, thus allowing or denying an activity, such as a handicap parking or premium parking section within a parking lot. Nor are temporal zones described, where, for instance, a toll authority might vary the pricing on a toll lane zone to address peak usage, encourage off-peak usage or eliminate the virtual toll zone completely during emergencies.

SUMMARY OF THE INVENTION

In a preferred embodiment, a system and method for authenticating a wager by limiting the ability to place the wager to designated zones, or subzones within a zone, is disclosed. The system includes a network, a server connected to the network, a supervisor device receiving information from a navigational ("NAV") service system and connected to the network and a user device receiving information from the NAV service system and connected to the network.

In a preferred embodiment, a supervisor defines a set of virtual geographic zones and sub-zones in which the user device can be tracked, and saves the set of virtual geographic zones and sub-zones to a supervisor account on the server. The user downloads a user application, sets up a user account that includes a user ID and a verification and downloads the set of virtual geographic zones and subzones. As the user moves into and out of the virtual geographic zones and sub-zones, the location of the user device is determined and a set of supervisor-defined actions are executed by the user application on the user device based on the location of the user device.

In one embodiment, the supervisor defines a zone in which wagers can be made or placed by a user using the user device, running a user gaming application. The user gaming application uses a User Location Information Process ("ULIP"), installed on the user device, to verify the location from which the wants to place a wager. The user gaming application runs in conjunction with the ULIP. The ULIP activates or deactivates the user gaming application on the user device, depending on whether the user is inside the designated gaming zone or outside of the designated gaming zone.

In one embodiment, when a user device enters a zone or a sub-zone, the user device is denied authorization to perform a function.

In one embodiment, a method for transferring funds from a financial institution into a wager account is disclosed.

In another embodiment, a method for establishing social gaming and peer to peer gaming is disclosed. In this embodiment, a user associated with a user device links a social network account to a user account to discover contacts and to engage in a game of chance with the discovered contacts.

In another embodiment, a method for determining a fee for a location host. In this embodiment, a location host is a bar, pub, or any establishment that promotes the game of chance operated by the supervisor.

In a preferred embodiment, a system and method for message delivery to a user and the tracking of the user through or in and out of a set of predefined zones, gaming zones, marketing zones, checkpoints, or stops along a tour, a journey or a mission, determined by a supervisor is disclosed.

In one embodiment, the set of supervisor-defined actions is a set of advertisements that are displayed on the user device based on the location of the user device and if the user device is inside an associated zone. In another embodiment, the set of supervisor-defined actions is a denial of authorization for a wager because the user is outside a statutorily mandated area or zone. In another embodiment, the set of supervisor-defined actions is a set of discount coupons for products and services of the supervisor to be redeemed at a point-of-sale based on the location of the user device. In this embodiment, the set of discount coupons are displayed on the user device when the user enters a retail store zone of the supervisor. In another embodiment, as the user moves through each sub-zone of a retail store zone of the supervisor, information about various products located in each sub-zone, including a location of each product, is displayed on the user device as the user moves through each sub-zone.

In another embodiment, the set of actions is a retail store event, during which the user must be present to win a prize. In this embodiment, the user must locate a predetermined sub-zone of the supervisor within a predetermined time period in order to redeem the prize. The user application determines the location and time of the user device and sends the location and time to the server. The supervisor may monitor the location of the user in real-time.

In one embodiment, the user application intermittently monitors the location of the user device at a predetermined frequency in real-time to determine an engagement of the user device with the zone, i.e., if the user device is at, within, or nearby the boundary of the zone. In this embodiment, the user application determines a predicted path for the user device relative to velocity of the user device, determines a zone equation for the zone, compares the predicted path to the zone equation, and the engagement of the predicted path with the zone equation is determined from the comparison.

In one embodiment, a first zone intersects a second zone providing the set of actions to the user devices required by the first zone and the second zone.

In one embodiment, the second zone is contained completely or partially by the first zone and is "excluded" from the set of actions.

In one embodiment, the set of actions is a security guard tour of a set of zones or sub-zones. In this embodiment, an entry is saved in a system log database as the user device passes through each zone or sub-zone.

In another embodiment, information about a supervisor-defined action is displayed on the user device as the user moves through each zone or sub-zone.

In another embodiment, a start time of a user and a time spent at each station or zone are saved in the VGZ server. Each time the user repeats a tour of the zones, the user application compares the actual time to reach each zone or sub-zone with historical times to reach each zone. The user application sends messages to the user, supervisor, or a system log database regarding the timeliness of the user reaching checkpoint zones or completing the tour of the zones or sub-zones.

In one embodiment, the system monitors progress of the user from one zone to another zone and predict progress from one zone to another and advise the user, the supervisor or both as to the timeliness of the current progress.

In one embodiment, a supervisor device is used initialize an account, determine zone location and configuration, and request approval of a zone profile. The zone profile approved by a map administrator and a notification of the approval is sent to the supervisor device.

In one embodiment, a user device logs into a server and requests zone profile information. The server delivers zone website information to the user device, which issues one or more additional requests based on the website information.

In one embodiment, a first user device that is authenticated and within a zone sends a request to a server to find other user devices in the same zone. The server sends a list of other user devices that are within the zone and the first user device initiates a chat session with one of the other user devices.

In one embodiment, a supervisor device is used to draw a zone on a map.

In one embodiment, a supervisor device requests authorization of a zone profile from a map administrator. The map administrator checks a map data and sends a notification to the supervisor device that indicates if the zone is authorized.

In one embodiment, a supervisor device creates a zone and requests authentication of the zone from a zone server. The zone server submits the zone authentication request to a map administrator that evaluates and approves the zone. Notification of the approval is sent from the map administrator to the zone server and from the zone server to the supervisor device. After the zone is approved, the supervisor device is used to link a website to a marker associated with the zone on a map.

In one embodiment, a supervisor device is used to request that a map marker be made into an "Active" map marker. The active map marker is visually distinctive from a marker that is not an active map marker and indicates that information about a zone has been associated with the location on the map related to the active map marker.

In one embodiment, a user device receives a tap event for a map marker, receives link information from a zone server, and interacts with a website that is not hosted by the zone server based the link information.

In one embodiment, a user device receives a tap event for a map marker, receives link information from a zone server, and interacts with a website either directly or through the zone server based the link information.

In one embodiment, a user device receives a tap event for a map marker, receives link information from a zone server, and interacts with a website hosted through the zone server based the link information.

In one embodiment, a user device is within a zone and the user device runs zone dependent task while in the zone.

In one embodiment, a user device is outside of a zone and receives a selection from the user to show the nearest zone. The user device sends the request to the zone server and the zone server sends information about the nearest zone to the user device.

In one embodiment, the zones stored on the zone server include nested zones with inner zones and outer zones. A user device in an outer zone can select the map marker of an inner zone and view the actions that are available in the inner zone.

In one embodiment, a social zone is included within a zone that allows a user to self-identify whether the user will appear within the social zone to other users.

In one embodiment, the app on the user device is used to navigate a vehicle using one or more exclusion zones.

In one embodiment, the app on the user device is used to navigate a vehicle using an inclusion zones.

In one embodiment, the app on the user device is used for a parking lot to find spaces and pay for parking.

In one embodiment, zones are used to create a virtual toll road.

In one embodiment, the zones are used to identify where a drone can fly and can be used by an app to control the flight of the drone based on the zone information.

In one embodiment, place zones are used to track or control aircraft along a flight path.

In one embodiment, the zone is a moveable zone that is defined relative to one or more specific coordinates.

In one embodiment, the zone is a moveable zone and is defined using polar coordinates that are relative to a one or more specific coordinates.

In one embodiment, a WLAN access and location device provides Wi-Fi access and the specific coordinates of a movable zone.

In one embodiment, a zone includes an alarm button that is displayed when the user device is within the zone. When pressed, the user device will contact emergency personnel.

In one embodiment, zone information is generated automatically from satellite imagery.

In one embodiment, a geo-location wireless access point (GWAP) provides location information and wireless access.

In one embodiment, a GWAP is stationary and associated with a stationary zone.

In one embodiment a GWAP movable or fixed to a vehicle and is associated with a movable zone.

In one embodiment, one or more GWAP devices provide location information that is used by user devices to determine positions of the user devices regardless of whether the user devices are indoors or outdoors.

BRIEF DESCRIPTION OF THE DRAWINGS

The disclosed embodiments will be described with reference to the accompanying drawings.

FIG. 1 is a schematic of a Wi-Fi-based access control of the prior art.
FIG. 2A is a schematic of a virtual geographic zone system of a preferred embodiment.
FIG. 7A is a flowchart of an action update method for a supervisor application of a preferred embodiment.
FIG. 7B is a flowchart of a method for verifying and monitoring a user location for a supervisor application of a preferred embodiment.
FIG. 8 is a flowchart of a method for user log-in, clock-in, and start tour for a user application of a preferred embodiment.
FIG. 12 is a flowchart of a method for establishing social gaming and peer to peer gaming.
FIG. 13 is a flowchart of a method for determining a fee for a location host.
FIG. 14A is a sequence diagram of a method for setting up a zone.
FIG. 14B is a flowchart of a method for user operation of a zone.
FIG. 15 is a flowchart of a method of person to person interaction.
FIG. 16G shows an embodiment for using virtual gates.
FIG. 17 is a view of the VGZ system for authorizing a zone.

FIG. 31 is a flowchart of a method for a user access method.

FIGS. 32A through 32C are a view of the VGZ system for a user access method.

FIG. 33 is a flowchart of a method for a user access method.

FIGS. 34A and 34B are a view of the VGZ system for a user access method.

FIG. 40A is a view of the VGZ system for a parking lot.

FIG. 40B is a view of the VGZ system for a toll road.

FIG. 44 is a view of the VGZ system for a movable zone.

FIG. 45A is a view of the VGZ system for a movable zone using radial coordinates.

FIG. 45B is a view of the VGZ system determining whether a user is in a moveable zone.

FIG. 46 is a diagram of a wireless local area network (WLAN) access and location device.

FIG. 52 is a flow chart of zone creation from one or more satellite images.

FIG. 53B is a diagram of a user device and a geo-located device with ranging signals.

FIG. 54 is a flow chart of a system and method of a GWAP used with a stationary zone.

FIG. 55 is a flow chart of a system and method of a GWAP used with a movable zone.

FIG. 57F is a schematic diagram of a toll collection system for a toll gate.

FIG. 57G is a flow chart for management setup of a toll collection system.

FIG. 57H is a flow chart for user account setup of a toll collection system.

FIG. 57I is a flow chart for usage scenario of a toll collection system.

FIG. 57J is a flow chart for delivering user statistics of a toll collection system.

FIG. 57K is a flow chart for delivering management statistics of a toll collection system.

FIG. 57L is a user interface diagram displayed on a device used by the system.

FIG. 57M is a flow chart of a method for generating billing alerts based on zone trigger alerts.

DETAILED DESCRIPTION

Figure 2B:
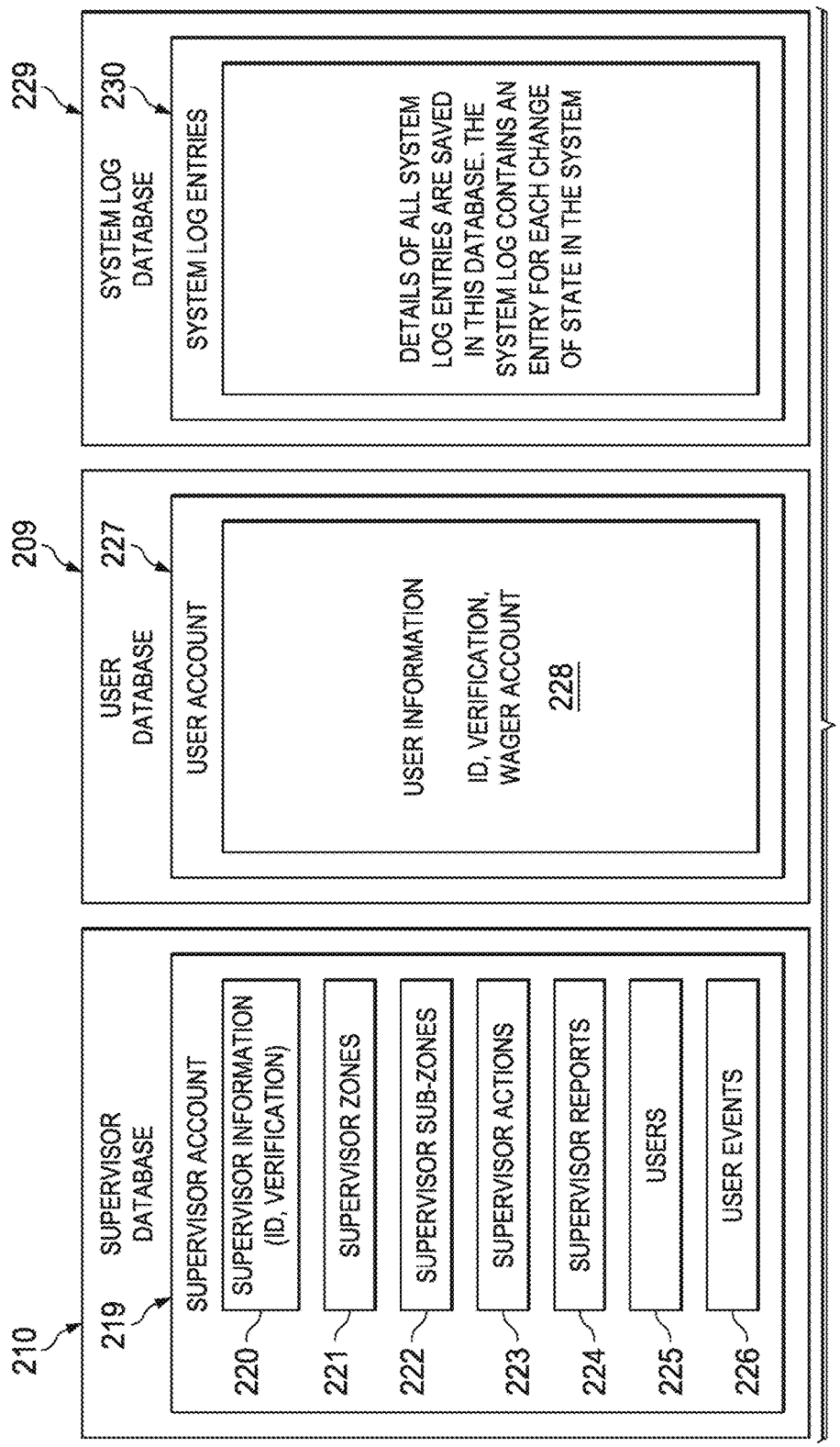
FIG. 2B is a schematic of a supervisor database, a user database, and a system log database of a virtual geographic zone system of a preferred embodiment.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing.

More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, satellite, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, Objective-C, C++, C#, VB.NET, Python or the like, conventional procedural programming languages, such as the "C" programming language, Visual Basic, Fortran 2003, Perl, COBOL 2002, PHP, ABAP, dynamic programming languages such as Python, PHP, HTML, AJAX, Ruby and Groovy, or other programming languages. The program code may execute entirely on a user device, partly on the user device, entirely on a supervisor device, partly on the supervisor device, as a stand-alone software package, partly on the user device and partly on a network server, partly on the supervisor device and partly on the network server, or entirely on the network server. In the network server scenario, the network server may be connected to the user device and/or the supervisor device through any type of network, including a local area network ("LAN") or a wide area network ("WAN"), or the connection may be made to an external computer connected to the user device or the supervisor device (for example, through the Internet using an Internet Service Provider) or in a cloud computing environment or offered as a service such as a Software as a Service ("SaaS").

Aspects of the present disclosure are described with reference to flowchart illustrations and/or block diagrams of methods, systems, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Computer Program Listing Appendix I includes source code written in HTML, JavaScript, and Python to realize the Zonal Places web application component of Zonal Systems Virtual Geographic Zone, which includes the functionality of loading, storing, and retrieving zone information from a server.

Computer Program Listing Appendix II includes source code written in Objective-C to realize the mobile application component of Zonal Systems Virtual Geographic Zone, which includes functionality of loading and displaying zones on a device.

Computer Program Listing Appendix III includes source code for determining whether a device is inside or outside of a zone. The physical placement of zones relative to each other is irrelevant. A user holding a mobile device enters and exits each zone independently of every other zone. Each zone has four states: outside, inside, going outside and going inside. The state of "inside" a zone is tracked elsewhere in the application and mobile devices can be "inside" multiple zones simultaneously. Each zone reports to the rest of the application the following six events: will go inside, will go outside, did go inside, did go outside, resumed inside and resumed outside.

Computer Program Listing Appendix IV comprises code for defining and authorizing zones. The code of Computer Program Listing Appendix IV is written at a high system level and assumes that the details of areas, such as data storage and network communications, are understood to be performed by any suitable mechanism (such as SQL database, binary file, document database, TCP/IP, Unix Sockets, REST, et cetera).

In Step 1, there is one actor, the supervisor device. The supervisor device creates a map interface, sets the current position of the supervisor device as the center of the map, and displays the map. The value of pin location is set by the function get touch point from user to the point touched on the map by the user. A zone is created by the create zone function around pin location using the value of default diameter, which was set to 100.0.

In step 2 there are two actors: supervisor device and VGZ server. The supervisor device gets credentials from the user of the device, including a username and password. The supervisor device then sends an authentication request to the VGZ server. The VGZ server receives the credentials from the supervisor device.

In Step 3 there are three actors (Supervisor Device, VGZ & Map Admin). This code is a functional representation of code used in a preferred embodiment.

A system and method for providing automatic oversight of the geographic areas where a wager may be legally placed using virtual geographic zones will be described.

Referring to FIG. 2A, system 200 includes virtual geographic zone ("VGZ") server 201 connected to network 202, supervisor device 203 connected to network 202 and receiving information from NAV service system 204, and user device 205 connected to network 202 and receiving information from NAV service system 204.

VGZ server 201 includes processor 206 and memory 207 connected to processor 206. VGZ application 208, user database 209, supervisor database 210, and system log database 229 are stored in memory 207. VGZ application 208 has supervisor set-up 232 and user set-up 233 that will be further described below. Processor 206 executes VGZ application 208.

Supervisor device 203 includes processor 211, memory 212 connected to processor 211, and NAV service receiver 214 connected to processor 211. Supervisor application 213 is stored in memory 212 and processor 211 executes supervisor application 213.

User device 205 includes processor 215, memory 216 connected to processor 215, and receiving information from NAV service receiver 218 connected to processor 215. User application 217 is stored in memory 216 and processor 215 executes user application 217. User application 217 has user location information process ("ULIP") 231. ULIP 231 is executed in the background in conjunction with user application 217 as a subsystem or co-process, in that ULIP 231 verifies a location of user device 205 and allows or stops functions of user application 217 based on the location of user device 205, as will be further described below.

In one embodiment, social media network 234 is connected to network 202. In this embodiment, user device 205 communicates with social media network 234 to grant or deny VGZ server 201 access to a contact list stored on social media network 234, as will be further described below. Any social media network known in the art may be employed.

In another embodiment, location host 235 is connected to network 202. In this embodiment, location host 235 receives a fee for wagers placed within the zone of the location host. For example, the location host is a bar or pub, or any other location that advertises a predetermined wagering game and receives a fee for wagers placed within the zone the location host.

In another embodiment, financial institution 236 is connected to network 202. In this embodiment, user device 205 communicates with financial institution 236 to transfer funds between financial institution 236 and VGZ server 201 through user device 205, as will be further described below.

In another embodiment, map administrator 237, public map owner and database 238, and private map owner and database 239 are connected to network 202. Map administrator 237 administrates and manages the use of zone data and information with one or more of public map owner and database 238 and private map owner and database 239.

It will be appreciated by one of ordinary skill in the art that any navigation system may be employed to determine the location of supervisor device 203 and user device 205. NAV service system 204 is available from many sources and continues to improve and be available in the marketplace. The most well-known of these systems is the Global Positioning System ("GPS"). Augmenting the GPS are GPS repeater systems. Other NAV services include, but are not limited to, any one or more of the below methods of locating a position on or above the surface of the oceans or land of the Earth and/or other current or future navigation systems that may facilitate the navigation of Earth or the universe beyond the area near Earth; an automatic direction finder ("ADF") is used for guidance, location and navigation of aircraft, the signaling of which is also available to terrestrial receivers; Bluetooth communications signaling; cell phone tower navigation used by cell phones and to determine location through triangulation; distance measuring equipment ("DME") used in aviation for guidance, location, and navigation, the signaling of which is also available to terrestrial receivers; interplanetary signaling, a navigational signaling that may result from the use of planets or moons of planets for reflective or original source signaling; near field communication ("NFC") systems; Ultra Wide Band ("UWB") real time location devices ("RTLS") including wireless tags; Local Positioning Systems (LPS) used for indoor navigation with 10 cm precision; repeater systems that repeat a satellite, GPS, cell tower or other navigation system; satellite signaling navigation that employs current or future forms of navigational signaling from satellites positioned around the Earth; VHF omnidirectional range ("VOR") aviation device used for guidance, location and navigation of aircraft, the signaling of which is also available to terrestrial receivers; a location determined using the Google Maps API; a wireless access point ("WAP") to a network, a gaming entity may add a WAP to its premises in order to facilitate more accurate and more convenient communication with a user device; Wi-Fi wireless access to a nearby WAP; a Geo-located Wi-Fi Access Point (GWAP), whose position has been determined by Differential GPS (DGPS), a Wide Area Augmentation System (WAAS), or other advanced geo-positioning method and whose latitude, longitude and altitude may be registered in a database; a Wi-Fi positioning system; other global navigations satellite systems (GNSS) similar to the US Navistar GPS system like the Russian GLONASS, European Union's Galileo, Chinese BeiDou System; hybrid GNSS like the Indian GAGAN system, and any other systems and combinations of part or all of the above systems.

In a preferred embodiment, a supervisor associated with supervisor device 203 interacts with a user associated with user device 205 using messages, communications, advertisements and services as will be further described below.

As used in this disclosure, a supervisor is a company supervisor, a store manager, a tour commander, a security officer commander, a military commander, a manager of commercial airplane flight, a shift supervisor, a route supervisor, a foreman, a home owner's association director, a gaming entity, a building manager, a payroll supervisor and any and all other authorities who define a zone, a sub-zone, a route, a tour, or a journey where a user may need to be present at a specific location.

In a preferred embodiment, the gaming entity is an entity licensed to take wagers or fees from wagers. In other embodiments, the gaming entity is a casino, race track, off track betting shop, Indian reservation, cruise ship, bar, bingo parlor, poker parlor, lottery vendor, facility where pari-mutuel wagering is allowed or facilitated, or similar licensed gambling location or any other type of facility (real or virtual) where wagers are placed on games of chance, outcomes of sporting events, races or any other event where the outcome is unknown. Wagering may be allowed in gaming zones that are remote from the gaming entity. For example, in advance deposit wagering, the user obtains an account at a race track, obtains an account balance to wager, and may place wagers in designated locations, zones, that facilitate pari-mutuel wagering with video coverage of horse and dog races.

In one embodiment, the boundary of a gaming zone can be any jurisdiction and/or political area. For example, the gaming zone is defined by the boundary of a city, county, or state.

The embodiments disclosed herein prevent "bleed over" from a gaming zone in which gaming is allowed. For example, the disclosed embodiments define a precise boundary of a gaming zone thereby preventing gaming in an area adjacent to the gaming zone where gaming is not allowed and/or unlawful. In another example, the disclosed embodiments prevent gaming that is otherwise lawful on the premises of a different gaming operator.

In another embodiment, the gaming entity is an entity that licenses a gaming user application from a game developer. A game developer is the author of a gaming user application that the gaming entity licenses and allows its users to use.

In one embodiment, the game developer licenses the ULIP to track users to verify that the user is in a gaming zone. Once the user is an authenticated user and is verified as being in a gaming zone, the gaming user application proceeds with the play of the game.

As used in this disclosure, a user is a person making a wager, a security officer on a tour, a soldier on a mission, a service technician, cleaning or maintenance personnel at a jobsite, a delivery man on a delivery route, a prison guard making rounds, or a shopper moving through a store.

An authenticated user is a user who has been authenticated via the user application on the user device, as will be further described below.

In a preferred embodiment, supervisor device 203 is a mobile device, such as a smartphone. In another embodiment, supervisor device 203 is a personal computer. In another embodiment, supervisor device 203 is a tablet computer. Other suitable computer devices known in the art may be employed.

In a preferred embodiment, user device 205 is a mobile device, such as a smartphone. In another embodiment, user device 205 is a personal computer. In another embodiment, user device 205 is a tablet computer. Other suitable computer devices known in the art may be employed.

In one embodiment, supervisor application 213 is a computer application executed on a personal computer. In another embodiment, supervisor application 213 is a mobile application executed on a smartphone or tablet computer. In another embodiment, supervisor application 213 is a web application executed through an Internet browser.

In one embodiment, supervisor application 213 is used by the gaming entity to manage and authenticate users and to define, manage, and authenticate gaming zones. In this embodiment, supervisor application 213 has a reporting function.

In one embodiment, user application 217 is a computer application executed on a personal computer. In another embodiment, user application 217 is a mobile application executed on a smartphone or tablet computer. In another embodiment, user application 217 is a web application executed through an Internet browser.

In one embodiment, ULIP 231 is a computer application executed in the background on a personal computer. In another embodiment, ULIP 231 is a mobile application executed in the background on a smartphone or tablet computer. In another embodiment, ULIP 231 is a web application executed in the background through an Internet browser.

In a preferred embodiment, VGZ application 208 is a computer application executed by processor 206 of VGZ server 201. In this embodiment, VGZ application 208 is a set of machine code instructions that receives, examines, and sends data to and from supervisor device 203 and user device 205, saves and retrieves data to and from user database 209, supervisor database 210, and/or system log database 229, as will be further described below. In this embodiment, VGZ application 208 manages supervisor set-up 232 and user set-up 233.

In one embodiment, network 202 is a cellular network providing a data connection to the Internet.

In another embodiment, network 202 is a local Wi-Fi network providing a data connection to the Internet. In another embodiment, network 202 is a local network connected to VGZ server 201.

In another embodiment, network 202 is a Bluetooth wireless network.

Other known wireless and wired networks may be employed.

In one embodiment, each of user device 205 and supervisor device 203 accesses NAV service system 204 through a local NAV service repeater as will be further described below.

Referring to FIG. 2B, supervisor database 210 includes a plurality of supervisor accounts 219. Each supervisor account 219 includes supervisor information 220, supervisor zones 221, supervisor sub-zones 222, supervisor actions 223, supervisor reports 224, users 225, and user events 226.

As used in this disclosure, the term "zone" is a geographic area of any size. The zone can be any two dimensional polygon or three dimensional polyhedron whose sides and vertices are determined by geographic points, i.e., latitude and longitude in the case of the polygon or latitude, longitude and altitude in the case of the polyhedron. A time period may be added to the zone by the supervisor to track user device 205 in the zone during a predetermined time period. The zone type can be an "inclusion" zone where predetermined actions are permitted or an "exclusion" zone where predetermined actions are prohibited. A set of zones are defined and saved by a supervisor using supervisor device 203 to a server.

As used in this disclosure, the term "sub-zone" is a geographic area of any size within a zone. The sub-zone can be any two dimensional polygon or three dimensional polyhedron whose sides are determined by geographic points, i.e., latitude and longitude in the case of the polygon or latitude, longitude and altitude in the case of the polyhedron. A time period may be added to the sub-zone by the supervisor to track user device 205 in the sub-zone during a predetermined time period. The sub-zone type can be "inclusion" where predetermined actions are permitted or "exclusion" where predetermined actions are prohibited. A set of sub-zones are defined and saved by a supervisor using supervisor device 203 as supervisor sub-zones 222 as will be further described below. A sub-zone may inherit attributes of the zone within which the sub-zone is contained.

In one embodiment, a zone or sub-zone is a job site, a delivery site, a checkpoint, a clock-in location, a clock-out location, a military mission checkpoint, a police stop on a "beat", a stop on a delivery route, or a set of stops or checkpoints on a "walk" or "tour" through a prison, areas of a retail store, a place of business where it is lawful to place a wager, or indoor or outdoor spaces in a park, monument, museum, shopping mall, school or other similar public places.

In another embodiment, a zone or a sub-zone is a gaming zone. In this embodiment, location information is a set of points of a fully closed multi-dimensional virtual object. The set of points include the starting point, intermediate points along straight lines and final closure back to the starting point, as will be further described below. The set of points form vertices which represent a fully closed two or three dimensional virtual object.

In one embodiment, a gaming zone may be fully or partially inside another gaming zone as a sub-zone.

In another embodiment, a gaming zone may fully or partially contain other gaming zones as sub-zones. In this embodiment, the sub-zone may be either an exclusion gaming zone or a class gaming zone, in which a predetermined class of games may be played. For example, pari-mutuel wagering may be allowed in the entire gaming zone, but slot machine play only allowed in the class gaming zone.

In another embodiment, a gaming zone may also overlap with another gaming zone.

In another embodiment, a gaming zone may be fully enclosed by an exclusion gaming zone.

As used in this disclosure, the term "action" is a predetermined function of user application 217 to be executed or to be prohibited from being executed based on the location of the user device relative to a zone or sub-zone as defined by the supervisor. In one embodiment, the action is a grant or a denial of access to placing a wager on the user application depending on if the user is inside or outside the zone where placing a wager is lawful. In one embodiment, the action is a grant or denial of access to a predetermined class of wagering games. In another embodiment, the action is social media link. In this embodiment, a user device is prompted to link the user account to a social media account. In another embodiment, the action is a coupon redeemable at a point-of-sale based on the location of the user device. In another embodiment, the action is an advertisement for display on a user device based on the location of the user device. In this embodiment, the advertisement can be in any combination of an audio, video, pictorial, or graphical format. In another embodiment, the action is a store event based on the location of the user device during which a user must be present in order to receive a prize. In another embodiment, the action is an acknowledgement and verification that the user has properly entered or exited a zone. In another embodiment, the action allows a user to "clock-in" or "clock-out" for a shift for which the user is working. In another embodiment, the action displays information about an indoor or outdoor place in a park. In other embodiments, any predetermined function can be defined as an action. A set of actions are defined and saved by the supervisor using supervisor device 203 as supervisor actions 223 as will be further described below.

In a preferred embodiment, supervisor information 220 includes a supervisor name, a supervisor ID, and a supervisor verification of a supervisor using supervisor device 203.

In one embodiment, the supervisor verification is an alphanumeric password. In another embodiment, the supervisor verification is a facial recognition. In another embodiment, the supervisor verification is a finger print identification.

As used in this disclosure, a "user event" is a log entry in system log database 229 of a user location sent to the VGZ server sent by user device 205. Each of user events 226 is saved into the supervisor account of the zone. User events 226 can be queried for a supervisor report.

Users 225 is a list of users that have received the actions of the zone from the supervisor. Users 225 can be queried for a supervisor report.

Supervisor reports 224 is a set of saved queries that a supervisor can execute to retrieve information.

User database 209 includes a plurality of user accounts 227. Each user account 227 includes user information 228. In a preferred embodiment, user information is a user ID and a user verification.

In another embodiment the user information is a user ID, a user verification, a wager account, and a social media link. In one embodiment, the user ID is a government issued ID. In this embodiment, the social media link is a stored username and password of a social media account of the user. In this embodiment, the wager account is a deposit account into which the user may deposit money to place a wager. In this embodiment, the wager account will be debited or credited as the user loses or wins after placing the wager, as will be further described below.

In one embodiment, the wager account may be deposited with an advanced deposit wager. In this embodiment, the advanced deposit wager ("ADW"), the ADW is a form of gambling on the outcome of a game, horse race, or sporting event in which the bettor must fund his or her account before being allowed to place a wager. ADW is a means of guaranteeing that there is money available to fulfill a wager. A user uses the user application to transfer money from personal sources to the wager account.

In one embodiment, the user verification is an alphanumeric password. In another embodiment, the user verification is a facial recognition. In another embodiment, the user verification is a fingerprint identification. In another embodiment, the user verification is a combination of a photograph and an alphanumeric password.

System log database 229 includes a plurality of system log entries 230. In a preferred embodiment, each of system log entries 230 is a saved entry for each change of state in the system. For example, each user location received is logged as a system log entry 230.

Figure 3A:
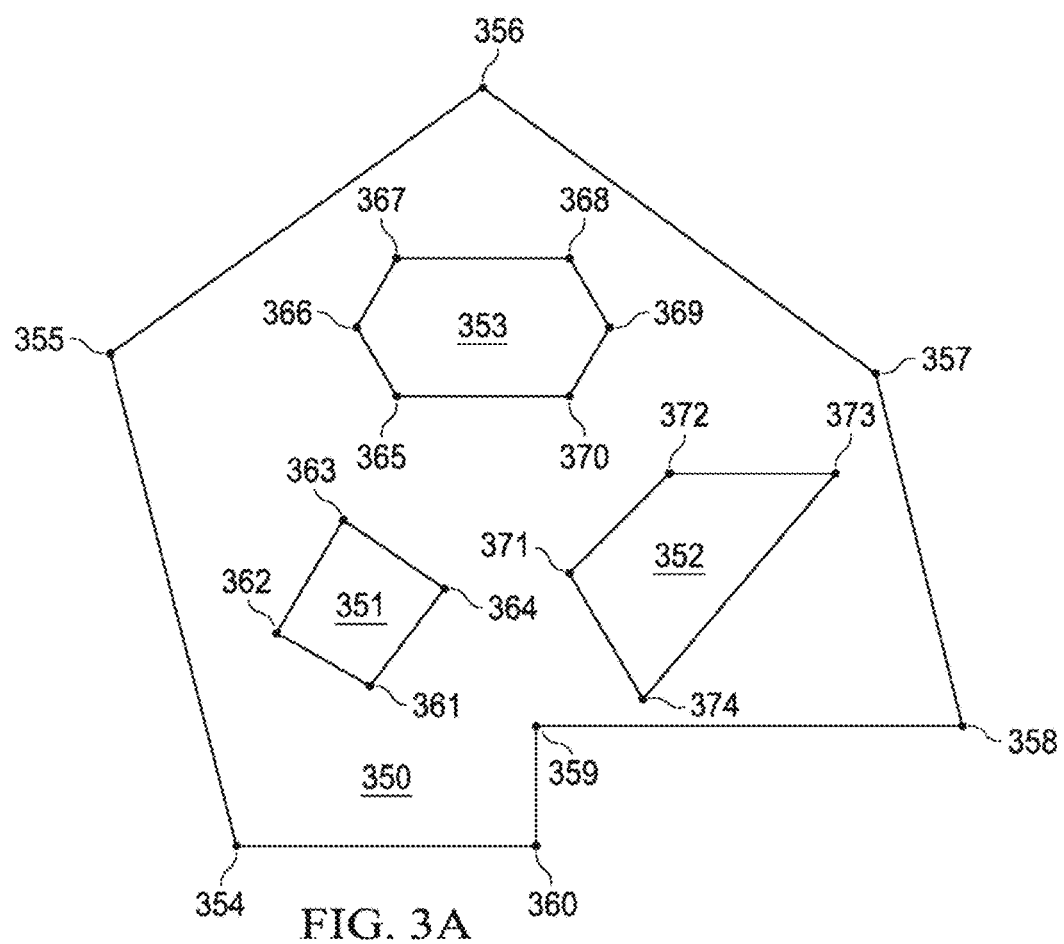
FIG. 3A is a plan view of zones of a preferred embodiment of the disclosure.

Referring to FIG. 3A, various zones will be described. Zone 350 is comprised of a polygonal shape having numerous vertices 354, 355, 356, 357, 358, 359 and 360. The vertices form a closed loop which can be any shape and have any number of vertices. Zone 350 is an area in which "actions" are sent to a user by the system. The code of Computer Program Listing Appendix III provides for determining whether a device is inside or outside a zone.

Zone 350 includes sub-zones 351, 352 and 353. Sub-zone 351 is comprised of a perimeter including vertices 361, 362, 363 and 364. The vertices form a closed loop which can be any shape and have any number of vertices. Sub-zone 351 can have any number of vertices and comprise any shape, so long as it is inside zone 350. In the system, sub-zone 351 receives a sub-set of actions sent to the user in zone 350.

Zone 350 includes "exclusion" sub-zone 353. Exclusion sub-zone 353 is an area bounded by a perimeter formed from vertices 365, 366, 367, 368, 369 and 370. Exclusion sub-zone 353 can have any number of vertices and comprise any shape, so long as it is inside zone 350. An "exclusion" sub-zone is a sub-zone in which a sub-set of actions sent to zone 350 are excluded so long as the user is within it.

"Hot zone" 352 is a sub-zone of zone 350 and is a perimeter formed by vertices 371, 372, 373 and 374. Hot zone 352 can have any number of vertices and comprise any shape, so long as it is inside zone 350. A "hot zone" is a sub-zone in which actions are actually being sent to a user.

Figure 3B:
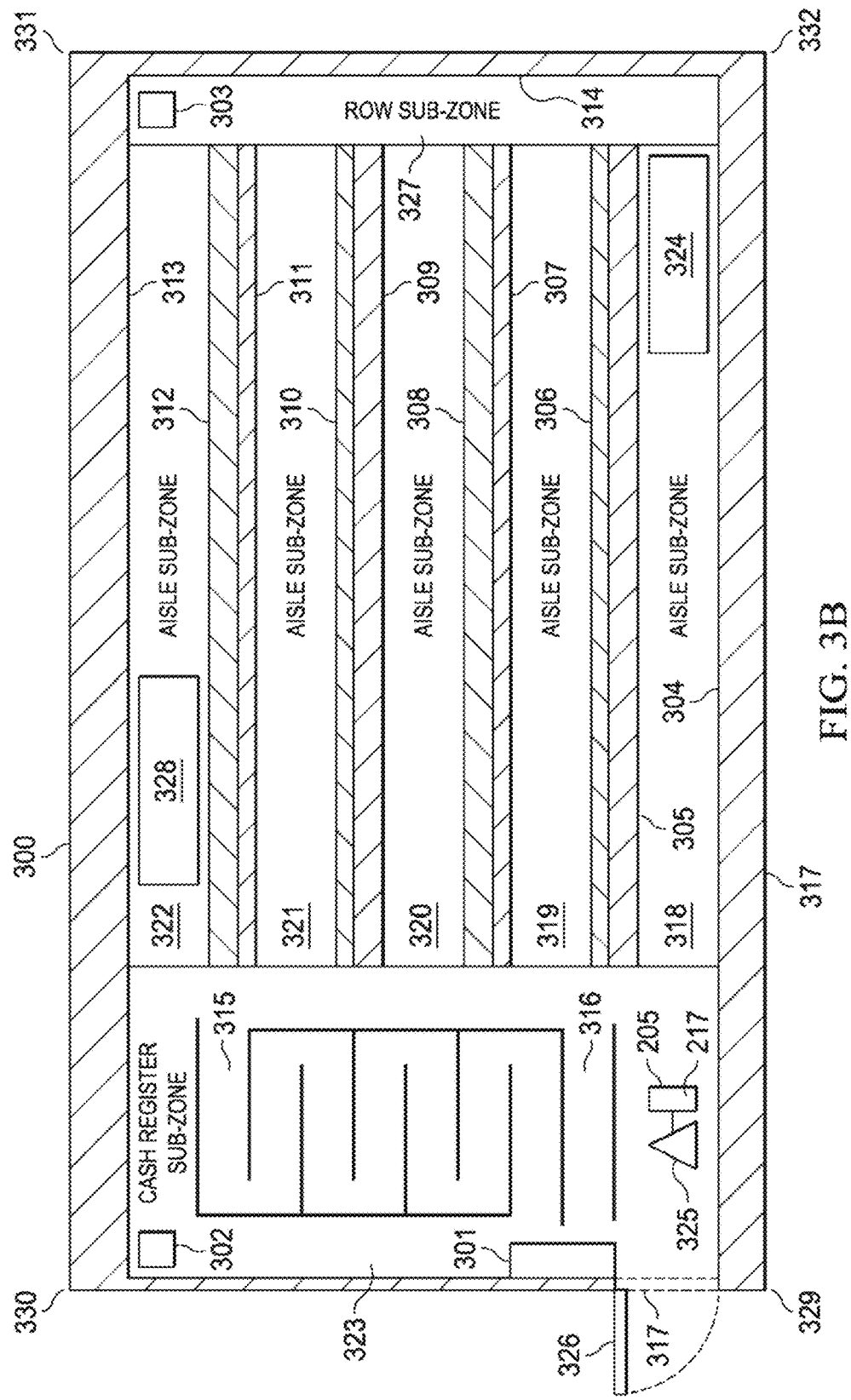
FIG. 3B is a plan view of a virtual geographic zone and sub-zones of a preferred embodiment.

Referring to FIG. 3B, an example of a preferred deployment of the system is described. Retailer 300 includes cash register 301, NAV service repeater 302 mounted within retailer 300 and product shelves 304, 305, 306, 307, 308, 309, 310, 311, 312, 313, and 314 positioned within retailer 300. Priority check-out line 316 is adjacent to cash register 301. Check-out line 315 is adjacent to priority check-out line 316. In one embodiment, Wi-Fi access point 303 is mounted within retailer 300. Of course, other deployments in different locations are possible.

Store zone 317 surrounds retailer 300. Aisle sub-zone 318 is positioned between product shelves 304 and 305. Aisle sub-zone 319 is positioned between product shelves 306 and 307. Aisle sub-zone 320 is positioned between product shelves 308 and 309. Aisle sub-zone 321 is positioned between product shelves 310 and 311. Aisle sub-zone 322 is positioned between product shelves 312 and 313. Row sub-zone 327 is adjacent to product shelf 314. Cash register sub-zone 323 is adjacent to door 326 and surrounds cash register 301, check-out line 315 and priority check-out line 316. Hot zone sub-zone 324 is positioned within aisle sub-zone 318 adjacent row sub-zone 327. Exclusion sub-zone 328 is positioned within aisle sub-zone 322.

In a preferred embodiment, each boundary of store zone 317, cash register sub-zone 323, aisle sub-zone 318, aisle sub-zone 319, aisle sub-zone 320, aisle sub-zone 321, aisle sub-zone 322, cash register sub-zone 323, hot zone sub-zone 324, row sub-zone 327, and exclusion sub-zone 328 is defined by a supervisor as will be further described below. In one embodiment, store zone 317 is defined by recording points 329, 330, 331, and 332 of store zone 317 as will be further described below.

User 325 has user device 205 running user application 217. User device 205 is in wireless communication with NAV service repeater 302 to determine the location of user device 205 as will be further described below.

In one embodiment, user device 205 is possessed by the user. In another embodiment, user device 205 is possessed by a supervisor and "loaned" to the user by the supervisor.

As user 325 moves in and out of store zone 317, cash register sub-zone 323, aisle sub-zone 318, hot zone sub-zone 324, aisle sub-zone 319, aisle sub-zone 320, aisle sub-zone 321, aisle sub-zone 322, row sub-zone 327, the location of user device 305 is tracked as will be further described below. Predetermined actions of user application 217 based on the location of user device 205 are executed or prohibited from being executed as will be further described below.

In one embodiment, as user 325 moves through each of aisle sub-zones 318, 319, 320, 321, and 322, and row sub-zone 327 information about products, including the price, specifications, and the location of the products on shelves adjacent to each of aisle sub-zones 318, 319, 320, 321, and 322, and row sub-zone 327, discount coupons for the purchase of the products located in each of aisle sub-zones 318, 319, 320, 321, and 322, and row sub-zone 327 are displayed actions on user device 205 by user application 217.

In another embodiment, as user 325 moves into hot zone sub-zone 324 user application 217 displays the status of a store event action on user device 205. In this embodiment, the status of the store event action is based on a predetermined time within which user 325 and user device 205 engage with, i.e., at or within, the boundary of hot zone sub-zone 324.

In one embodiment, hot zone sub-zone 324 is "exclusion." In an "exclusion" zone, all actions are deactivated except for actions related to store events. In another embodiment, hot zone sub-zone 324 is "inclusion" and allows other actions, including information about products, including the price, specifications, and the location of the products on shelves adjacent to each of aisle sub-zones 318, 319, 320, 321, and 322, and row sub-zone 327, discount coupons for the purchase of the products located in each of aisle sub-zones 318, 319, 320, 321, and 322.

In one embodiment, a supervisor can verify and monitor the location of user device 205 in store zone 317 as will be further described below.

In another embodiment, as user 325 moves into cash register sub-zone 323, user application 217 determines whether user 325 can access priority check-out line 316 or must use check-out line 315 and displays the determination on user device 205. In one embodiment, the determination of whether user 325 can access priority check-out line 316 is based on a predetermined amount of money user 325 has spent at retailer 300. In another embodiment, the determination of whether user 325 can access priority check-out line 316 is based on a predetermined amount of time user has been a customer of retailer 300.

In one embodiment, exclusion sub-zone 328 is a sub-zone in which the supervisor can decline to send actions to a user. In this embodiment actions may be prohibited by law or other limitations so that actions which would otherwise be delivered to the user are not delivered. Instead of an action, a message may be sent to the user regarding the prohibited zone and its boundaries.

Figure 3C:
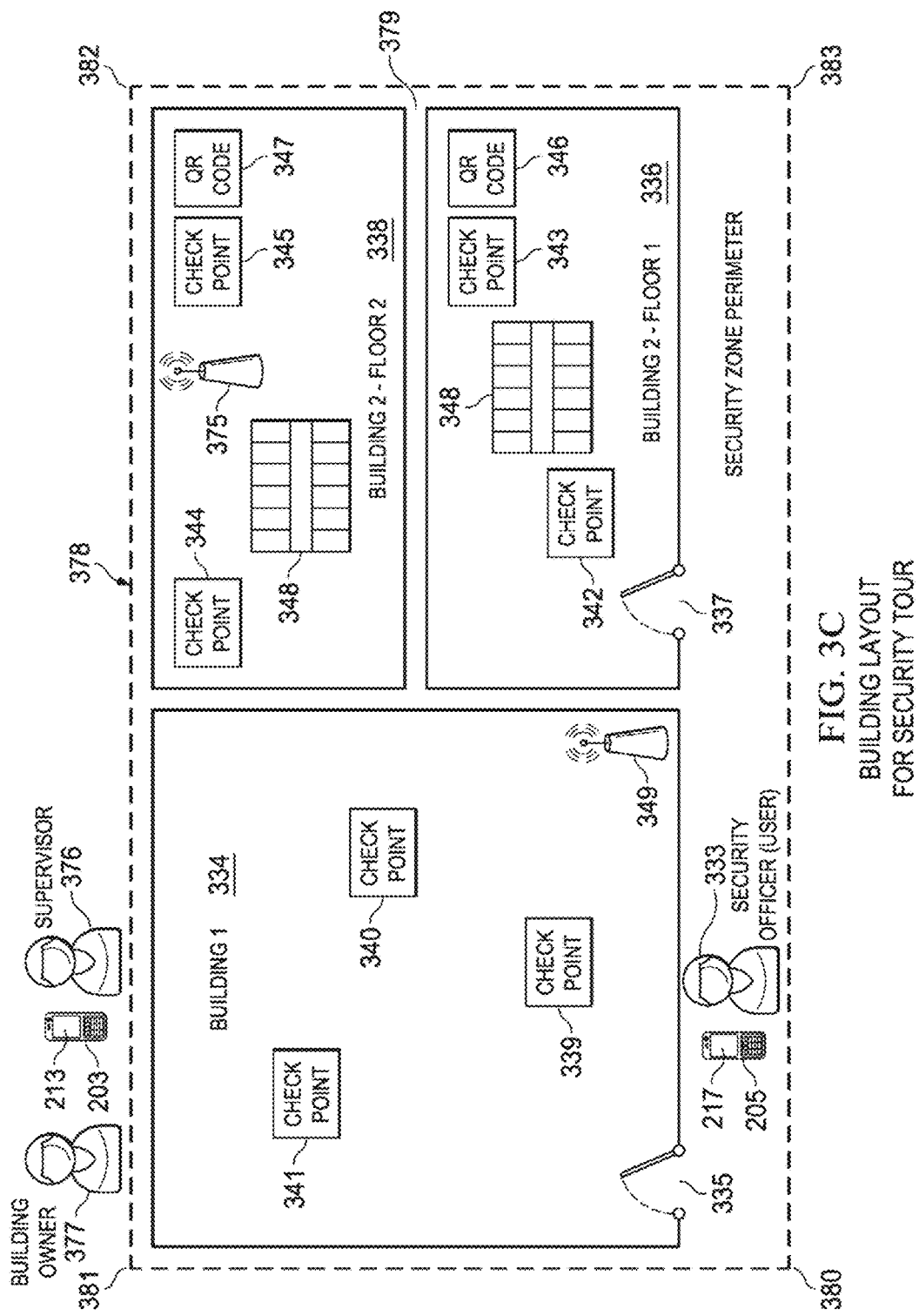
FIG. 3C is a plan view of a virtual geographic zone and sub-zones of a building layout for a security tour of a preferred embodiment.

Referring to FIG. 3C, an example of a preferred security tour embodiment is described. Buildings 334 and 379 are located next to each other. Security perimeter zone 378 surrounds buildings 334 and 379. Building 334 has checkpoint zones 339, 340, and 341. Building 379 has floor 336 and floor 338 above floor 336. Floor 336 has checkpoint zones 342 and 343. Floor 338 has checkpoint zones 344 and 345.

In one embodiment, QR codes 346 and 347 may be placed at checkpoint zones 343 and 345, respectively, to insure accuracy when user 333 checks in at checkpoint zones 343 and 345.

In another embodiment, NAV service repeaters 349 and 375 may be added to buildings 334 and 379, respectively, to insure accuracy at checkpoint zones 339, 340, 341, 342, 343, 344, and 345.

Building owner 377 has asked supervisor 376 to create a security tour for user 333 for building 334 and building 379. In this embodiment, user 333 is a security officer.

In another embodiment, building owner 377 can assume the duties of supervisor 376 by logging in as a supervisor using supervisor device 203.

As used in this disclosure, a tour is a set of one or more zones or sub-zones that may be visited in sequence or randomly, a military mission, a sequence of checkpoints a security officer visits, a delivery route to be completed, the "walk" through a prison when a prison guard makes rounds, or any series of places (zones) all of which are defined by a supervisor and may be visited by a user either in sequence or randomly.

Supervisor 376 loads supervisor application 213 on supervisor device 203 and defines security perimeter zone 378 by points 380, 381, 382, and 383. Inside security perimeter zone 378 and using supervisor application 213, supervisor 376 defines checkpoint zones 339, 340, and 341 in building 334 and checkpoint zones 342, 343, 344, and 345 in building 379 on floors 336 and 338 using stairs 348. This process of defining zones and sub-zones will be further described below.

User 333 is tasked with monitoring checkpoint zones 339, 340, and 341 in buildings 334 and checkpoint zones 342, 343, 344, and 345 in building 379. To begin a tour, user 333 turns on user device 205 and runs user application 217.

On first running, user application 217 will ask user 333 to authenticate (login). Once user 333 has authenticated, an entry is made in system log database 234 and user application 217 verifies that user 333 is inside the perimeter of security perimeter zone 378, as will be further described below. If user 333 is inside security perimeter zone 378, user 333 is allowed to clock-in using user application 217 and an entry is made in system log database 234, as will be further described below.

When user 333 has clocked-in, user 333 may begin the tour. User 333 enters building 334 through door 335 and proceeds to checkpoint zone 339. In one embodiment, user 333 is automatically checked-in by a supervisor defined action, when user device 205 enters each checkpoint zone, as will be further described below. An entry is made in system log database 234, as will be further described below.

When user 333 exits checkpoint zone 339 an entry is made in system log database 234. User 333 proceeds to checkpoint zone 340.

In one embodiment, user 333 may proceed to each checkpoint zone in any order.

In another embodiment, user 333 proceeds to each checkpoint zone in a predetermined order.

User 333 continues to check-in at each checkpoint zone in building 334, as described above and then proceeds to building 379. User 333 enters building 379 through door 337. User 333 proceeds to the first checkpoint zone, in this embodiment checkpoint zone 342. User 333 passes through each of checkpoint zones 342, 343, 344, and 345 and automatically checks in at each of checkpoint zones 342, 343, 344, and 345 at which an entry in system log database 234 is made at the entry and exit of each checkpoint zone 342, 343, 344, and 345.

In another embodiment, user 333 checks in at checkpoint zones 343 and 345 by scanning QR codes 346 and 347 with user device 205 using user application 217. In another embodiment, other scanable codes are employed.

In another embodiment, user device 205 uses NAV service system 204 via NAV service repeaters 349 and 375 inside building 334 and 379, respectively, to determine the location of user device 205, as will be further described below.

In another embodiment, as user 333 moves from checkpoint zone to checkpoint zone, predetermined actions of user application 217 based on the location of user device 205 are executed or prohibited from being executed, as will be further described below. In this embodiment, the actions include the logging of events into system log database 234.

When user 333 has completed checking in at each of checkpoint zones 339, 340, 341, 342, 342, 343, 344, and 345, the tour is complete. All entry data from the tour is saved on the VGZ Server 201 in system log database 234. System log database 234 data is available for query by supervisor reports 224.

In another embodiment, VGZ application 208 saves data of each tour undertaken by user 333 and the time it takes to complete each tour on a zone by zone basis for future comparison, as will be further described below.

It will be appreciated by those skilled in the art that this preferred security embodiment has the ability to automatically track the progress of user 333 through tours and allows supervisor 376 to manage a larger plurality of users 333 than would normally be manageable.

Embodiments of a supervisor set-up process, a user set-up process, a supervisor application process, a user application process, and a time verification process will be described below executed by a combination of VGZ server 201, supervisor device 203, NAV service system 204, and user device 205 will be described below.

Figure 3D:
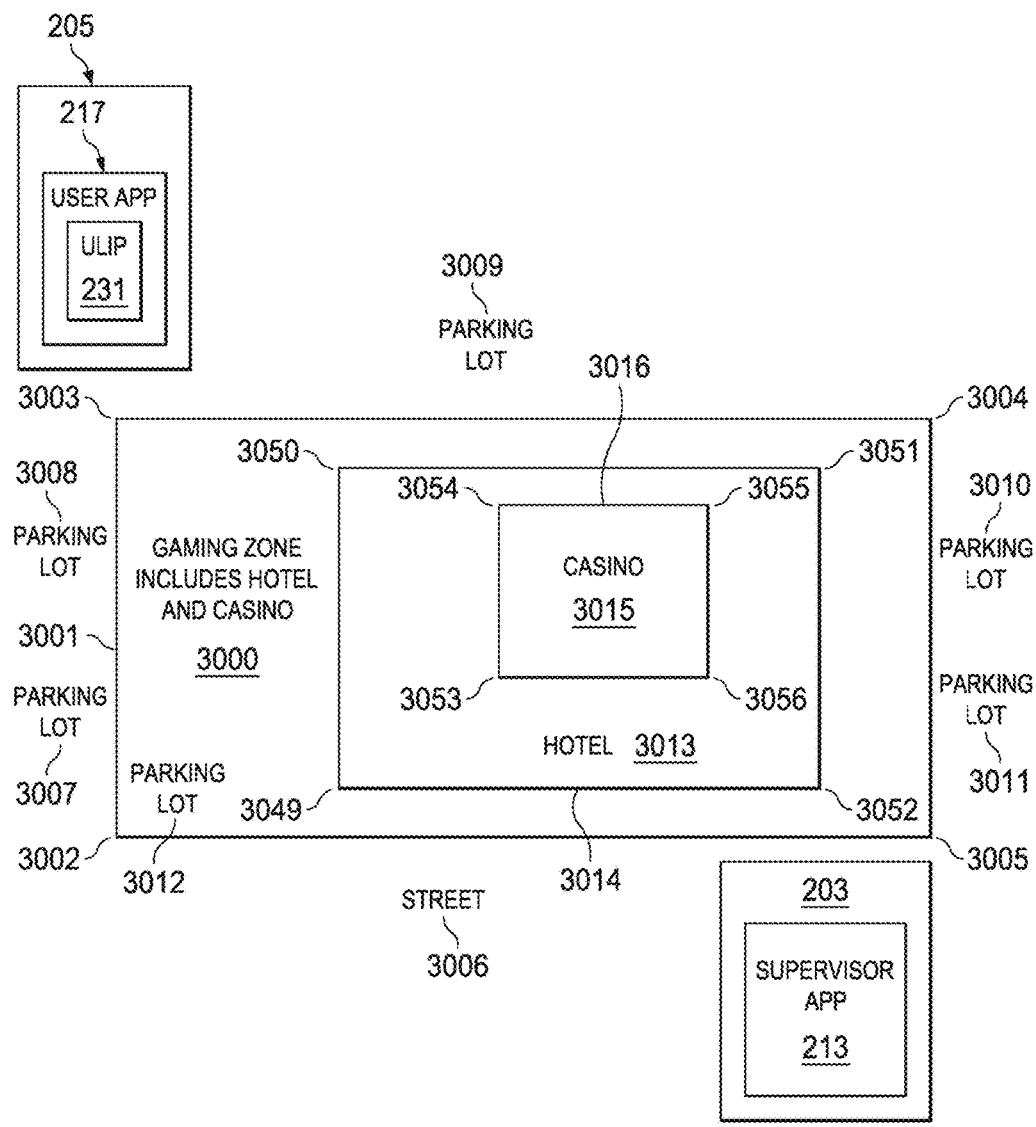
FIG. 3D is a plan view of a virtual geographic zone used in a gaming application.

Referring to FIG. 3D in another embodiment, gaming zone 3000 has perimeter 3001. Perimeter 3001 is defined by points 3002, 3003, 3004, and 3005. Street 3006 is adjacent to gaming zone 3000. Each of parking lots 3007, 3008, 3009, 3010, and 3011 is adjacent to gaming zone 3000. Gaming zone 3000 includes hotel zone 3013. Hotel zone 3013 has perimeter 3014 defined by points 3049, 3050, 3051, and 3052. Hotel zone 3013 includes casino zone 3015. Casino zone has perimeter 3016 defined by points 3053, 3054, 3055, and 3056. Gaming zone 3000 surrounds parking lot 3012.

A supervisor with supervisor device 203 defines gaming zone 3000 by a set of locations at points 3002, 3003, 3004, and 3005. Inside gaming zone 3000 and using supervisor application 213, the supervisor defines hotel zone 3013 by a set of locations at points 3049, 3050, 3051, and 3052 and casino zone 3015 by a set of locations at points 3053, 3054, 3055, and 3056. In one embodiment, the supervisor may also define gaming zone 3000, hotel zone 3013, and casino zone 3015 using the web version of supervisor app 213. The gaming zones may also define gaming classes where different games or a subset of games are enabled in different zones. This process of defining zones and sub-zones will be further described below.

In another embodiment setup and maintenance of gaming zone supervisor and user parameters may be added or modified by supervisor set-up 232 or user set-up 233.

Unlike range limited or proximity dependent "geo-fencing" solutions, the gaming zone can contain exclusion zones within the gaming zone whereby access to make a wager via ULIP 231 is denied.

In one embodiment, gaming is allowed only in casino zone 3015 and not anywhere else. In another embodiment, gaming zone 3000 is an exclusion zone. In this embodiment, hotel zone 3013 is an inclusion in which gaming is permitted. In other embodiments, casino zone 3015 may be defined as exclusion zone or an inclusion zone. This process of defining a zone as an exclusion zone or an inclusion zone will be further described below.

A user is associated with user device 203 running user application 217 and ULIP 231.

In a preferred embodiment, user application 217 is a gaming application that executes a set of games. In this embodiment, a gaming application is computer program that provides the user an opportunity to place a wager on the set of games. The set of games are games of chance, racing events, bingo games, sporting events where a user may place a wager on the outcome of the game or event. The set of games can take various forms. For example, a slot-machine-like game, a roulette-like-game, a poker-like-game, and a horse-racing-like game may be included in the set of games. Other wager or betting games known in the art may be employed.

As a user with user device 205 moves into and out of gaming zone 3000, hotel zone 3013, and casino zone 3015, the location of user device 205 is tracked and verified, as will be further described below. A set of actions defined by the supervisor will execute or be prevented from executing based on the location of user device 205, as will be further described below.

In a preferred embodiment, user application 217 uses ULIP 231 to determine if the user is inside a gaming zone where it is legal to place a wager. If the user is inside the gaming zone, then ULIP 231 grants permission to user application 217 to allow a wager to be made. This process will be further described below.

In a preferred embodiment, user application 217 interfaces with the ULIP 231 to securely connect with the VGZ server 201 to determine if the authenticated user's device 205 is inside or outside of a gaming zone of location host 235. In one embodiment, user application 217 is a stand-alone application that depends upon ULIP 231 for authentication and location information. ULIP 231 provides authentication and location information to user application 217.

In another embodiment, ULIP 231 is independent of user application 217. In this embodiment, ULIP 231 can be an internal process that can be called by another application.

In a preferred embodiment, gaming zone 3000 is a closed polygon. In another embodiment, gaming zone 3000 is a closed polyhedron. In other embodiments, gaming zone 3000 is defined by any defined polygon or polyhedron.

Unlike range limited or proximity dependent "geo-location" solutions, which are dependent on limitations of a radio frequency signal, there is no loss of signal strength at the periphery of a gaming zone, nor is there any limit on how small or how large the gaming zone may be, provided that cell phone coverage is available. The gaming zone is not dependent on signal strength for accuracy or distance. The gaming zone depends upon geographic coordinates for accuracy. The gaming zone is not limited to a circular footprint or hemispherical shape. The location of user device 205 is identified within the gaming zone at all times.

Figure 3E:
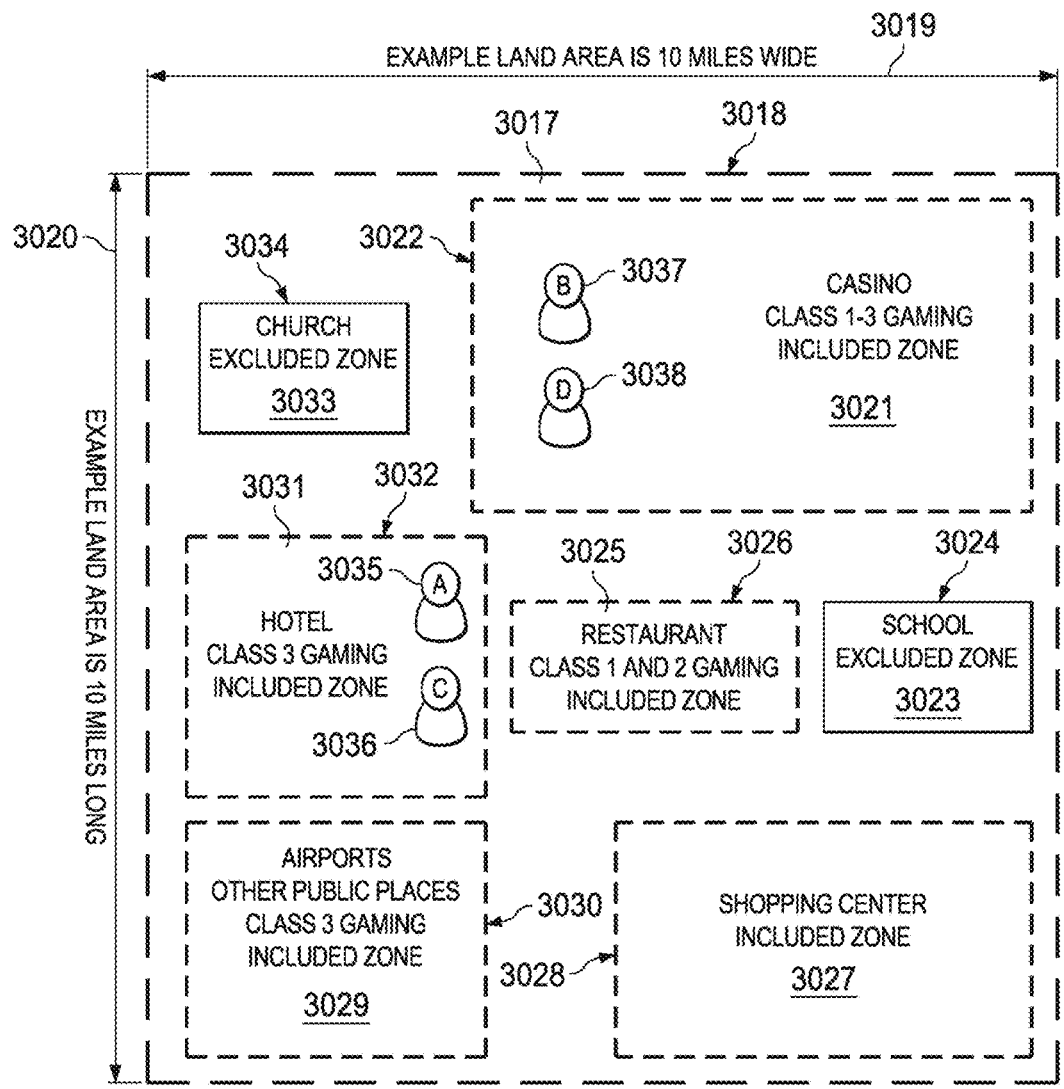
FIG. 3E is a plan view of a virtual geographic zone used in a gaming application as applied to a large tract of land.

Referring to FIG. 3E in another embodiment, gaming zone 3017 has perimeter 3018.

Gaming zone 3017 has dimensions 3019 and 3020. Gaming zone 3017 includes casino zone 3021 having perimeter 3022, school zone 3023 having perimeter 3024, restaurant zone 3025 having perimeter 3026, shopping center zone 3027 having perimeter 3028, airport zone 3029 having perimeter 3030, hotel zone 3031 having perimeter 3032, and church zone 3033 having perimeter 3034.

In a preferred embodiment, each of dimensions 3019 and 3020 is ten (10) miles. Other distances may be employed.

In a preferred embodiment, each of school zone 3023 and church zone 3033 is an excluded zone. In this embodiment, all wagering is denied if the location of a user device is in either of school zone 3023 or church zone 3033.

In one embodiment shown in FIG. 3E, each of casino zone 3021, restaurant zone 3025, airport zone 3029, and hotel zone 3031 is limited to a predetermined class of wagering games. In this embodiment, wagering is limited to the predetermined class of wagering games.

Figure 3F:
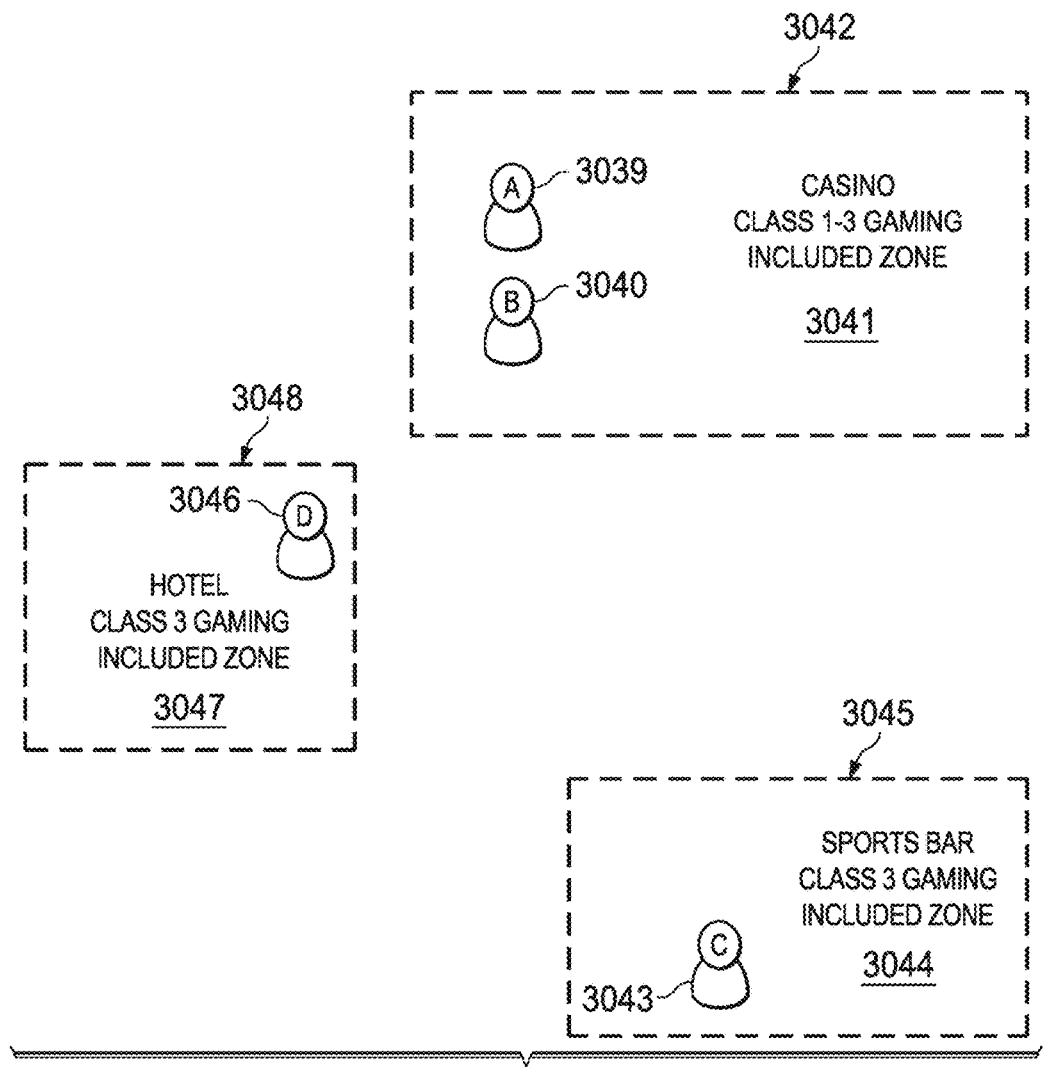
FIG. 3F is a plan view of a virtual geographic zone and a peer-to-peer gaming zone.

In another embodiment shown in FIG. 3F, gaming zones are used for gaming social networking. Each of users 3035, 3036, 3037, and 3038 has a user device. Users 3035 and 3036 are placing wagers in hotel gaming zone 3031 and users 3037 and 3038 are placing wagers in casino gaming zone 3021. Each of users 3035, 3036, 3037, and 3038 has linked their respective user account to their respective social media network account, as will be further described below. Each of casino zone 3021 and hotel zone 3031 has a social media link action. In this embodiment, any user having a user device inside either of casino zone 3021 or hotel zone 3031, may be manually or automatically linked the social media network. The user application determines the location of the user device and the VGZ application queries a contact list of the social media network account of the user and searches for any users on the contact list in a set of zones having the social media link action and users to "find" each other. Users must declare themselves "discoverable" in order to be "found". This process will be further described below.

Continuing in FIG. 3E for example, user 3035 uses user application 217 (FIG. 3D) to display "friends" in hotel zone 3031. User application 217 will display all users in hotel zone 3031 who are "friends" with user 3035. User 3035 can then make contact electronically in order to play a peer to peer game, make a wager, or make contact. If user application 217 does not find any "friends" in hotel zone 3031 then user 3035 can use user application 217 to "expand coverage" to encompass other gaming zones. In this example, casino zone 3021 would be discovered and user 3037 would be discovered (if he has made himself discoverable) and user 3035 and user 3037 would be connected. In this example, user 3038 would not be discovered by users 3035, 3036, or 3037 since even though he may have made himself discoverable, because user 3038 is not "friends" with any of users 3035, 3036, or 3037.

As used in this disclosure, a peer to peer ("P2P") gaming consists of wagers made between or among users in the same location or in locations remote from one another. Examples of P2P gaming would be poker and betting exchanges on sporting events. Provided all users are in the same gaming zone or in gaming zones of a location host where P2P gaming is lawful.

In another embodiment, users 3035 and 3036 are engaged in placing wagers and engaging in P2P games of chance such as poker or sports wagers at hotel zone 3031. In this embodiment, users 3031 and 3038 are placing similar P2P game wagers at casino zone 3021.

In another embodiment, hotel zone 3031 is a location host. In this embodiment, hotel zone 3031 receives a fee for each wager placed within hotel zone 3031. In this embodiment, the fee is calculated at the end of each month by VGZ server 201. Other time periods may be employed.

Referring to FIG. 3F in another embodiment, users 3039 and 3040 are within casino zone 3041 having perimeter 3042. User 3043 is within sports bar zone 3044 having perimeter 3045. User 3046 is within hotel zone 3047 having perimeter 3048. Casino zone 3041, sports bar zone 3044, and hotel zone 3047 are gaming zones and have a social media link action. Each of users 3039, 3040, 3043, and 3046 has a user device. Users 3039, 3040, 3043, and 3046 are engaged in P2P gaming such as poker, sports betting exchanges or any new P2P games.

Users 3039, 3040, 3043, and 3046 may each make themselves discoverable and link their respective social media network accounts to find, play P2P games, and communicate with each other as previously described.

Figure 4A:
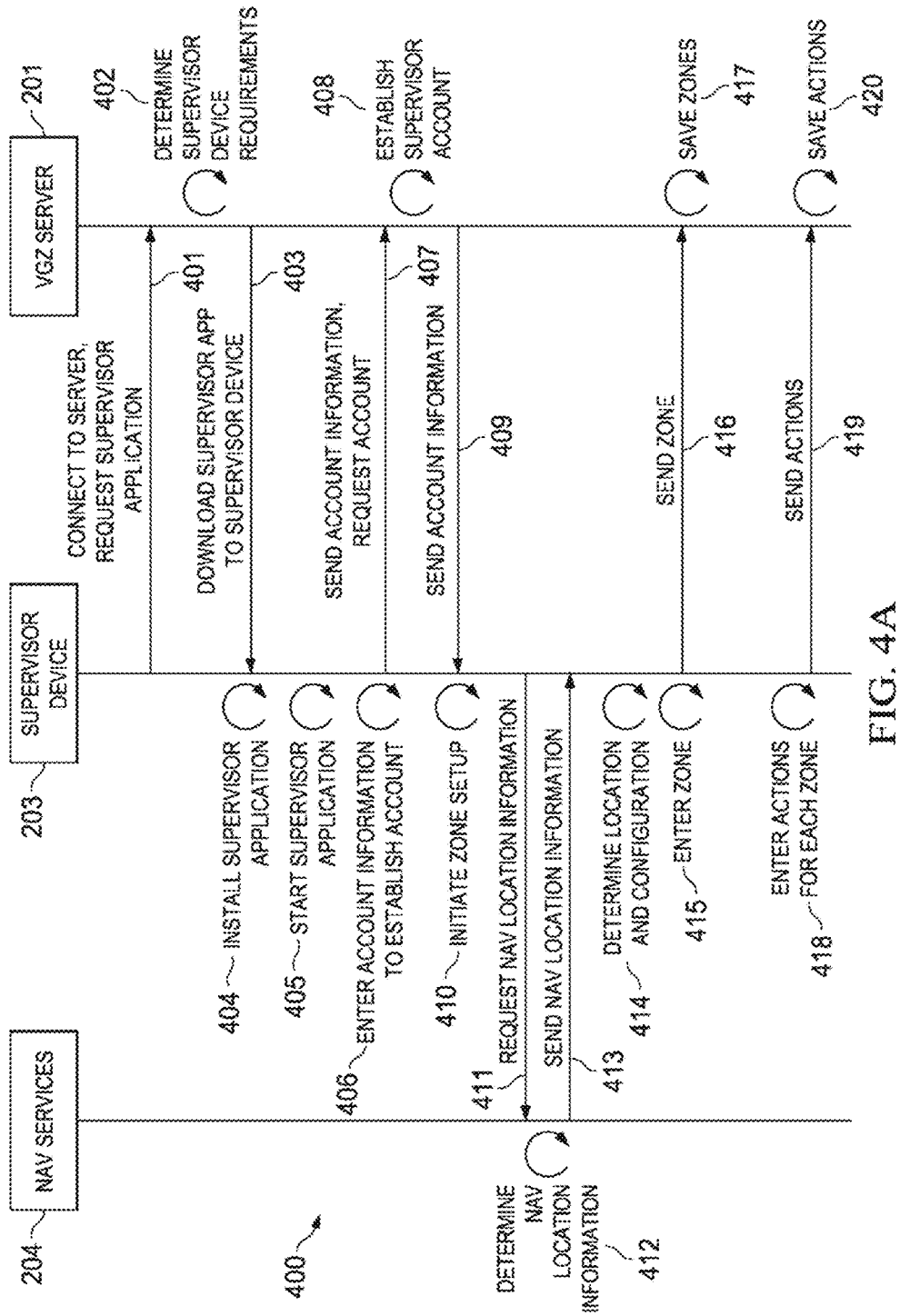
FIG. 4A is a flowchart of supervisor set-up method of a preferred embodiment.

Referring to FIG. 4A, supervisor set-up method 400 for a supervisor application using a VGZ application will be described. In step 401, supervisor device 203 connects to VGZ server 201 and requests the supervisor application. In step 402, the VGZ application determines the requirements of supervisor device 203. In step 403, the supervisor application is downloaded to supervisor device 203. In step 404, supervisor device 203 installs the supervisor application. In step 405, supervisor device 203 starts the supervisor application. In step 406, a set of supervisor account information is entered into supervisor device 203 to establish a supervisor account. In step 407, supervisor device 203 sends the set of supervisor account information to VGZ server 201 to request the supervisor account. In step 408, the VGZ application establishes a supervisor account by saving the supervisor account information into a supervisor database. In step 409, VGZ server 201 sends an account confirmation to supervisor device 203.

In step 410, the supervisor application initiates a zone set-up function to establish and define each zone or sub-zone as will be further described below. In step 411, the supervisor application requests location information from NAV services system 204. In step 412, NAV services system 204 determines the NAV location information.

In one embodiment, NAV services system 204 is a GPS system. In this embodiment, the location information includes the position of the GPS satellite at the time the GPS signal is to be sent and the time at which the GPS signal is sent. Other NAV services systems may be employed.

In step 413, the location information is sent to supervisor device 203. In step 414, supervisor device 203 determines its location from the location information. In step 415, the location, i.e., longitudinal, latitudinal, and altitudinal coordinates, of a set of zones and/or a set of sub-zones are entered into supervisor device 203.

Figure 4B:
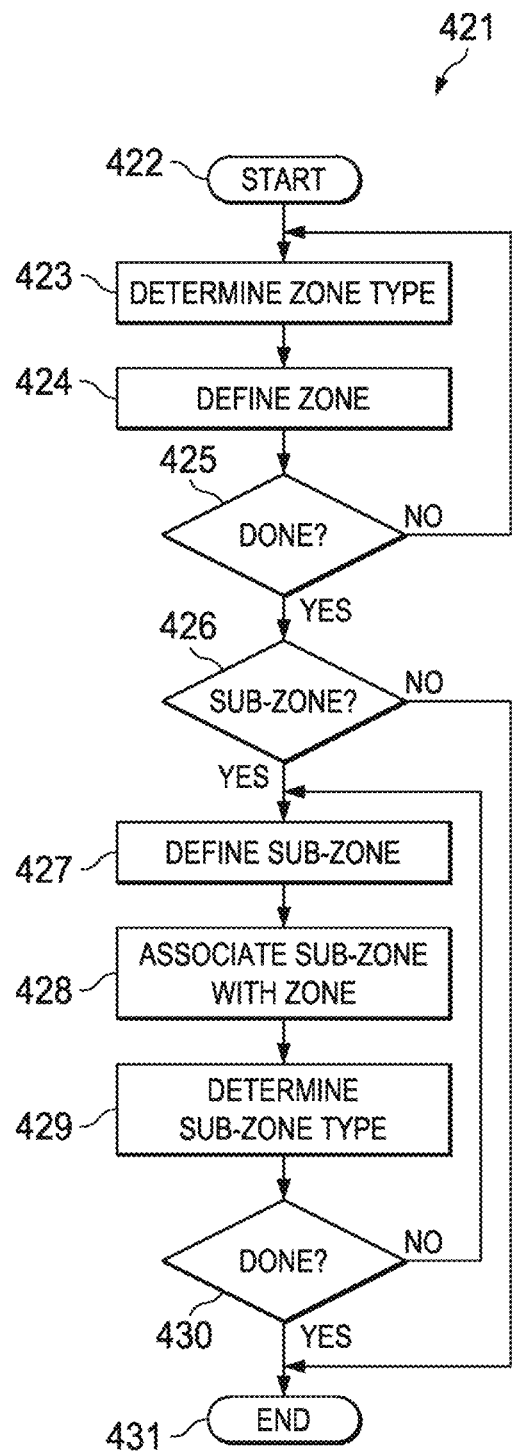
FIG. 4B is a flowchart of a method for establishing a zone or a sub-zone of a preferred embodiment.
Figure 4C:
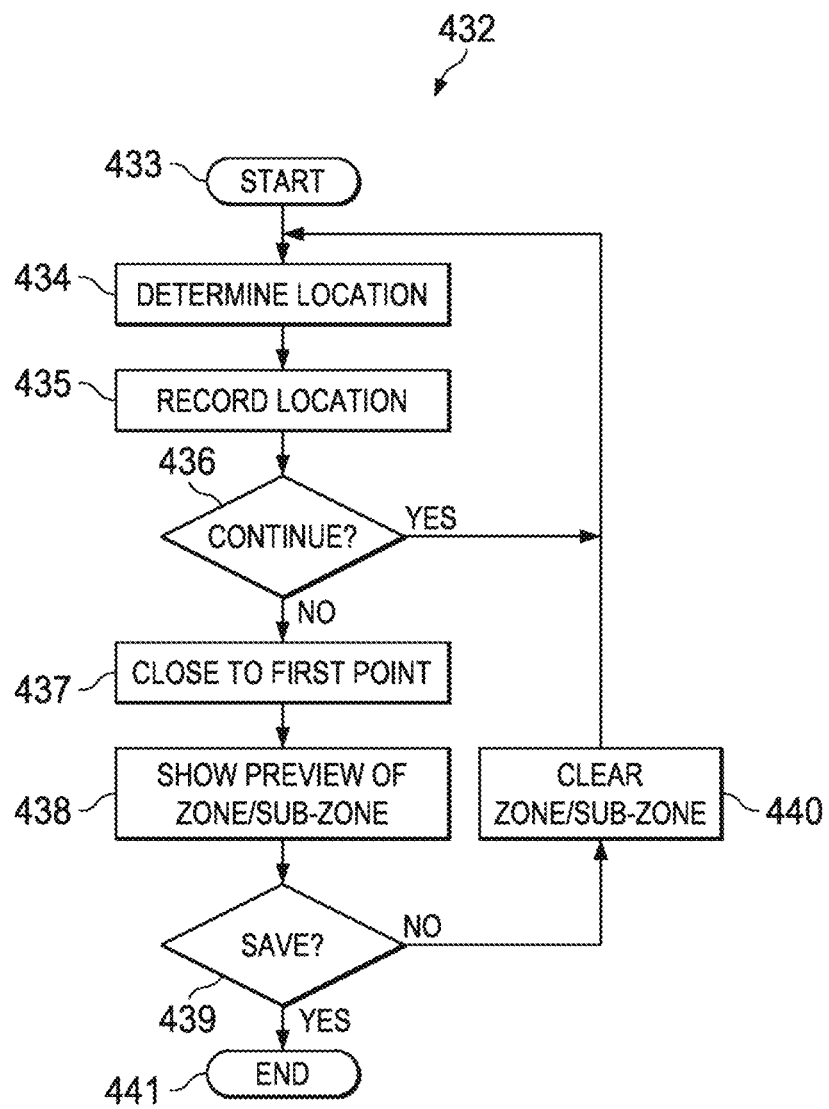
FIG. 4C is a flowchart of a method for defining a zone or sub-zone of a preferred embodiment.

In a preferred embodiment, steps 411, 412, 413, 414, and 415 are repeated to establish and define points of a polygonal or polyhedral zone or a sub-zone as will be further described in FIGS. 4B and 4C.

In step 416, the saved set of zones and/or sub-zones is sent to VGZ server 201. In step 417, VGZ server 201 saves the sets of zones and/or sub-zones into the supervisor account. In step 418, an action for each zone and sub-zone is entered. In step 419, the entered action is sent to VGZ server 201. In step 420, VGZ server 201 saves each action.

Referring to FIG. 4B, method 421 for establishing a zone and a sub-zone is described in further detail.

Method 421 starts at step 422. In step 423, a zone type is determined, i.e., whether the zone is "inclusion" or "exclusion." In step 424, the determined zone is defined. In step 425, whether all zones have been established is determined. If all zones have not been established, then method 421 returns to step 423. If all zones have been established, then method 421 proceeds to step 426. In step 426, whether a sub-zone needs to be established is determined. If no sub-zones need to be established, then method 421 ends in step 431. If a sub-zone needs to be established, then the sub-zone is defined in step 427. In step 428, the sub-zone is associated with the zone. In step 429, a sub-zone type is determined for the sub-zone, i.e., whether the sub-zone is "inclusion" or "exclusion". In step 430, whether all sub-zones have been established is determined. If all sub-zones have not been established, then method 421 returns to step 427. If all sub-zones have been established, then method 421 ends in step 431. Steps 424 and 427 are performed as will be further described in FIG. 4C. In one embodiment, a zone partially inside another zone is a sub-zone. In another embodiment, a zone partially inside another zone is not a sub-zone.

Referring to FIG. 4C, method 432 for defining a polygon for a zone or sub-zone is described in further detail. Method 432 starts at step 433. In step 434, a point location of the supervisor device is determined as previously described. In step 435, the determined point location is recorded in the supervisor device. In step 436, a decision is made as to whether or not to record additional points as corners of the polygon referencing a zone or subzone. If additional points are to be recorded, then method 432 returns to step 434. In a preferred embodiment, the supervisor moves along a desired path and determines and records the set of point locations. The set of point locations are endpoints for sides of a polygon for the zone or sub-zone. In this embodiment, the supervisor ends the determination and recording of the set of point locations at the last point location along the desired path and the polygon is closed to the first point.

If no additional points are to be recorded then the process moves to step 437. In step 437, the polygon is closed to the first point location.

In step 438, the determined zone or sub-zone is displayed as a preview. In step 439, whether the displayed zone or sub-zone is to be saved into memory is determined. If not saved into memory, then the displayed zone or sub-zone is cleared in step 440 and method 432 returns to step 434. If the displayed zone or sub-zone is saved into memory, then method 432 ends in step 441.

Figure 5A:
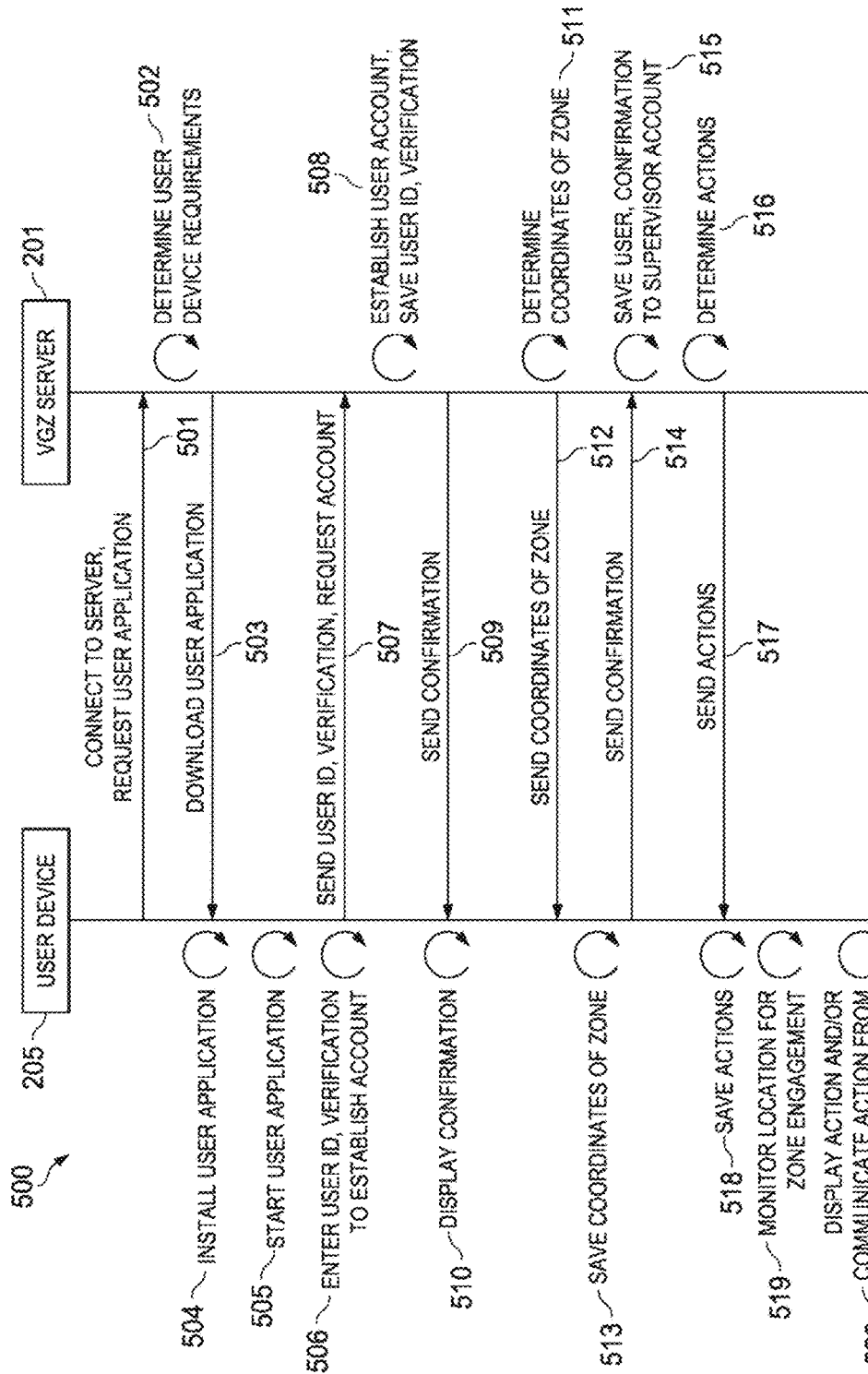
FIG. 5A is a flowchart of a user set-up method of a preferred embodiment.

Referring to FIG. 5A, user set-up method 500 for a user application using a VGZ application is described. In step 501, user device 205 connects to VGZ server 201 and requests the user application. In step 502, the requirements of user device 205 are determined. In step 503, the user application is downloaded. In step 504, the user application is installed. In step 505, the user application is started. In step 506, a set of user information that includes a user ID and a user verification is entered into the user application to establish a user account. In one embodiment, a wager account is established. The balance of the wager account belongs to the user. When the user registers and is authenticated with a supervisor, the user grants the supervisor permission to add winnings to and subtract losses from the wager account.

In step 507, the set of user information is sent to VGZ server 201 and to request the user account. In step 508, VGZ application 208 establishes the user account by saving the set of user information in the user database. In step 509, VGZ server 201 sends a confirmation to user device 205. In step 510, the confirmation is displayed on user device 205.

In step 511, the coordinates of a set of zones are determined from each supervisor account of each zone of the set of zones. The zones may be associated with different games, authorization levels and casinos. In step 512, the coordinates of the set of zones are sent to user device 205. In step 513, user device 205 saves the coordinates of the set of zones into memory. In step 514, a confirmation is sent to VGZ server 201. In step 515, VGZ server 201 saves the user to each of the supervisor accounts for each zone. In step 516, the actions for each zone are determined from the supervisor database. In step 517, the actions for each zone are sent to user device 205. In step 518, the actions for each zone are saved to the memory of user device 205. In step 519, the user application on user device 205 monitors the location of user device 205 at predetermined time intervals in order to determine if the user device engages, i.e., is near, at, or within a zone, as will be further described in FIG. 5B. In a preferred embodiment, a user associated with user device 205 can activate the intermittent monitoring of the location of user device 205 in step 519 at any time. In this embodiment, any zone may be discoverable as will be further described in FIG. 5B. In step 520, if user device 205 engages, i.e., is at or within the zone, then the actions for the engaged zone are displayed on user device 205. In another embodiment, if user device 205 engages, i.e., is at or within the zone, then ULIP 231 communicates the actions for the engaged zone to user application 217, as will be further described below.

Figure 5B:
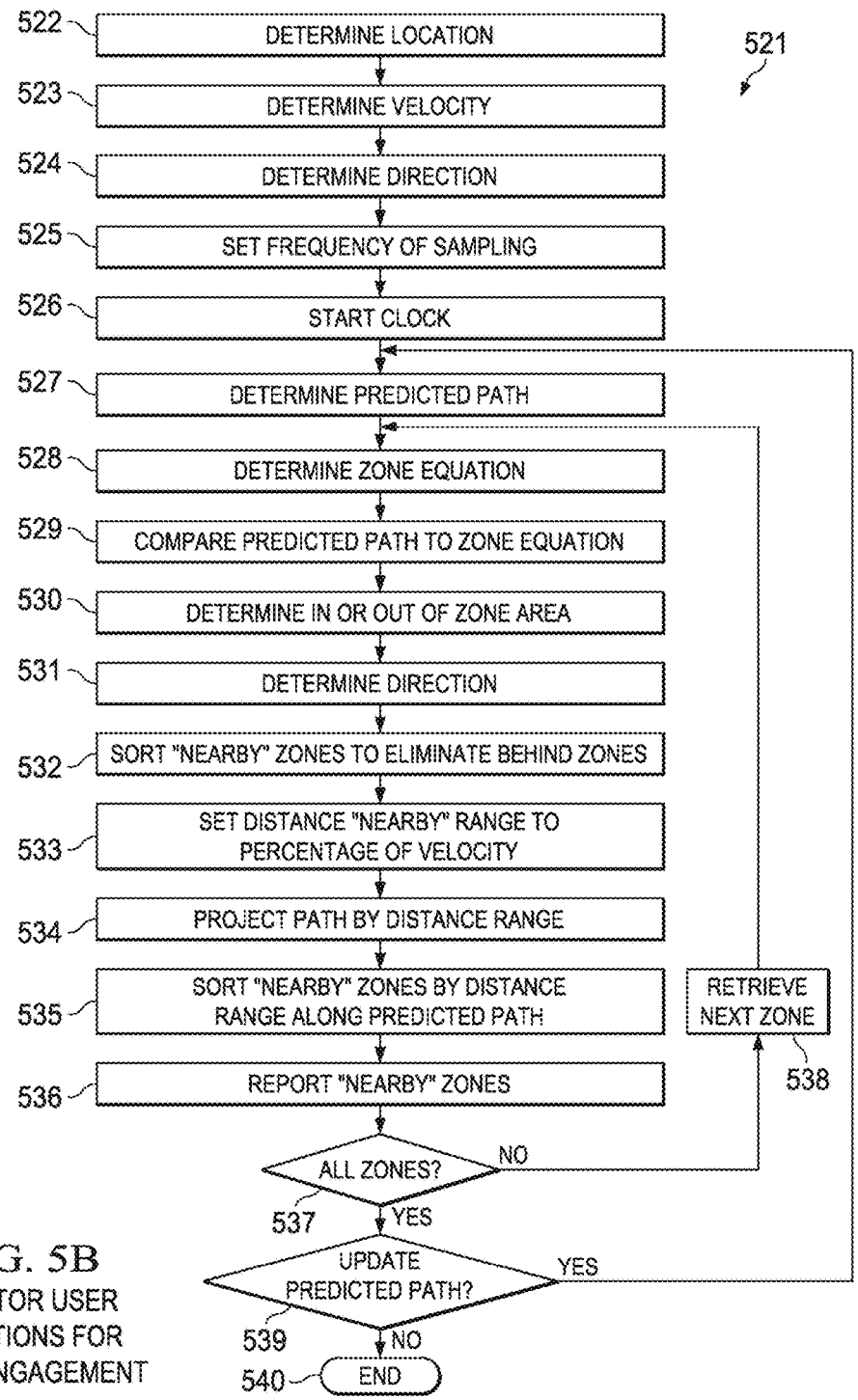
FIG. 5B is a flowchart of a method for monitoring user location for zone engagement of a preferred embodiment.

Referring to FIG. 5B, method 521 for monitoring a location of a user device to determine an engagement of the user device with a zone is described in further detail. In step 522, a location of the user device is determined as previously described. In step 523, a velocity of the user device is determined. In a preferred embodiment, the velocity of the user device is determined by determining a set of locations and a time period between a first location and a second location. In this embodiment, each position n is a set of latitudinal, longitudinal pairs $(x_n, y_n)$. In this embodiment, velocity is calculated by:

$$v_n = \frac{\Delta d_n}{\Delta t_n} \qquad \text{Eq. 1}$$

$$\Delta d_n = \sqrt{(x_n - x_{n-1})^2 + (y_n - y_{n-1})^2} \qquad \text{Eq. 2}$$

where v is the velocity of the user device, $\Delta d_n$ is the distance from location $(x_{n-1}, y_{n-1})$ to location $(x_n, y_n)$, and $\Delta t_n$ is the time period between the determination of location $(x_{n-1}, y_{n-1})$ and location $(x_n, y_n)$. In other embodiments, a plurality of locations is determined, a time period between each of the plurality of locations is determined, and the velocity of the user device is determined using Eq. 1 and Eq. 2.

In step 524, a direction of travel of the user device is determined from the set of locations. In step 525, a frequency of sampling is set. In a preferred embodiment, the frequency of sampling is the frequency with which method 521 determines the location of the user device and a predicted path of the user device as will be further described below.

In step 526, a clock is started to maintain a time constant. In step 527, the predicted path of the user device is determined by plotting a spline of a set of predicted positions $(x_p, y_p)$ of the user device using the set of locations, the velocity at each of the set of locations, and using the following equations:

$$x_p = \frac{1}{2}a_x t^2 + v_{x_o} t = \frac{(v_{x_o} + v_{x_p})t}{2} \qquad \text{Eq. 3}$$

$$y_p = \frac{1}{2}a_y t^2 + v_{y_o} t = \frac{(v_{y_o} + v_{y_p})t}{2} \qquad \text{Eq. 4}$$

where $x_p$ is the latitudinal distance, $y_p$ is the longitudinal distance, $a_x$ is the latitudinal acceleration, $a_y$ is the longitudinal acceleration, $v_{x_o}$ is the latitudinal velocity at $x_o$, $v_{y_o}$ is the longitudinal velocity at $y_o$, $v_{x_p}$ is the velocity at $x_p$, $v_{y_p}$ is the longitudinal velocity at $y_p$, t is time, and $(x_p, y_p)$ is any point on the predicted path. In one embodiment, the predicted path is sent to the VGZ server. In another embodiment, the predicted path remains on the user device.

In step 528, an equation defining the zone is determined. In a preferred embodiment, the zone equation is a mathematical function that defines the boundary of the zone. In step 529, the predicted path is compared to the zone equation. In one embodiment, each point of the predicted path is compared to points on the boundary of the zone. In one embodiment, each zone has a latitudinal distance $(x_{max} - x_{min})$ and a longitudinal distance $(y_{max} - y_{min})$ and each point $p(x_p, y_p)$ along the predicted path is compared to the zone to determine if point p along the predicted path is at the boundary or within the boundary of the zone. In this embodiment, for each $y_p$ along the predicted path, $x_p$ is compared to $x_{min}$ and $x_{max}$ of the zone to determine whether the following relationship is true:

$$x_{min} \leq x_p \leq x_{max} \qquad \text{Rel. 5}$$

In this embodiment, for each $x_p$ along the predicted path, $y_p$ is compared to $y_{min}$ and $y_{max}$ of the zone to determine whether the following relationship is true:

$$y_{min} \leq y_p \leq y_{max} \qquad \text{Rel. 6}$$

In this embodiment, if Rel. 5 and Rel. 6 are true, then point $(x_p, y_p)$ of the predicted path engages, i.e., is at or within the boundary of the zone.

In another embodiment, point $(x_p, y_p)$ of the predicted path is compared to the boundary of the zone using $x_{min}$, $x_{max}$, $y_{min}$, $y_{max}$ to determine whether point $(x_p, y_p)$ is within a predetermined distance from the boundary of the zone to determine whether the zone is "nearby."

In step 530, whether the predicted path is at, nearby, or within the zone area is determined from the comparison in step 529. In other embodiments, other methods of determining whether the predicted path engages, i.e., is at, within, or nearby the boundary of the zone, may be employed.

In step 531, the direction of the user device is determined. In step 532, the nearby zone is sorted to eliminate any zone that is behind the user device along the direction of travel. In step 533, a nearby distance range $D_r$ is set to a percentage β of the velocity $v_n$ determined in step 523 by:

$$D_r = v_n \beta \qquad \text{Eq. 7}$$

Any percentage can be employed. For example, the percentage can be 20%, 50%, or 75%. If the percentage is 50%, then Eq. 7 becomes:

$$D_r = 0.5 v_n \qquad \text{Eq. 8}$$

In step 534, the predicted path is modified so that the predicted path extends at the nearby distance range $D_r$. In step 535, the nearby zones are sorted by the nearby distance range $D_r$ along the predicted path. In step 536, the sorted nearby zones are reported for display.

In step 537, whether each zone has been compared to the predicted path is determined. If each zone has not been compared to the predicted path, then the next zone is retrieved in step 538. Method 521 returns to step 528. If each zone has been compared to the predicted path, then method 521 proceeds to step 539. In step 539, whether the predicted path needs to be updated is determined. In a preferred embodiment, the predicted path is determined at time $t_o$. In this embodiment, the present time is $t_p$. In this embodiment, the time elapsed is:

$$t_e = t_p - t_o \qquad \text{Eq. 9}$$

If the time elapsed $t_e$ is greater than a predetermined time period, then method 521 returns to step 527. If the time elapsed $t_e$ is less than or equal to the predetermined time period, then method 521 ends in step 540 and any determined nearby zone is sent from the server to the user device and/or displayed on the user device.

Figure 6:
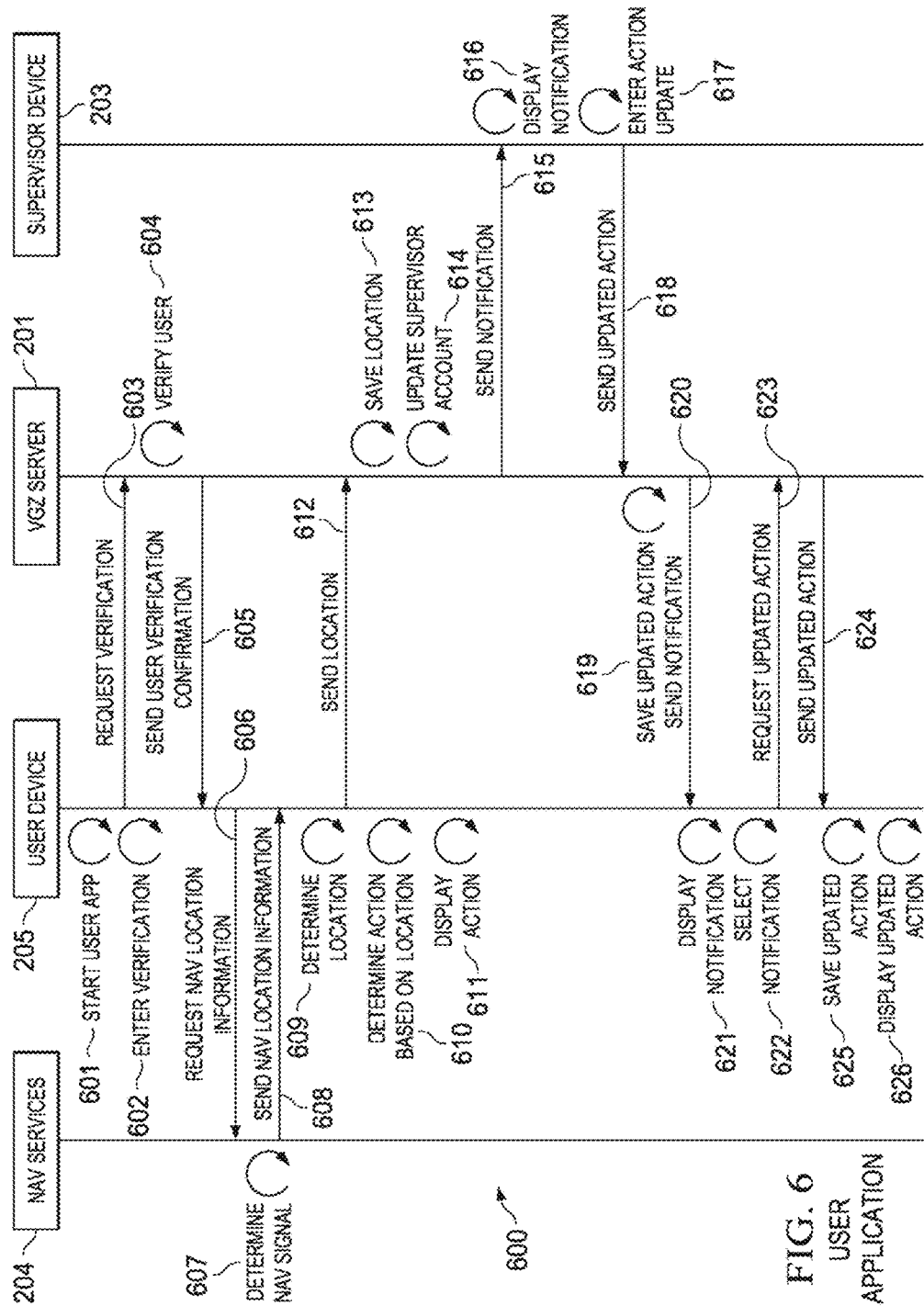
FIG. 6 is a flowchart of a user application method of a preferred embodiment.

Referring to FIG. 6, method 600 for user application 217 is described. In step 601, user application 217 is started on user device 205. In step 602, a user verification is entered. In step 603, the user verification is sent to VGZ server 201 to request verification. In step 604, the entered user verification is verified by comparing the entered user verification to a user verification stored in a user database. In step 605, a user verification notification is sent to user device 205 if the user is verified.

In step 606, location information from NAV services system 204 is requested. In step 607, NAV services system 204 determines the location information.

In one embodiment, NAV services system 204 is a GPS system. In this embodiment, the location information includes the position of the GPS satellite and the time at which the GPS signal is sent. Other NAV systems may be employed.

In step 608, NAV services system 204 sends the location information to user device 205. In step 609, a location of user device 205 is determined from the location information. In step 610, a set of actions based on the location of user device 205 is determined. In a preferred embodiment, the location of user device 205 is compared to the zone and the sub-zone to determine if the location of user device 205 engages, i.e., is at or within, the boundary of the zone or the sub-zone. In this embodiment, the location of user device 205 is compared to the zone to determine if the zone is "nearby." If the location of user device 205 engages, then the set of actions of the zone or sub-zone is retrieved from memory. In another embodiment, method 521 is employed. In step 611, the set of actions are displayed on user device 205. In step 612, the location is sent to VGZ server 201.

In step 613, the location is saved as a user event. In step 614, the supervisor account is updated with the user location. In step 615, a notification is sent to supervisor device 203. In step 616, the notification is displayed on user device 203. In step 617, an updated action is entered on supervisor device 203. In step 618, the updated action is sent to VGZ server 201. In step 619, the updated action is saved to the supervisor account. In step 620, an updated action notification is sent to user device 205. In step 621, user device 605 displays the updated action notification. In step 622, the updated action notification is selected. In step 623, the updated action is requested from VGZ server 201.

In step 624, the updated action is sent to user device 205. In step 625, the updated action is saved to the memory of user device 205. In step 626, user device 205 displays the updated action.

Referring to FIG. 7A, method 700 for push updating actions is described. In this embodiment, the updated action is directly pushed to user device 205. In step 701, an updated action is entered into supervisor device 203. In step 702, the updated action is sent to VGZ server 201. In step 703, the updated action is saved to the supervisor account. In step 704, the updated action is sent to user device 205. In step 705, the updated action is saved to the memory of user device 205. In step 706, user device 205 displays an updated action notification. In step 707, the updated action notification is selected. In step 708, the updated action is displayed on user device 205. In step 709, a receipt confirmation is sent to VGZ server 201. In step 710, the receipt confirmation is saved to the supervisor account as a user event. In step 711, a receipt notification is sent to supervisor device 203. In step 712, the receipt notification is displayed on supervisor device 203.

Referring to FIG. 7B, method 713 for verifying and monitoring a user device location in a zone and a sub-zone is described.

In step 714, supervisor device 203 sends a request for a user device location to VGZ server 201. In step 715, VGZ server 201 sends the request for a user device location to user device 205. In step 716, user device 205 requests location information from NAV services system 204. In step 717, NAV services system 204 determines the location information. In step 718, NAV services system 204 sends the location information to user device 205. In step 719, user device 205 determines the location of user device 205. In step 720, user device 205 sends the location to VGZ server 201. In step 721, VGZ server 201 verifies the location by comparing the location to the zone and the sub-zone to determine if the location engages, i.e., is at or within the boundary of the zone or sub-zone. In one embodiment, method 521 is employed. In step 722, VGZ server 201 sends the location and a location verification to supervisor device 203. In step 723, VGZ server 201 saves the location and the location verification to the supervisor account. In step 724, supervisor device 203 displays the location. In step 725, supervisor device 203 displays the location verification.

In another embodiment, steps 716, 717, 718, 719, 720, 721, 722, 723, 724, and 725 are repeated to constantly monitor and verify the location of user device 205 from supervisor device 203.

Referring to FIG. 8, method 800 describes a user tour process.

In step 801, a user starts user application 217 on user device 205. In step 802, user application 217 requests the user to authenticate (login) and the user enters a set of credentials for authentication verification. In step 803, a request to for authentication verification is sent to VGZ server 201. In step 804, VGZ server 201 verifies the user credentials. In step 805, a user authentication verification is sent to user device 205. In step 806, the user is authenticated and the verification is displayed on user device 205.

In step 807, the user clocks-in by requesting a clock-in from VGZ server 201. In step 808, the clock-in request is sent to VGZ server 201. In step 809, VGZ server 201 processes the clock-in request and saves a clock-in entry in system log database 234. In step 810, VGZ server 201 must verify the user is within a zone where the user can clock-in and initiates a location verification of user device 205.

In step 811, location information from NAV services system 204 is requested. In step 812, NAV services system 204 determines the location information.

In one embodiment, NAV services system 204 is a GPS system. In this embodiment, the location information includes the position of the GPS satellite and the time at which the GPS signal is sent. Other NAV systems may be employed.

In step 813, NAV services system 204 sends the location information to user device 205. In step 814, a location of user device 205 is determined from the location information. In step 815, the location of user device 205 is sent to VGZ server 201.

In step 816, VGZ server 201 verifies if user device 205 is within a login zone boundary as previously described. In step 817, if the user is within bounds of the login zone, the user is verified and clocked-in, and the verification is sent to user device 205.

In step 818, a request to start a tour is sent to VGZ server 201. In step 819, VGZ server 201 save a tour start entry in system log database 234. In step 820, a tour start verification instruction is sent to user device 205. The tour begins in step 821.

In step 822, the user checks-in at a checkpoint. In one embodiment, the user checks-in manually as previously described.

In step 823, the check-in location of user device 205 is sent to VGZ server 201. In step 824, VGZ server 201 saves the check-in location of user device 205 as a check-in log entry in system log database 234.

In another embodiment, user device 205 is automatically checked-in at a checkpoint zone by a set of actions. In step 825, a set of actions based on the location of user device 205 is determined and displayed on user device 205. In a preferred embodiment, the location of user device 205 is compared to a checkpoint zone and sub-zone to determine if the location of user device 205 engages, i.e., is at or within, the boundary of the checkpoint zone or the sub-zone. In this embodiment, the location of user device 205 is compared to the checkpoint zone to determine if the zone is "nearby." If the location of user device 205 engages, then the set of actions of the checkpoint zone or sub-zone is retrieved from memory. In another embodiment, method 521 is employed.

In step 826, the action is executed, i.e., user device 205 generates a check-in notification. In step 827, the check-in notification is sent to VGZ server 201. In step 828, the executed action is saved in system log database 234 as a check-in log entry.

Steps 822, 823, 824, 825, 826, 827, and 828 are repeated for each checkpoint zone on the tour until all of the checkpoints on the tour have been reached at which time the tour is automatically ended.

In step 829, a request to end the tour is sent to VGZ server 201. In step 830, VGZ server 201 saves a tour end log entry in system log database 234. In step 831, VGZ server 201 sends a tour end verification to user device 205. In step 832, the end tour verification is displayed on user device 205.

In step 833, a request to clock-out is generated on user device 205. In step 834, the request to clock-out is sent to VGZ server 201. In step 835, VGZ server 201 processes the clock-out request and saves a clock-out entry in system log database 234.

In step 836, the clock-out request is verified. In this step, steps 810, 811, 812, 813, 814, 815, 816, and 817 may be repeated.

In step 837, VGZ server 201 sends a clock-out verification to user device 205. In step 838, the clock-out verification is displayed on user device 205.

Figure 9:
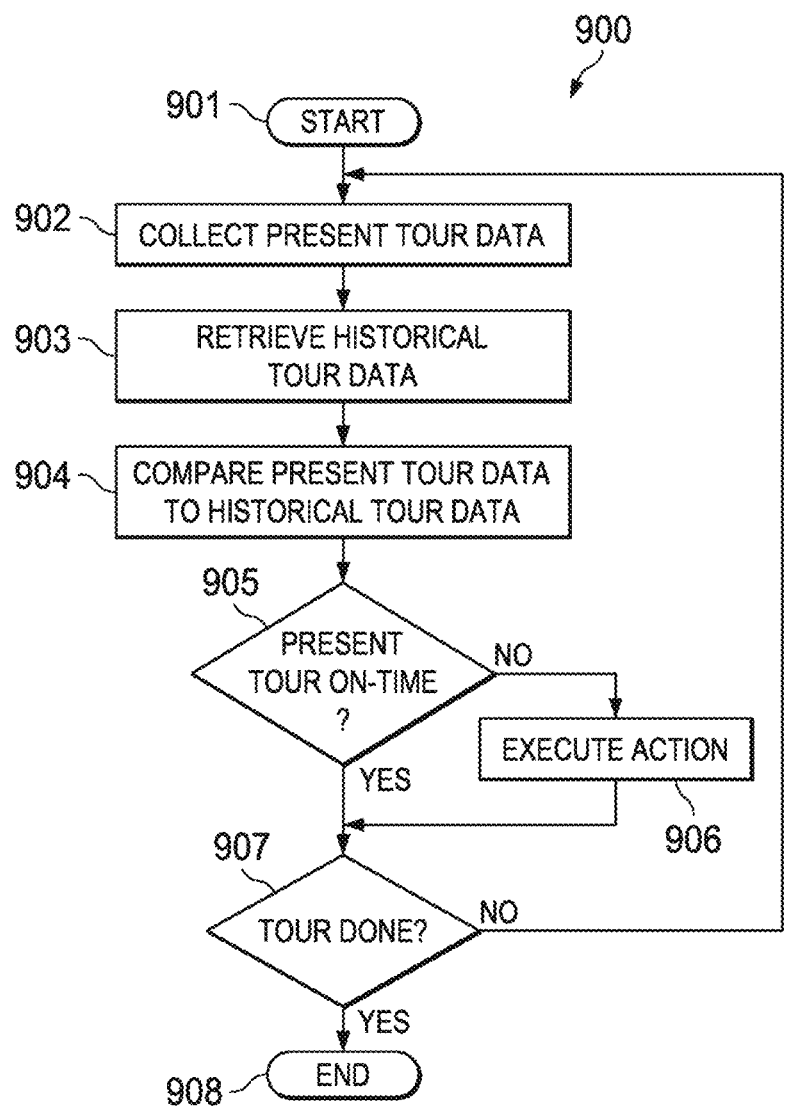
FIG. 9 is a flowchart of a method for a time verification of a tour of a preferred embodiment.

Referring to FIG. 9, method 900 for determining whether a present tour is on time by VGZ application 208 is disclosed.

In step 901, the present tour starts. In step 902, a set of present tour data is collected. In step 903, a set of historical tour data is retrieved from system log database 234. In step 904, the set of present tour data is compared to the set of historical tour data on a zone by zone basis. In one embodiment, an average time elapsed between each checkpoint zone of the set of historical tour data is compared to the current time elapsed between each checkpoint zone in the same sequence of zones. In one embodiment, a supervisor determines the time parameters used for comparison to determine whether the present tour is one time.

In step 905, VGZ application 208 determines whether the present tour is on time. If the present tour is on time, then method 900 proceeds to step 907. If the present tour is not on time, then a predetermined action set by a supervisor is executed in step 906. In one embodiment, the present tour is not on time if the current time is greater than the predetermined time parameter. In another embodiment, the present tour is not one time if the current time is less than the predetermined time parameter.

In one embodiment, the action includes a notification. The notification is in the form of a phone call, a text message, an email, a blinking notification, an alarm notification or any combination thereof. In other embodiments, other notifications are employed.

In one embodiment, the action is a notification sent to user device 205 stating that the tour is not on time.

In another embodiment, the action is a notification sent to supervisor device 203 stating that the tour is not on time.

In another embodiment, the action is a notification sent to supervisor device 203 and user device 205 stating that the tour is not on time.

In step 907, whether the present tour is done is determined. In a preferred embodiment, if an end tour verification has been sent, as previously described, then the present tour is done. In this embodiment, if an end tour verification has not been sent, then the present tour is not done. If the present tour is not done, then method 900 returns to step 902. If the present tour is done, then method 900 ends in step 908.

Figure 10:
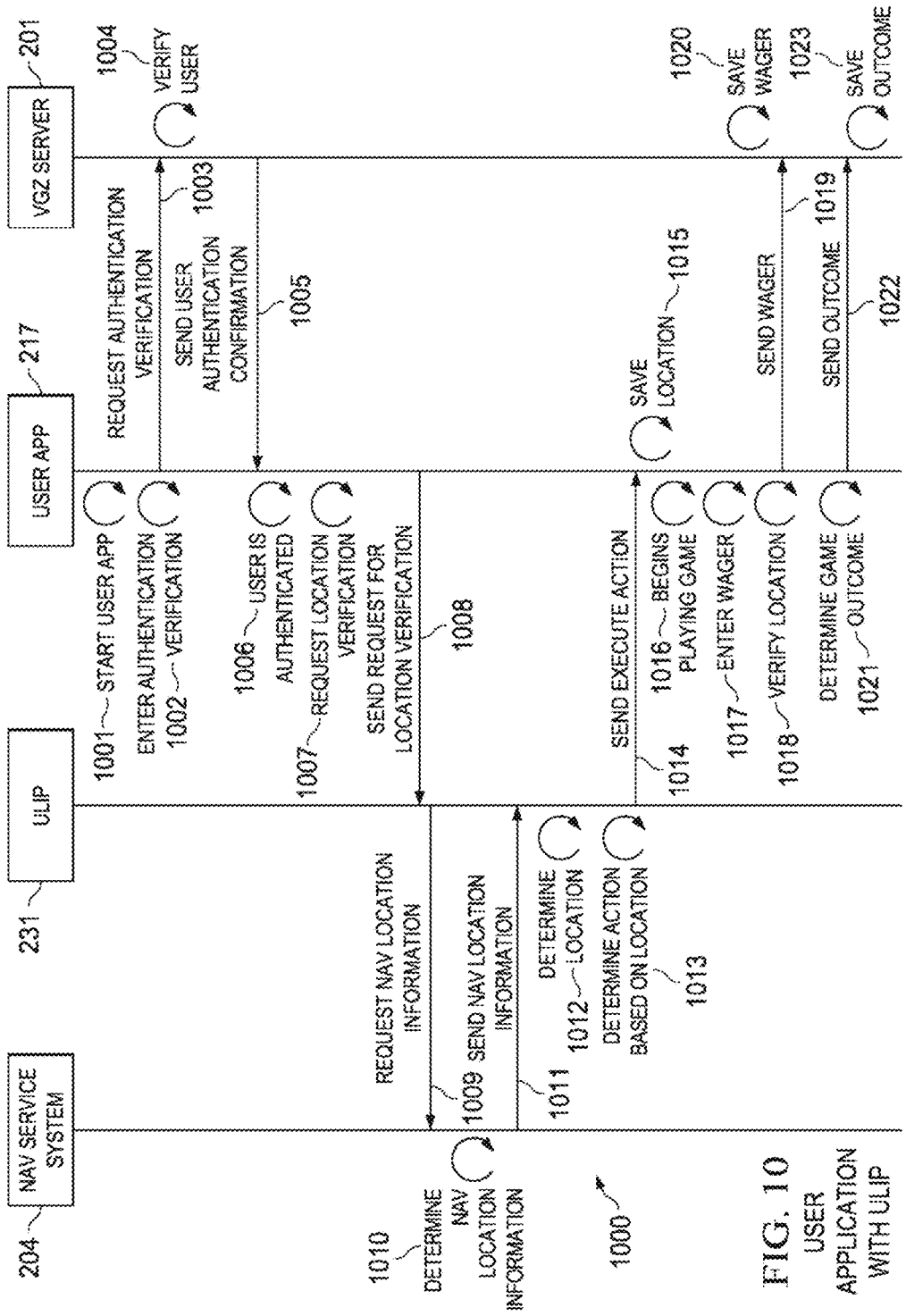
FIG. 10 is a flowchart of a method for a user application and a user location information process of a preferred embodiment.

Referring to FIG. 10, method 1000 for user application 217 and ULIP 231 is described. In step 1001, user application 217 is started on user device 205. In step 1002, a user verification is entered into user application 217. In step 1003, the user verification is sent to VGZ server 201 to request authentication verification. In step 1004, the entered user verification is verified by comparing the entered user verification to a user verification stored in a user database. In step 1005, a user verification notification is sent to user application 217 if the user is verified. In this step, a set of zone coordinates is downloaded to user device 205.

In step 1006, the user verification notification is displayed using user application 217. In step 1007, a location verification request is entered using user application 217. In step 1008, the location verification is sent to ULIP 231. In step 1009, location information from NAV services system 204 is requested by ULIP 231. In step 1010, NAV services system 204 determines the location information.

In one embodiment, NAV services system 204 is a GPS system. In this embodiment, the location information includes the position of the GPS satellite and the time at which the GPS signal is sent. Other NAV systems may be employed.

In step 1011, NAV services system 204 sends the location information to ULIP 231. In step 1012, a location of user device 205 is determined from the location information. In one embodiment, steps 1009, 1010, 1011, and 1012 are repeated to continuously determine the location of user device 205. In one embodiment, method 521 may be employed. In step 1013, a set of actions based on the location of user device 205 is determined. In a preferred embodiment, the location is compared to a gaming zone and/or sub-zone to determine if the location engages, i.e., is at or within the boundary of the gaming zone or sub-zone. In step 1014, an authorize action is sent to user application 217 if the location of user device 205 is within the gaming zone or sub-zone. If the location of user device 205 is not within the gaming zone or sub-zone or is within an excluded zone or sub-zone, then authorization to place a wager on a game is denied.

In step 1015, the location is saved on user device 205. In step 1016, a game on user application 217 begins. In step 1017, a wager is entered on user application 217. In step 1018, the location of user device 205 is verified by comparing the location of user device 205 saved on user device 205 with the set of zone coordinates saved on user device 205. If the location of user device 205 is not within the coordinates of a gaming zone or sub-zone or is within the coordinates of an excluded zone or sub-zone, then the wager is denied.

In step 1019, the wager is sent to VGZ server 201 if the location of user device 205 is within the coordinates of a gaming zone or sub-zone and is not within the coordinates of an excluded zone or sub-zone. In step 1020, the wager is saved in the wager account. In step 1021, an outcome of the game is determined. In step 1022, the outcome is sent to VGZ server 201. In step 1023, the outcome is compared to the wager and saved. In this step, if the outcome coincides with the wager, then the wager account is credited according a set of rules and odds of the game. If the outcome does not coincide with the wager, then the wager account is debited according the set of rules and odds of the game.

Figure 11:
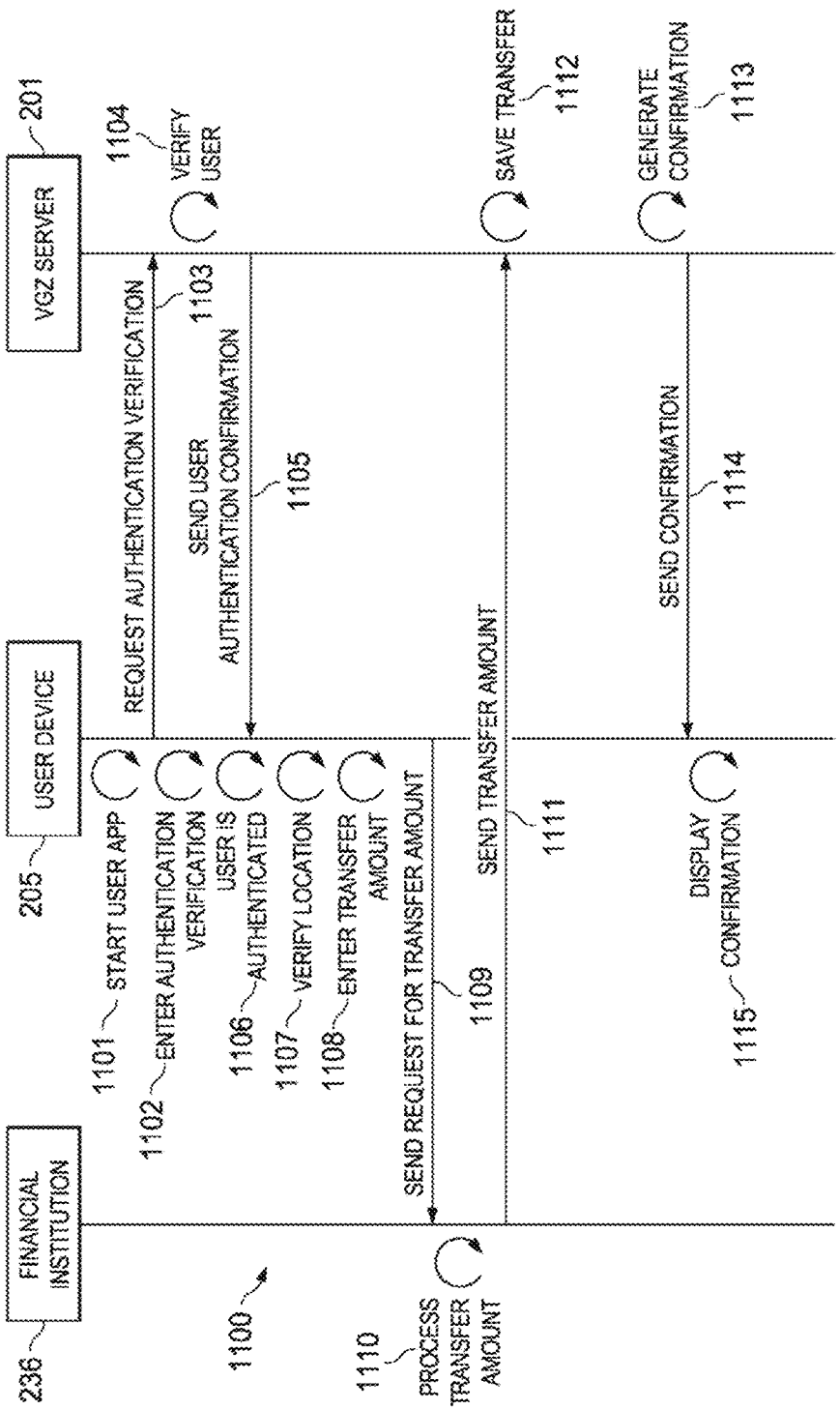
FIG. 11 is a flowchart of a method for a user application transfer process.

Referring to FIG. 11, method 1100 for transferring funds is described. In step 1101, a user application is started on user device 205. In step 1102, a user verification is entered. In step 1103, the user verification is sent to VGZ server 201 to request verification. In step 1104, the entered user verification is verified by comparing the entered user verification to a user verification stored in a user database. In step 1105, a user verification notification is sent to user device 205 if the user is verified.

In step 1106, the user verification notification is displayed on user device 205. In step 1107, a location of user device 205 is verified using user application 217 and ULIP 231 as previously described in steps 1007, 1008, 1009, 1010, 1011, 1012, 1013, and 1014 of FIG. 10. In this step, if the location of user device 205 is not within a gaming zone, then process 1100 stops. If the location of user device 205 is within a gaming zone, then process 1100 proceeds to step 1108. In step 1108, a transfer amount is entered on user device 205. In step 1109, a request for the transfer amount is sent to financial institution 236. In a preferred embodiment, the request includes login information to communicate with financial institution 236.

In step 1110, the transfer request is processed. If financial institution 236 approves the transfer request, then the transfer amount is sent to VGZ server 201 in step 1111. In step 1112, VGZ server 201 saves the transfer amount by crediting the wager account of the user the transfer amount. In step 1113, a transfer confirmation notification is generated. In step 1114, the transfer confirmation notification is sent to user device 205. In step 1115, the transfer confirmation notification is displayed on user device 205.

Referring to FIG. 12, method 1200 for social gaming and P2P gaming is described. In step 1201, user application 217 is started on user device 205. In step 1202, a user is authenticated as previously described. In step 1203, a location verification request is entered using user application 217. In step 1204, the location verification is sent to ULIP 231. In step 1205, location information from NAV services system 204 is requested by ULIP 231. In step 1206, NAV services system 204 determines the location information as previously described.

In one embodiment, NAV services system 204 is a GPS system. In this embodiment, the location information includes the position of the GPS satellite and the time at which the GPS signal is sent. Other NAV systems may be employed.

In step 1207, NAV services system 204 sends the location information to ULIP 231. In step 1208, a location of user device 205 is determined from the location information. In one embodiment, steps 1205, 1206, 1207, and 1208 are repeated to continuously determine the location of user device 205. In one embodiment, method 521 may be employed. In step 1209, a set of actions based on the location of user device 205 is determined as previously described. In a preferred embodiment, the location is compared to a gaming zone and/or sub-zone to determine if the location engages, i.e., is at or within the boundary of the gaming zone or sub-zone. In step 1210, the location of user device 205 is sent to VGZ server 201. In step 1211, the location is saved as a user event. In step 1212, an authorization action is sent to user application 217 if the location of user device 205 is within the gaming zone or sub-zone. If the location of user device 205 is not within the gaming zone or sub-zone or is within an excluded zone or sub-zone, then authorization to place a wager on a game is denied.

In step 1213, a set of social network criteria is entered into user application 217. In one embodiment, the set of social network criteria includes a username, a password, a discoverability status, and a discoverability range. In this embodiment, the username and the password allows VGZ server 201 to login to a social network account of the user and query to receive a contact list of the user. In this embodiment, the discoverability status allows other users to search the location of the user. In this embodiment, the discoverability range is a geographic range within which the user can search for the location of other users. The user can change the discoverability range to increase or decrease the range. In step 1214, the set of social network criteria is sent to VGZ server 201. In step 1215, the set of social network criteria is saved into a user account. In step 1216, a request is sent to social media network 234. The request includes the set of social network criteria. In step 1217, social media network 234 allows VGZ server 201 to login as the user and query a contact list of the user and social media network 234 processes the query and retrieves the contact list of the user. In step 1218, the contact list is sent to VGZ server 201. In step 1219, the contact list is saved into the user account. In step 1220, a set of users is determined. In a preferred embodiment, VGZ server 201 compares the location of user device 205 with a location of each user device associated with a user on the contact list. If the location of the user device of another user on the contact list is within the discoverability range, then the location of that user is assembled into the set of users. In step 1221, the set of users is sent to user device 205. In step 1222, the set of users is displayed on user device 205. In step 1223, another user of the set of users is selected for communication. In this step, the other user is contacted to initiate a P2P game. In the P2P game, each contacted user can place a wager on the same game or place a wager between the users as previously described.

Referring to FIG. 13, method 1300 for determining a fee is described. In step 1301, user application 217 is started on user device 205. In step 1302, a user is authenticated as previously described. In step 1303, a location verification request is entered using user application 217. In step 1304, the location verification request is sent to ULIP 231. In step 1305, ULIP 231 verifies the location of user device 205 and authorizes a wager for user application 217 as previously described. In step 1306, the location verification is sent to user application 217. In step 1307, the location verification is sent to VGZ server 201. In step 1308, the location verification is saved. In step 1309, a game on user application 217 begins. In step 1310, a wager is entered on user application 217. In step 1311, the wager is sent to VGZ server 201. In step 1312, the wager is saved. In step 1313, a fee is calculated. In one embodiment, the fee is a predetermined percentage of the wager. In another embodiment, the fee is a flat fee. In another embodiment, the fee is calculated according to a number of users present in a gaming zone of the location host. In another embodiment, the fee is calculated by a predetermined number of responses to advertisements by the location host. Other methods of calculating a fee known in the art may be employed.

In one embodiment, the fee is calculated on a monthly basis. Other time periods may be employed.

In step 1314, the fee is sent to location host 235. In one embodiment, this step is performed without a network connection. In one embodiment, the fee is sent through the mail.

Referring to FIG. 14A, method 1400 for setting up a zone is described. Source code related to the embodiment of FIG. 14A is included in the Computer Program Listing Appendix I.

Method 1400 includes several operations that are performed with several devices or services, including NAV services 1401, supervisor device 1402, VGZ server 1403, and map administrator 1404, which are respective embodiments of NAV services 204, supervisor device 203, VGZ System Server 201, and map administrator 237 of FIG. 2.

At step 1411, supervisor device 1402 sends a request to VGZ server 1403 to download the supervisor application. The request comprises one or more messages between supervisor device 1402 and VGZ server 1403 and includes one or more device characteristics that describe supervisor device 1402, such as: browser name and version, operating system name and version, available memory, processor type and speed, and so on. The supervisor application is used by supervisor device 1402 to set up a profile and zones with VGZ server 1403.

At step 1412, VGZ server 1403 determines the requirements of supervisor device 1402 related to downloading the supervisor application. VGZ server 1403 includes several different types and versions of the supervisor application that each have certain requirements. The supervisor application is also referred to as a client application and the supervisor application includes clients for one or more operating systems, including Microsoft Windows, Apple iOS, Apple OSX, Android OS, Linux, and so on. VGZ server 1403 determines an appropriate version of the supervisor application to download to supervisor device 1402 based on the characteristics received from supervisor device 1402.

At step 1413, VGZ server 1403 downloads the supervisor application to supervisor device 1402. The supervisor application downloaded to supervisor device 1402 is based on the characteristics of supervisor device 1402 that were shared with VGZ server 1403.

At step 1414, supervisor device 1402 installs the supervisor application. In one embodiment, the installation is automatic and requires no user input. In an alternative embodiment, a user of supervisor device 1402 customizes the installation of the supervisor application.

At step 1415, the supervisor application is started on supervisor device 1402.

At step 1416, account information is entered into the supervisor application. The account information includes contact information for the owner of the account being created.

At step 1417, a request for an account is sent from supervisor device 1402 to VGZ server 1403. The account request includes the account information that was entered into the supervisor application.

At step 1418, VGZ server 1403 creates an account. The account created is based on the information provided by supervisor device 1402 to VGZ server 1403.

At step 1419, VGZ server 1403 sends account information to supervisor device 1402. The account information includes the account number and other information used for accessing the account.

At step 1420, supervisor device 1402 initiates zone setup and sets up billing information.

At optional step 1421, supervisor device 1402 requests navigational location information from NAV services 1401.

At step 1422, NAV services 1401 determines navigational location information. In one embodiment, the navigational location information is the location of supervisor device 1402.

At step 1423, the navigational location information is sent from NAV services 1401 to supervisor device 1402.

In one embodiment, in lieu of or in addition to the navigation location information sent from NAV services 1401, the geo-position of the supervisor device may be determined by the use of a Geo-located Wi-Fi Access Point (GWAP) apparatus or a grid of such apparatus whose locations have been determined by advanced geo-positioning methodologies, such as Differential GPS (DGPS), which may be determined using a SIMRAD MXB5 DGPS antenna and MX525A DGPS sensor or a Wide Area Differential GPS (WADGPS) or other accurate methods of determining the latitude and longitude of the GWAP. The geo-location of any fixed Wi-Fi apparatus can be independently determined when it is installed, and that location can be registered to a database.

At step 1424, supervisor device 1402 determines a location, configuration, place, coordinates, and so on to identify a zone to be associated with the account set up with VGZ server 1403 for a geographic place or location. In one embodiment, supervisor device 1402 creates a place profile that identifies a geographic location, i.e., a place using one or more coordinates. In certain embodiments, the coordinates are two dimensional (longitude and latitude), three dimensional (longitude, latitude, and altitude), and four dimensional (longitude, latitude, altitude, and time).

At step 1425, zone profile information is entered using supervisor device 1402. The zone profile information includes actions, data, and information that are associated with the zone and will be accessible to users of the zone. In one embodiment, the zone profile includes one or more hyperlinks that point to a website associated with supervisor device 1402, such as the website of location host 235 of FIG. 2. In one embodiment, the zone profile also includes additional content or modules that can be downloaded to a user device when the user device enters the zone established with supervisor device 1402.

At step 1426, supervisor device 1402 sends the place profile and the zone profile to VGZ server 1403.

At step 1427, the place profile and the zone profile related to a zone are saved by VGZ server 1403.

At step 1428, VGZ server 1403 queues the zone profile for approval by map administrator 1404.

At step 1429, VGZ server sends, as a request, data and information related to the place profile and the zone profile to map administrator 1404. In one embodiment, VGZ server sends the coordinates of the zone from the place profile and one or more hyperlinks from the zone profile. When approved, the hyperlinks can be provided by a map owner and database to users of the map owner, such as one or more of public map owner 238 and private map owner 239 of FIG. 2.

At step 1430, the data and information related to the zone, which includes data and information from the place profile and the zone profile, are received by map administrator 1404. Map administrator 1404 applies one or more approval rules and allows or disallows the request for the zone based on the rules.

At step 1431, map administrator approves or disapproves the zone profile for the requested zone and place related to the zone profile and place profile. In one embodiment, if a zone already exists for the coordinates of the requested zone, the requested zone will be disallowed since another zone already exists for those coordinates. If there is no pre-existing zone for the coordinates sent to map administrator 1404, then map administrator 1404 will allow the requested zone.

In an alternative embodiment, the system determines a conflict between a new zone and a pre-existing zone where the two zones are competing for the same space without actually having the same coordinates. This can be accomplished by calculating the approximate center point of each zone and then calculating the square footage of each zone and defining a circle of that square footage about the center point of the zones. If the circles intersect with over 50% of the area of one or more of the circles, the zones would be in conflict and the new zone request would be denied because of the pre-existing zone. The percentage of intersection or overlap could vary for different applications. Additionally, the proximity of the approximate center points could also influence the calculation so that when the center points are closer together, there is a higher likelihood that the request will be denied.

In an alternative embodiment, each zone for the same area receives a layer number. When requesting a new zone that conflicts with a pre-existing zone, the owner requesting the new zone is presented with a suggested layer identifier to differentiate the new zone from the pre-existing zone.

At step 1432, map administrator 1404 sends an appropriate notification to VGZ server 1403. The notification from map administrator 1404 identifies whether the request for the zone related to the zone profile and place profile was approved by map administrator 1404.

At step 1433, VGZ server 1403 takes appropriate approval or disapproval action to notify supervisor device 1402. In one embodiment, when the zone request was approved by map administrator 1404, VGZ server generates a notification that is an approval notification, which may include time stamps for one or more of when the approval was made by map administrator 1404, when the approval was sent by map administrator 1404, and when the approval was received by VGZ server 1403. When the zone request was disapproved by map administrator 1404, VGZ server generates a notification that is a disapproval notification that may include one or more reasons for why the request was not approved and may include one or more time stamps related to the disapproval of the zone request.

At step 1434, VGZ server 1403 sends the notification related to the zone request to supervisor device 1402.

At step 1435, supervisor device 1402 receives the approval or disapproval of the request. If disapproved, the zone creation and approval process starts over at step 1424. If approved the zone and place are added. In one embodiment, the zone and place are added to a list of zones that have been successfully approved and can be displayed to a user of supervisor device 1402.

Referring to FIG. 14B, method 1440 user operation of zones is described. Method 1440 includes several operations that are performed with several devices or services, including VGZ server 1403 and user device 1405, which are respective embodiments of VGZ system server 201 and user device 205 of FIG. 2.

At step 1441, a user runs the user application on user device 1405. In one embodiment, the user application is a mobile device app that has been downloaded to and installed on user device 1405.

At step 1442, user device 1405 sends a login request to VGZ server 1403 to authenticate with the system. The login request includes credentials that identify one or more of the user, user device 1405, and the user application running on user device 1405.

At step 1443, VGZ server 1403 verifies the credentials. If no credentials are found, VGZ server 1403 adds a new user.

At step 1444, VGZ server 1403 has authenticated the user of user device 1405 and sends one or more map place markers to be displayed on user device 1405. A place is a two dimensional (latitude and longitude), three dimensional (latitude, longitude, altitude) or four dimensional (latitude, longitude, altitude, and time) space. A place is typically shown on a map with a graphical marker icon and is the geographical physical location. In one embodiment, the zones displayed on a map in the zonal system include a "Z" on the marker, where a black letter "Z" indicates the marker is not an active marker and a red letter "Z" indicates that the marker is an active marker. A "Z+" marker indicates the location of a zone that is served by one or more Geo-located Wi-Fi Access Points (GWAP) apparatus. In alternative embodiments, different colors or some other graphical differentiation is used to visibly indicate which markers are active and which markers are not active.

At step 1445, the authenticated user of user device 1405 taps a place marker to select a zone. The place markers were received from VGZ server 1403 and identify places on a map displayed on user device 1405 that are associated with a zone. Tapping on the marker displayed on user device 1405 causes user device 1405 to display additional information about the zone associated with the marker.

At step 1446, user device 1405 detects a zone. The zone is detected via the user location information process (ULIP) that continually monitors the location of user device 1405 so that exception conditions can be raised upon zone entry and zone exit. A zone entry exception is raised when user device 1405 enters a zone and a zone exit exception is raised when user device 1405 leaves the zone. The code of Computer Program Listing Appendix III provides for determining whether a device is inside or outside a zone and for raising the aforementioned exceptions via changing the state of a class.

At step 1447, user device 1405 requests a zone profile. In one embodiment, the request for the zone profile is generated in response to a zone entry exception being raised.

At step 1448, the user initiates a zone profile request. User device 1405 sends the zone profile request to VGZ server 1403.

At step 1449, VGZ server 1403 retrieves the zone profile from a database. A zone profile comprises the information normally available with the place (location point, description, etc.) plus additional information added to the place (larger geographic boundaries, polygon or polyhedron coordinates, temporal data, website link, availability of a Geo-located Wi-Fi Access Point to the zone, function and actions, and so on). Zone profiles can also contain functional code to be downloaded into the mobile device app.

At step 1450, VGZ server 1403 links the user application running on user device 1405 to the zone associated with the zone profile.

At step 1451, the zone is now available to be shown on a website of the owner of the zone. In one embodiment, supervisor device 1402 displays the zone and displays the location of user device 1405 within the zone.

At step 1452, VGZ server 1403 prepares the zone profile for delivery and a log entry is made. In one embodiment, the data and information of the zone profile that is sent to user device 1405 includes content or modules that are based on the zone and that handle one or more actions related to the zone.

At step 1453, VGZ server 1403 delivers the zone website information to user device 1405. The zone website information includes data and information from the zone profile and place profile related to the zone that is displayed on user device 1405.

At step 1454, zone profile information is displayed on user device 1405 and is replicated from the website of the owner of the zone. In one embodiment, the content or module sent to user device 1405 and displayed using the user application replicates the user experience that the user would have if the user had loaded the website of the owner of the zone in a browser.

At step 1455, user device 1405 determines the user's usage of the zone profile. The usage includes activation of hyperlinks, button click events, and so on, which are linked to one or more actions associated with the zone.

At step 1456, user device 1405 delivers the user's response to the presentation of the zone profile to VGZ server 1403. In one embodiment, the user response is a selection of an action associated with the zone.

At step 1457, VGZ server 1403 acts on the user response to the zone profile presentation.

At step 1458, VGZ server 1403 determines if there are more requests from user device 1405.

At step 1459, a message asking for more requests is sent from VGZ server to user device 1405. In an alternative embodiment, instead of VGZ server 1403 sending a message to user device 1405 asking for more requests, VGZ server simply waits for a next request from user device 1405. If the request is not received before a watchdog timer finishes counting down, VGZ server 1403 will terminate the connection.

At step 1460, user device 1405 determines if there are more requests for actions from the user.

At step 1461, if there are more requests, the process loops back to step 1457 to handle the additional requests.

At step 1462, if there are not more requests or a timeout occurs, the link to the zone is terminated.

At step 1463 when there are no more requests, user device 1405 sends a message to VGZ server 1403 to terminate the link between user device 1405 and the zone.

At step 1464, VGZ server 1403 completes the termination and continues monitoring for the next zone entry.

Referring to FIG. 15, method 1500 for person to person interaction is described. Method 1500 includes several operations that are performed with several devices or services, including website 1501, user device 1502, and VGZ server 1503, which are respective embodiments of website 235, user device 205, and VGZ server 201 of FIG. 2. User device 1502 is a mobile device, such as one of a smartphone, a tablet computer, a desktop computer, an autonomous robot, a robotic device, a drone, a navigation system in a car, a smart watch, a laptop, a virtual reality or augmented reality viewer and so on, that is capable of interacting with website 1501 or directly with VGZ server 1503.

At step 1511, the user application, also referred to as the nZonal app, has already been installed, started, and authenticated to VGZ server 1503 and is in a zone.

At step 1512, user device 1502 displays one or more user interface controls or widgets that allow the user to select and activate the actions available in the zone. One of the actions displayed is the "Find Users" action that finds other users within the same zone.

At step 1513, user device 1502 receives a selection from the user, such as by clicking on a button or activating a hyperlink, to perform the Find Users action to find one or more other users in the current zone.

At step 1514, user device 1502 sends a request for the Find Users action to VGZ server 1503.

At step 1515, VGZ server 1503 queries a database for other user devices that are currently in the same zone as user device 1502.

At step 1516, VGZ server 1516 prepares to transmit location information associated with other user devices that are in the current zone of user device 1502. In one embodiment, VGZ server 1516 applies a filter to the results so as to not share the location of other user devices that have selected to not be visible to the Find Users action.

At step 1517 VGZ server 1503 sends the location information to the nZonal app running on user device 1502.

At step 1518, the locations of other user devices that are currently in the same zone as user device 1502 are displayed by user device 1502, which is a replication of information that is displayed on website 1501.

At step 1519, user device 1502 displays menu items for several methods or actions for establishing P2P communications and selecting another user to communicate with, such as by the name of the other user, the location of the device of the other user within the zone, and a chat room open to all users within the zone.

At step 1520, the user of device 1502 taps the location of another user that is displayed on a display screen of user device 1502. In response to receiving the selection of the other user, a chat window is opened on user device 1502, which is also optionally displayed on website 1501.

At step 1521, website 1501 establishes the chat room between user device 1502 and the user device of the other user that was selected by tapping on the display of user device 1502. When the chat is finished, website 1501 disconnects the chat room.

At step 1523, website 1501 notifies user device 1502 that the chat with the other user is disconnected. User device 1502 returns to single user usage.

At step 1524, each user device that was connected to the chat room closes the chat window. In one embodiment the chat window was a private message window that was only shared between certain users in the current zone and not with all of the users in the current zone.

Referring to FIGS. 16A through 16F, one embodiment for a user interface for creating a polyhedral zone using a Zone Web Application is described. The owner, also referred to as a location host, such as location host 235 of FIG. 2A, uses the owner's Zone Web Application provided by the VGZ server, such as VGZ system server 201 of FIG. 2A, to define a zone around a place on an online map that is provided by, e.g., one of public map owner and database 238 and private map owner and database 239 of FIG. 2A.

In FIGS. 16A through 16E the owner defines a polyhedral zone as a set of specific coordinates, 1602, 1603, 1604, etc., that form the vertices of a polygon on an online Map.

In FIGS. 16B through 16E, the owner uses the user interface of the Zone Web Application to initiate the creation of a polygon with a click of the cursor on icon 1601. Owner moves the cursor to position 1602 and clicks to set a first coordinate there and to establish the starting coordinate of a first side of a polygon. The owner clicks at positions 1603 through 1613 in succession to create coordinate vertices of the polygon. The straight lines of the polygon on the map identify the edges of the polygonal. The polygon is closed when the user clicks on position 1613. In one embodiment, the user or owner is manipulating a machine, such as supervisor device 203 of FIG. 2A, which in turn is creating the zone on another machine, such as system server 201 of FIG. 2A.

Figure 16A:
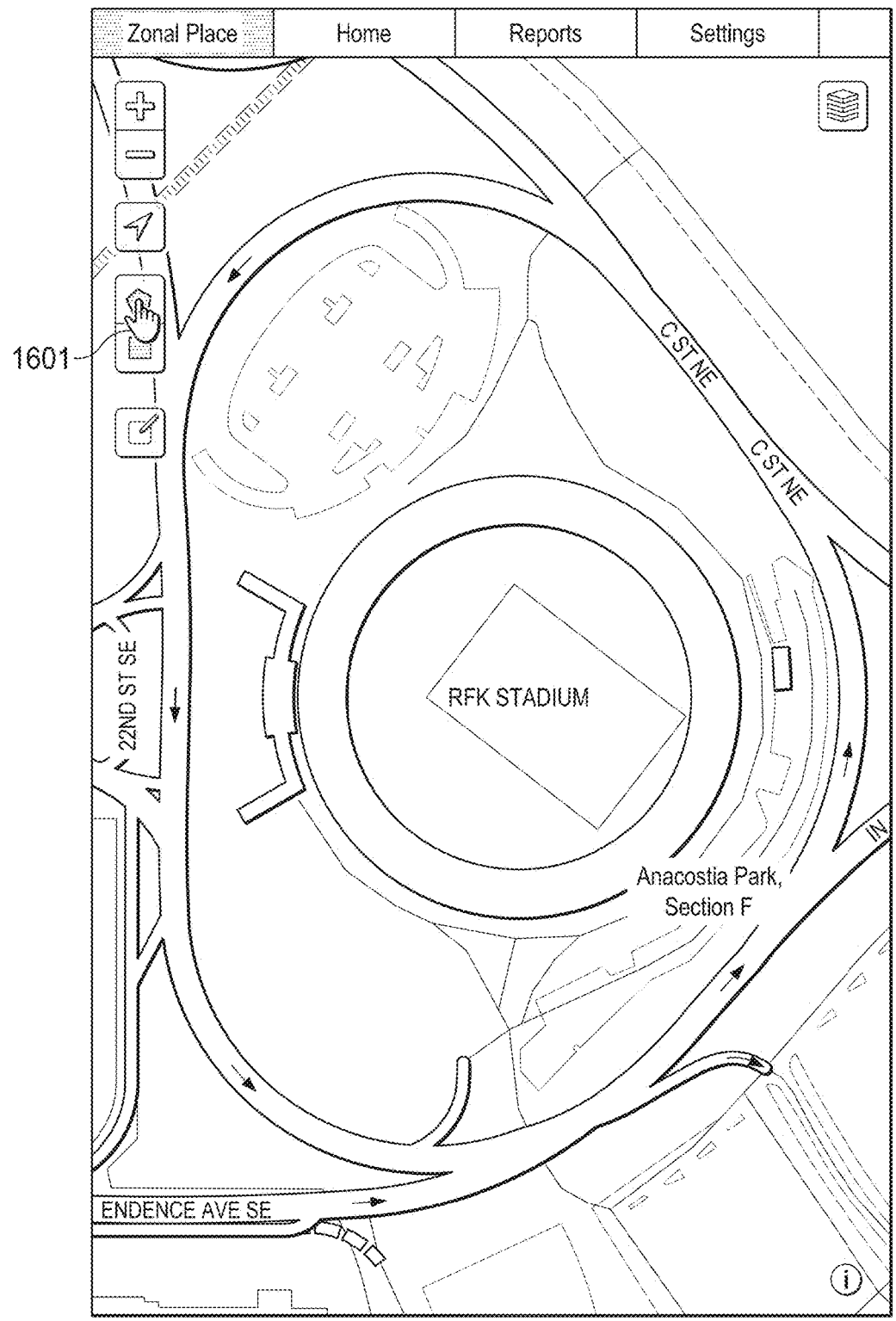
FIGS. 16A through 16F are user interface diagrams for defining zones.
Figure 16B:
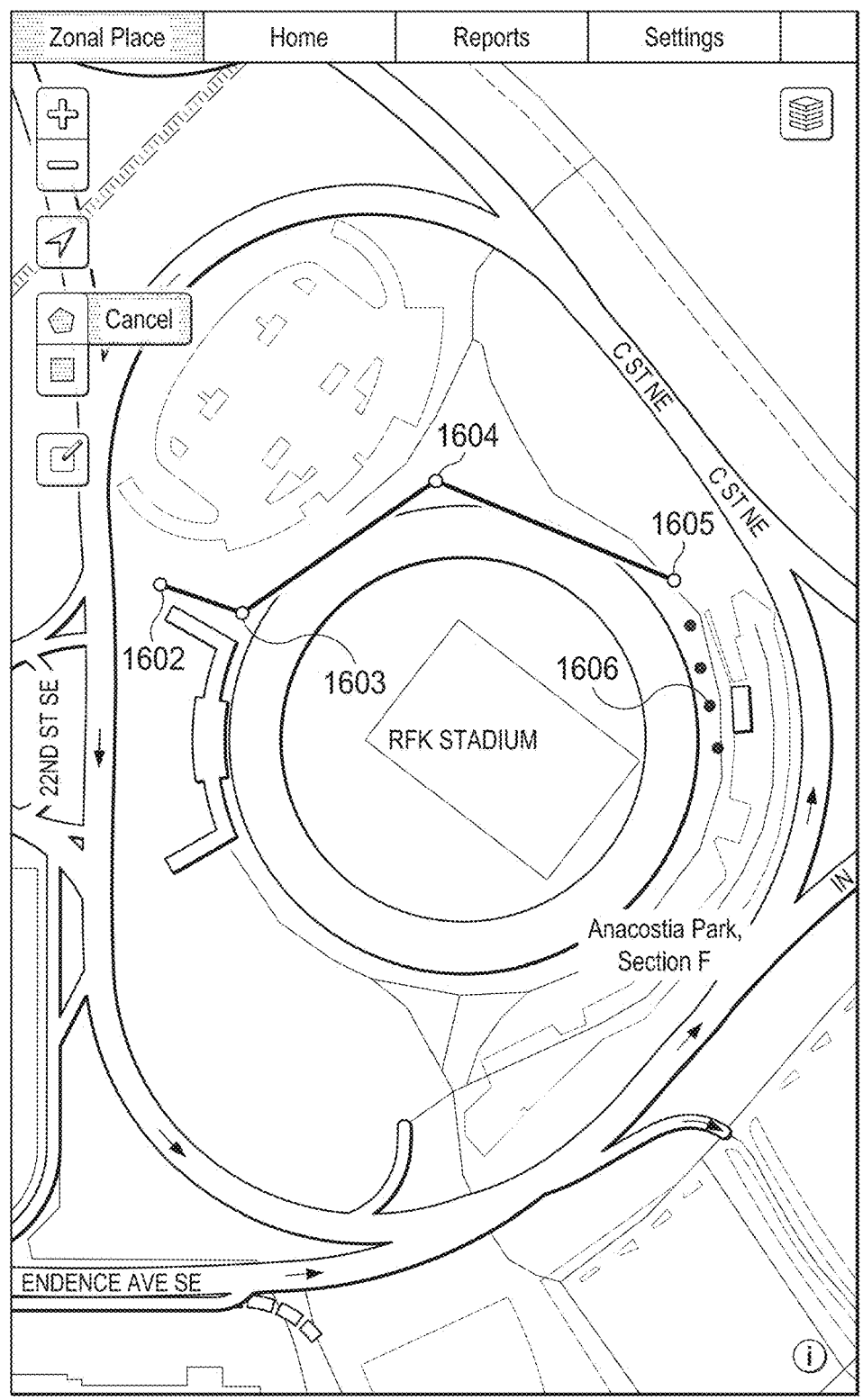
Figure 16C:
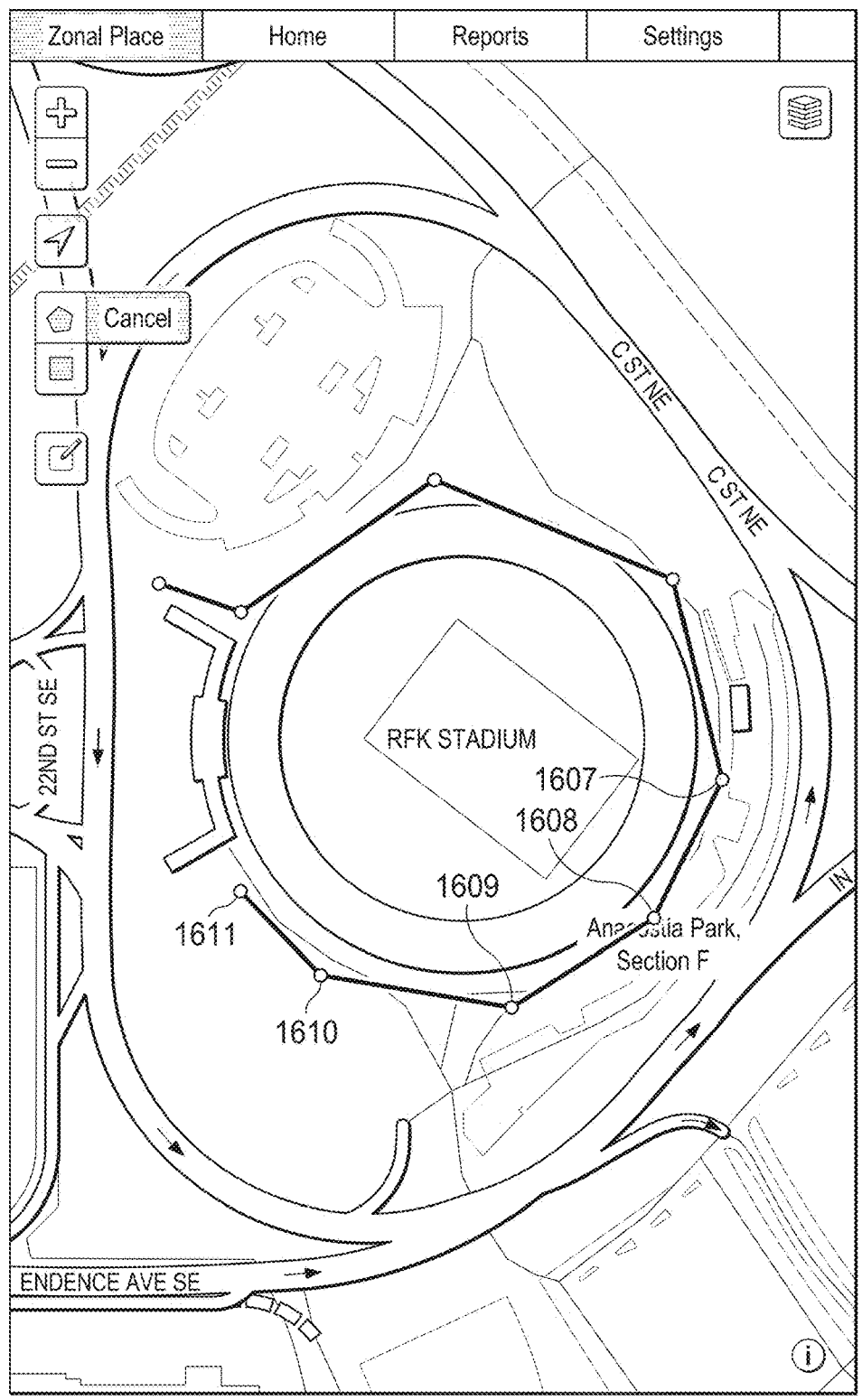
Figure 16D:
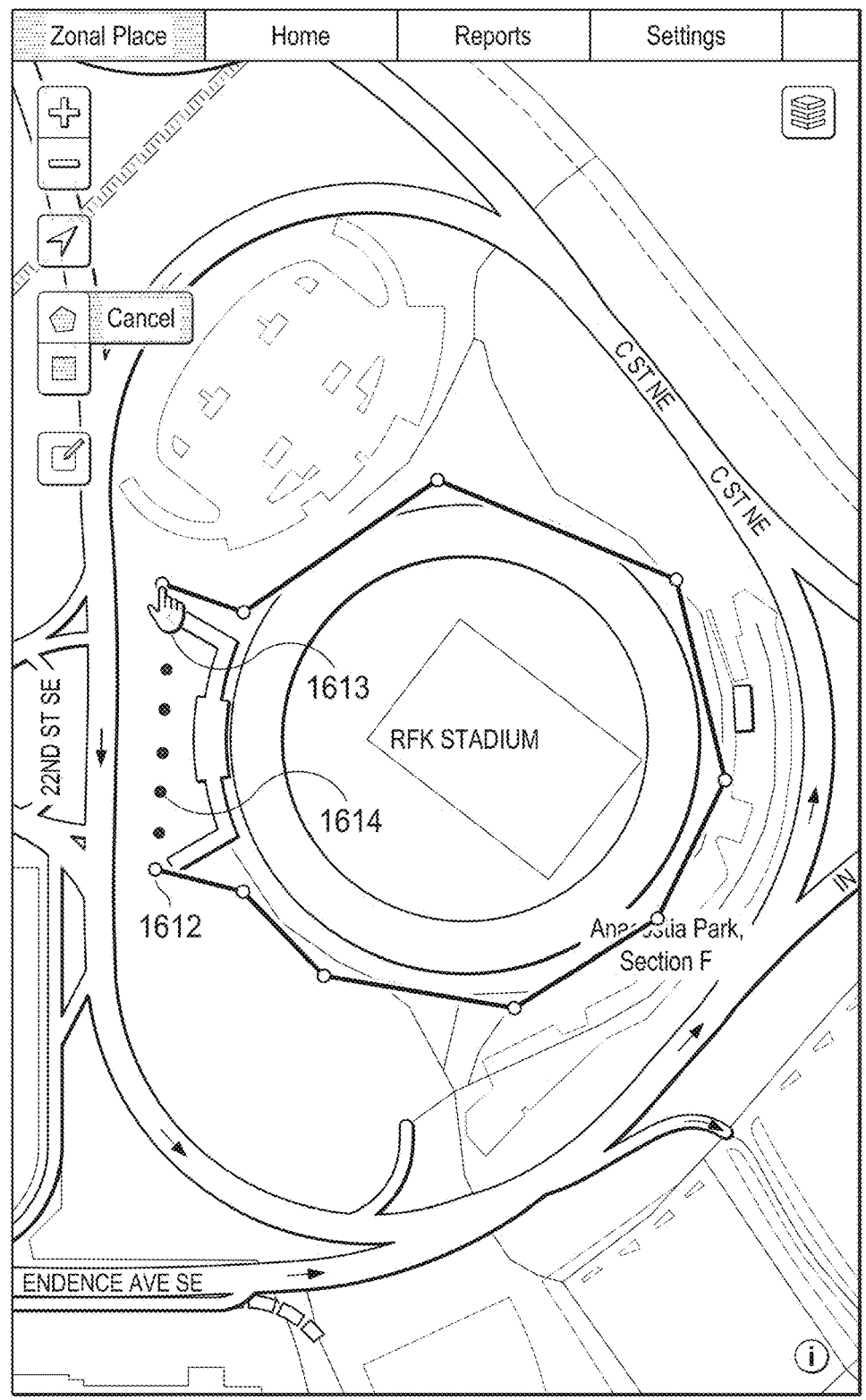
Figure 16E:
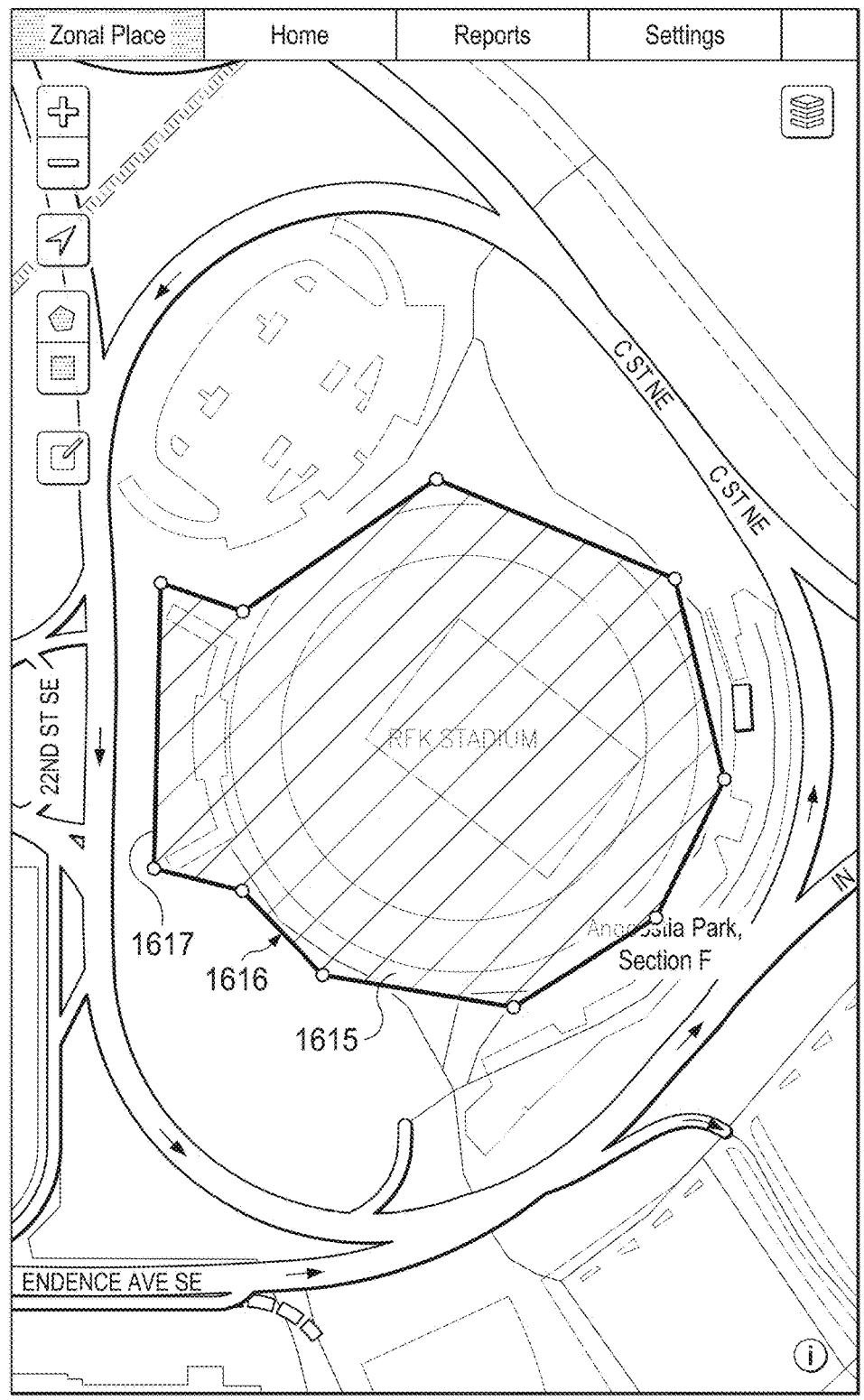

FIG. 16D shows more detail of when the owner extends a side of the polygon toward the next coordinate. The edge of the polygon is shown by a dotted line 1614 until the user clicks at the next coordinate, which is position 1613. Clicking on position 1613 completes the side and dotted line 1614 changes to solid line 1617, as shown in FIG. 16E.

Also in FIG. 16D, when the cursor is above position 1613, the image of the cursor indicator turns becomes a "hand" to identify that the polygon will be closed if a click event is received. After receiving the click at position 1613, the polygon is closed and area 1615 within the closed polygon is shown as cross-hatched, as seen in FIG. 16E. In one embodiment, the movement of the cursor and the click events are received via a mouse attached to a computer.

Figure 16F:
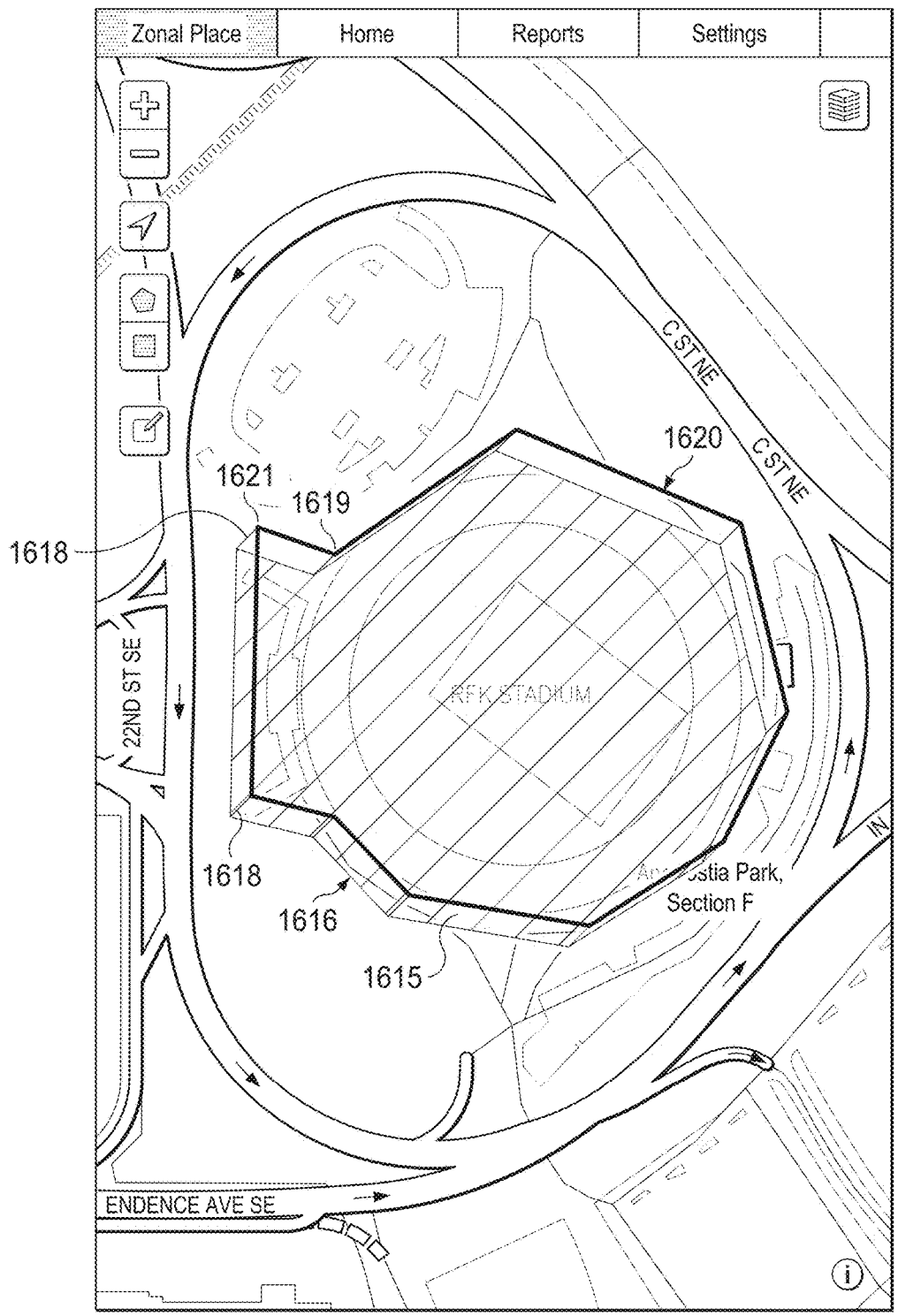

FIG. 16F shows an optional embodiment where the owner turns the finished closed polygon into a polyhedron by adding third dimension height 1618. Height 1618 defaults to 300 feet, which allows drones to fly over the zone without engaging the zone and can also be used to control the flight of a drone. In an alternative embodiment, the height 1618 is selected by clicking on position 1621. The area 1615 becomes the base of the polyhedron and is mirrored by top 1620 of the polyhedron, which is 300 feet above the base. After creating the polygon or polyhedron, the coordinates are saved to a VGZ server and used to define a zone for the place that is located at the coordinates.

Referring to FIG. 16G, an embodiment with virtual gate is shown. A close-up view of virtual gate 160721 forms one side of a closed polygon of zone 160701. Virtual gate 160721 enables the user to enter zone 160701 at a designated gated area, which may correspond to a real door or gate in a place associated with zone 160701, such as an entrance to a secure area. Virtual gate 160721 is illustrated by two coordinates, 160711 and 160712, which define the virtual gate as a part of a geo-fence to zone 160701. Entrance or exit from zone 160701 through virtual gate 160721 can cause a zonal app user to be treated differently than a zonal app users or other persons that cross into or out of zone 160701 without using virtual gate 160721. The virtual gate users may be able to access information or services in zone 160701 that is unavailable to persons that do not use the virtual gate 160721 and who may be denied such access or services by entering or leaving the zone via an unauthorized route.

Referring to FIG. 17, a view of the system is shown for the zone authorization process. The zone authorization process includes several operations that are performed with several devices or services.

Map 1701 is a first map displayed on a user interface of owner device 1705 and map 1715 is a second map displayed on the user interface of owner device 1705. In one embodiment owner device 1705 is an embodiment of supervisor device 203 of FIG. 2A. The user interface of owner device 1705 displays zone 1704, location name 1702, and marker 1703 on top of first map 1701 and displays zone 1704, location name 1702, and marker 1714 on top of second map 1715, as will be described further below.

Map 1712 is a map displayed on a user interface of a user device. The user device is an embodiment of user device 205 if FIG. 2A. The user interface of the user device displays marker 1714 and location name 1702 on top of map 1712. In one embodiment, marker 1714 is "printed" onto map 1712 by incorporating the image of the marker into the image of the map, which replaces pixels from the map image with pixels from the marker image.

VGZ cloud 1706 is an embodiment of VGZ system server 201 of FIG. 2A. VGZ cloud 1706 sends and receives multiple messages during the authorization process to associate information received from owner device 1705 into map owner database 1712.

Map administrator device 1711 is a server that processes authorization requests. Map administrator device 1711 is an embodiment of map administrator 237 of FIG. 2A.

Map owner database 1712 stores data and information related to one or maps that can be displayed by devices connected to the system. Map owner database 1712 is an embodiment of public map owner and database 238 and private map owner and database 239 of FIG. 2.

At first step, once zone 1704 is created and saved, such as by the process described in FIG. 16, a map marker 1703 is positioned or printed on map 1701 at the approximate center of zone 1704 by the owner, using the owner's Zone Web Application running on owner device 1705. Owner device 1705 saves the description, function and information for completed zone 1704.

At a second step, the completed zone can either be approved or rejected by VGZ cloud 1706 based on the zone is valid as determined by VGZ cloud 1706. Owner device 1705 is notified of the determination and, if zone 1704 is rejected, provided information for why zone 1704 was rejected by VGZ cloud 1706. If the zone is approved, the zone information related to zone 1704 is added to a zone administration database of VGZ cloud 1706 so that the zone information of zone 1704 can be accessed and displayed via the owner's website or a zone administrator website of VGZ cloud 1706.

At a third step, owner device 1705 submits authorization request 1707 to VGZ cloud 1706 to request that zone 1704 be submitted by VGZ cloud 1706 to map administrator device 1711 for approval by map administrator device 1711 to get information related to zone 1704 added to map owner database 1712.

At a fourth step, VGZ cloud acknowledges request 1707 and optionally sends notification 1708 to owner device 1705.

At a fifth step, VGZ cloud sends request 1709 to map administrator device 1711. Request 1709 includes data and information related to zone 1704 so that zone 1704 can be approved and so that data and information related to zone 1704 can be added to map owner data base 1712.

At a sixth step, when the zone 1704 is authorized by map administrator device 1711, VGZ cloud 1706 sends notification 1709 to owner device 1705. Owner device 1705 is used to replace marker 1703 with marker 1714 that contains a black letter "Z" or other means of graphically signifying that a zone now exists at that place.

At this point, the zone 1704 designated by marker 1714 is discoverable on map 1712 displayed on a user device.

Figure 18:
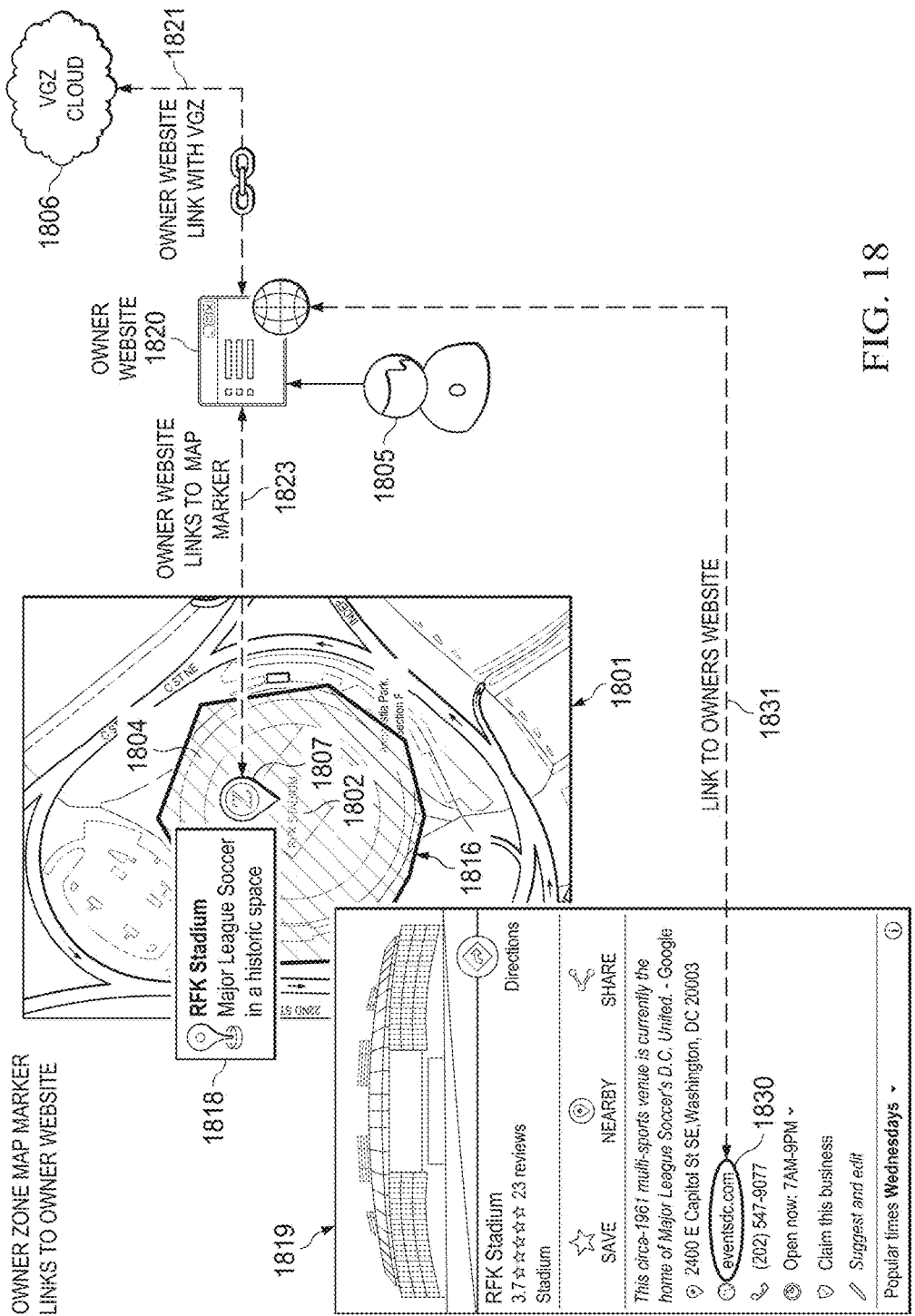
FIG. 18 is a view of the VGZ system for defining a zone with a link to owner website.

Referring to FIG. 18, a view of the system is shown for linking information on a map to a website. The process described in FIG. 18 includes several operations that are performed with several devices or services. Source code related to the embodiment of FIG. 18 is included in the Computer Program Listing Appendix I.

Map 1801 is a map displayed on owner device 1805. The user interface of owner device also displays zone 1804 with perimeter 1816, marker 1807, and location name 1802. Marker 1807 includes link 1823 to website 1820. After interaction with owner device 1805, the user interface displays one or more of information window 1818 and information sidebar 1819.

Information window 1818 and information sidebar 1819 each display information related to one or more business at the geographic location on map 1801. Information sidebar 1819 includes text 1830, which includes link 1831 to website 1820. Website 1820 is an embodiment of owner website 235 of FIG. 2A.

Owner device 1805 is an embodiment of supervisor device 203 of FIG. 2A and is used to update website 1820. Website 1820 includes link 1821 to VGZ cloud 1806. VGZ cloud 1806 is an embodiment of VGZ system server 201 of FIG. 2A.

Owner 1805 links website 1820 to map marker 1807. The linkage is established directly from map marker 1807 to website 1820.

Mechanical interaction with the user device allows to control interaction between the user device and the system server. When map marker 1807 is tapped by the user on the user interface via a touch sensitive screen, one or more of the following are performed: a connection to website 1820 is established, information window 1818 is displayed, and information sidebar 1819 is displayed. Once all of the links have been established, the user begins interaction with zone 1804 and website 1820 via the user interface on the user device.

Figure 19:
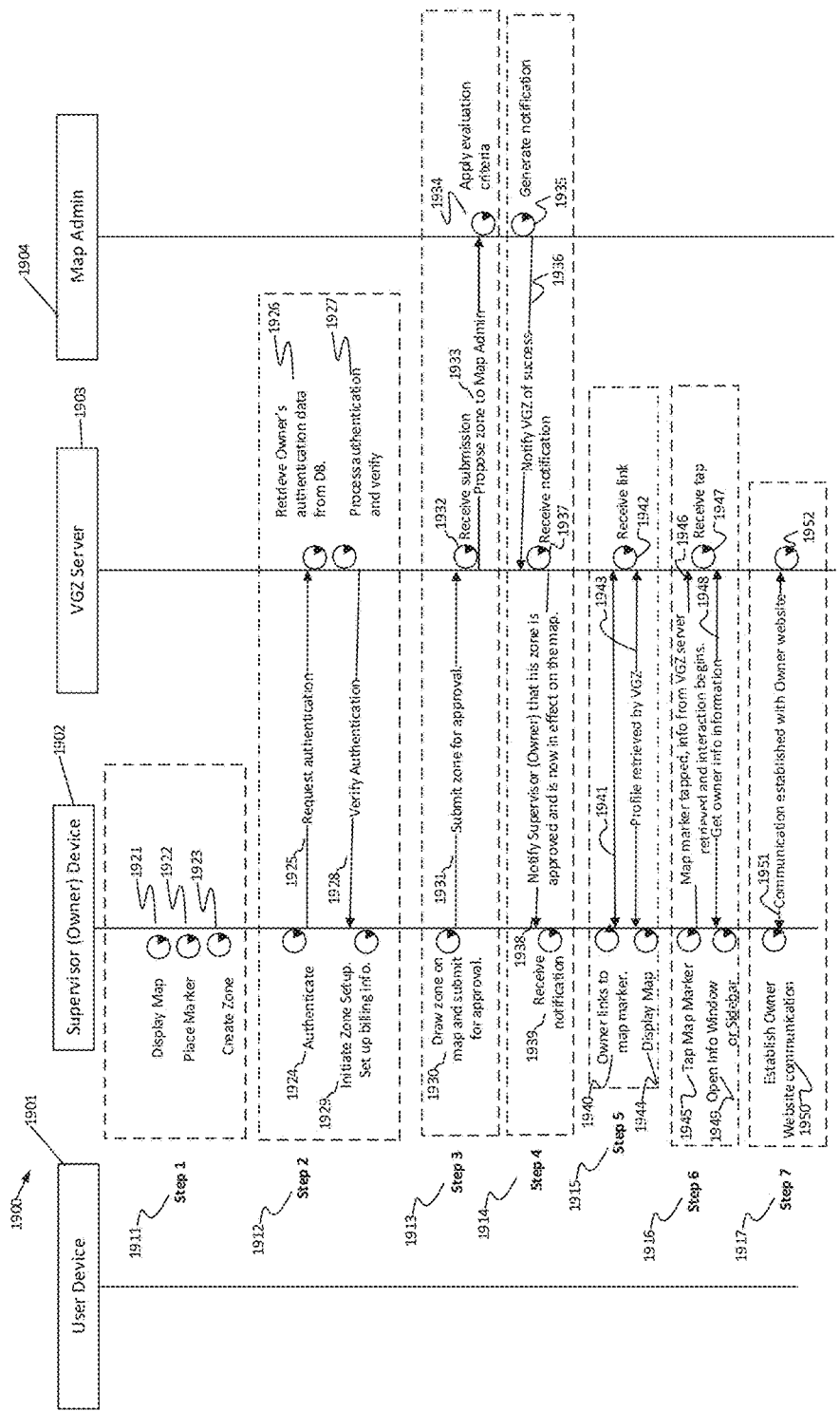
FIG. 19 is a flowchart of a method for defining a zone.

Referring to FIG. 19, a sequence diagram for a method of setting up zone and linking the zone to a website, such as with the system of FIGS. 17 and 18, is shown. Method 1900 includes several steps performed by different devices. User device 1901, supervisor or owner device 1902, VGZ server 1903, and map administrator device 1904 are respective embodiments of user device 205, supervisor or owner device 203, VGZ system server 201, and map administrator device 237 of FIG. 2A. Method 1900 includes steps 1911 through 1917 that each include one or more steps of operations. The code of Computer Program Listing Appendix IV is for the first 3 steps in flowchart FIG. 19.

First step 1911 includes operations 1921 through of 1923. At operation 1921, a map is displayed on supervisor device 1902. At operation 1922, a place marker is displayed on the map displayed on supervisor device 1902. At operation 1923, a zone is created using supervisor device 1902.

Second step 1912 includes operations 1924 through 1929. At operation 1924, an authentication operation is initiated. At operation 1925, supervisor device 1902 sends a request for authentication of the owner that is using supervisor device 1902 to VGZ server 1903. At operation 1926, VGZ server retrieves authentication data of the owner from a database based on the request received from operation 1925. At operation 1927, VGZ server processes the request and initiates verification. At operation 1928, a verification request is sent from VGZ server 1903 to supervisor device 1902. At operation 1929, the verification is complete and the owner sets up billing information and initiates zone setup, which is third step 1913.

Third step 1913 includes operations 1930 through 1934. At operation 1930, a zone is drawn on the map displayed on supervisor device 1902 and a selection is made to submit the zone for approval. At operation 1931, supervisor device 1902 sends data and information related to the zone for approval to VGZ server 1903. At operation 1932, VGZ server 1903 receives the request that includes the data and information for the zone. At operation 1933, VGZ server sends the proposed zone to map administrator device 1904 for evaluation. At operation 1934, map administrator device applies evaluation criteria to determine whether to approve the proposed zone. If the zone is not approved method 1900 can start over again at first step 1911. If the zone is approved, method 1900 can proceed to fourth step 1914.

Fourth step 1914 includes operations 1935 through 1939. At operation 1935, map administrator device 1904 generates a notification of the approval. At operation 1936, map administrator device 1904 sends the notification to VGZ server 1903. At operation 1937, VGZ server 1903 receives and processes the notification of the approval of the zone. At operation 1938, VGZ server 1903 sends a notification to supervisor device 1902 that includes information about the approval of the zone. At operation 1939, supervisor device 1902 receives the notification from VGZ server 1903 and displays the notification.

Fifth step 1915 includes operations 1940 through 1944. At operation 1940, the owner users supervisor device to create a link between the map marker for the zone and the website of the owner. At operation 1941, supervisor device 1902 sends the link information to VGZ server 1903. At operation 1942, VGZ server 1903 receives and stores the link information. At operation 1943, profile information is passed back and forth between VGZ server and supervisor device 1902. At operation 1944, the map displayed on supervisor device 1902 is updated to include one or more links provided by the owner to the website using supervisor device 1902.

Sixth step 1916 includes operations 1945 through 1949. At operation 1945, the owner taps on the marker displayed on the map to generate a tap event by supervisor device 1902. At operation 1946, in response to the tap event, supervisor device 1902 sends a request for information related to the map marker to VGZ server 1903. At operation 1947, VGZ server 1903 receives and processes the request that was generated in response to the tap. At operation 1948, one or more messages are passed between VGZ server 1903 and supervisor device 1902 to transfer information from VGZ server 1903 to supervisor device 1902 that will be displayed in an information window or information sidebar by supervisor device 1902. At operation 1949, supervisor device 1902 opens one or more of the information window and the information sidebar to display information received from VGZ server.

Seventh step 1917 includes operations 1950 through 1952. At operation 1950, supervisor device 1902 initiates the establishment of website communication. At operation 1951, one or more messages are sent and received between supervisor device 1902 and VGZ server 1903 to establish communication with the website. At step 1952, VGZ server receives and sends messages that establish communication with the website.

Figure 20:
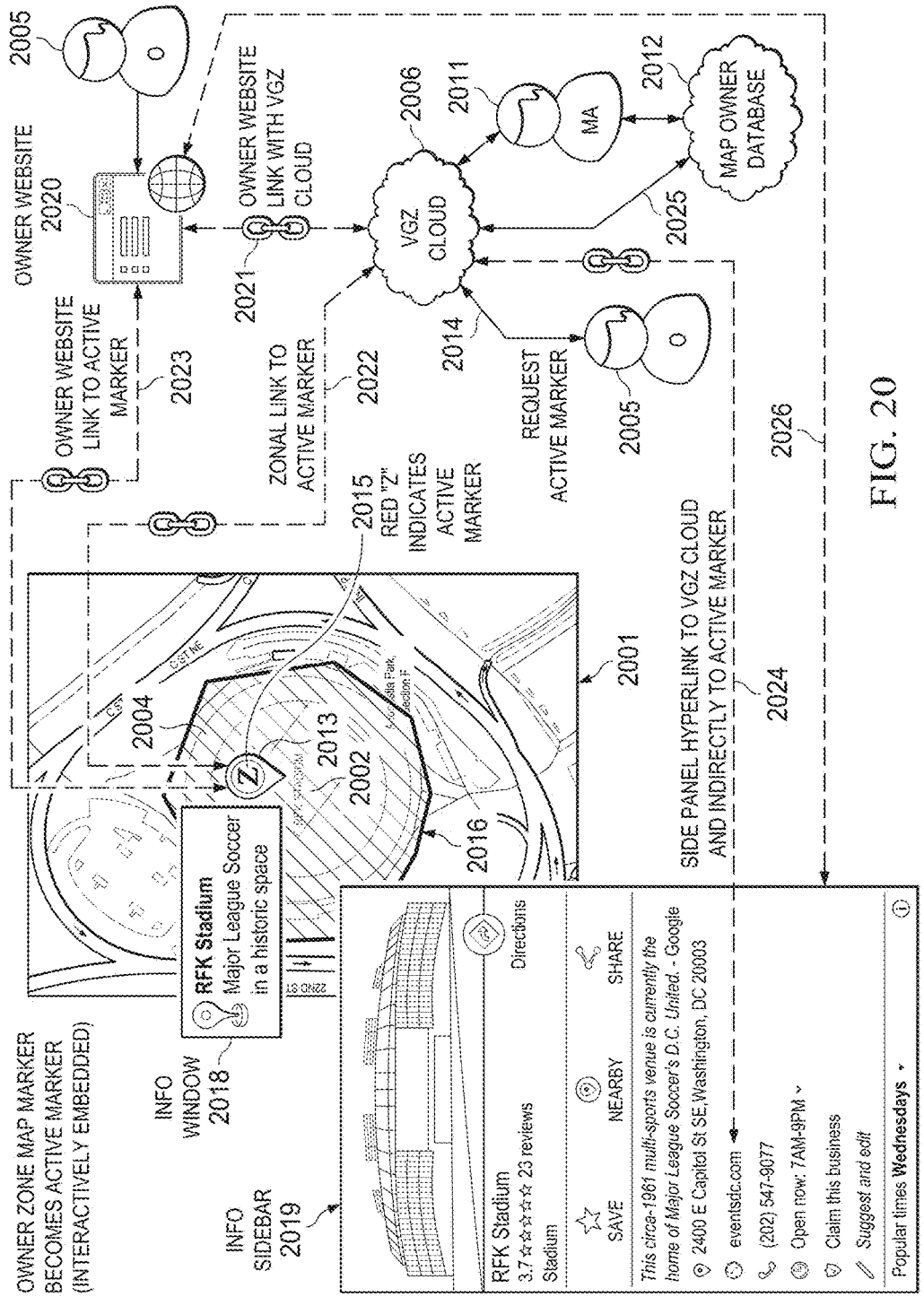
FIG. 20 is a view of the VGZ system for creating active markers interactively embedded in a map.

Referring to FIG. 20, a view of the system is shown for creating an active marker. The process described in FIG. 20 includes several operations that are performed with several devices or services.

Owner device 2005, website 2020, VGZ cloud 2006, and map administrator device 2011, are respective embodiments of supervisor device 203, website 235, VGZ system server 201, and map administrator device 237 of FIG. 2A. Map owner database 2012 is an embodiment of one or more of public map owner and databases 238 and private map owner and database 239 of FIG. 2A.

Map 2001 is displayed on a user interface of owner device 2005. Zone 2004 with perimeter 2016, marker 2013 with red "Z" 2015 or other means of graphically signifying that a zone now exists at that place, and location name 2002 are displayed on top of map 2001. In one embodiment, each of these features are "printed on the map" by replacing or overlaying the map pixels with pixels from images of the perimeter and the marker.

Information window 2018 and information sidebar 2019 are optionally displayed on top of map 2001 in response to input from the user. Marker 2013 includes one or more links, such as link 2022 to VGZ cloud 2006 and link 2023 to website 2020. Information side bar 2019 includes link 2024 to VGZ cloud 2006 and link 2026 to owner website 2020

At a first step, owner 2005 sends request 2014 to VGZ cloud 2006 to have map marker 2013 be designated an active marker by adding information associated with zone 2004 to the map owner data base 2012. VGZ cloud 2006 conveys request 2025 to map owner 2012 via request 2025. A map administrator uses map administrator device 2011 to oversee request 2025 and grants or denies request 2025.

At a second step, if the request was granted with map administrator device 2011, map administrator device 2011 sends a notification to VGZ cloud 2006 and map marker 2013 will be displayed on map 2001 with red "Z" 2015 instead of with a black "Z" (or other means of graphically signifying that a zone now exists at that place). The red "Z" indicates map marker 2013 is an active marker, enabling a user device, such as user device 205 of FIG. 2A, to access information related to zone 2004 in response to tapping the marker 2013.

At a third step that is optional, owner device 2005 is used provide one or more links to VGZ cloud 2006 that interconnect information between information displayed on a user interface, VGZ cloud 2006, and website 2020. The links are stored by VGZ cloud 2006 and can be provided by VGZ cloud 2006 to map owner database 2012 so that map owner database 2012 can provide the link in response to a request that map owner database 2012 receives from a user device for map 2001.

At a fourth step, marker 2013, which is associated with information about zone 2004 stored in map owner data base 2012, contains link 2022 to VGZ cloud 2006 to be able to access the actions (social, time clock, parking, promotions, and so on) that are available when a user device enters the geographic area of zone 2004. When marker 2013 is an active marker that includes link 2022, red "Z" 2015 or other means of graphically signifying that a zone now exists at that place is displayed within marker 2013. In contrast, when marker 2013 is not an active marker and does not include link 2022, a black "Z" or other means of graphically signifying that a zone now exists at that place is displayed within marker 2013.

Figure 21:
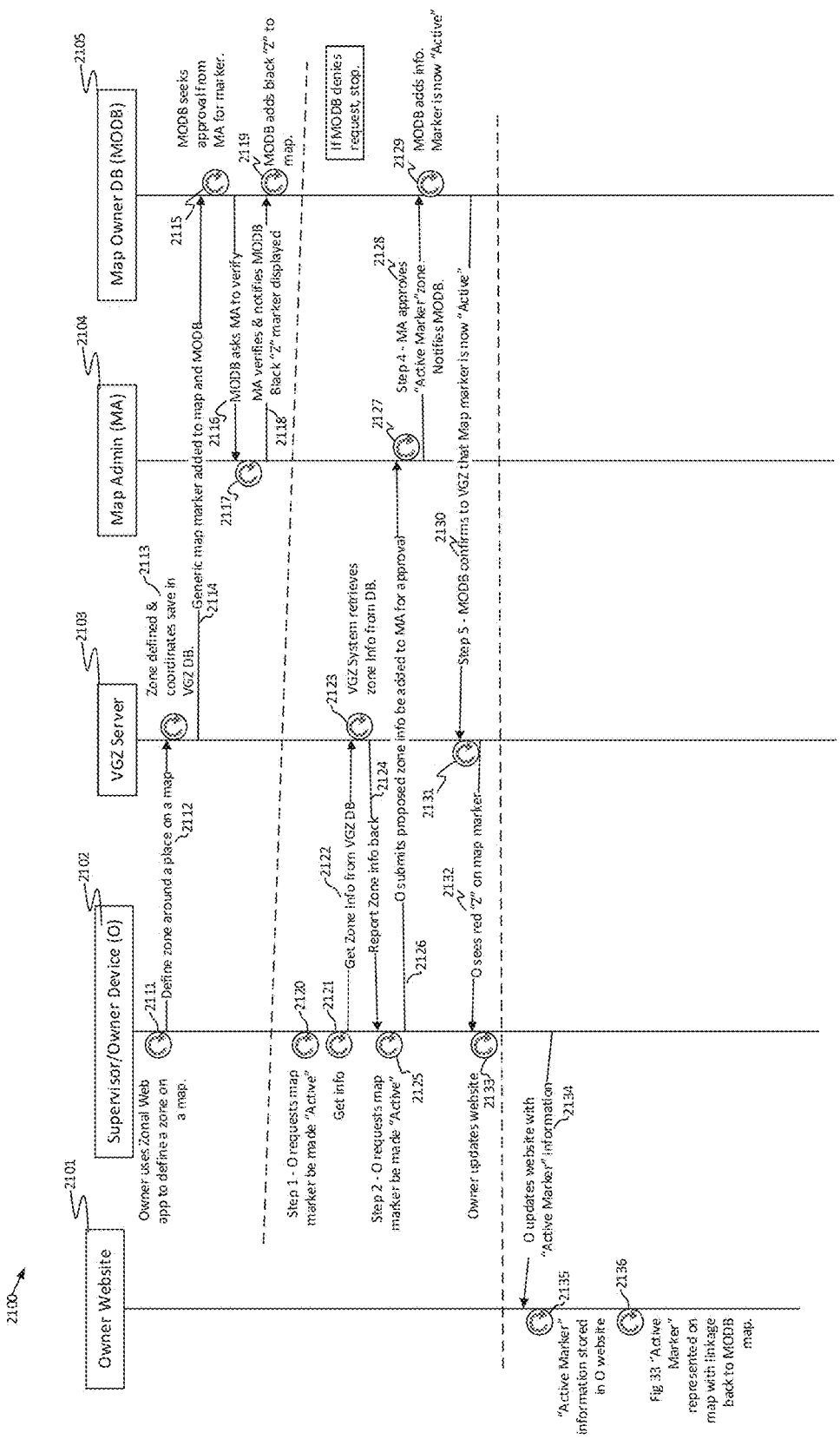
FIG. 21 is a flowchart of a method for creating active markers.

Referring to FIG. 21, a flowchart for a method of creating a zone with an active marker, such as with the system of FIG. 20, is shown. Source code related to the embodiment of FIG. 21 is included in the Computer Program Listing Appendix I.

Method 2100 includes several steps performed by different devices, services, or modules. Website 2101, supervisor device 2102, VGZ server 2103, map administrator device 2104, and map owner database 2105 are respective embodiments of website 235, supervisor device 203, VGZ system server 201, and map administrator device 237 of FIG. 2A. Map owner database 2105 is an embodiment of one or more of public map owner and databases 238 and private map owner and database 239 of FIG. 2A.

At step 2111, supervisor device 2102 is used to create and define a zone on a map via a web application running on supervisor device 2102. At step 2112, supervisor device 2102 sends the coordinates and information related to the zone that has been defined on the map to VGZ server 2103. At step 2113, VGZ server 2103 saves the zone that was defined using supervisor device 2102.

At step 2114, VGZ server 2103 sends a request to map owner database 2105 to associate and place a generic map marker on the map related to the zone. At step 2115, after receiving the request to place the generic map marker, map owner database begins to process the request and generates a request to send to map administrator device 2104 for verification. At step 2116, map owner database 2105 sends the request for verification to map administrator device 2104. At step 2117, Map administrator device 2104 receives the request for verification and processes the request. At step 2118, after the request is verified, map administrator device 2104 sends a notification to map owner database 2105 that the generic marker is verified. At step 2119, map owner database 2105 adds a black letter "Z" or other means of graphically signifying that a zone now exists at that place to the marker that is placed on a map that is related to the zone defined by supervisor device 2102.

At step 2120, the owner uses supervisor device 2102 to change the marker from a generic marker to an active marker by adding a "Z" or other means of graphically signifying that a zone now exists at that place. At step 2121, supervisor device 2102 gets information related to the zone that will be changed. At step 2122, supervisor device 2102 sends a request for the zone information to VGZ server 2103. At step 2123, in response to the request, VGZ server 2103 retrieves the zone information from a database connected to VGZ server 2103. At step 2124, VGZ server 2103 reports the zone information back to supervisor device 2102.

At step 2125, after displaying the zone information, supervisor device 2102 starts the process of requesting that the marker be made active in response to user input received by supervisor device 2102. At step 2126, supervisor device 2102 sends the zone information that is related to the marker to be made active to map administrator device 2104. At step 2127, map administrator device 2104 receives the zone information submission. At step 2128, the request is approved and map administrator device sends a notification to map owner database 2105. At step 2129, map owner database 2105 receives the notification and updates the marker for the zone to be an active marker or other means of graphically signifying that a zone now exists at that place. Active map markers may also be referred to as interactive map markers.

At step 2130, map owner database 2105 sends a confirmation to VGZ server 2013 that the map marker is updated to be an active map marker. At step 2131, VGZ server 2103 receives the confirmation from map owner database 2105 and processes the confirmation. At step 2132, VGZ server 2103 sends the confirmation to supervisor device 2102 so that supervisor device 2102 will display the maker with a red letter "Z" or other way of signifying that it is an active marker that can obtain the zone coordinates for the place. At step 2133, the process to update website 2101 is initiated.

At step 2134, supervisor device 2102 sends updated active marker information to website 2101. At step 2135, the active marker information is stored by website 2101. At step 2136, the active marker is linked with the map maintained by map owner database 2105.

Figure 22:
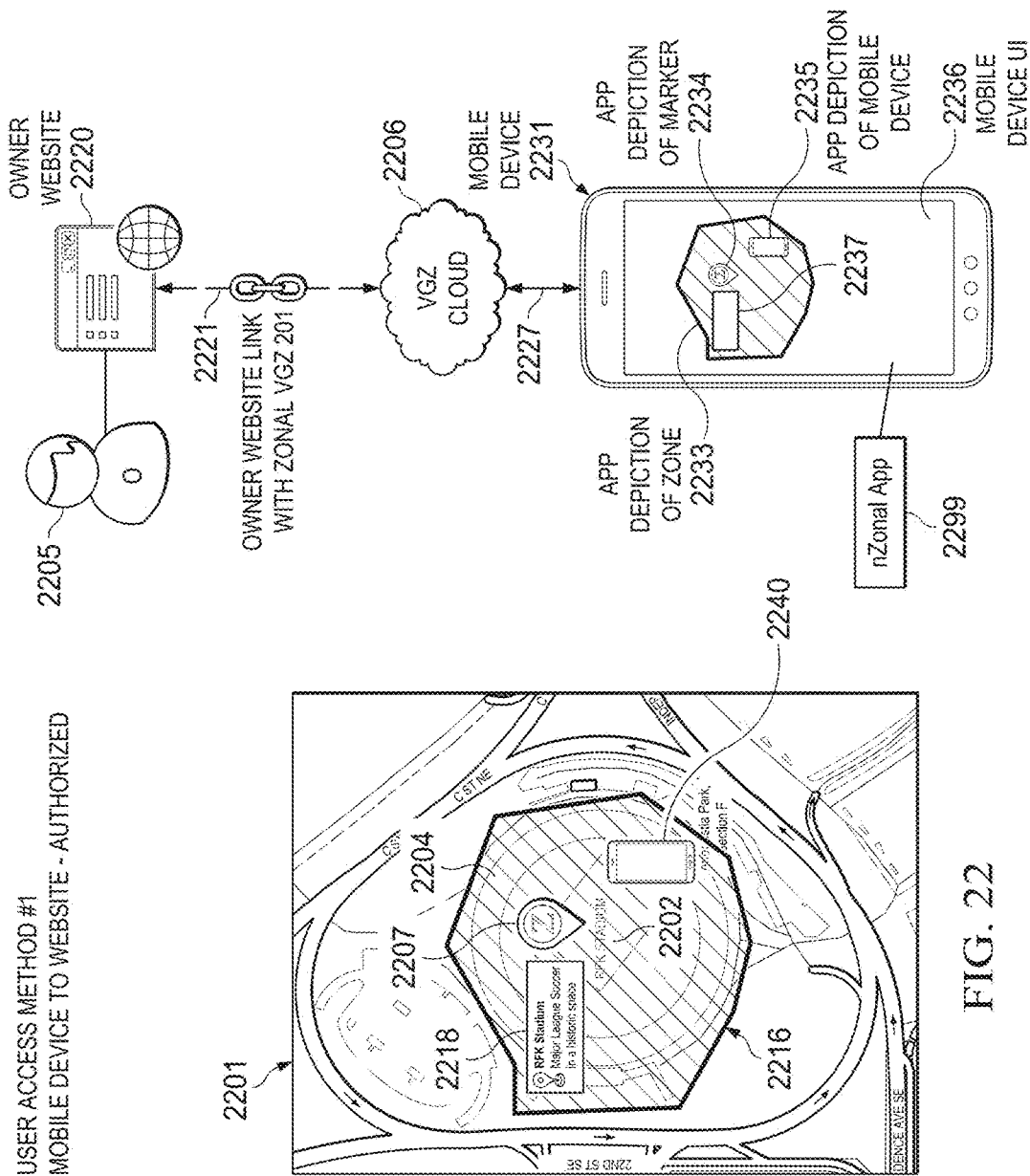
FIG. 22 is a view of the VGZ system for a user access method by a mobile device to an owner website using a marker on a map.

Referring to FIG. 22, a view of the system is shown for a first access method. The process described in FIG. 22 includes several operations that are performed with several devices or services.

Owner device 2205, website 2220, VGZ cloud 2206, and mobile device 2231, are respective embodiments of supervisor device 203, website 235, VGZ system server 201, and user device 205 of FIG. 2A.

Map 2201 is displayed on owner device 2205. Zone 2204 with perimeter 2216, marker 2207, location name 2202, information window 2218, and user device depiction 2240 are displayed on map 2201.

Owner device 2205 can connect to website 2220. Website 2220 is connected to VGZ cloud 2206 by link 2221. Mobile device 2231 is connected to VGZ cloud 2206. User interface 2236 is displayed on mobile device 2231 when user application 2299, also referred to as the nZonal App, is running on mobile device 2231. Zone 2233, marker 2234, depiction 2235 of mobile device 2231, and information window 2237 are shown on user interface 2236 on top of a map.

At a first step, owner device 2205 is used to set up zone 2204, as previously described. Zone 2204 is authorized and shown with a black letter "Z" or other means of graphically signifying that a zone now exists at that place in marker 2207 on map 2201, which is displayed by a user interface on owner device 2205.

A user with mobile device 2231 is inside zone 2204 and activates user application 2299 on mobile device 2231. Mobile device 2231 begins communicating with VGZ cloud 2206 over communication link 2227.

At a second step, the user touches the zone marker 2234 displayed on a touch sensitive screen of mobile device 2231. In one embodiment, the touch sensor embedded in the screen registers a touch event that is received by a processor of mobile device 2231. In response to the touch event, information window 2237, which is similar to information window 2218 on map 2201, is displayed on mobile device 2231.

At a third step, mobile device 2231 gets zone coordinates via a link in information window 2237 that enables communication link 2227 from mobile device 2231 to VGZ cloud 2206.

At a fourth step, interaction begins between mobile device 2231 and website 2220.

Figure 23:
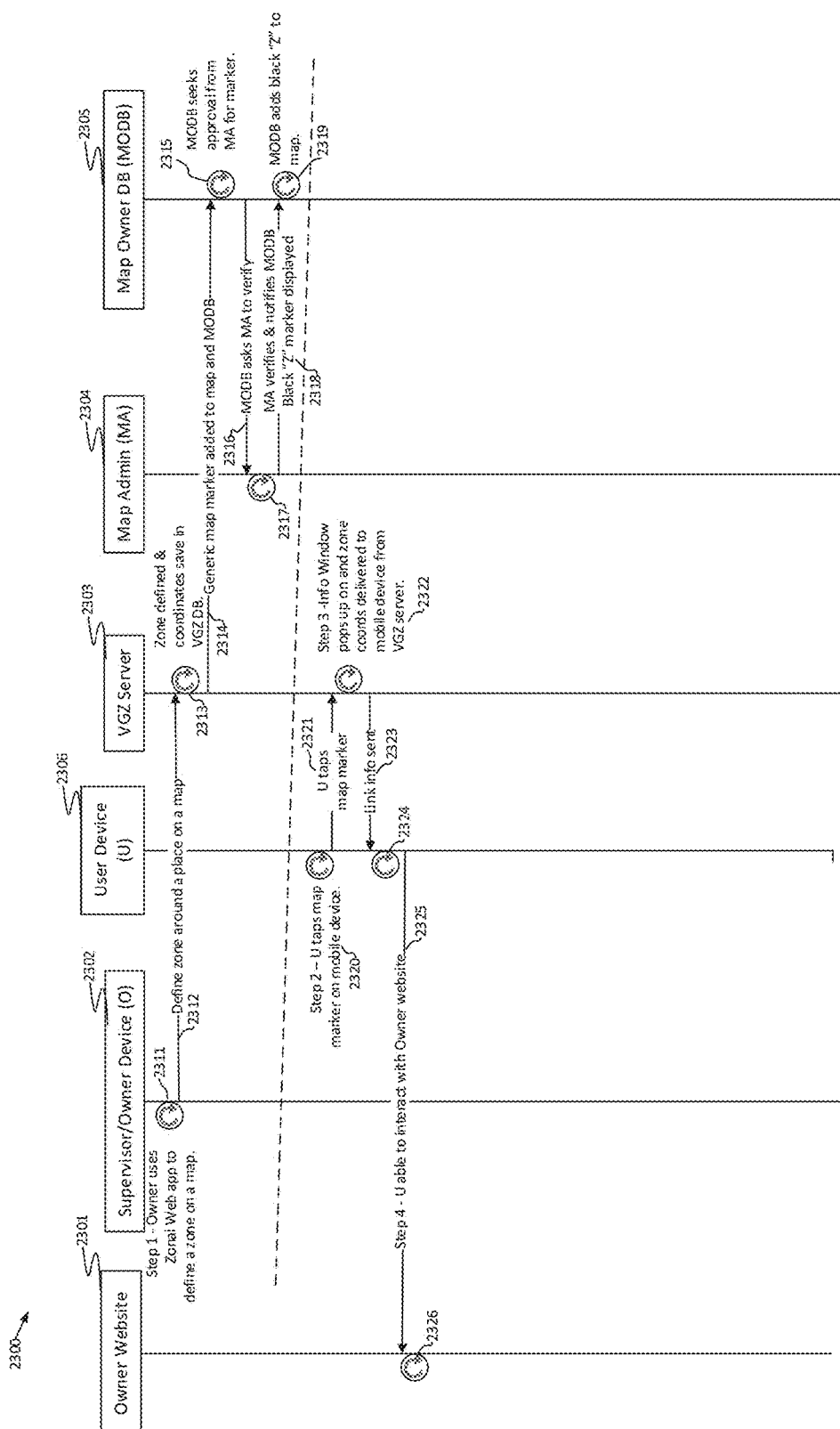
FIG. 23 is a flowchart of a method for a user access method.

Referring to FIG. 23, a flowchart for a method of creating a zone with an active marker, such as with the system of FIG. 22, is shown. Method 2300 includes several steps performed by different devices, services, or modules. Website 2301, supervisor device 2302, user device 2306, VGZ server 2303, map administrator device 2304, and map owner database 2305 are respective embodiments of website 235, supervisor device 203, user device 205, VGZ system server 201, and map administrator device 237 of FIG. 2A. Map owner database 2305 is an embodiment of one or more of public map owner and databases 238 and private map owner and database 239 of FIG. 2A.

At step 2311, supervisor device 2302 is used to create and define a zone on a map via a web application running on supervisor device 2302. At step 2312, supervisor device 2302 sends the coordinates and information related to the zone that has been defined on the map to VGZ server 2303. At step 2313, VGZ server 2303 saves the zone that was defined using supervisor device 2302.

At step 2314, VGZ server 2303 sends a request to map owner database 2305 to associate and place a generic map marker on the map related to the zone. At step 2315, after receiving the request to place the generic map marker, map owner database begins to process the request and generates a request to send to map administrator device 2304 for verification. At step 2316, map owner database 2305 sends the request for verification to map administrator device 2304. At step 2317, Map administrator device 2304 receives the request for verification and processes the request. At step 2318, after the request is verified, map administrator device 2304 sends a notification to map owner database 2305 that the generic marker is verified. At step 2319, map owner database 2305 adds a black letter "Z" or other graphic indication that there is a zone in that place to the marker that is placed on a map that is related to the zone defined by supervisor device 2302.

At step 2320, a user taps on a map marker displayed on a map on user device 2306. At step 2321, user device 2306 sends a request to VGZ server 2303 related to the tap on the map marker. At step 2322, VGZ server 2303 receives the request from user device 2306 and prepares to send the information that will be displayed in an information window on user device 2306. In an alternative embodiment the information for the information window is already resident on user device 2306 and the request sent at step 2321 notifies VGZ server 2303 that the map marker has been tapped.

At step 2323, link information is sent from VGZ server 2303 to user device 2306. At step 2324, user device 2306 receives the link information from VGZ server and displays the information window on top of the map. At step 2325 user device 2306 initiates communication with website 2301 based on the link information from VGZ server. At step 2326, website 2301 receives and processes a link request from user device 2306 to enable interaction between website 2301 and user device 2306.

Figure 24:
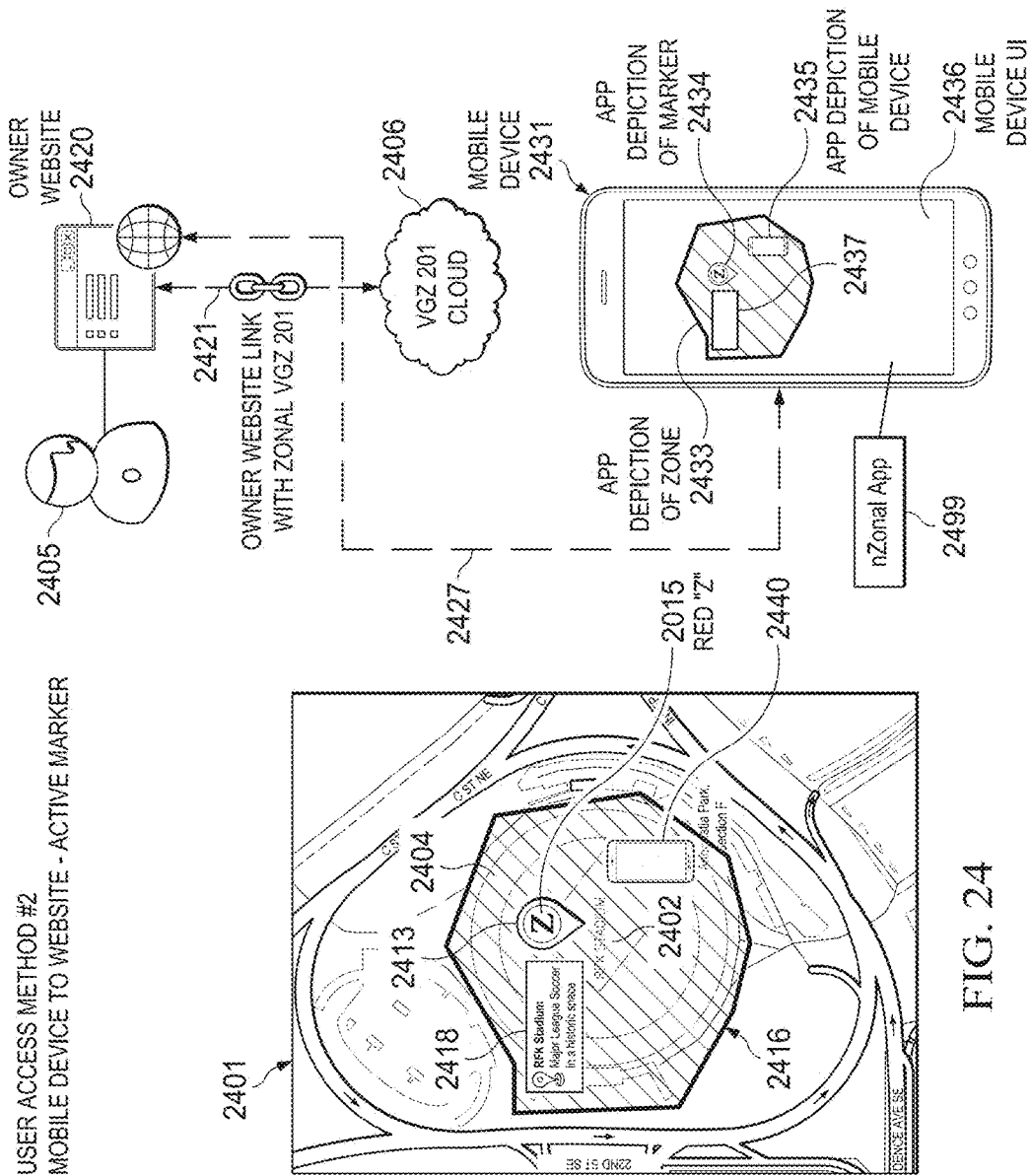
FIG. 24 is a view of the VGZ system for a user access method by a mobile device to an owner website via an active marker on a map.

Referring to FIG. 24, a view of the system is shown for a second access method. The process described in FIG. 24 includes several operations that are performed with several devices or services.

Owner device 2405, website 2420, VGZ cloud 2406, and mobile device 2431, are respective embodiments of supervisor device 203, website 235, VGZ system server 201, and user device 205 of FIG. 2A.

Map 2401 is displayed on owner device 2405. Zone 2404 with perimeter 2416, marker 2407, location name 2402, information window 2418, and user device depiction 2440 are displayed on map 2401.

Owner device 2405 can connect to website 2420. Website 2420 is connected to VGZ cloud 2406 by link 2421. Mobile device 2431 is connected to website 2420. User interface 2436 is displayed on mobile device 2431 when user application 2499, also referred to as the nZonal App, is running on mobile device 2431. Zone 2433, marker 2434, depiction 2435 of mobile device 2431, and information window 2437 are shown on user interface 2436 on top of a map.

At a first step, owner device 2405 is used to set up a zone as previously described. Zone 2404 is active.

The user of mobile device 2431 is inside the geographic area associated with zone 2404 and activates user application 2499, also referred to as the nZonal App, and begins communicating with VGZ cloud 2406.

At a second step, a touch by on marker 2435 causes pop of up of information window 2437 in mobile device 2431.

At a third step, user mobile device 2431 gets zone coordinates via a link associated with active marker 2434 to VGZ cloud 2406 and to website 2420.

At a fourth step, user interaction between mobile communication 2431 and website 2420 is established with communication link 2427.

Figure 25:
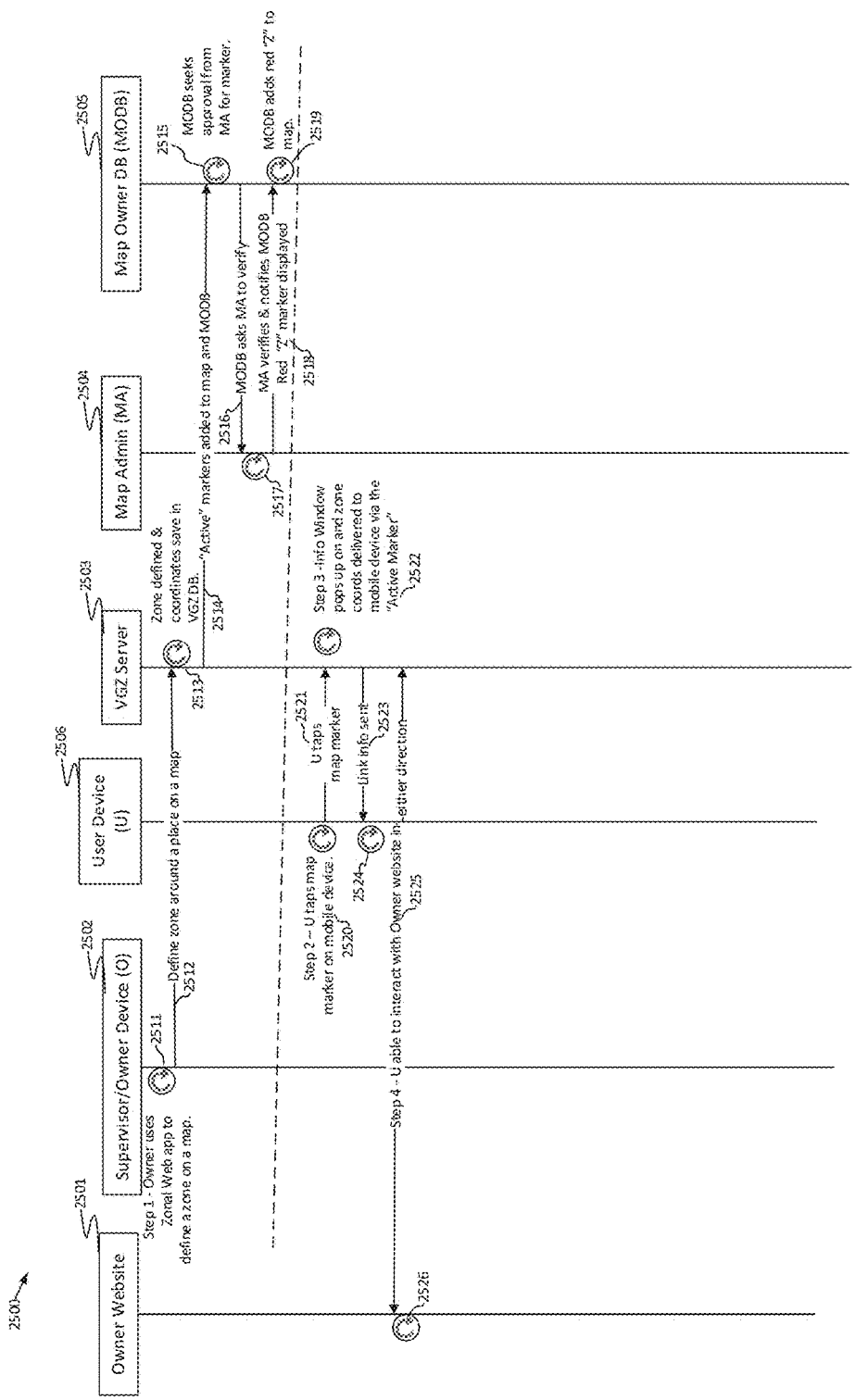
FIG. 25 is a flowchart of a method for a user access method.

Referring to FIG. 25, a flowchart for a method of creating a zone with an active marker, such as with the system of FIG. 24, is shown. Method 2500 includes several steps performed by different devices, services, or modules. Website 2501, supervisor device 2502, user device 2506, VGZ server 2503, map administrator device 2504, and map owner database 2505 are respective embodiments of website 235, supervisor device 203, user device 205, VGZ system server 201, and map administrator device 237 of FIG. 2A. Map owner database 2505 is an embodiment of one or more of public map owner and databases 238 and private map owner and database 239 of FIG. 2A.

At step 2511, supervisor device 2502 is used to create and define a zone on a map via a web application running on supervisor device 2502. At step 2512, supervisor device 2502 sends the coordinates and information related to the zone that has been defined on the map to VGZ server 2503. At step 2513, VGZ server 2503 saves the zone that was defined using supervisor device 2502.

At step 2514, VGZ server 2503 sends a request to map owner database 2505 to associate and place an active map marker on the map related to the zone. At step 2515, after receiving the request to place the active map marker, map owner database begins to process the request and generates a request to send to map administrator device 2504 for verification. At step 2516, map owner database 2505 sends the request for verification to map administrator device 2504. At step 2517, Map administrator device 2504 receives the request for verification and processes the request. At step 2518, after the request is verified, map administrator device 2504 sends a notification to map owner database 2505 that the active marker is verified. At step 2519, map owner database 2505 adds a red letter "Z" or other means of graphically signifying that a zone now exists at that place to the marker that is placed on a map that is related to the zone defined by supervisor device 2502.

At step 2520, a user taps on a map marker displayed on a map on user device 2506. At step 2521, user device 2506 sends a request to VGZ server 2503 related to the tap on the map marker. At step 2522, VGZ server 2503 receives the request from user device 2506 and prepares to send the information that will be displayed in an information window on user device 2506. In an alternative embodiment the information for the information window is already resident on user device 2506 and the request sent at step 2521 notifies VGZ server 2503 that the map marker has been tapped.

At step 2523, link information is sent from VGZ server 2503 to user device 2506. At step 2524, user device 2506 receives the link information from VGZ server and displays the information window on top of the map. At step 2525 user device 2506 initiates communication with website 2501 either directly or via VGZ server 2503 based on the link information from VGZ server. At step 2526, web site 2501 receives and processes a link request that is received directly from user device 2506 or is received indirectly via VGZ server 2503 to enable interaction between website 2501 and user device 2506.

Figure 26:
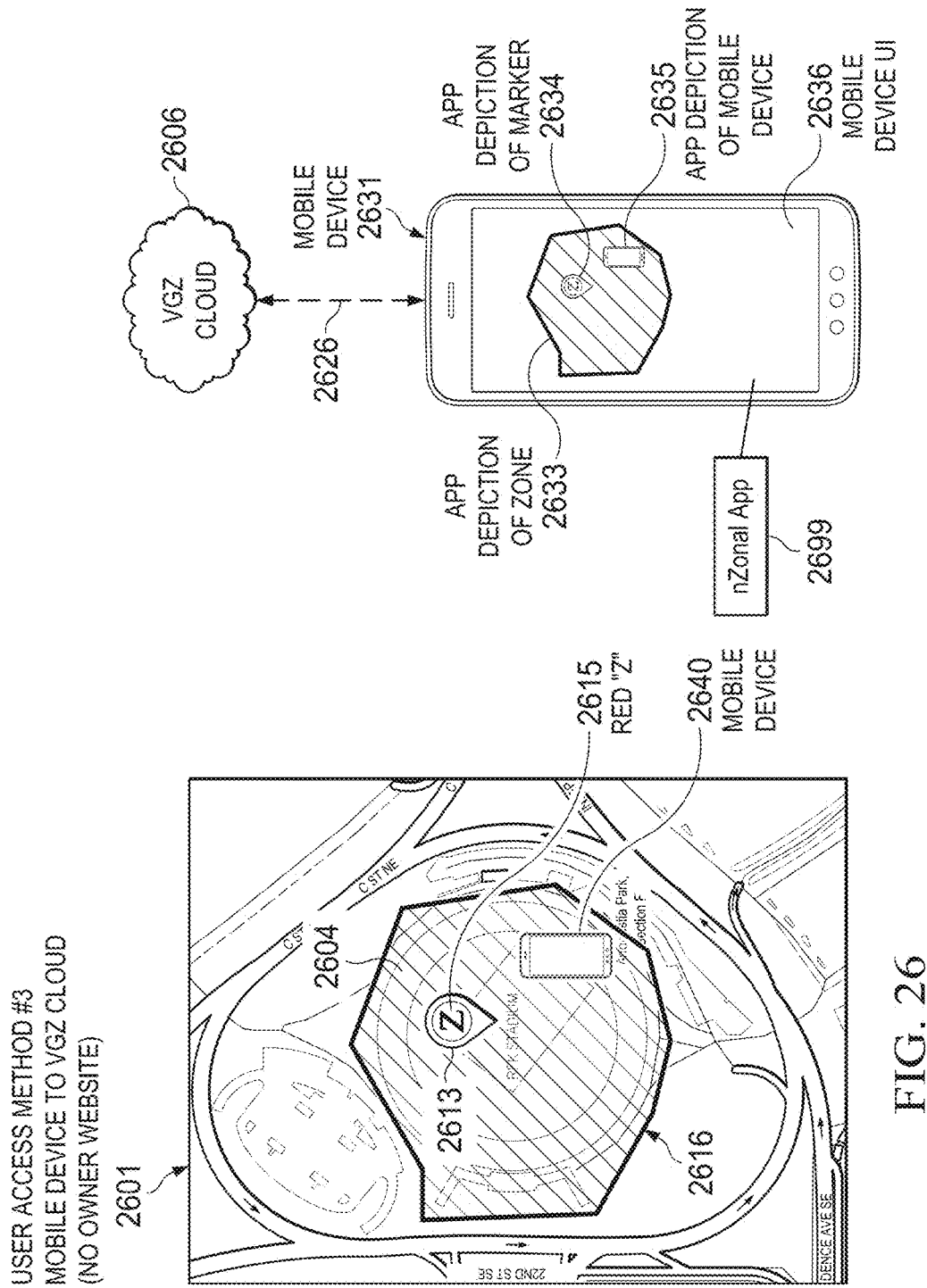
FIG. 26 is a view of the VGZ system for a user access method by a mobile device to VGZ cloud via an active marker on a map.

Referring to FIG. 26, a view of the system is shown for a third access method. The process described in FIG. 26 includes several operations that are performed with several devices or services. Source code related to the embodiment of FIG. 26 is included in the Computer Program Listing Appendix II.

VGZ cloud 2606 and mobile device 2631 are respective embodiments of VGZ system server 201 and user device 205 of FIG. 2A.

Map 2601 is displayed on an owner device, such as supervisor device 203 of FIG. 2A. Zone 2604 with perimeter 2616, marker 2607, and user device depiction 2640 are displayed on map 2601.

Owner device 2605 can connect to website 2620. Website 2620 is connected to VGZ cloud 2606 by link 2621. Mobile device 2631 is connected to website 2620. User interface 2636 is displayed on mobile device 2631 when user application 2699, also referred to as the nZonal App, is running on mobile device 2631. Zone 2633, marker 2634, and depiction 2635 of mobile device 2631 are shown on user interface 2636 on top of a map.

At first step, an owner uses a supervisor device to set up zone 2604, as previously described. Zone 2604 is active.

The user of mobile device 2631 is inside the geographic area associated with zone 2604 and activates user application 2699, also referred to as the nZonal App, and begins communicating with VGZ cloud 2606.

At a second step, a touch on marker 2634 initiates the process to facilitate interaction between mobile device 2631 and VGZ cloud 2606. The interaction is associated with zone 2604 and the one or more actions that are available via zone 2604 and that are accessed via VGZ cloud 2606.

At a third step, mobile device 2631 receives coordinates for zone 2604 via a link associated with active marker 2634.

At a fourth step, user interaction between mobile communication 2631 and VGZ cloud 2606 with respect to zone 2604 is established with communication link 2626.

Figure 27:
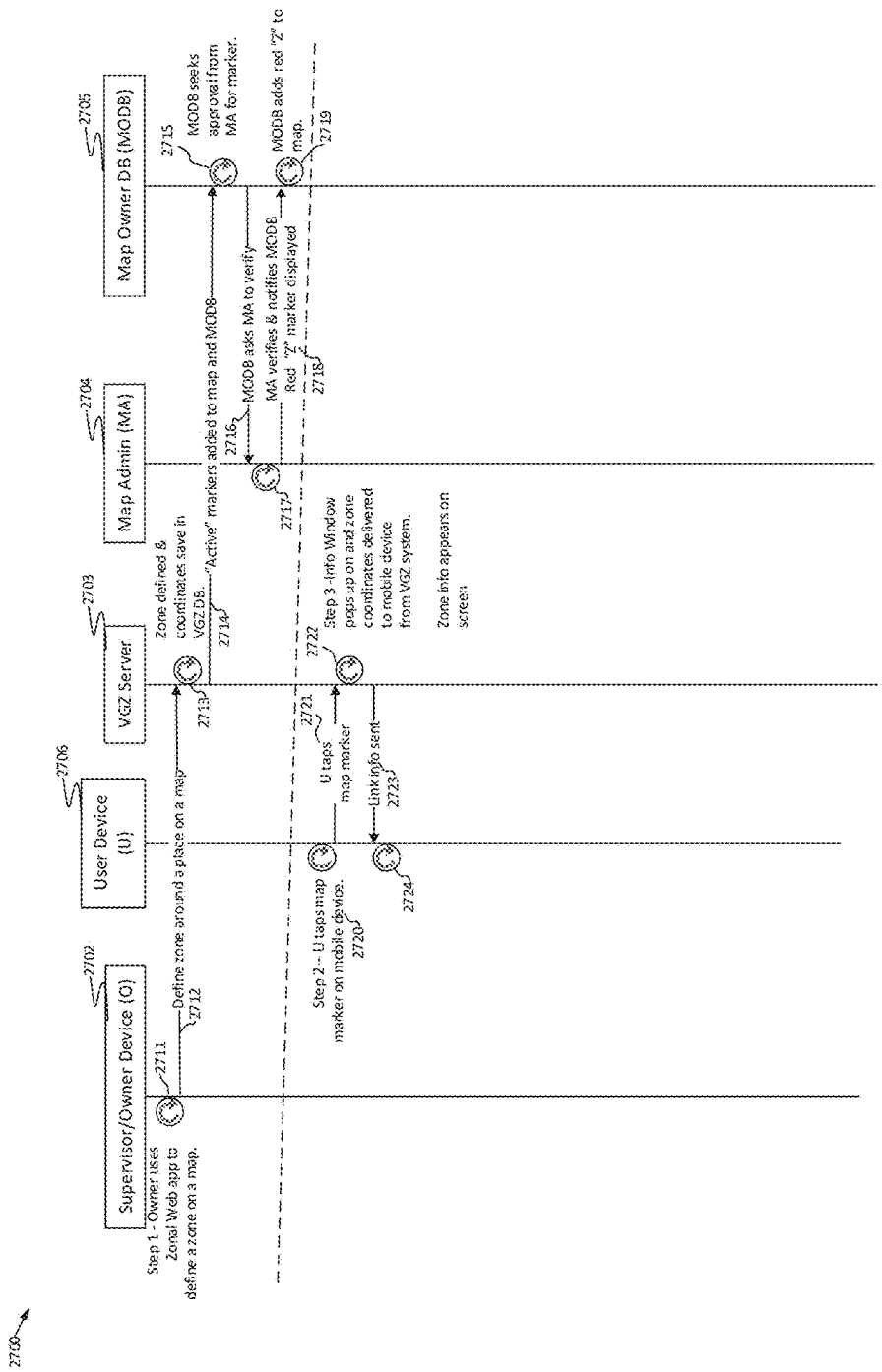
FIG. 27 is a flowchart of a method for a user access method.

Referring to FIG. 27, a flowchart for a method of creating a zone with an active marker, such as with the system of FIG. 26, is shown. Method 2700 includes several steps performed by different devices, services, or modules. Supervisor device 2702, user device 2706, VGZ server 2703, map administrator device 2704, and map owner database 2705 are respective embodiments of supervisor device 203, user device 205, VGZ system server 201, and map administrator device 237 of FIG. 2A. Map owner database 2705 is an embodiment of one or more of public map owner and databases 238 and private map owner and database 239 of FIG. 2A.

At step 2711, supervisor device 2702 is used to create and define a zone on a map via a web application running on supervisor device 2702. At step 2712, supervisor device 2702 sends the coordinates and information related to the zone that has been defined on the map to VGZ server 2703. At step 2713, VGZ server 2703 saves the zone that was defined using supervisor device 2702.

At step 2714, VGZ server 2703 sends a request to map owner database 2705 to associate and place an active map marker on the map related to the zone. At step 2715, after receiving the request to place the active map marker, map owner database begins to process the request and generates a request to send to map administrator device 2704 for verification. At step 2716, map owner database 2705 sends the request for verification to map administrator device 2704. At step 2717, Map administrator device 2704 receives the request for verification and processes the request. At step 2718, after the request is verified, map administrator device 2704 sends a notification to map owner database 2705 that the active marker is verified. At step 2719, map owner database 2705 adds a red letter "Z" or other means of graphically signifying that a zone now exists at that place to the marker that is placed on a map that is related to the zone defined by supervisor device 2702.

At step 2720, a user taps on a map marker displayed on a map on user device 2706. At step 2721, user device 2706 sends a request to VGZ server 2703 related to the tap on the map marker. At step 2722, VGZ server 2703 receives the request from user device 2706 and prepares to send the information that will be displayed in an information window on user device 2706. In an alternative embodiment the information for the information window is already resident on user device 2706 and the request sent at step 2721 notifies VGZ server 2703 that the map marker has been tapped.

At step 2723, link information is sent from VGZ server 2703 to user device 2706. At step 2724, user device 2706 receives the link information from VGZ server and displays the information window on top of the map.

Figure 28:
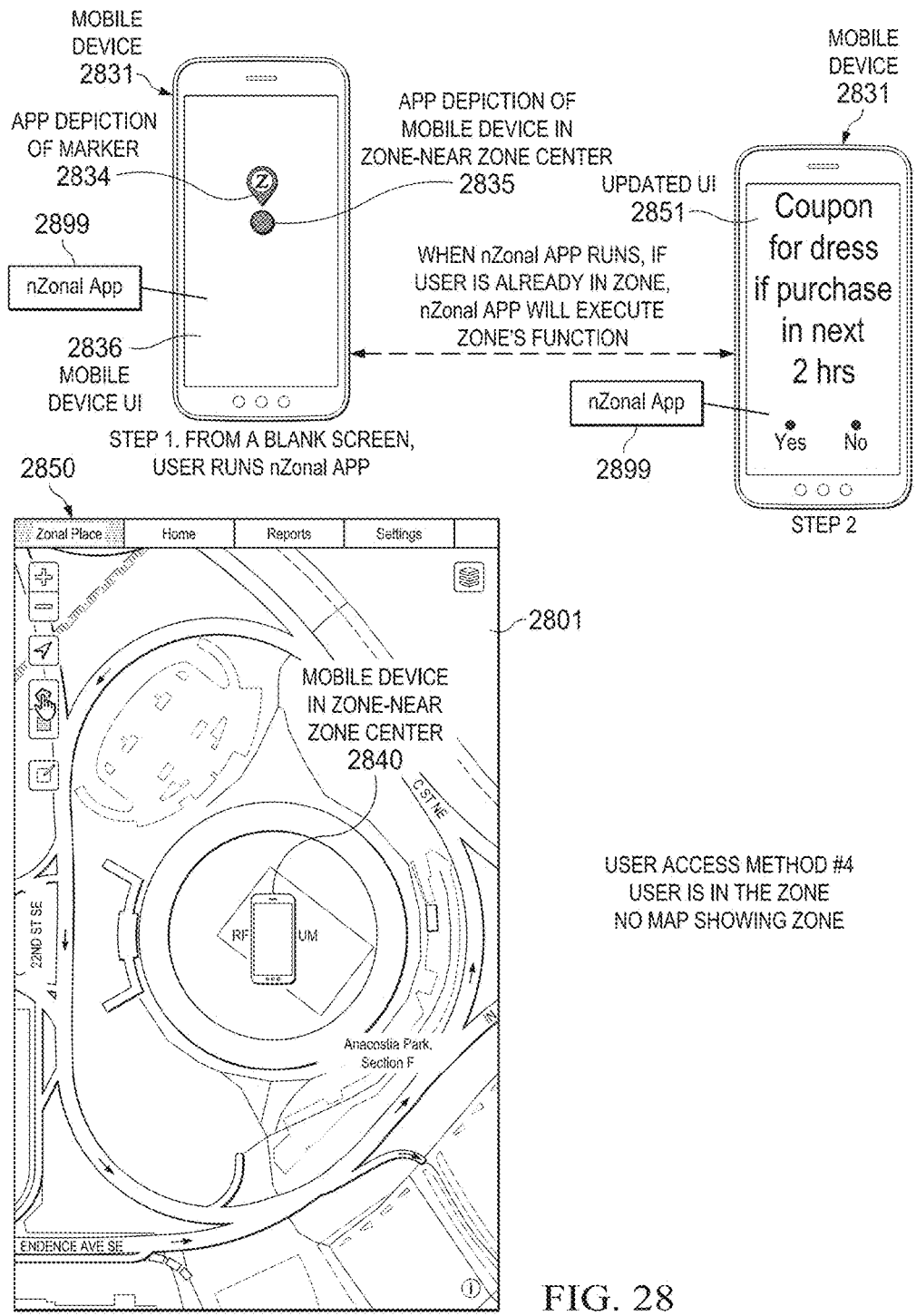
FIG. 28 is a view of the VGZ system for a user access method.

Referring to FIG. 28, a view of the system is shown for a fourth access method. The process described in FIG. 28 includes several operations that are performed with several devices or services.

User interface 2850 is a user interface displayed on a supervisor device, such as supervisor device 203 of FIG. 2A. User interface includes the display of map 2801 and depiction 2840 of mobile device 2831. User interface 2850 does not display the zone that has already been associated with the geographical location of mobile device 2831.

Mobile device 2831 is an embodiment of user device 205 of FIG. 2A. Mobile device 2831 displays a first user interface 2836 and a second updated user interface 2851 when an action associated with a zone in which mobile device 2831 is located is run automatically. First user interface 2836 displays map marker 2834 and depiction 2835 of the location of mobile device 2831 near a center of a zone without depicting the zone itself. Second updated user interface 2851 displays a coupon offer, which is an action that the owner of the zone has associated with the zone.

A zone, also referred to as a virtual zone, and the depiction of the virtual zone are completely separate. A virtual zone can exist anywhere at any time without showing on a map and can be acted upon after the owner stores information in the VGZ Cloud. Many other factors and options determine what part, if any, of the zone information is actually shown or depicted on a map on a device.

As an initial step, the owner of a business at a physical location sets up a zone, as previously described. The zone is active and available to interact with mobile device 2831.

At a first step, mobile device 2831 is inside the zone associated with the current geographical location of mobile device 2831 and the user application, also referred to as the nZonal App, is activated. After being activated, mobile device 2831 begins communication with a VGZ server, such as VGZ system server 201 of FIG. 2A via the nZonal App.

At a second step, the user application automatically executes a "Coupon Offer" function that has been associated with the zone and transmitted to the nZonal App for execution. Mobile device 2831 receives and displays the coupon offer, which is selected by the user of mobile device 2831.

Figure 29:
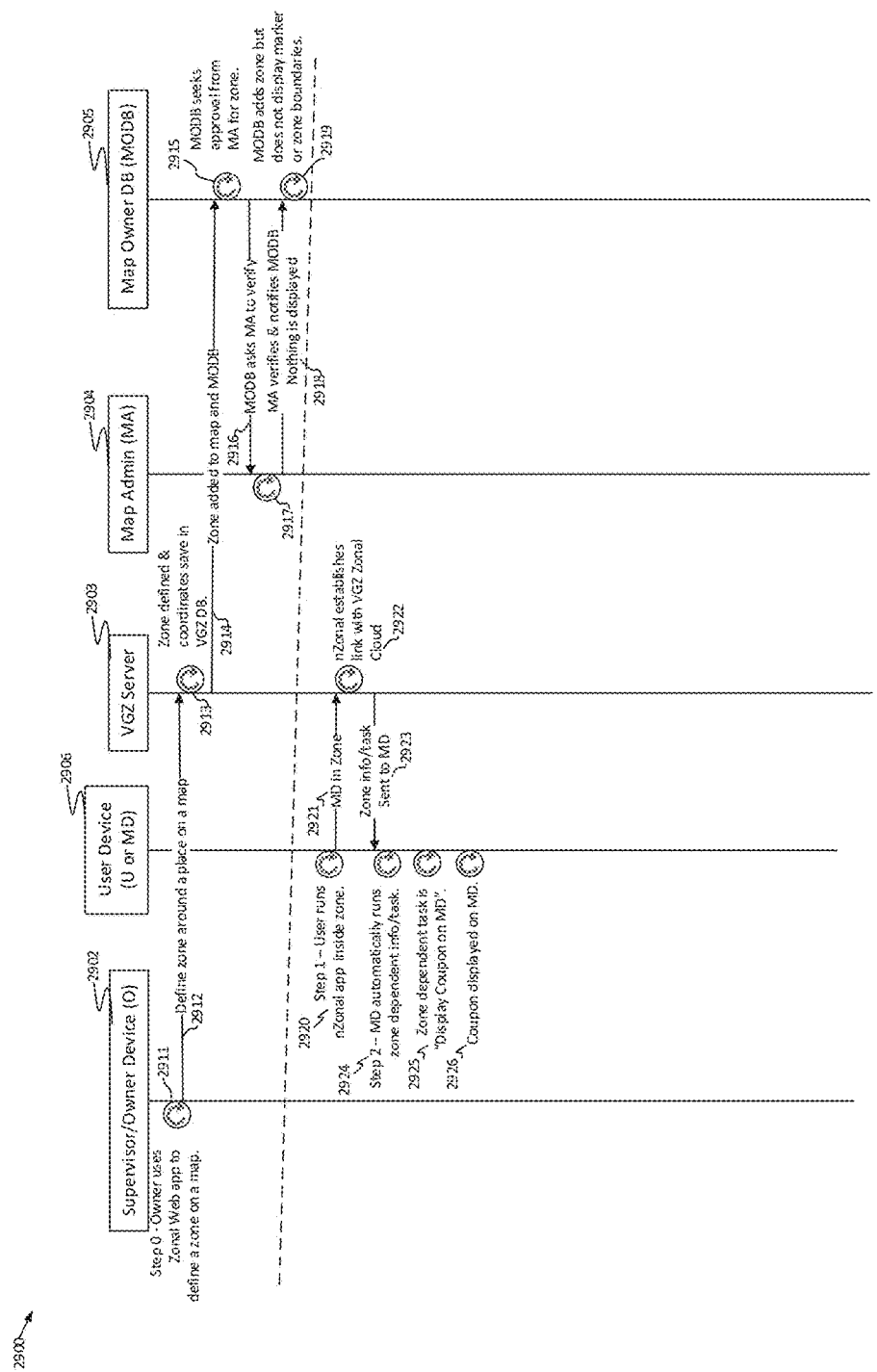
FIG. 29 is a flowchart of a method for a user access method.

Referring to FIG. 29, a flowchart for a method of creating a zone with an active marker, such as with the system of FIG. 28, is shown. Method 2900 includes several steps performed by different devices, services, or modules. Supervisor device 2902, user device 2906, VGZ server 2903, map administrator device 2904, and map owner database 2905 are respective embodiments of supervisor device 203, user device 205, VGZ system server 201, and map administrator device 237 of FIG. 2A. Map owner database 2905 is an embodiment of one or more of public map owner and databases 238 and private map owner and database 239 of FIG. 2A.

At step 2911, supervisor device 2902 is used to create and define a zone on a map via a web application running on supervisor device 2902. At step 2912, supervisor device 2902 sends the coordinates and information related to the zone that has been defined on the map to VGZ server 2903. At step 2913, VGZ server 2903 saves the zone that was defined using supervisor device 2902.

At step 2914, VGZ server 2903 sends a request to map owner database 2905 to associate the zone with the map without displaying the zone and without displaying a map marker. At step 2915, after receiving the request to associate the zone, map owner database begins to process the request and generates a request to send to map administrator device 2904 for verification. At step 2916, map owner database 2905 sends the request for verification to map administrator device 2904. At step 2917, Map administrator device 2904 receives the request for verification and processes the request. At step 2918, after the request is verified, map administrator device 2904 sends a notification to map owner database 2905 that the zone is verified without display of a marker. At step 2919, map owner database 2905 adds the zone but does not display a maker or the zone boundaries.

At step 2920, which is similar to the first step described with relation to FIG. 28, a user runs a user application on user device 2906 inside the zone defined using supervisor device 2902. At step 2921, when user device 2906 is inside the zone, the user device sends a request to VGZ server 2903. At step 2922, VGZ server receives the request from user device 2906 and the communication link between user device 2906 and VGZ server 2903, also referred to as VGZ cloud, is established. At step 2923, VGZ server 2903 sends a message to user device 2906 that includes the zone information and the functions and actions related to the zone.

At step 2924, which is similar to the second step described with relation to FIG. 28, user device 2906 automatically executes the action related to the zone. At step 2925, user device 2906 identifies the action of "Display Coupon on Mobile Device" is dependent on the zone. At step 2926, user device 2906 displays the coupon offer as a part of the action related to the zone.

Figure 30:
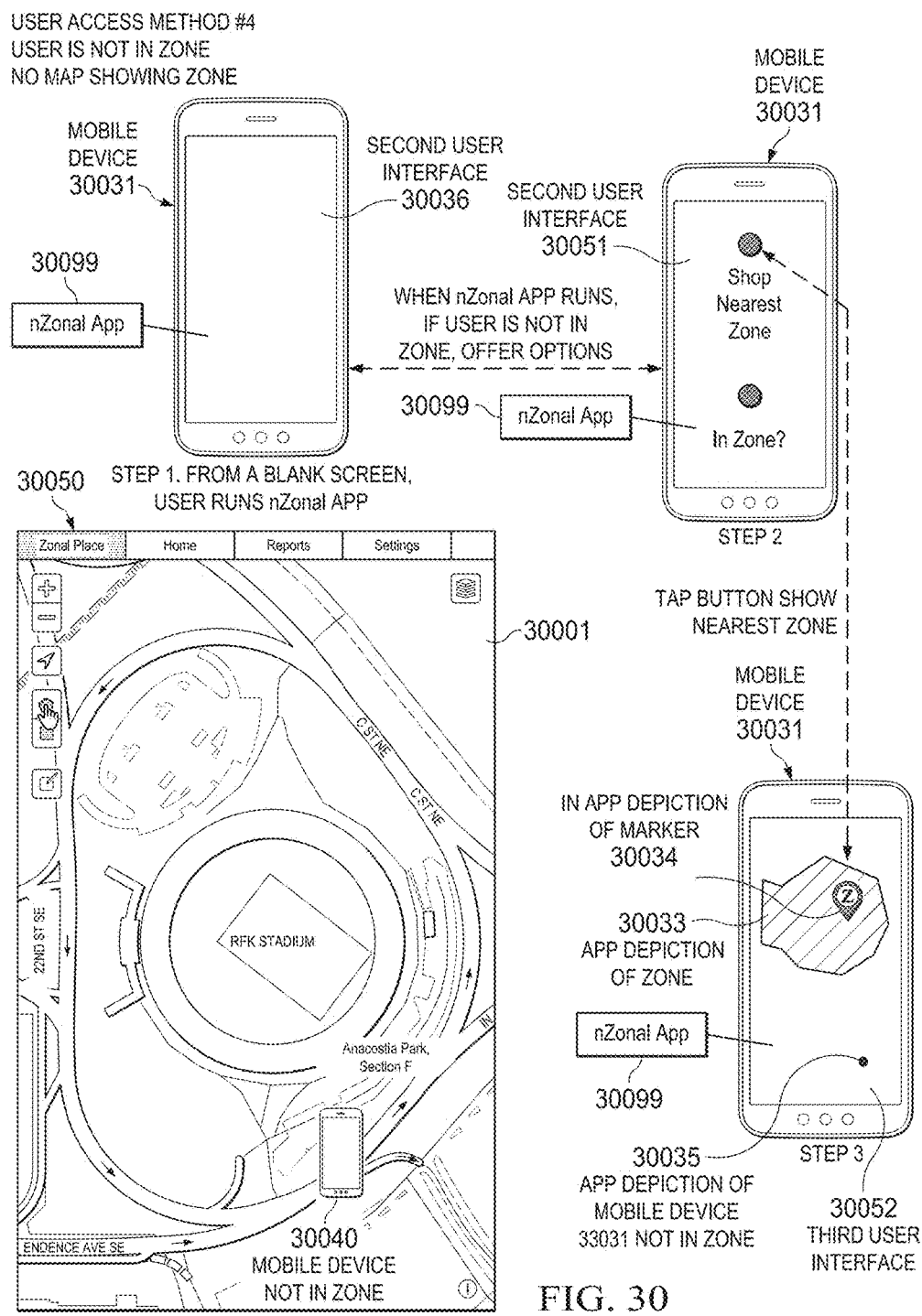
FIG. 30 is a view of the VGZ system for a user access method.

Referring to FIG. 30, a view of the system is shown for a fourth access method. The process described in FIG. 30 includes several operations that are performed with several devices or services.

User interface 30050 is a user interface displayed on a supervisor device, such as supervisor device 203 of FIG. 2A. User interface includes the display of map 30001 and depiction 30040 of mobile device 30031. User interface 30050 does not display the zone and does not display the marker that has already been associated with the geographical location of mobile device 30031.

Mobile device 30031 is an embodiment of user device 205 of FIG. 2A. Mobile device 30031 displays a first user interface 30036, second user interface 30051, and third user interface 30052. First user interface 30036 displays a blank screen, i.e., just prior to execution of the user application.

Second user interface 30051 is displayed after the user application has loaded and mobile device 30031 is not inside of a zone. Second user interface 30051 includes the display of two buttons, a first button that when clicked will show the nearest zone, and a second button that when clicked will identify whether mobile device 30031 is currently in a zone.

Third user interface 30052 is displayed after the user interacts with second user interface 30051 to show one or more zones that are near the present location of mobile device 30031. Third user interface displays depiction 30033 of the zone, depiction 30034 of a map marker, and depiction 30035 of mobile device 30031 that is outside of the zone being displayed.

As an initial step, the owner of a business at a physical location sets up a zone, as previously described. The zone is active and available to interact with mobile device 30031.

At a first step, the user application, also referred to as the nZonal App, determines if the mobile device is currently not located inside of a zone and displays one or more options related to not being within a zone.

At a second step, mobile device 30031 displays an option of "Show nearest zone" and the user of mobile device 30031 selects that option.

At a third step, the nearest zone is displayed on mobile device 30031 along with the position of mobile device 30031 in relation to the zone.

At a fourth step, if the location of mobile device 30031 moves outside of the geographical area displayed by third user interface 30052, then the user application repeats the second step and shows second user interface 30051 to display options for being outside of a zone.

Referring to FIG. 31, a flowchart for a method of creating a zone with an active marker, such as with the system of FIG. 30, is shown. Method 3100 includes several steps performed by different devices, services, or modules. Supervisor device 3102, user device 3106, VGZ server 3103, map administrator device 3104, and map owner database 3105 are respective embodiments of supervisor device 203, user device 205, VGZ system server 201, and map administrator device 237 of FIG. 2A. Map owner database 3105 is an embodiment of one or more of public map owner and databases 238 and private map owner and database 239 of FIG. 2A.

At step 3111, supervisor device 3102 is used to create and define a zone on a map via a web application running on supervisor device 3102. At step 3112, supervisor device 3102 sends the coordinates and information related to the zone that has been defined on the map to VGZ server 3103. At step 3113, VGZ server 3103 saves the zone that was defined using supervisor device 3102.

At step 3114, VGZ server 3103 sends a request to map owner database 3105 to associate the zone with the map without displaying the zone and without displaying a map marker. At step 3115, after receiving the request to associate the zone, map owner database begins to process the request and generates a request to send to map administrator device 3104 for verification. At step 3116, map owner database 3105 sends the request for verification to map administrator device 3104. At step 3117, Map administrator device 3104 receives the request for verification and processes the request. At step 3118, after the request is verified, map administrator device 3104 sends a notification to map owner database 3105 that the zone is verified without display of a marker. At step 3119, map owner database 3105 adds the zone but does not display a maker or the zone boundaries.

At step 3120, which is similar to the first step described in relation to FIG. 30, user device 3106 executes the zone user application while user device 3106 is not present within a zone. At step 3121, user device 3106 sends a message to VGZ server 3103 that includes a request for information to determine if user device 3106 is outside of one or more zones. At step 3122, VGZ server 3103, also referred to as VGZ zonal cloud, establishes a communication link with user device 3106 and generates a report that identifies that user device 3106 is not within or is outside of one or more zones.

At step 3123, VGZ server 3103 sends the report to user device 3106. At step 3124, user device 3106 identifies that it is not within a zone and displays one or more options related to not being within a zone.

At step 3125, which is similar to the second step described in relation to FIG. 30, the user of user device 3106 selects a "Show Nearest Zone" option. At step 3126, user device 31063 sends a query to VGZ server 3103 to find one or more zones that are near user device 3106. At step 3127, VGZ server 3103 receives the query and searches for one or more zones that are near or nearest to user device 3106.

At step 3128, VGZ server 3103 sends a response to user device 3106 that includes information about one or more zones that are near or nearest to user device 3106.

At step 3129, which is similar to the third step described in relation to FIG. 30, one or more of the nearest zones are displayed by user device 3106 along with the relative position of user device 3106 to the displayed zones. Optionally, a map is also displayed.

At step 3130, the user application running on user device 3106 waits for movement of user device 3106 and continuously updates the displayed position of user device 3106. At step 3131, if user device 3106 moves away from the zone that was displayed so that the zone is no longer displayed, then method 3100 proceeds to step 3132 to issue another query to VGZ server 3103 and repeat steps 3127 through 3131. If user device 3106 moves into the zone that was displayed, then the user application begins to engage with the zone as previously described.

Figure 32C:
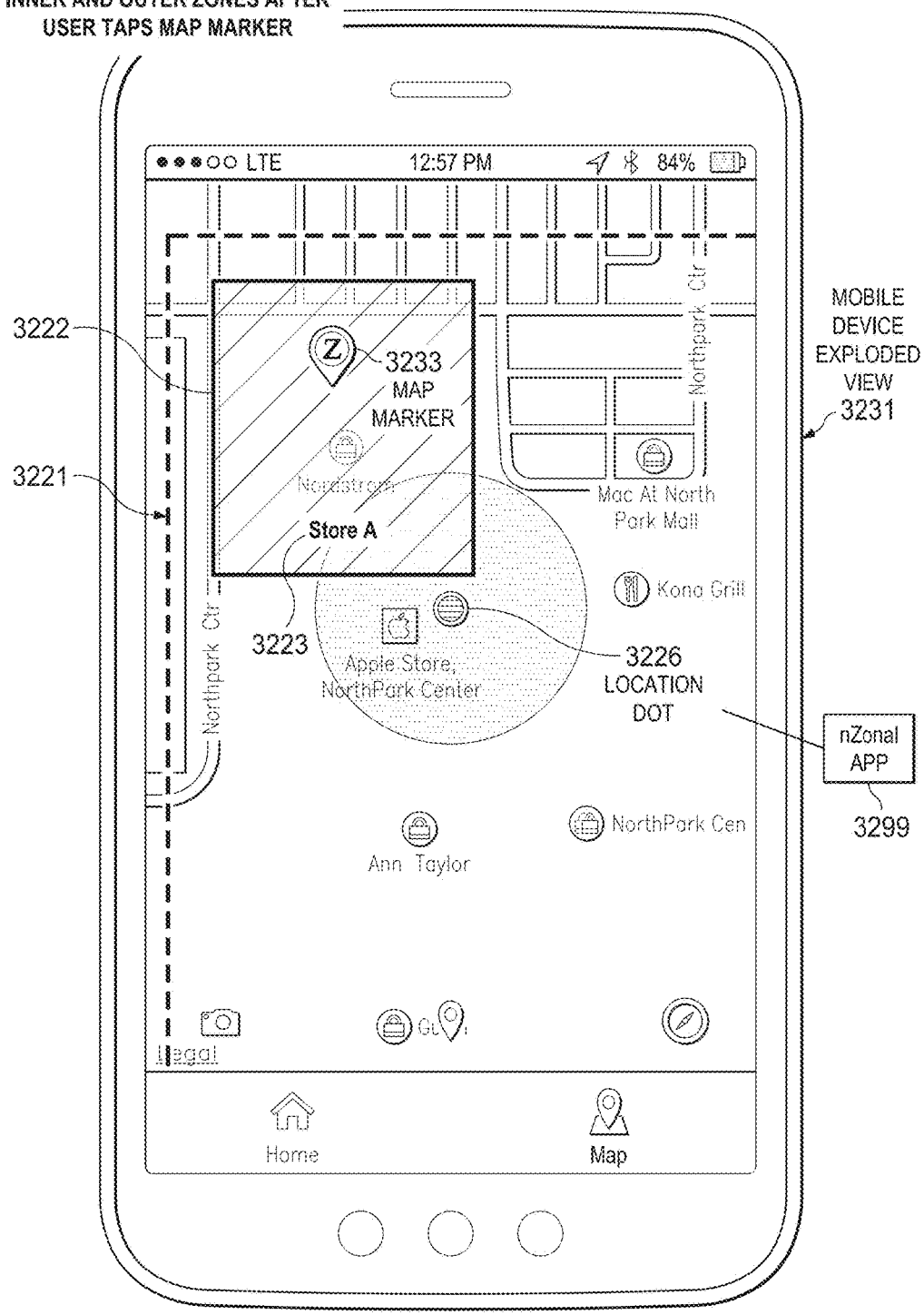

Referring to FIGS. 32A through 32C, the user interfaces for multiple devices are described for when the zones include inner and outer zones. FIG. 32A shows the user interface of a supervisor device, such as supervisor device 203 of FIG. 2A. FIGS. 32B and 32C show the user interface of a user device, such as user device 205 of FIG. 2A, which is running user application 3299.

In FIG. 32A, outer zone 3201 surrounds Shopping Mall 3200 in Dallas, Tex. The owner adds inner zone 3202 around department Store A, also referred to as store 3203. Inner zone 3202 that corresponds to store 3203 can be partially or wholly contained in outer zone 3201 of shopping mall 3200. The perimeter of inner zone 3202 identifies the location of inner zone 3202 with respect to the map displayed on the owner device. While shown on the supervisor device in FIG. 32A, the boundaries and marker related to inner zone 3202 do not appear on the user device until the user taps the map marker associated with the zone. If one map marker or zone overlaps the other, the map marker or zone may be shown on the user device numbered and stacked in layers like playing cards, with the largest zone at the bottom of the stack, or the most frequented zone on the top of the stack, etc. according to search criteria selected by the user. The user in turn can chose the zone they want by tapping the appropriate marker on a touch sensitive screen. When a user enters shopping mall 3200, and outer zone 3221 is shown on mobile device 3231, which corresponds to outer zone 3201 shown on the supervisor device. Outer zone 3221 is shown as a polygon bounded by a solid black line. Innermost zones, like inner zone 3222, are displayed with a solid black line. Outer zones like outer zone 3221 are displayed with differentiating combinations of dashed and dotted lines.

FIG. 32B depicts inner zone 3222 shown inside outer zone 3221. As mobile device 3231 is moved around shopping mall 3200, location dot 3226 is updated to show the current position of mobile device 3231 on mobile device 3231. Additionally, location dot 3206 in FIG. 32A is also updated on the supervisor device to show the present location of mobile device 3231.

FIG. 32C shows perimeter boundary and the cross hatching in inner zone 3222, which indicates that the user has tapped map marker 3233. Inner zone 3222 boundary and internal crosshatching are not shown until user taps map marker 3233. Map marker 3233 displayed on mobile device 3231 is associated with and corresponds to the same zone as map marker 3213 of FIG. 32A that is displayed on the supervisor device.

Referring to FIG. 33, a flowchart for a method of creating a zone with an active marker, such as with the system of FIGS. 32A through 32C, is shown. Method 3300 includes several steps performed by different devices, services, or modules. Supervisor device 3302, user device 3306, VGZ server 3303, map administrator device 3304, and map owner database 3305 are respective embodiments of supervisor device 203, user device 205, VGZ system server 201, and map administrator device 237 of FIG. 2A. Map owner database 3305 is an embodiment of one or more of public map owner and databases 238 and private map owner and database 239 of FIG. 2A.

At step 3311, supervisor device 3302 is used to create and define a zone with an active marker on a map via a web application running on supervisor device 3302. At step 3312, supervisor device 3302 sends the coordinates and information related to the zone and active marker that has been defined on the map to VGZ server 3303. At step 3313, VGZ server 3303 saves the zone that was defined using supervisor device 3302.

At step 3314, VGZ server 3303 sends a request to map owner database 3305 to associate and place an active map marker on the map related to the zone. At step 3315, after receiving the request to place the active map marker, map owner database begins to process the request and generates a request to send to map administrator device 3304 for verification. At step 3316, map owner database 3305 sends the request for verification to map administrator device 3304. At step 3317, Map administrator device 3304 receives the request for verification and processes the request. At step 3318, after the request is verified, map administrator device 3304 sends a notification to map owner database 3305 that the active marker is verified. At step 3319, map owner database 3305 adds a red letter "Z" or other means of graphically signifying that a zone now exists at that place to the marker that is placed on a map that is related to the zone defined by supervisor device 3302.

At step 3320, a user runs a user application, also referred to as the nZonal App, on user device 3306. At step 3321, user device 3306 sends a request to VGZ server 3303 and establishes communication between VGZ server 3303 and user device 3306.

At step 3322, the communication link between the user application running on user device 3306 and VGZ server 3305, also referred to as VGZ Zonal Cloud, is established. VGZ server detects that user device 3306 is inside of an outer zone that has associated with it one or more inner zones. VGZ server gathers information related to one or more zones nearest to user device 3306.

At step 3323 the information gathered by VGZ server 3303 about the zones that are nearest to user device 3306 is sent from VGZ server 3303 to user device 3306.

At step 3324, the user application running on user device 3306 detects that user device 3306 is outside of an inner zone that has been defined for a store and displays a map marker for the store based on the information received from VGZ server 3303. At step 3325, the user taps the inner zone active marker. At step 3326, in response to the tap, user device 3306 sends a query to VGZ server 3303. At step 3327, VGZ server 3303 receives the query and generates a response that includes the information, actions, and/or tasks that have been associated with the map marker and the inner zone related to the query request.

At step 3328, VGZ server 3303 sends a response to the query that includes the information, actions, and tasks that are associated with the zone. At step 3329, after receiving the response, user device 3306 displays an offer associated to one of the actions from the response from VGZ server 3303. At 3330, the user takes advantage of the offer via user device 3306.

Figure 34B:
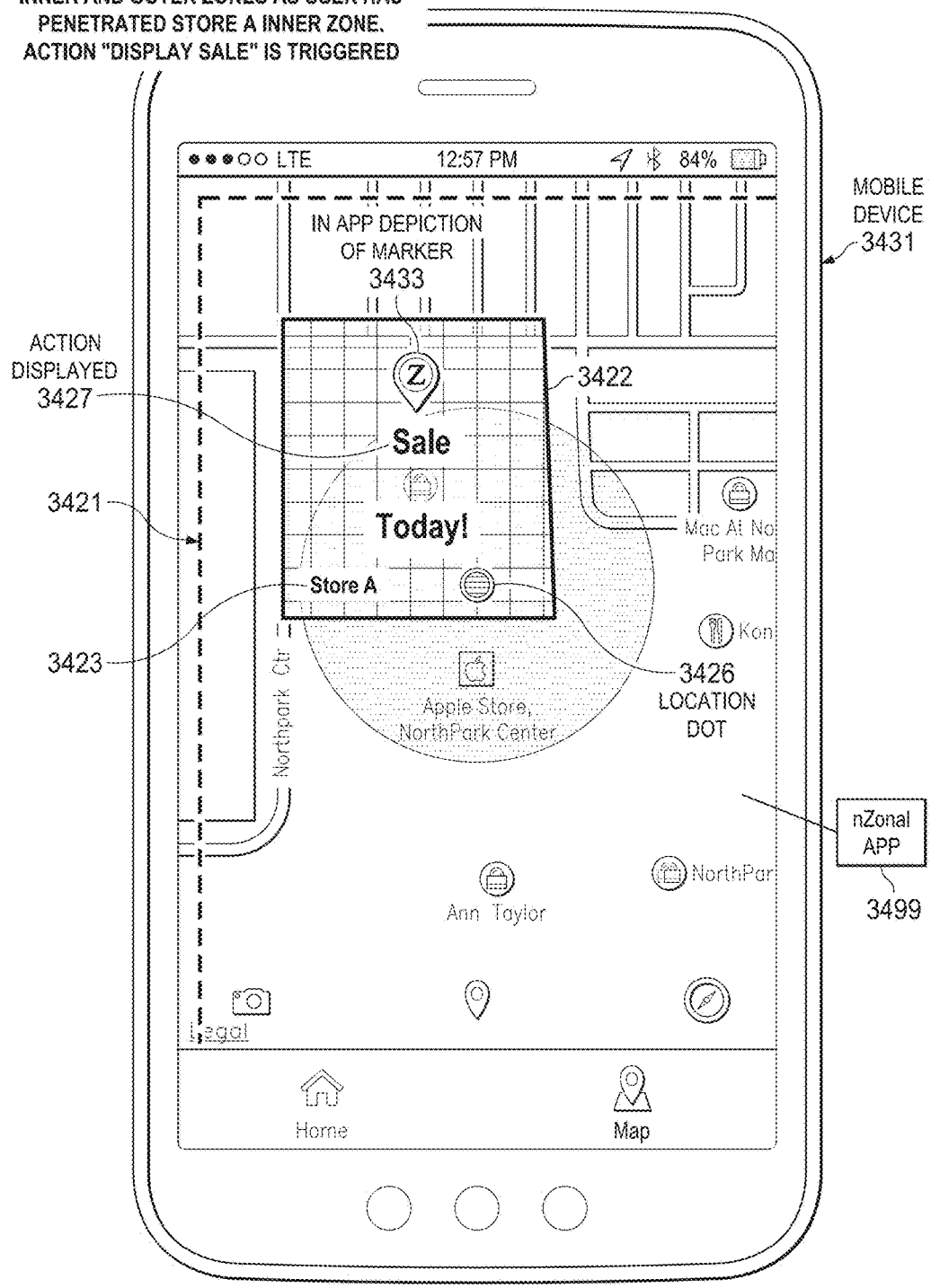

Referring to FIGS. 34A and 34B, the user interfaces for multiple devices are described for when the zones include inner and outer zones. FIG. 34A shows the user interface of a supervisor device, such as supervisor device 203 of FIG. 2A. FIG. 34B show the user interface of a user device, such as user device 205 of FIG. 2A, which is running user application 3499.

In FIG. 32A, location dot 3206 is displayed outside of inner zone 3202 on the supervisor device. In FIG. 34A, location dot 3406 is displayed inside of inner zone 3402 on the supervisor device.

In FIGS. 32B and 32C, location dot 3226 is displayed on mobile device 3231 outside of Store A inner zone 3222. In FIG. 34B, location dot 3426 is inside Store A inner zone 3422. When mobile device 3431 (and by association location dot 3426) enters inner zone 3102 of store 3423, action 3427 is triggered on mobile device 3431.

In FIG. 34B, action 3427 has been triggered. In this case the action is to display "Sale Today" on mobile device 3431. Inner zone 3422 of store 3423 can extend out into Shopping Mall outer zone 3421 some distance beyond the geographical boundaries of Store A so that users walking past the entrance of Store A will trigger zone action 3427.

Figure 35:
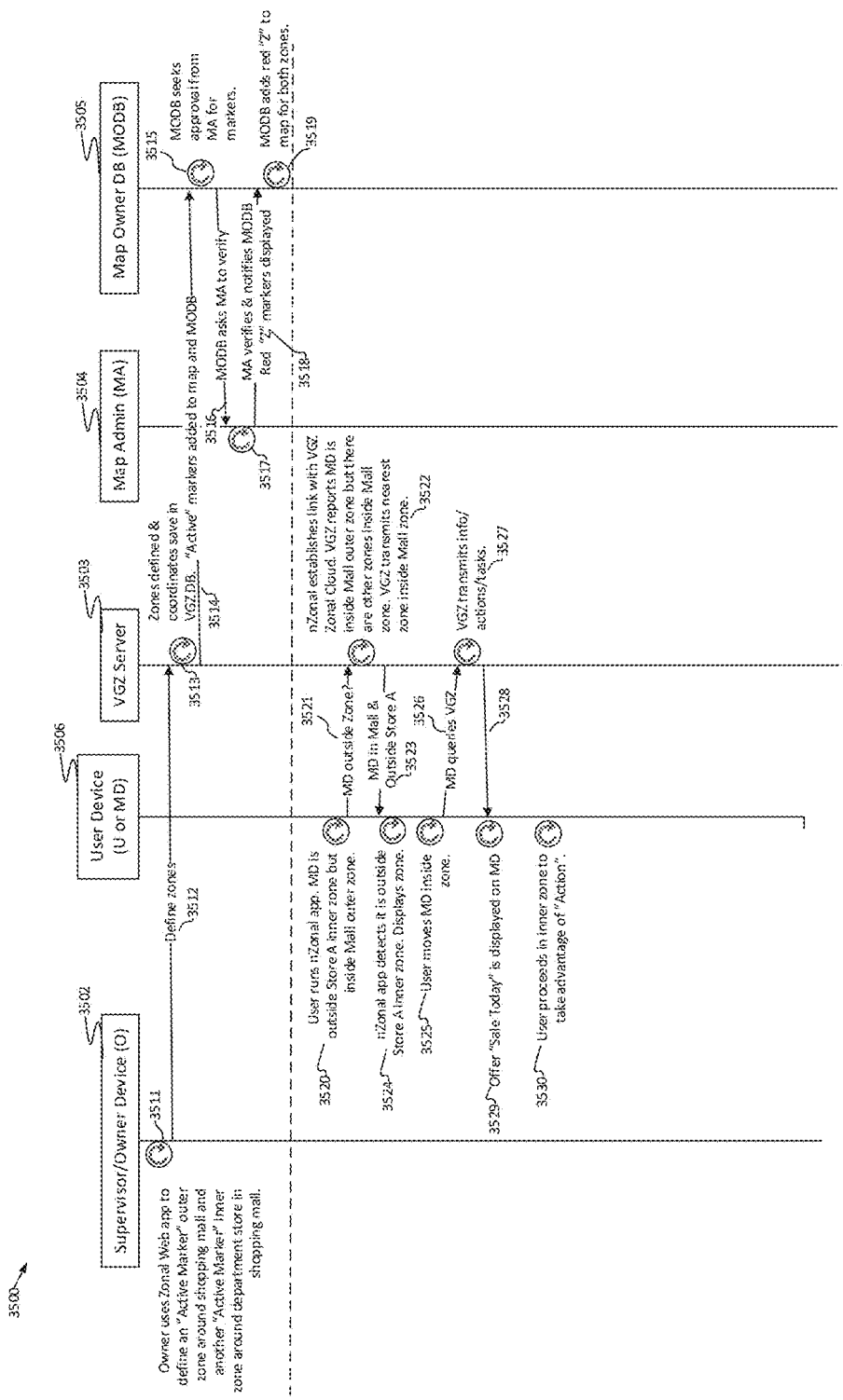
FIG. 35 is a flowchart of a method for a user access method.

Referring to FIG. 35, a flowchart for a method of tracking user movement within a nested zone, such as with the system of FIGS. 34A and 34B, is shown. Method 3500 includes several steps performed by different devices, services, or modules. Supervisor device 3502, user device 3506, VGZ server 3503, map administrator device 3504, and map owner database 3505 are respective embodiments of supervisor device 203, user device 205, VGZ system server 201, and map administrator device 237 of FIG. 2A. Map owner database 3505 is an embodiment of one or more of public map owner and databases 238 and private map owner and database 239 of FIG. 2A.

At step 3511, supervisor device 3502 is used to create and define one or more outer and inner zones with an active marker on a map via a web application running on supervisor device 3502. At step 3512, supervisor device 3502 sends the coordinates and information related to the zone and active marker that has been defined on the map to VGZ server 3503. At step 3513, VGZ server 3503 saves the zone that was defined using supervisor device 3502.

At step 3514, VGZ server 3503 sends a request to map owner database 3505 to associate and place an active map marker on the map related to the zone. At step 3515, after receiving the request to place the active map marker, map owner database begins to process the request and generates a request to send to map administrator device 3504 for verification. At step 3516, map owner database 3505 sends the request for verification to map administrator device 3504. At step 3517, Map administrator device 3504 receives the request for verification and processes the request. At step 3518, after the request is verified, map administrator device 3504 sends a notification to map owner database 3505 that the active marker is verified. At step 3519, map owner database 3505 adds a red letter "Z" or other means of graphically signifying that a zone now exists at that place to the marker that is placed on a map that is related to the zone defined by supervisor device 3502.

At step 3520, a user runs a user application, also referred to as the nZonal App, on user device 3506. User device is inside of an outer zone, such as outer zone 3421 of FIG. 34B, but is not inside of an inner zone, such as inner zone 3422 of FIG. 34B. At step 3521, user device 3506 sends a request to VGZ server 3503 and establishes communication between VGZ server 3503 and user device 3506.

At step 3522, the communication link between the user application running on user device 3506 and VGZ server 3505, also referred to as VGZ Zonal Cloud, is established. VGZ server detects that user device 3506 is inside of an outer zone that has associated with it one or more inner zones. VGZ server gathers information related to one or more zones nearest to user device 3506.

At step 3523 the information gathered by VGZ server 3503 about the zones that are nearest to user device 3506 is sent from VGZ server 3503 to user device 3506.

At step 3524, the user application running on user device 3506 detects that user device 3506 is outside of an inner zone that has been defined for a store and displays a map marker for the store based on the information received from VGZ server 3503. At step 3525, the user taps the inner zone active marker. At step 3526, in response to the tap, user device 3506 sends a query to VGZ server 3503. At step 3527, VGZ server 3503 receives the query and generates a response that includes the information, actions, and/or tasks that have been associated with the map marker and the inner zone related to the query request.

At step 3528, VGZ server 3503 sends a response to the query that includes the information, actions, and tasks that are associated with the zone. At step 3529, after receiving the response, user device 3506 displays performs an action associated to one of the actions from the response from VGZ server 3503, such as the action to display "Sale Today" on the inner zone depicted on the user device. At 3530, the user proceeds into the store and takes advantage of the offer via user device 3506.

Figure 36:
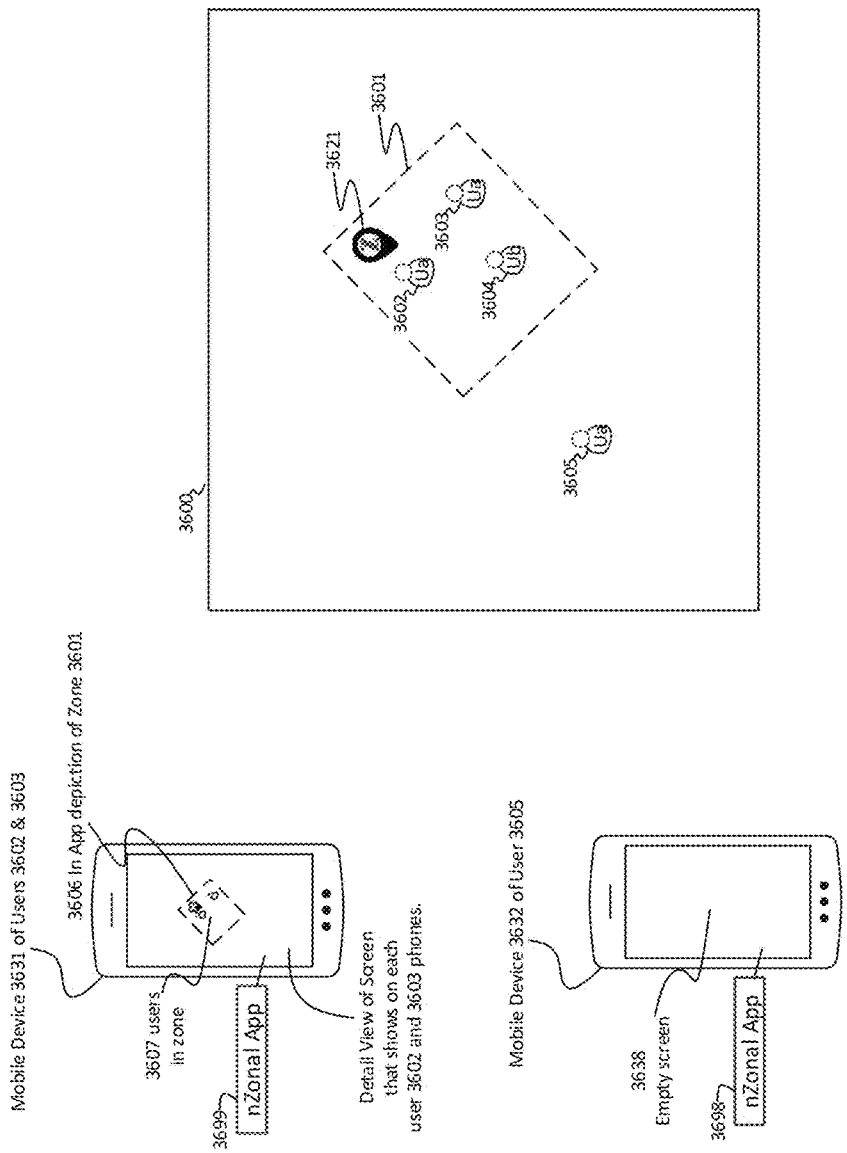
FIG. 36 is a view of the VGZ system for a social zone.

Referring to FIG. 36, a view of the system is shown for social zones. The process and system described in FIG. 36 includes several operations that are performed with several devices or services.

Screen shot 3600 is a screen shot from a user interface displayed on a supervisor device, such as supervisor device 203 of FIG. 2A. Screen shot 3600 displays social zone 3601 and user icons 3602 through 3605. User icons 3602 through 3605 represent the relative locations of user devices, in a hotel zone. User icons 3602 through 3604 are shown within social zone 3601 and user icon 3605 is not shown within social zone 3601.

Mobile device 3631 is an embodiment of the mobile device the user associated with user icon 3602 that is displayed on screen shot 3600 from a supervisor device. Mobile device 3632 is an embodiment of a mobile device of a user associated with user icon 3605 that is not within social zone 3601 displayed on the supervisor device.

In this embodiment, a hotel has set up one or more zones for its floor plan, such as social zone 3601 around a courtyard area shown on screen shot 3600. Social zone 3601 provides a common place where nZonal app users can find and meet like-minded people. The users associated with the user icons 3602 through 3604 are interested in in meeting each other and can share tips and ideas for how to use the user application or nZonal App. The social functions can be customized to the specific zone at the owner's option, such as specialized entertainment zones, geo-caching contest zones, etc. Users may identify themselves by type or category of user according to an identification criteria they use in their nZonal account, to allow their location to be revealed by type to other users having the same type and chose to see other users by type in the zoned area.

All social zone information is stored in the VGZ cloud, which is an embodiment of VGZ system server 201 of FIG. 2A. Each mobile device of each user is in communication with the VGZ Cloud.

Users associated with user icons 3602, 3603, 3604 and 3605 each run the nZonal App on their mobile devices respective mobile devices. User icons 3602, 3603, and 3605 include the letters "Ua" to indicate that the respective users are identified as type Ua. User icon 3604 includes the letters "Ub" to indicate that the respective user is identified as type Ub. Users may select their type from one or more different types, categories, or classes depending upon each individual user's likes or needs. In one embodiment, the types and categories are defined by the owner and include: business user of a first conference, business user of a second conference, vacation user, and so on. In one embodiment, the "Ua" type is for hotel guests and the "Ub" type is for hotel employees.

Mobile device 3631, which is associated with user icon 3602 shows depiction 3606 of social zone 3601, which was set up with a supervisor device. Mobile device 3631 shows user icons 3607 within depiction 3606 of social zone 3601 that include user icons 3602 and 3603 from screen shot 3600, but does not show a depiction of user icons 3604 or 3605.

Mobile device 3632, which is associated with the user indicated by user icon 3605 on screen shot 3600 from the supervisor device, shows empty screen 3638 because the position of mobile device 3632 is not within the social zone depicted as social zone 3601 on screen shot 3600 and depicted as social zone 3606 on mobile device 3631.

User 3605 gets the zonal profile by tapping on zonal marker 3621 displayed on a map on a touch sensitive screen on the mobile device of user 3605. When user 3605 enters the social zone while running the nZonal app, an alert will be sent to the mobile devices of the users of the same type associated with user icons 3602 and 3603 to alert them that the user associated with user icon 3605 is running the nZonal app and has entered the social zone. An alert is not sent to user 3604 and user 3604 will not be displayed on the devices associated with user icons 3602, 3603, and 3605 since user 3604 is of type "Ub" and users 3602, 3603, and 3605 are of type "Ua". After entering the social zone, the user interface of mobile device 3632 of user 3605 will be updated to show the social zone and the other users within the social zone that have the same type selected.

The users associated with user icons 3602 and 3603 are able acknowledge the alert that was sent. In one embodiment, the users associated with user icons 3602 and 3603 can establish direct contact with the user of mobile device 3632, who is associated with user icon 3605, after mobile device 3632 is brought within social zone 3601. The direct contact may be in the form of instant messaging that is facilitated through a chat session provided by the owner website.

Figure 37:
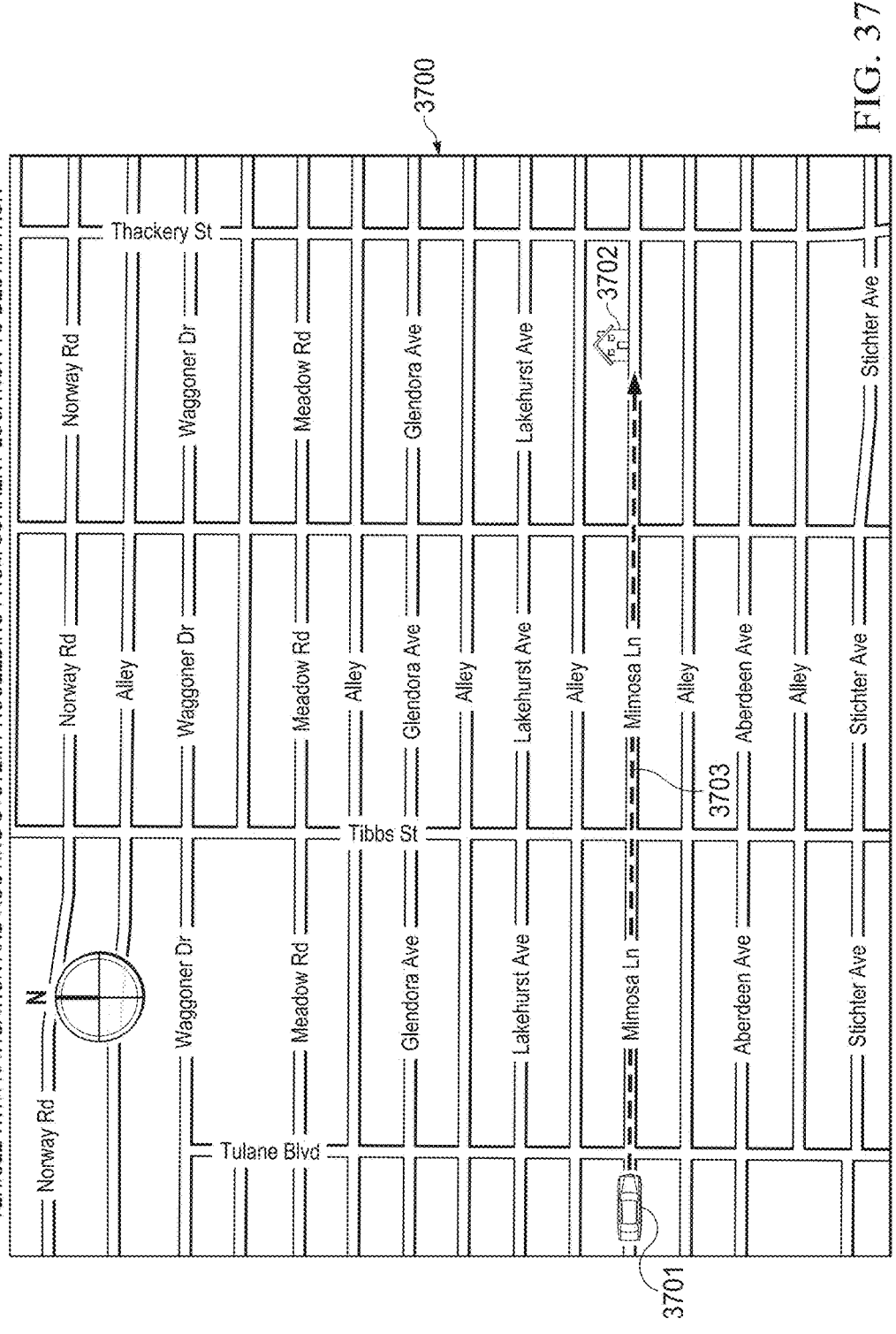
FIG. 37 is a view of the VGZ system for navigation routing.

Referring to FIG. 37, shows a map displayed on a user interface for vehicle navigation and routing, including the control of autonomous vehicles.

Map 3700 is displayed on a user interface of a user device, such as user device 205 of FIG. 2A. The user device can be implemented as part of a vehicular navigation system that is installed into vehicle represented by icon 3701. In an alternative embodiment, the user device is implemented as a smartphone running the nZonal App and carried by the user that is sitting inside of the vehicle represented by icon 3701.

The user starts the navigation system in the vehicle and determines that the user device is headed East on Mimosa Ln.

The user tells the navigation system to navigate to house 3702, which is also on Mimosa Ln.

The navigation system analyzes potential routes for street blockages or other situations that could cause a need for traffic re-routing.

In this case, the navigation system determines that the vehicle does not need to be re-routed from the current course and plots route 3703, a straight line East from the vehicle's current location, to proceed directly to house 3702. The vehicle associated with icon 3701 proceeds directly along route 3703 to the destination, house 3702.

Figure 38:
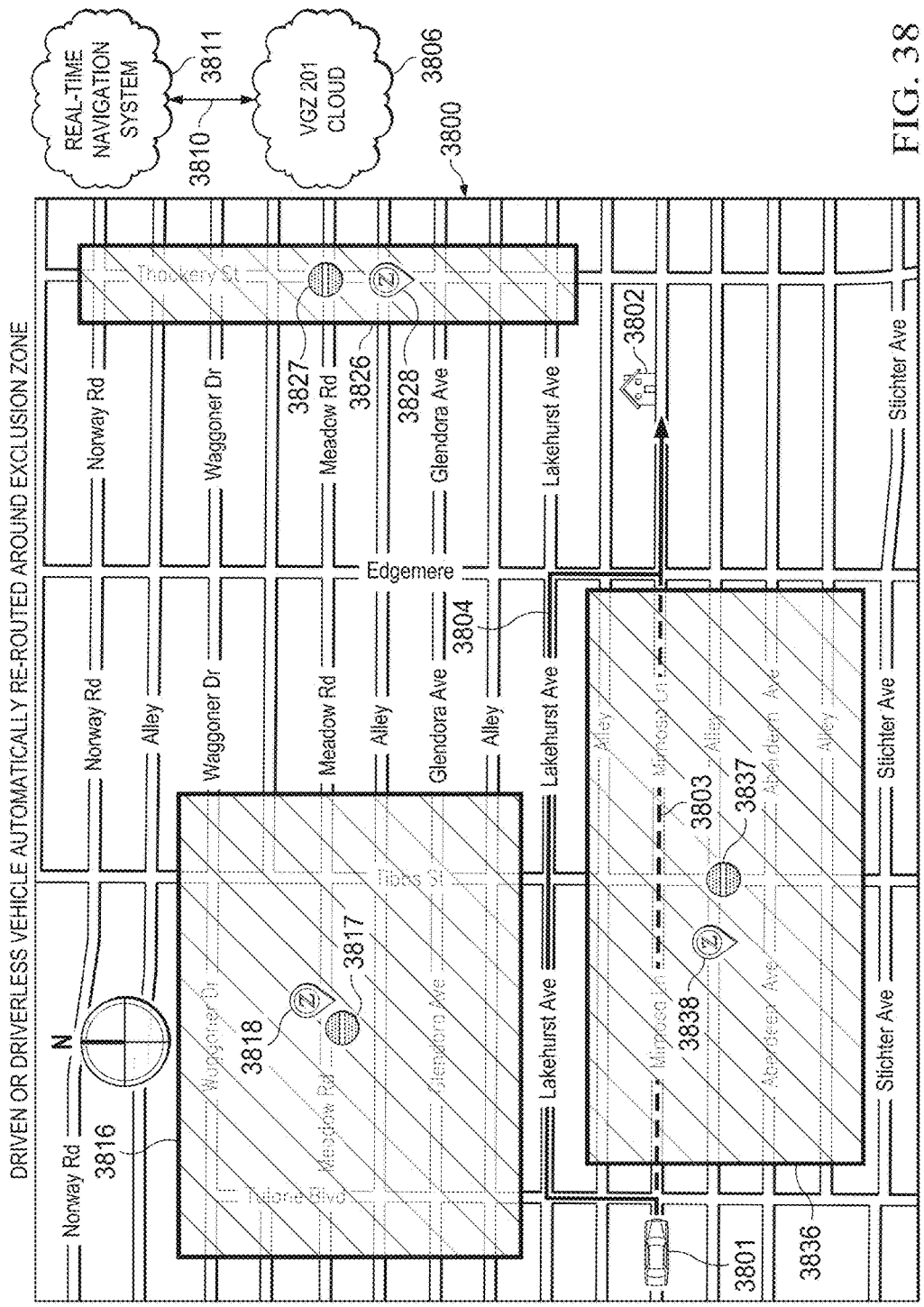
FIG. 38 is a view of the VGZ system for navigation routing.

Referring to FIG. 38, shows a map on a user interface for vehicle navigation and routing. Map 3800 is displayed on a user interface of a user device, such as user device 205 of FIG. 2A. The user device can be implemented as part of a vehicular navigation system of a user driven or autonomously or semi-autonomously driven vehicle that is installed into vehicle represented by icon 3801. In an alternative embodiment, the user device is implemented as a smartphone running the nZonal App and carried by the user that is sitting inside of the vehicle represented by icon 3801.

In this embodiment and referring to map 3800, user with mobile device 3801 or mobile device equipped vehicle 3801 starts navigation system in the vehicle associated with icon 3801. The navigation system determines that the vehicle is headed East on *Mimosa* Ln. The user device in the vehicle is also equipped with a real-time navigation system (RTNS) 3811 or a frequently uploaded navigation system. In one embodiment, the RTNS is a GPS navigation device that identifies the location of the device and provides navigation and direction information to a user of the device. In one embodiment, the RTNS includes hardware and software as part of a smartphone or a built-in car navigation device.

All zone information is stored in the VGZ cloud 3806, which is an embodiment of VGZ system server 201 of FIG. 2A. VGZ Cloud 3806 notifies registered RTNS 3811 of exclusion zone 3836 and, via prior arrangement, requests that RTNS 3811 flag portions of Mimosa Lane, Aberdeen Avenue, and the surrounding alleys with a "No Entry" road using icon 3807, which effectively makes the street a dead end for navigation purposes. RTNS 3811 acknowledges request and so notes Mimosa Lane is blocked between Tibbs St and Edgemere. Zones 3816, 3826, and 3836 are exclusion zones that prevent routes from being planned through certain areas of the map, including streets, alleys, and intersections. Zones 3816, 3826, and 3836 respectively include icons 3817, 3827, and 3837 that are displayed on zones 3816, 3826, and 3836 to indicate that zones 3816, 3826, and 3836 are exclusion zones and should not be entered. Zones 3816, 3826, and 3836 respectively include markers 3818, 3828, and 3838 that are displayed on zones 3816, 3826, and 3836 for interaction with zones 3816, 3826, and 3836 by touching or clicking markers 3818, 3828, and 3838.

The user tells navigation system in vehicle 3801 that he wants to go to home 3802, which is also on Mimosa Ln.

Navigation system analyzes potential routes via one of a real time link RTNS 3811 or through the link to VGZ Cloud 3806. In either case the goal is to check for street blockages or other situations that could cause a need for traffic re-routing. In either case the navigation system of car 3801 determines it cannot take straight route 3803 because of one or more blockages that are retrieved from RTNS 3811 or from VGZ Cloud 3806.

The navigation system plots alternative route 3804 around zones 3816, 3826, and 3836 and proceeds to destination home 3802 via route 3804. Authorized areas are shown as unshaded.

Whether implemented as a mobile device or a car navigation system, the user interface of the user device: 1) shows one or more zone areas and displays a prohibited zone as shaded with street access blocked at a boundary. VGZ server 3806 can alter the car's mapping system to see the roads as being blocked or dead-ends.

When a user drives the vehicle or a semi-autonomous vehicle drives itself toward a prohibited or blocked zone, the user, or the semi-autonomous vehicle's control system identifies that all streets into prohibited zone are blocked at one or more boundaries and takes route 3804 to arrive at home 3802.

Alternatively, an autonomous or driverless vehicle is automatically re-routed via route 3804 around the one or more prohibited areas and arrives at home 3802.

If a vehicle continues East on Mimosa and drives into the zone, the system notifies Owner and sounds alarm on user's mobile device that the prohibited zone has been entered.

Figure 39:
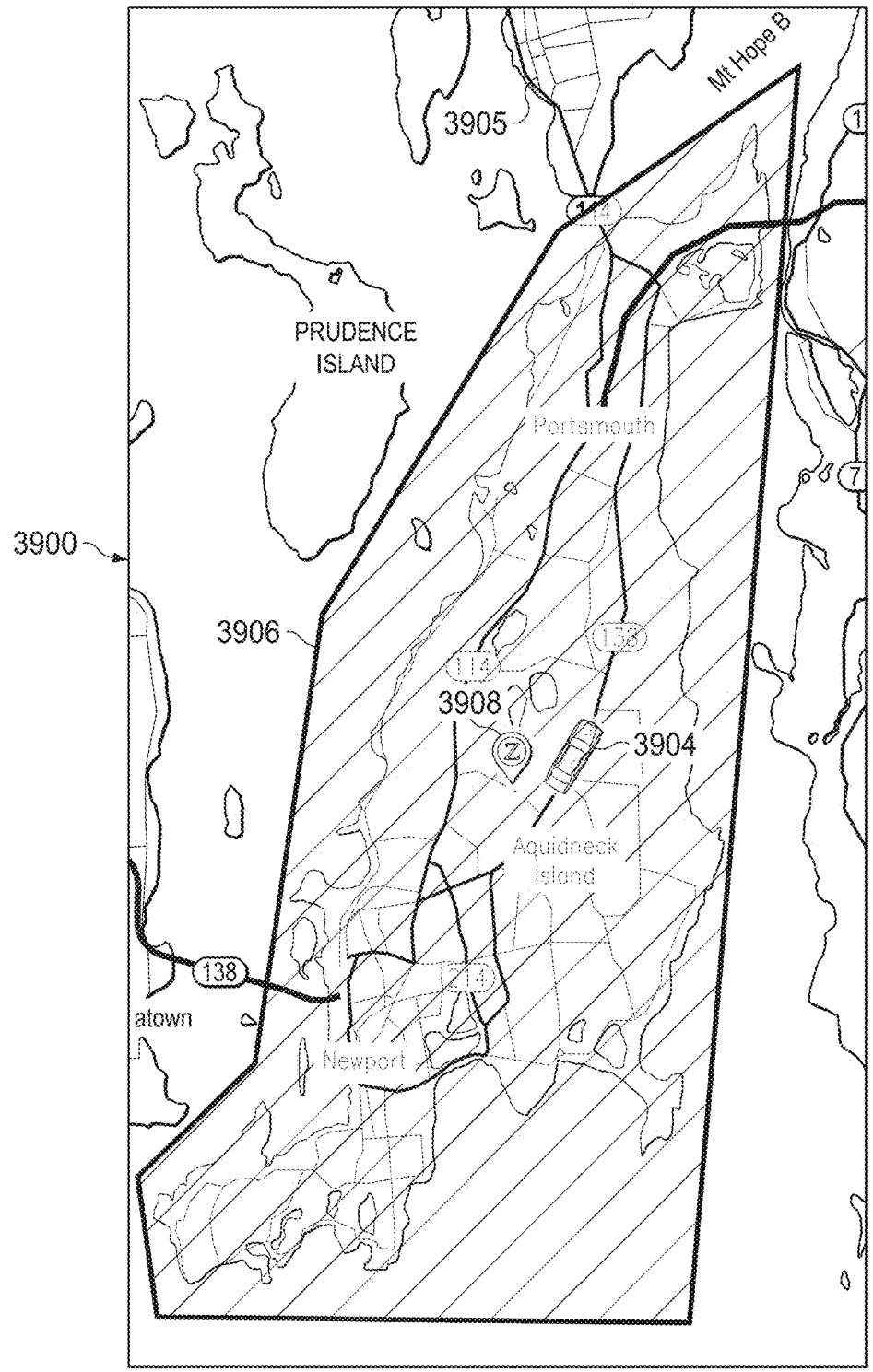
FIG. 39 is a view of the VGZ system for navigation routing.

Referring to FIG. 39, a map is shown from a user interface display for vehicle navigation and routing. Map 3900 is displayed on a user interface of a user device, such as user device 205 of FIG. 2A. The user device can be implemented as part of a vehicular navigation system that is installed into vehicle 3904 represented by an icon on map 3900 and is running a version of the nZonal app. In an alternative embodiment, the user device is implemented as a smartphone running the nZonal App and carried by the user that is sitting inside of the vehicle 3904 represented by the icon on map 3900.

The owner desires to confine to an inclusion zone, one or more user driven or autonomously driven robotic vehicles located on Aquidneck Island, R.I. Each such vehicle uses a navigation system that communicates with the VGZ cloud, which is an embodiment of VGZ system server 201 of FIG. 2A and each navigation system of each vehicle is running a version of the nZonal app.

The owner sets up zone 3906 which is an inclusion zone that surrounds the island and evidences the zone by putting marker 3908 on map 3900. The VGZ cloud blocks all routes that cross a boundary of zone 3906, creating virtual road blocks where the zone boundary crosses a street.

The mobile device user can access the zone's profile by tapping zone marker 3908 on a touch sensitive screen that displays marker 3908 on map 3900. Zone profile information can be stored on the Owner's device or stored in the VGZ cloud. The VGZ cloud notifies the vehicle's navigation system of each of the blocked routes and overrides the vehicle's navigation system to prevent the vehicle from attempting to cross the virtual road blocks.

As long as vehicle 3904 is told to go to addresses that are on the island or a driven car simply stays within zone 3906, vehicle functions normally delivering payload and passengers to destinations within zone 3906.

If vehicle 3904 is given address 3905, which would cause vehicle 3904 to cross one of the boundaries of zone 3906, vehicle will not proceed to address 3905 since the route to 3905 is blocked. Alternatively, where vehicle 3904 is a driven car, vehicle 3904 can be prevented proceeding outside of the zone beyond the virtual road block by using a speed limiter that limits the speed of the vehicle outside inclusion zone 3906 or engine lock that locks up the engine and prevents the car from moving outside inclusion zone 3906. In similar fashion, an autonomous vehicle may be sent to a location in a zone, then be confined within the inclusion zone as described above. The same methodology of using discoverable place zones may be employed on farm vehicles that are equipped with automatic steering.

Referring to FIG. 40A, a system for parking cars using one or more zones is described.

The owner of parking lot 4000 deploys VGZ parking application and evidences such parking zone with marker 4008 on a map.

The owner define entry/exit zone 4002. Entry and exit to parking lot 4000 is controlled by mechanical gate 4001. The user in vehicle 4004, accesses the parking zone information by tapping zone marker 4008 displayed on a touch sensitive screen on a mobile device, which may be a mobile phone or the vehicle's on-board navigation system.

When vehicle 4004 enters zone 4002, the application for the zone causes the mechanism of the gate arm to be raised and the vehicle's time of entry is recorded and the user then parks car 4004 in parking lot 4000. If the user in car 4004 does not have the nZonal app on mobile device in the car, the mechanical gate will not open.

Later, the user re-enters vehicle 4004 to leave. Vehicle approaches gate 4001 and enters zone 4002 to exit the parking lot. A user's zonal ID is logged with the exit time. A parking fee is calculated and charged to a user account.

In one embodiment, there is either a pressure or magnetic sensitive plate or wire loop/coil in the drive or the cameras visually check to determine a car is in zone 4002.

In one embodiment, the system can report occupied parking places at any time to either the web application running on a supervisor device or the nZonal app running on a user device.

In one embodiment, passage of a user's vehicle through zone 4002 can be confirmed via one or more of video observance, via a pressure sensitive plate or entering the field of a wire loop/coil. The pressure plate keeps the system from falsely recording a vehicle's departure when the user removes their mobile device from the vehicle and leaves the zone on foot.

In one embodiment, the wire loop/coil is an oval that is about 4'×10', which is similar to wire loops built into the concrete at stop lights. When a vehicle enters the field of the loop, the vehicle changes the impedance of the coil/loop and triggers the stop light to cycle, or in this case, provides a notification to the system that the vehicle is at the gate.

Cameras 4010, 4011, 4012, and 4013 all record events in the parking lot in real time, track ingress and egress of vehicles through zone 4002, and keep track of which spaces are available. The open spaces or the quantity of open spaces can be displayed on the mobile device.

In one embodiment, a zone is defined for each parking space and the quantity of open spaces, as determined by pressure or magnetic sensitive plates or cameras or entering the field of a wire loop/coil, are displayed on a user's mobile device via the zones defined for the spaces.

Referring to FIG. 40B, an embodiment that uses virtual geographic zones for toll roads is illustrated. Toll road 400201 includes West-bound lanes 400202 and East-bound lanes 400203. Vehicles enter West-bound lanes 400202 at entrance ramp zone 400211 and exit West-bound lanes 400202 at exit ramp zone 400212. Vehicles enter East-bound lane 400203 at entrance ramp zone 400214 and exit East-bound lane zone 400203 at exit ramp zone 400213. In one embodiment, the toll collection system uses one or more physical gates or virtual gates (such as the zones at entry ramps/lanes 400211 and 400214 and exit ramps/lanes 400213 and 400212) at the entrance and exit ramps or lanes of the toll road.

The same methodology as used in a parking lot or garage may be applied to a toll road such that a vehicle entering the toll road via a toll zone, such as entrance lane 400211 and entrance lane 400214, may actuate a camera, whose locations are indicated by a "C" on FIG. 40B, to photograph the vehicle's license plate and evidence the vehicle's access via the zonal app on a smart device or the vehicle's navigation system that is equipped with the zonal app. If the vehicle does not have the zonal app, the owner of the vehicle may be fined. The vehicle's exit from the toll road, such as at exit lane 400212 and exit lane 400213, may be similarly recorded and charged to the user's account. Embodiments of the user device include a smart phone of the driver and a computer system in the vehicle.

In one embodiment, each entrance and exit to a toll road, which may include gated or ungated entrances and exits, are associated with a zone or a subzone that may be evidenced with a marker on map, such as one of markers 400221, 400222, 400223, 400224. Information on the toll road's zones may be accessed by the user by tapping a touch sensitive screen that displays the zones' markers on a map, which can contain the information for all of the virtual toll gates on the road. When the zone or subzone of a toll entrance is entered by the zonal app user in a vehicle, the user device connects to the toll authority and the toll authority sends one or more actions to the user device using a secure connection. One of the actions is to pay the toll upon exiting the toll road using a pre-existing account that has already been linked to the user device and contains sufficient funds for the transaction. Upon selecting the action to pay the toll, the user device notifies a server of the toll authority over the secure connection that the toll is to be paid with the pre-existing account. Upon receiving the notification, the toll authority reduces the value of the account by the amount of the toll upon entrance or exit and, if a gated entrance or exit, sends a message to the gate to open and allow the user to pass. The presence of a vehicle at a toll gate can be determined automatically via one or more of video observance, via a pressure sensitive plate or entering the field of a wire loop/coil. If the user fails to pay the toll, a photograph of the vehicle's license plate can be taken and sent to the toll road authority for collection of the toll and a fine.

In one embodiment, the nZonal App on the user device includes sufficient permissions to automatically select the action of paying the toll. Automatically paying the toll reduces the amount of time spent by the user at the toll gate.

In one embodiment, the road could be segmented with zones for purposes of monitoring speeds.

Figure 41:
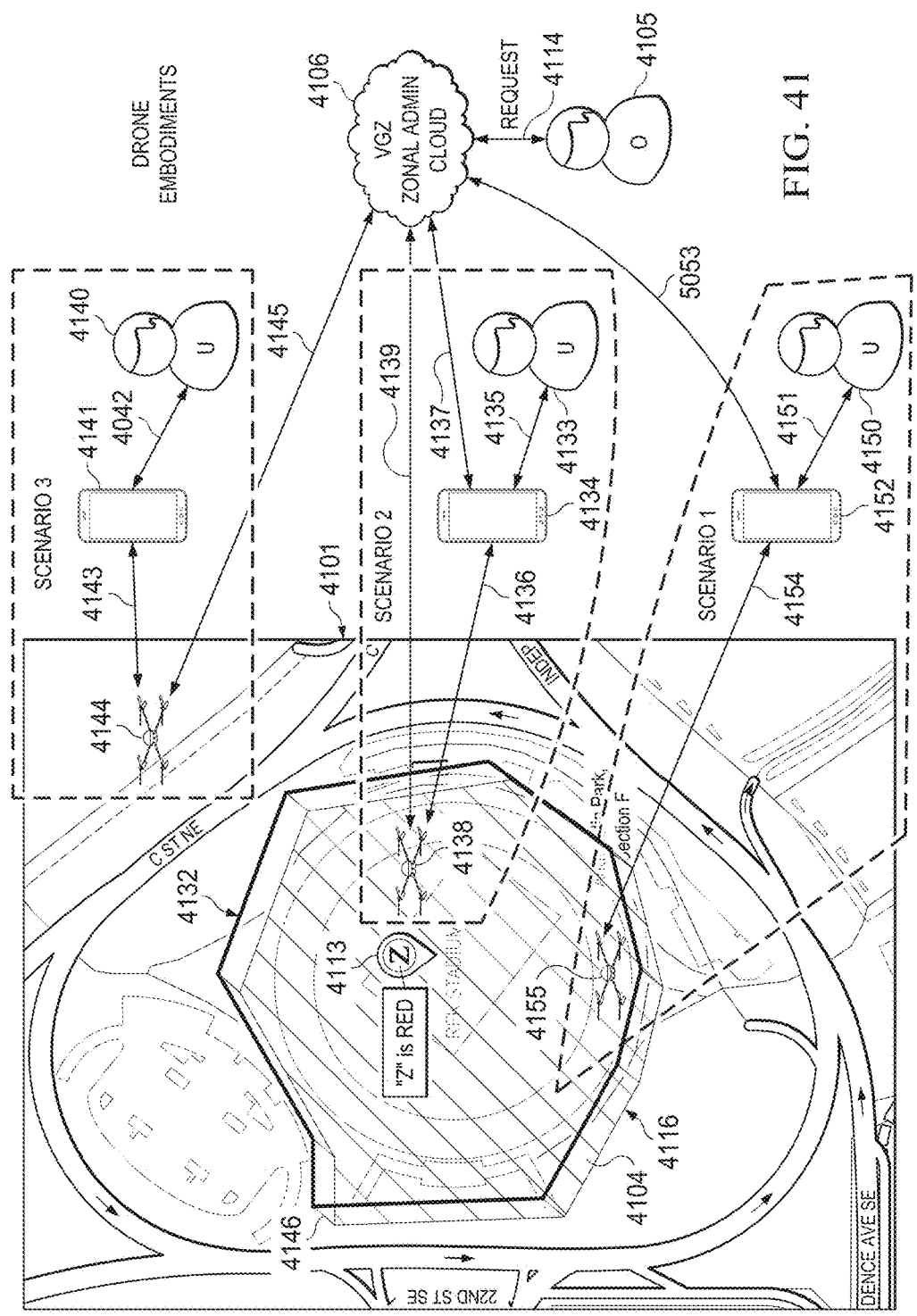
FIG. 41 is a view of the VGZ system for controlling drones.

Referring to FIG. 41, the use of virtual geographic zones with robotic vehicles is described.

As commercial and recreation flying drones become more popular, it is inevitable that government agencies will pass laws to govern their use or that property owners will either want to prohibit them from encroachments in air space or keep them within a defined flight area. The VGZ system is a tool for complete and accurate management of authorized and unauthorized air spaces for autonomous flying drones.

The VGZ system allows for multiple scenarios of the usage of drones over at a location, such as at a stadium hosting a noon football game.

In a non-limiting example, a television network might own the rights to broadcast a Noon football game at RFK stadium that will last from Noon until 4 pm.

The television network does not want any drones over the stadium for the 2 hours before and the 2 hours after the game to prevent any broadcast poaching of the game by unauthorized drones. The television network wants its own drones to be able to fly over the stadium, but does not want any other drones flying over the stadium.

Owner 4105 (using a supervisor device, such as supervisor device 203 of FIG. 2A) sends request 4114 to Zonal Admin Cloud 4106 (which is an embodiment of VGZ system server 201 of FIG. 2A) to add a 3rd and a 4th dimension to two-dimensional zone 4104. The 3rd dimension will add, in one embodiment, 300 feet of altitude 4146 to zone 4104 making it a polyhedron. The top 4132 of the polyhedron is set at "300 feet above ground level (AGL)", or any other desired altitude. Polyhedral zone 4104 now includes the volume bounded by zone boundary 4116 at ground level up to and including zone boundary 4132 at 300 feet AGL. The default altitude is subject to change based on FAA (Federal Aviation Administration) regulations for drones.

The request 4114 sent to Zonal Admin Cloud 4106 also includes a request to add a 4th or temporal dimension. Owner 4105 selects the zone to be active from about 10 am to about 6 pm on the day of the Noon football scheduled at the stadium.

In a first scenario controlled by VGZ Zonal Admin Cloud 4106, user 4150 is outside of zone 4104 and is using smartphone 4152 to control drone 4155. Even though smartphone 4152 is outside the zone 4104 and may not be aware of zone 4104, VGZ Zonal Admin Cloud 4106 is aware of the boundaries of zone 4104.

Since drone 4155 is controlled by drone software in smartphone 4152, the drone software in smartphone 4151 can use the application program interface (API) of the VGZ system to disallow unauthorized navigation by user 4150.

In the first scenario, the VGZ software in smartphone 4152 stops drone 4155 from being navigated into zone 4104 or forces drone 4155 to navigate around zone 4104 similar to the way the car navigated around the exclusion zones in FIG. 38.

In a second scenario, the VGZ API software is resident both in drone 4138 and smartphone 4134. The software in drone 4138 includes the VGZ system API and functionality so that drone 4138 can communicate directly with VGZ Zonal Admin Cloud 4106 via link 4139 in order to determine if drone 4138 is encroaching upon restricted zone 4104.

Smartphone 4134 is also able to link with VGZ Zonal Admin Cloud 4106 in order to display the position of drone 4138 relative to zone 4104, but the software in drone 4138 prevents drone 4138 from entering restricted zone 4104 or forces drone 4138 to navigate around zone 4104.

In the second scenario, the VGZ software in drone 4138 stops drone 4138 from navigating into zone 4104 (or causes drone 4138 to navigate around zone 4104) while the user monitors but does not control the movement of drone 4138.

In a third scenario, the VGZ API software is resident only in drone 4144. Avoidance of zone 4104 is completely under control of drone 4144. Smartphone 4141 still where drone 4144 flies due to drone control software loaded onto smartphone 4141, but zone avoidance is handled by drone 4144.

Drone 4144 control software flies drone 4144 normally, frequently checking with the VGZ system via the VGZ API to determine if drone 4144 has crossed into zone 4104 or if drone 4144's current navigation course will cross into zone 4104.

If drone 4144 crosses into zone 4104, then the drone control software, using the VGZ API, automatically takes control of drone 4144 and flies drone 4144 out of zone 4104.

Additional scenarios include where the controlling smartphone is inside the zone. In these scenarios, even though the phone is inside the zone, the drone can still be allowed to fly outside the zone so that the phone and the drone have different rights. The owner defining the zone selects the rights as desired. The methodology would apply to any robotic vehicle operating within a polyhedral zone, including zones for a high rise office building or parking garage. Similarly, the robot may be sent to such a zone from outside the zone, then confined within the zone after arrival.

Figure 42:
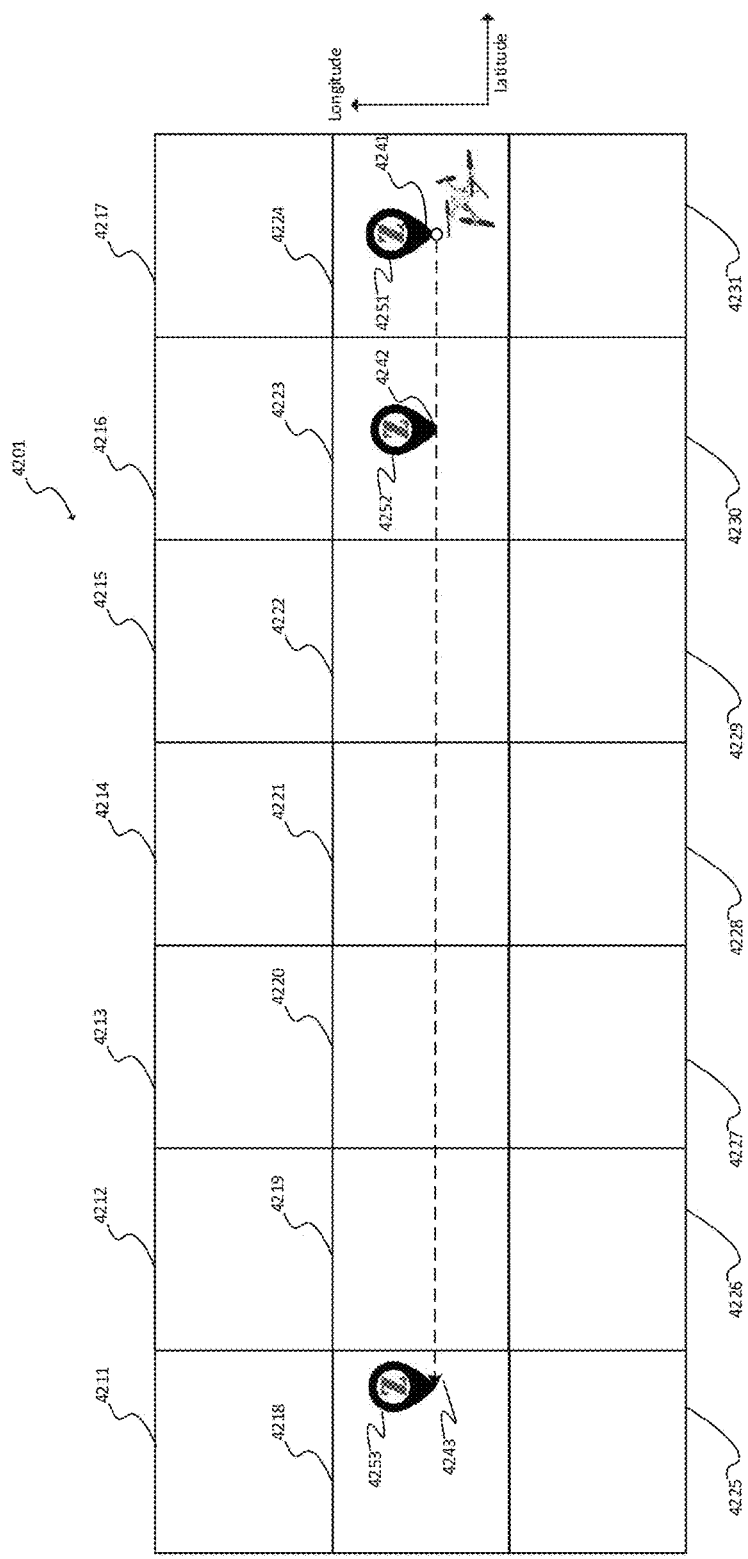
FIG. 42 is a two-dimensional projection used with a flight plan based on longitude and latitude.
Figure 43:
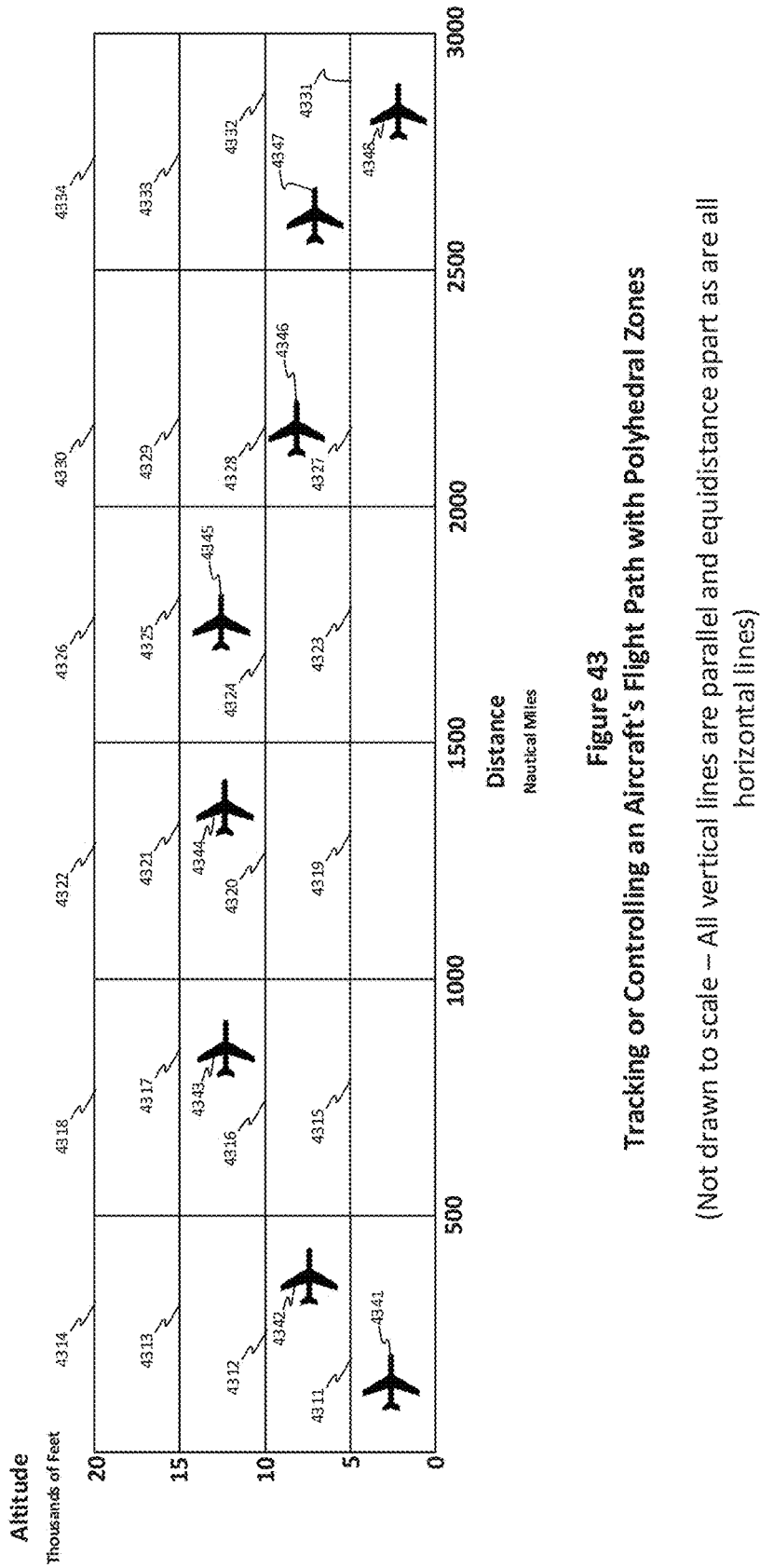
FIG. 43 is a two-dimensional projection used with a flight plan based on altitude and distance.

Referring to FIGS. 42 and 43, an aircraft's path is tracked through a series of contiguous zones similar to the way that a security officer is tracked on their tour. FIGS. 42 and 43 are not to scale.

FIG. 42 shows two-dimensional projection 4201 of contiguous zones 4211 through 4231 that is based on longitude and latitude. Projection 4201 is displayed by the system on one or more of a user device and a supervisor device. Route 4242 is based on a flight plan from an airport at point 4241 to an airport at point 4243. Zones 4218 through 4224 are a part of the flight plan. Zones 4211 through 4217 and 4225 through 4231 are not a part of the flight plan.

FIG. 43 shows a two-dimensional projection of contiguous zones 4311 through 4334 that is based on distance and altitude. Indicators 4341 through 4348 show the position of the aircraft with respect to zones 4311 through 4334 during the flight of the aircraft.

In one embodiment, zones 4311 through 4314 of FIG. 43 have the same longitude and latitude coordinates as zone 4224 of FIG. 42. In one embodiment, projection 4201 and projection 4301 are displayed by the system on one or more of a user device and a supervisor device, such as user device 205 and supervisor device 203 of FIG. 2A. Departure point 4241 is associated with marker 4251, flight path 4242 is associated with marker 4252, and destination point 4243 is associated with marker 4253. Markers 4251, 4252, and 4253 respectively allow for interaction with departure point 4241, flight path 4242, and destination point 4243.

The pilot of a drone or aircraft would run the nZonal "aircraft tracking" app on a smart device similar to a security officer running the nZonal "security" app from FIG. 3C. The "aircraft tracking" app function can be accomplished with or without Internet access, since it may recruit the smart device's GPS capabilities without Internet access. The process can be implemented by the user tapping a touch sensitive screen on a device at the displayed point of departure, 4241 on FIG. 42, and on another marker indicating the destination, 4243 on FIG. 42, creating a flight path 4242 through a database of polyhedral zones established for such purpose. The "aircraft tracking" app can report data to the VGZ server periodically as it moves both laterally and attitudinally through successive polygonal/polyhedral zones set up along the aircraft's flight plan. If the aircraft diverts from the flight plan, the app can access the next adjacent zone from a database of polyhedral zones established around the Earth for this purpose. In this manner, the aircraft can be tracked for conformance to a flight plan established by the user or supervisor and defined by a series of polyhedral zones similar to the way a security officer is tracked for schedule conformance and checkpoints. If certain non-conforming conditions are met, alarm messages can automatically be sent to the pilot and to flight controllers or authorities acting as supervisors.

FIG. 44 is a view of the system with movable zones that may be used around trains, ships or other vehicles where access to online services is confined to the vehicle or confined to where a user entering the vehicle's zone can be evidenced. Screen shot 4400 is from a user interface of a device, such as supervisor device 203 of FIG. 2A, used by the owner of a ship that is represented by ship image 4402. The ship is shown at a dock, represented by dock image 4404, with zone 4408 around the ship. Each time a ship docks at a port and is moored to a berth, the ship can be moored to the berth at slightly different latitude and longitude locations even though the location of the berth does not change. After the ship is moored, its location becomes constant enough for movable zone 4408 to be fitted around the ship. Users can obtain the ship's movable zonal access information from the ship owner's website or from QR codes or RFID devices displayed next to "Z" markers on an outline of the ship and displayed on the ship or at placards on the dock by the owner for that purpose.

Zone 4408 includes four vertices 4410 (point A), 4412 (point B), 4414 (point C), and 4416 (point D) forming a rectangle. Additional vertices may be added so that the shape of the zone conforms to the shape of the ship. Zone 4408 optionally includes one or more subzones, such as for each deck and for each cabin within the ship. Vertices 4410, 4412, 4414, and 4416 are relative to fixed point 4418, also referred to as fixed point Z, which is locked to the current location of the ship. In one embodiment, fixed point 4421, also referred to as fixed point W is another fixed point on the vehicle that can be used with fixed point Z to determine the heading of the vehicle.

Movable zone 4408 can be associated with any movable object, including: a train, a bus, a car, or the like.

In FIG. 44 owner of ship wants movable zone 4408 to always surround the ship and be based on points Z and W. The latitude and longitude of fixed points Z and W are associated with the known latitude and longitude of the ship obtained from the ship's navigation system. The latitude and longitude of vertices A, B, C, and D are defined relative to the latitude and longitude of fixed points Z and W so that movable zone 4408 formed by points ABCD will continually surround the ship. In certain embodiments, one or more of fixed points Z and W include values for latitude, longitude, altitude, roll, pitch, and yaw. The roll, pitch, and yaw can be measured by an inertial measurement unit that includes one or more accelerometers, gyroscopes, magnetometers, and the like. One or more of the latitude, longitude, altitude, roll, pitch, and yaw are used so that the orientation of movable zone 4408 can be synchronized with the orientation of the ship.

Movable zone 4408 is associated with a special movable zone module that is loaded into the nZonal app on a user's smartphone. The special movable zone module instructs the nZonal app running on a user device to use delta coordinates based on fixed points Z and W. The locations of points A, B, C, and D do not change relative to Z and W.

In one embodiment using longitude and latitude, point Z is at (0,0) to form an origin at an X-Y axis for a coordinate system for the movable zone. Point A is at $(-\Delta x, +\Delta y)$, point B is at $(-\Delta x, -\Delta y)$, point C is at $(+\Delta x, -\Delta y)$ and point D is at $(+\Delta x, +\Delta y)$ of the coordinate system of the movable zone. The movable zone module of the nZonal app saves these delta coordinates so they may be applied when the movable zone module receives the latitude and longitude of location Z. Point W is a fixed distance away from point Z. As the heading of the vehicle changes, point W rotates around point Z in a circular fashion. The coordinate system of the movable zone is rotated about point Z based on the position of W with respect to Z so that the actual latitude and longitude of points A, B, C, and D are updated even though their relative position to point Z does not change.

In one embodiment, fixed point Z corresponds to the location of first fixed wireless device 4420, which is a wireless local area network (WLAN) access and location device (also referred to as a super Wi-Fi access point) that provides Internet connectivity and provides location information and is fixed to a certain location on ship 4402. Fixed point W corresponds to the location of a second fixed wireless device. The first Wi-Fi access point at fixed point 4420 and the second Wi-Fi access point at fixed point 4421 are connected to the Internet via the ship's system for delivering Internet service (or another mechanism). The first fixed wireless device at fixed point 4420 and the second fixed wireless device at fixed point 4421 have built in GPS receiver that continually publishes the latitude and longitude coordinates of respective points Z and W to devices 4422 and 4424. There can be variations of this device or the deliverance of the latitude and longitude information, as one example, the device may use gpsd (a daemon that receives data from a GPS receiver and provides that data to one or more applications) running in the Unix-like OpenWrt embedded operating system.

User mobile devices 4422 and 4424, also referred to as user mobile devices M and N, may use several facilities for gaining access to Internet and to the VGZ System. When in port, user mobile devices M and N receive Internet access from Wi-Fi access points (including the fixed wireless devices at fixed points 4420 and 4421) or terrestrial phone systems. As the ship moves out to sea, Internet service is delivered by the ship's onboard Internet service delivery systems via the fixed wireless devices at fixed points 4420 and 4421.

When the ship is stationary, the owner sets up movable zone 4408 and registers it as a movable zone with the VGZ System, such as with VGZ system server 201 of FIG. 2A. The VGZ system tags zone 4408 as a movable zone in the VGZ data base. The owner can distribute the ship's movable zone app to users via the owner's website, or via QR codes set up around the ship or at the dock for that purpose. Similarly, such movable zone apps can be obtained from a transit authority's website or QR codes displayed at train stations, bus kiosks, etc.

When mobile device M runs the nZonal app, the VGZ system determines that mobile device M is in movable zone 4408 and transmits the movable zone module and instructions to mobile device M. Mobile device M can then process the actions related to mobile zone 4408, such as zone inclusion/exclusion, in accordance to the zone's instructions that were set up by the owner.

Mobile device N is not in movable zone 4408 and therefore does not have access to zone ABCD's services, actions, and methods. Once a mobile device is on board the ship, the mobile device will be in movable zone 4408 and will have access to those facilities.

FIG. 45A is a view of the system using a zone with polar coordinates, which are also referred to as radial coordinates. FIG. 45B (not to scale) is an exploded view of the triangle formed by points 4504, 4515 and 4516 in FIG. 45A and should be viewed in concert with FIG. 45A. A view of the zone is displayed on a device, such as supervisor device 203 of FIG. 2A. Zone 4502 surrounds a ship that is docked at a port. Zone 4502 is associated with marker 4503, which allows for interaction with zone 4502 via touches or clicks of a user or supervisor device. Zone 4502 comprises vertices 4511 to 4520, which are also referred to as points 4511 to 4520. The ray from point 4504 (also referred to as point X2) to point 4511 (also referred to as point X1) defines the polar axis of the coordinate system. Point 4511 corresponds to the bow of the ship and point 4504 is a primary reference point for the ship. Point 4506 corresponds to the location of user device 4508.

X1 and X2 are fixed points on a ship, may correspond to the center axis of the ship at the bow and the bridge, and are associated with a moveable zone for the ship.

Fixed points X1 and X2 (points 4511 and 4504) establish a fixed axis on the ship and the polar axis of the coordinate system and, in one embodiment, is irrespective of the ship's heading. In one embodiment, the polar axis is based on the ship's heading.

For the purpose of the illustration, point 4524 at the center of the base of triangle 4522 (FIG. 45B) formed by points 4504, 4515, and 4516, is about 305 feet from X2.

The coordinates of the ship that are stored by the VGZ system correspond to vertices 4511 300 feet from X2 at 0°, 4512 260 feet from X2 at 10°, 4513 20 feet from X2 at 90°, 4514 at 166°, 4515 300 feet from X2 at 170°, 4516 310 feet from X2 at 180°, 4517 300 feet from X2 at 190°, 4518 at 200°, 4519 20 feet from X2 at 270°, and 4520 260 feet from X2 at 350°.

The radial coordinates and angular coordinates from X2 to points 4511 through 4520 are stored in the VGZ system.

When the ship is at rest, GPS readings are taken at X1, X2, and the mobile device U—which is shown at point 4506 having radial coordinates of 250 feet and 175° from the polar axis formed from X2 to X1. Alternatively, Ultra Wide Band (UWB) transceivers can be affixed at X1, X2 and at any other point near or within the perimeter formed by points 4511 through 4520. These fixed UWB transceivers can in turn be used to locate mobile devices within the zone that that includes the UWB transceivers, as part of a Real Time Location System (RTLS). The use of UWB RTLS allows for precise and enhanced location reporting of user devices even when the user devices are unable to determine their locations using GPS.

A process determines if mobile device 4508 (also referred to as mobile device U) is within the boundaries of zone 4502 associated with the ship.

At a first step, mobile device 4506 determines, via GPS, which two radial coordinates are nearest to and on either side of the mobile device, which in this case are the coordinates for points 4515 and 4516. Alternatively, if the mobile device is equipped with a UWB transceiver, the mobile device can determine that it is located between the nearest coordinates 4515 and 4516 that have UWB transceivers affixed.

At a second step, mobile device 4506 determines the radial coordinate of point 4524, which has the same angular coordinate as point 4506 of mobile device 4506. As shown in the example, the radial coordinate of point 4524 is 305 feet. FIG. 45B, which is not to scale, shows the length of line 4534, i.e., the radial coordinate of point 4524, which is given by:

$$d_1 = \sqrt{d_2^2 + d_3^2 - 2d_2d_3\cos\theta_1} \quad \text{Eq. 10}$$

$$\theta_2 = \arcsin\left(\frac{d_2\sin\theta_1}{d_1}\right) \quad \text{Eq. 11}$$

$$d_4 = \frac{d_2d_3\sin\theta_1}{d_1\sin(\theta_4 + \theta_2)} \quad \text{Eq. 12}$$

wherein $d_1$ is a length of line 4531 between points 4515 and 4516,
$d_2$ is a length of line 4532 between points 4504 and 4515,
$d_3$ is a length of line 4533 between points 4504 and 4516,
$d_4$ is a length of line 4534 between points 4504 and 4524,
$\theta_1$ is an angle at point 4504 between lines 4532 and 4533,
$\theta_2$ is an angle at point 4516 between lines 4531 and 4533, and
$\theta_4$ is an angle at point 4504 between lines 4534 and 4533.

At a third step, the radial coordinate of point 4506, which is 250 feet (the distance from X2 to U) is subtracted from the radial coordinate of point 4524, which is 305 feet (the distance from X2 to 4524) and at the base of triangle 4522.

At a fourth step, if the subtraction from the third step yields a positive number, then mobile device U is determined to be in zone 4502. If the subtraction from the third step yields a negative number, mobile device U is outside of zone 4502.

Referring to FIG. 46, fixed wireless device 4602 is an embodiment of fixed wireless devices at fixed points 4420 and 4421 from FIG. 44. Fixed wireless device 4602 is mounted in a fixed position on a vehicle and comprises processor 4604, memory 4606, satellite and beacon signal navigation receiver 4612, Wi-Fi transceiver 4614, Ethernet port 4616, and optionally comprises heading sensor 4618, ultra-wideband real-time location system (UWB RTLS) module 4619, and VOR transceiver module 4620.

Processor 4604 includes circuits that perform instructions and may comprise one or more individual processors that are spread throughout the systems fixed wireless device 4602.

Memory 4606 includes data and instructions and may comprise one or more individual memories that are spread throughout the systems fixed wireless device 4602. The instructions in memory 4606, when executed by processor 4604 cause fixed wireless device to perform one or more operations, including: determining longitude, latitude, and altitude via satellite navigation receiver 4612; provide internet access via Wi-Fi transceiver 4614; connect with other networks via Ethernet port 4616; optionally determine a heading, roll, pitch, and yaw of the vehicle via heading sensor 4618; optionally determine the heading of the vehicle based upon the location coordinates of fixed wireless device 4602 and the location coordinates of a second fixed wireless device; provide the location and heading of the vehicle to a zone server and/or one or more handheld devices running the nZonal App that are connected to fixed wireless device 4602.

Satellite and beacon navigation receiver 4612 is part of a satellite and beacon navigation system in fixed wireless device 4602 that receives satellite and beacon signals and determines the location of fixed wireless device 4602 based on the received satellite and beacon signals. In one embodiment, satellite and beacon navigation receiver 4612 comprises a satellite navigation receiver and a fixed beacon navigation receiver.

Wi-Fi transceiver 4614 is part of a Wi-Fi access point in fixed wireless device 4602. Wi-Fi transceiver 4614 sends and receives wireless signals that provide for Internet access for devices that are communicatively connected to fixed wireless device 4602.

Ethernet port 4616 is part of an Ethernet controller in fixed wireless device 4602. In one embodiment, Ethernet port 4616 provides for the connection between the local area network of the vehicle on which fixed wireless device 4602 is located.

Heading sensor 4618 is part of a sensor system in fixed wireless device 4602. In one embodiment, heading sensor 4618 comprises three gyroscopes, three accelerometers, and three magnetometers to provide nine axes of measurement to determine the heading of the vehicle including its roll, pitch, and yaw with respect to the surface of the Earth similar to a Pozyx Shield for Arduino from Pozyx Labs (http://www-.pozyx.io and http://www.arduino.cc).

UWB RTLS Module 4619 is an optional sensor system in fixed wireless device 4602. In one embodiment, UWB RTLS Module 4619 is a DecaWave DWM1000 module that comprises a ScenSor DW1000 Chip (further described at www-.decawave.com/products/dw1000) or a UWB module from Pozyx Labs (https://www.pozyx.io/store), which also includes a DW1000 chip/transceiver. The DecaWave DW1000 is an IEEE 802.15.4-2011 UWB compliant device that supports 2-way ranging and time difference of arrival (TDOA) systems with a precision of 10 cm and connects to a host processor with a four pin serial peripheral interface (SPI) bus. The DecaWave DW1000 provides accurate transmit and receive timestamp information to a host processor, from which time of flight and distance calculations can be performed by comparing the transmit and receive times of ranging signals sent between a plurality of transceivers. In one embodiment, two-way ranging is used where a responder module determines the time of flight (TOF) in accordance with the following:

$$\text{TOF}=((T_{RR}-T_{SP})-(T_{SR}-T_{RP})+(T_{RF}-T_{SR})-(T_{SF}-T_{RR}))/4 \quad \text{Eq. 13}$$

wherein $T_{SP}$ is a timestamp that indicates when an initiator sends a polling signal, $T_{RP}$ is a timestamp that indicates when a responder receives the polling signal, $T_{SR}$ is a timestamp that indicates when the responder sends a response signal in response to the polling signal, $T_{RR}$ is a timestamp that indicates when the initiator receives the response signal that is in response to the polling signal, $T_{SF}$ is a timestamp that indicates when the initiator sends a final signal, and $T_{RF}$ is a timestamp that indicates when the responder receives the final signal.

Information from UWB RTLS module 4619 is available when fixed wireless device 4602 is within proximity of another device that includes a UWB real-time location system. UWB RTLS module 4619 provides time of flight measurements for signals passed between two or more UWB devices, such as UWB RTLS modules 4619.

VOR transceiver module 4620 is an optional sensor system in fixed wireless device 4602. In one embodiment, VOR transceiver module 4620 comprises an Analog Devices AD 9954 direct digital synthesizer and a MicroChip dsPIC Digital Signal Controller that controls one or more of the direct digital synthesizers to either send or receive VOR signals. When acting as a transmitter, VOR transceiver module 4620 outputs a master omnidirectional signal and a rotating directional signal that when received by a VOR receiver allows for the determination of the angle of the receiver with respect to the transmitter.

In one embodiment, fixed wireless device 4602 is programmed with instructions to determine the location of fixed wireless device 4602 based on information from one or more of satellite and beacon navigation receiver 4612, heading sensor 4618, UWB RTLS module 4619, and VOR transceiver module 4620. Distance information from UWB RTLS module 4619 and direction information from VOR transceiver module 4620 are used when fixed wireless device 4602 is within a proximity of another device, such as another fixed wireless device, that provides the proper signaling for the distance and direction information to be calculated with UWB RTLS module 4619 and VOR transceiver module 4620.

In one embodiment, fixed wireless device 4602 is a first fixed wireless device that is part of a system that comprises a second fixed wireless device that is similar to fixed wireless device 4602 and provides wireless network access and location information. The first fixed wireless device 4602 is attached to a first fixed point at a first location of a vehicle associated with a moveable zone, such as a ship. The second fixed wireless device is attached to a second fixed point at a second location of the vehicle. The first fixed wireless device and the second fixed wireless device publish longitude and latitude coordinates of the first and second locations to user devices that are wirelessly connected to the first fixed wireless device and the second fixed wireless device.

The first fixed point and the second fixed point are associated with the moveable zone of the vehicle. In one embodiment, the locations of the first fixed point, the second fixed point, the moveable zone, and the relationships thereof are stored on a virtual geographic zone server, such as VGZ system server 201 of FIG. 2A.

Figure 47:
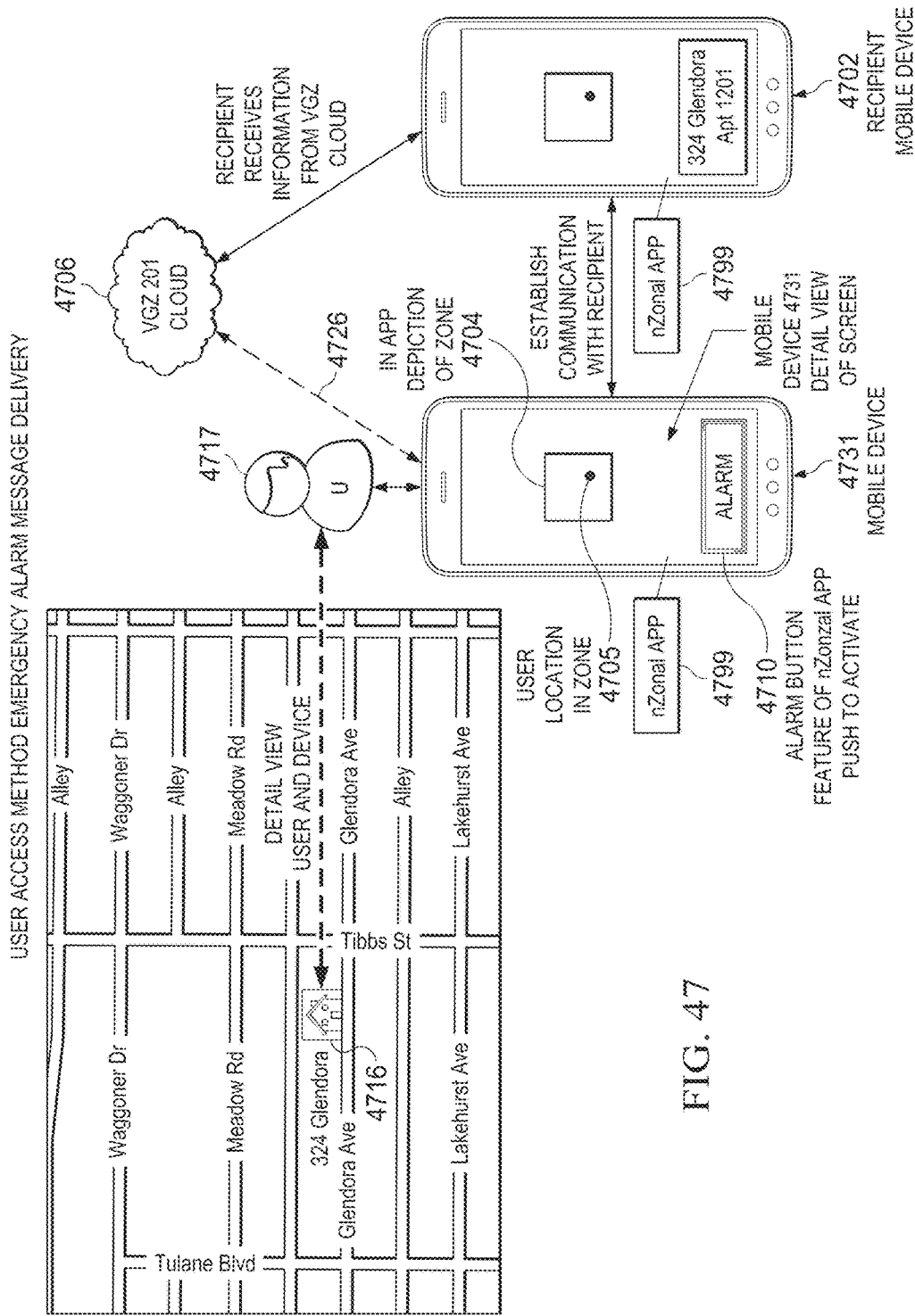
FIG. 47 is a view of the VGZ system for an alarm zone.

Referring to FIG. 47, in this embodiment, user 4717 has previously registered zone 4716 with authorities as an emergency zone. Authorities are running nZonal software.

User 4717 of the nZonal app 4799 can press an "Alarm Button" 4710 on the app and the nZonal app 4799 will automatically and optionally communicate with a recipient in one or both of the methods below.

Method 1. User makes an "Alarm Call" on their device, which contacts local authorities. An entry is made in the nZonal data base signifying the "Alarm Call". A responder to the "Alarm Call" can also use the nZonal app to find the location of the user within the zone (the user's building). The location of the user is shown on the device of the authority when the zone is approached or entered. Instructions are displayed to guide the authority to the user within the structure.

Method 2. Make any other appropriate communication with authorities or another user or recipient as dictated by the service being offered. When the authorities arrive at the zone, the device of the authority displays the zone functionality, including showing where the user is located in the zone and any instructions needed get to the location of the user within the zone.

With either method, the nZonal app that is used by a responder (i.e., the authority) can determine what floor of a building the user is on either by the zone associated with the floor or via the altitude reporting of the zone and noting the difference between the altitude of the ground floor and the altitudinal location of the user.

When nested zones are used, the zone reporting the location of the user is the inner-most zone of the nested zones.

Using presets, the user may optionally cause a fixed dimension "safe" zone (like zone 4716) to automatically be created around the user, entered into the VGZ data base and optionally reported to a recipient (e.g., the responder or authority). In the event the user leaves or is moved from the safe zone, the recipient is notified.

Figure 48:
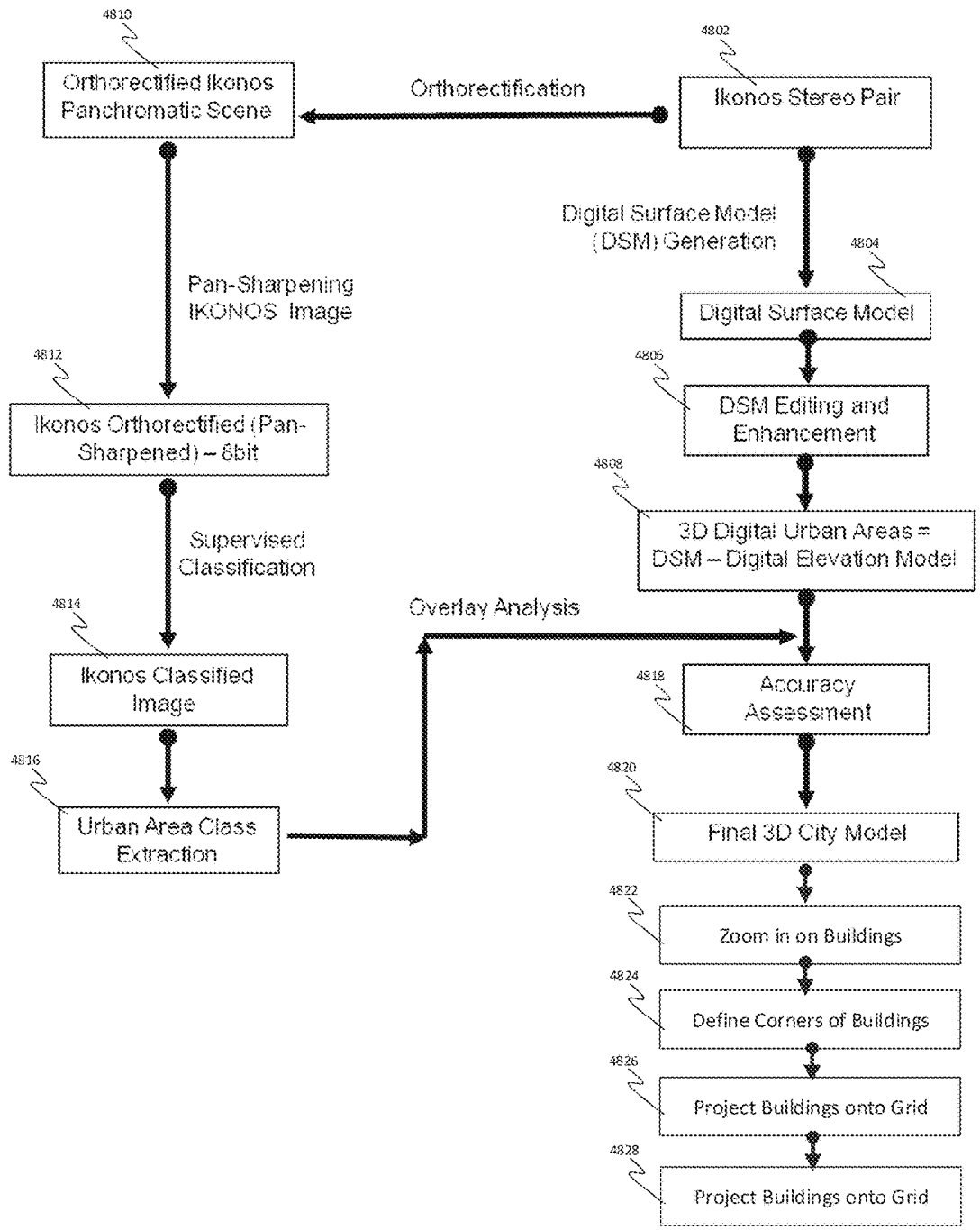
FIG. 48 is a flow chart for processing satellite images for zones.

FIG. 48 shows a flow chart of how satellite imagery may be used to capture building shapes and convert those shapes into two dimensional or three dimensional coordinates. Those skilled in the art will recognize that there are many ways to acquire a satellite image of Earth's surface that could be suitable for processing into zones including services from AcrGis (www.ArcGIS.com), DigitalGlobe (www.digitalglobe.com), CCG's NPA Satellite Mapping (www.cgg.com), TerraServer (www.terraserver.com), government resources, and others. In a preferred embodiment, the method uses algorithms to process stereoscopic satellite images in such a way that building footprint polygon corners can be identified, and a Mercator projection can be used to obtain the latitude and longitude coordinates the building's polygonal footprint and height of its polyhedral dimensions. Similar methodologies may be used to convert satellite images into place zones either manually, as previously described, or automated by computer.

At step 4802, a stereoscopic pair of satellite images is received.

At step 4804, a digital surface model (DSM) is created based on the stereoscopic pair of satellite images.

At step 4806, the DSM is edited and enhanced.

At step 4808, three dimensional (3D) urban areas are determined by subtracting a digital elevation model from the DSM.

At step 4810, an orthorectified image is created from the stereoscopic pair of satellite images.

At step 4812, the orthorectified image is sharpened.

At step 4814, the sharpened image is classified.

At step 4816, the urban area classes are extracted.

At step 4818, an accuracy assessment is performed based on the 3D digital urban areas from step 4808 and the urban area classes from step 4816.

At step 4820, a 3D model is created of the urban areas that were assessed in step 4818.

Figure 49:
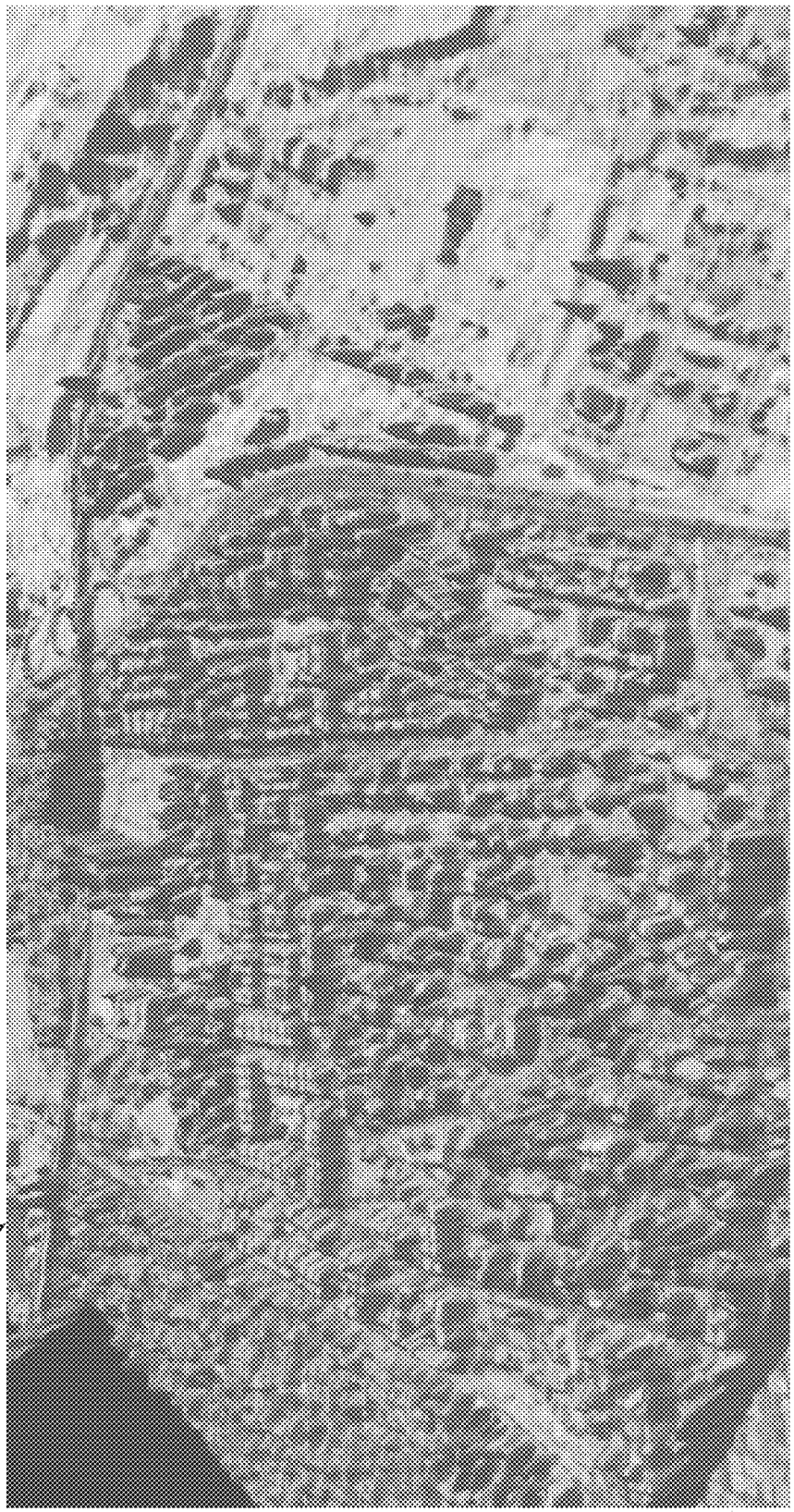
FIG. 49 is a stereoscopic image derived from one or more satellite images.

FIG. 49 shows image 4902, which is an example of the output of step 4820. In this example, a stereoscopic photograph of a dense urban area was acquired. Buildings are identified using an algorithm that utilizes a Digital Surface Model (DSM) extracted from the images in addition to the image spectral properties. A digital terrain mapping model is applied in concert with DSM created from satellite stereo imagery to compute building height.

Figure 50:
FIG. 50 is an image with building outlines derived from one or more satellite images.

FIG. 50 shows image 5002, which is an example one embodiment of the output of step 4816. For FIG. 50, Digital Surface Modeling and building shape recognition were used to create a two dimensional representation of the buildings in the satellite image forming a 1-m resolution pan-sharpened multispectral image. Images are first classified into 4 groups (bare soil, building, vegetation and road) and finally, into likelihood classifications of 2 groups (building and others) shown in FIG. 50.

Figure 51B:
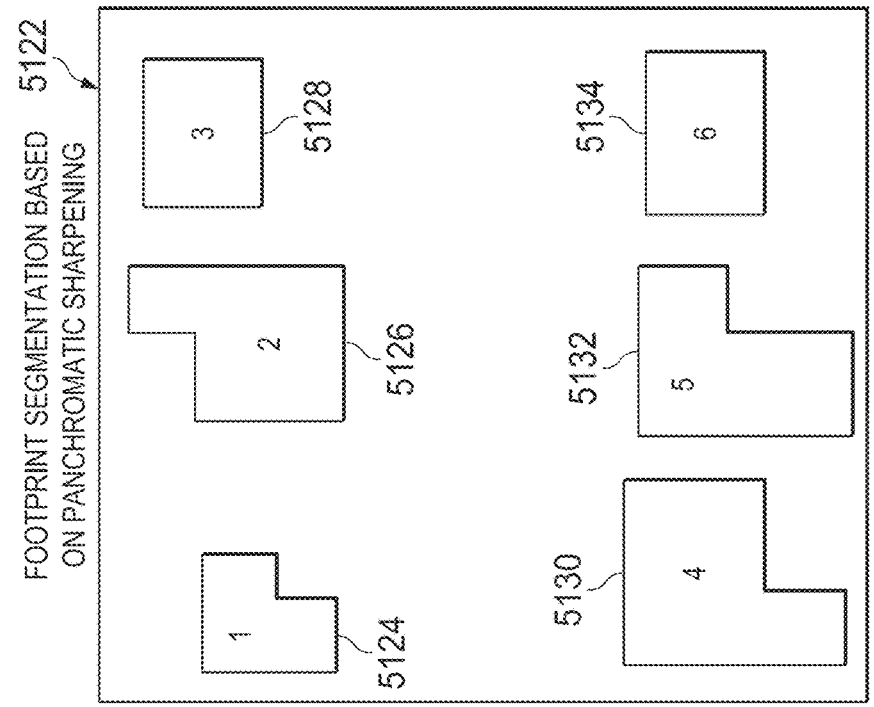
FIGS. 51A, 51B, and 51C show the creation of zones from one or more satellite images.
Figure 51A:
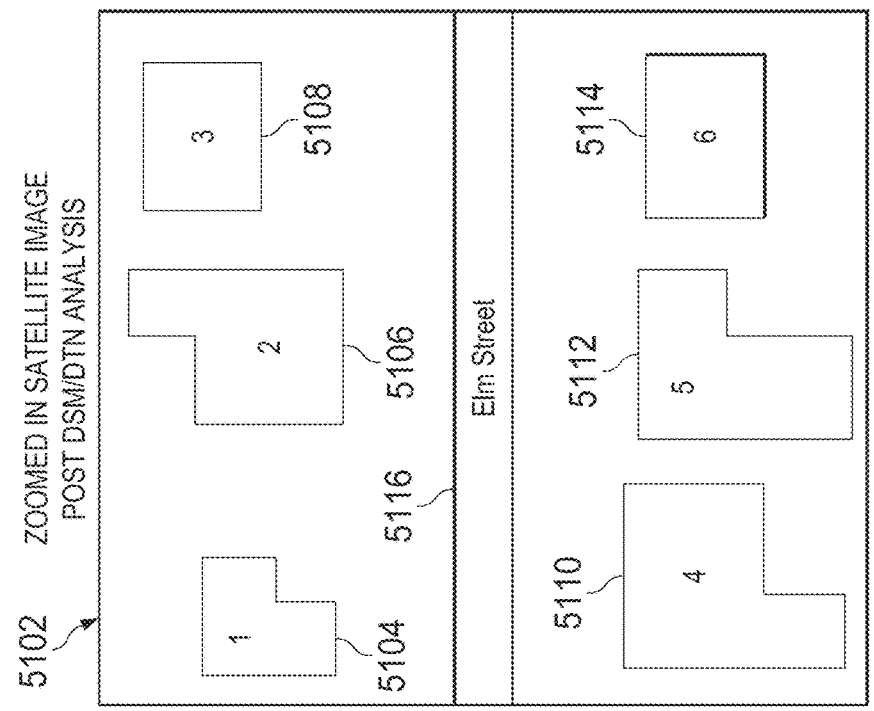

At step 4822 and shown in FIG. 51A, the zoom of image 5002 of FIG. 50 is increased to form image 5102, which shows six (6) isolated buildings 5104, 5106, 5108, 5110, 5112, and 5114. Having used the Digital Surface Modeling along with digital terrain modeling methods the outlines of the buildings become more apparent.

At step 4824 and shown in FIG. 51B, building footprint corners are determined using panchromatic sharpening algorithms to form sharpened image 5120 from image 5102 of FIG. 51. The building footprint corners are used to define Cartesian coordinates of the corners of the polygons shown in FIG. 51B for purpose of creating place zones. Sharpened image 5120 includes panchromatic sharpened outlines 5124, 5126, 5128, 5130, 5132, and 5134 that are formed from buildings 5104, 5106, 5108, 5110, 5112, and 5114 from image 5002 of FIG. 50.

Figure 51C:
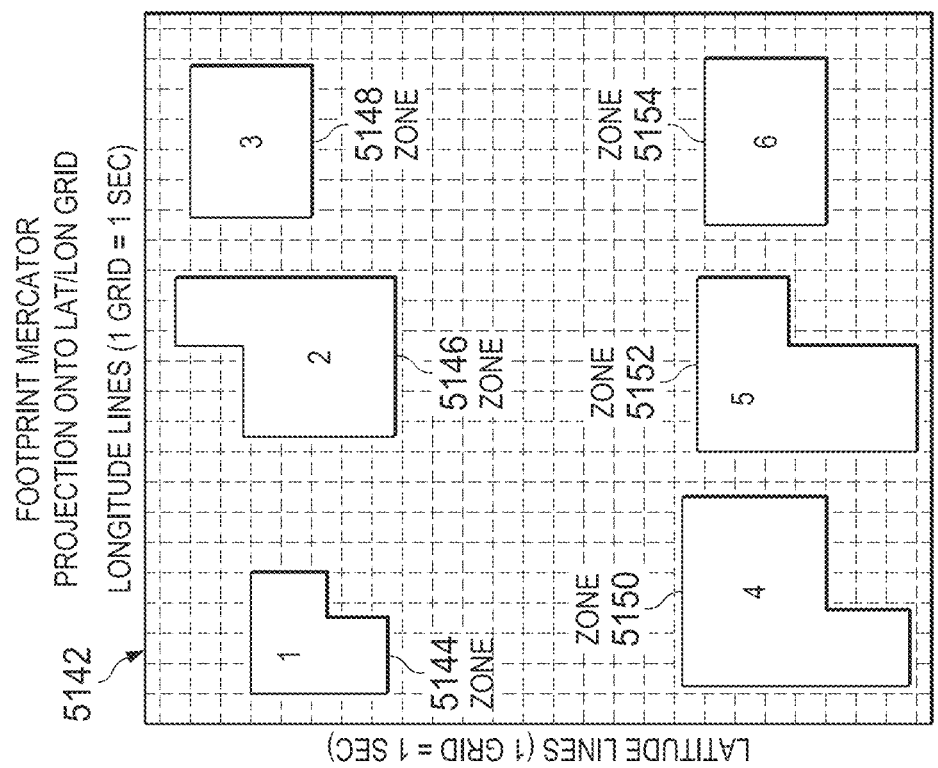

At step 4826 and shown in FIG. 51C, the panchromatic sharpened outlines 5124, 5126, 5128, 5130, 5132, and 5134 of FIG. 51B of buildings 5104, 5106, 5108, 5110, 5112, and 5114 of FIG. 51A that are located at #1, #2, #3, #4, #5 and #6 Elm St., respectively, are projected onto Mercator latitude and longitude 1 second grid 5142 (or similar grid of sufficiently fine resolution) to precisely acquire latitude and longitude of the vertices (corners) of the footprint polygons and/or the building's polyhedral vertices using the methods mentioned in Step 4824.

At step 4828, once the latitude and longitude of the vertices (corners) of the footprint polygons are acquired, zones 5144, 5146, 5148, 5150, 5152, and 5154 of FIG. 51C are created from panchromatic sharpened outlines 5124, 5126, 5128, 5130, 5132, and 5134 of FIG. 51B, are respectively associated with addresses #1, #2, #3, #4, #5, and #6 on Elm St., and are stored in the VGZ data base as place zones. Such Place Zones can subsequently be identified by a marker on a map. This method results in an automated creation of a zone and an association between the zone, the street address and the latitude and longitude coordinates of the zone.

FIG. 52 is a flowchart of one embodiment of a complete method used for automatic zone creation from satellite imagery. In this embodiment, the owner uses the referenced technique to automatically create a zone from the coordinates of the footprint of a building and then to store the zone coordinates in the VGZ data base. A user or owner of the nZonal app may optionally choose to register the building footprint in the VGZ System data base by its street address and/or building name or another identification methodology. While there may be multiple ways of acquiring a building footprint image the method of transforming the image into a Place Zone remains the same.

The system includes imagery source 5201, supervisor device 5202, VGZ server 5203, and image processing task 5204.

Imagery source 5201 provides the satellite imagery used by the system. In one embodiment, imagery source 5201 is a server that provides the imagery that is stored in a database.

Supervisor device 5202 is an embodiment of supervisor device 203 of FIG. 2A.

VGZ server 5203 is an embodiment of VGZ system server 201 of FIG. 2A.

Image processing task 5204 is the task that processes the satellite imagery. In one embodiment, image processing task 5204 is performed by VGZ server 5203 and is an embodiment of the method of FIG. 48.

At step 5211, an auto zone creation feature is activated on supervisor device 5202.

At step 5212, a request to acquire satellite imagery from imagery source 5201 is sent from supervisor device 5202.

At step 5213, the request from supervisor device 5202 for satellite imagery is received by the imagery source.

At step 5214, satellite imagery is delivered to image processing task 5204 running on VGZ server 5203.

At step 5215, image processing task 5204 begins.

At step 5216, a database of existing zones is checked to see if the location requested by supervisor device 5202 already has a zone defined. If the zone is already defined, then at step 5217, the zone is returned to VGZ server 5203 and the process proceeds to step S229. If the zone is not already defined, the process proceeds to step 5218.

At step 5218, an image is captured and analyzed for the type of image. The captured image is checked to determine if it is already registered to an address.

At step 5219, a digital surface modeling method is applied to the image captured at step 5218.

At step 5220, a digital terrain modeling method is applied to the output from step 5219.

At step 5221, a panchromatic sharpening method is applied to the output from step 5220.

At step 5222, corners of buildings are identified within the output from step S221.

At step 5223, it is determined whether the polygons or polyhedrons formed from step 5222 are closed and within a size range. If the polygons or polyhedrons are not closed or if the polygons or polyhedrons are not within the size range, then the process proceeds to step S230. If the polygons or polyhedrons are closed and the polygons or polyhedrons are within the size range, then the process proceeds to step 5224.

At step 5224, the buildings are projected with a Mercator or cylindrical projection onto a grid of latitude and longitude lines.

At step 5225, Cartesian coordinates are determined for the buildings from the location on the grid.

At step 5226, street addresses are identified for the zone coordinates determined in step 5225.

At step 5227, image processing task 5204 sends the polygon zone information generated in the preceding steps to VGZ server 5203.

At step 5228, the polygon zone information is sent to VGZ server 5203.

At step 5229, VGZ server 5203 receives a zone description from image processing task 5204.

At step 5230, VGZ server 5203 determines if there are more buildings to process. If there are more buildings to process, then the process proceeds to step 5215 to process more buildings.

At step 5231, when there are no more buildings to process, VGZ server 5203 sends a notification to supervisor device 5202.

At step 5232, supervisor device 5202 receives the notification from VGZ server 5203 that image processing is complete and flags the zones as being ready for production.

At step 5233, the database of zone information is ready for zone membership requests.

At step 5234, information about the zones are sent from supervisor device 5202 to VGZ server 5203.

At step 5235, the information from supervisor device 5202 is received by VGZ server 5203 and the zone database information is updated with the information from supervisor device 5202 that includes the data and information determined by image processing task 5204.

The advantage of this method of zone creation is that using a computer it can automatically and accurately create zones for buildings in very large numbers and the user or owner does not need to take the time to map them by hand.

Figure 53A:
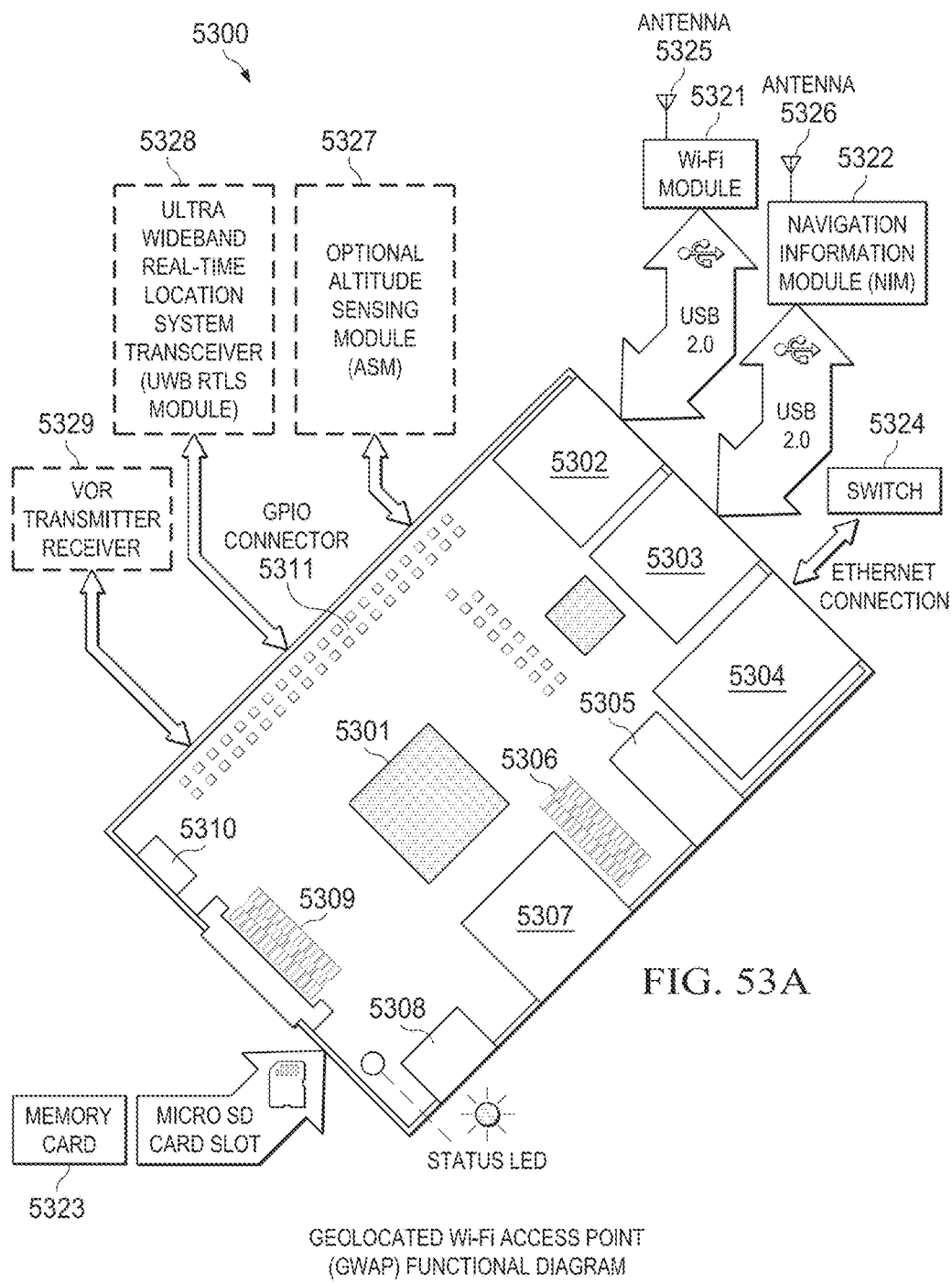
FIG. 53A is a diagram of a Geo-located Wi-Fi Access Point (GWAP).

Referring to FIG. 53A, a Geo-located Wi-Fi Access Point (GWAP) device includes board 5300. The location of the GWAP device can be determined using advanced geo-positioning techniques and its position can be mapped in areas where standard GPS information, which is dependent on satellite signals, which may be weak or non-existent indoors or in dense urban areas. The more precise geo-positioning of GWAP devices in such environments enables mobile devices to be geo-located more accurately.

Board 5300 includes system on a chip (SoC) 5301, universal serial bus (USB) connector 5302, USB connector 5303, Ethernet connector 5304, audio video (A/V) jack 5305, camera serial interface (CSI) connector 5306, high-definition multimedia interface (HDMI) connector 5307, micro-USB power connector 5308, display serial interface (DSI) connector 5309, antenna 5310, general purpose input output pins 5311. In one embodiment, board 5300 is a Raspberry Pi 3 board available from the Raspberry Pi Foundation (https://www.raspberrypi.org).

Wi-Fi module 5321 is connected to board 5300 by USB connector 5302 and is also connected to antenna 5325. In one embodiment, Wi-Fi module 5321 includes a Realtek RTL8192CU chipset, which is a highly integrated single-chip Wireless LAN (WLAN) USB 2.0 network interface controller complying with the 802.11n specification. In one embodiment, Wi-Fi module 5321 is a USB Wi-Fi (802.11b/g/n) Module with Antenna for Raspberry Pi Product ID 1030, available from Adafruit Industries (https://www.adafruit.com/product/1030).

Navigation Information Module (NIM) 5322 is connected to board 5300 via connector 5303 and is connected to antenna 5326 via an adapter cable.

In one embodiment, NIM 5322 includes an MTK3339 chipset and is high-quality GPS module that can track up to 22 satellites on 66 channels with excellent high-sensitivity receiver (−165 dB tracking) and can do up to 10 location updates a second for high speed, high sensitivity logging or tracking. In one embodiment, NIM 5322 is a GPS module, such as the Ultimate GPS Breakout—66 channel w/10 Hz updates—Version 3 MTK3339 chipset Product ID 746, available from Adafruit Industries (https://www.adafruit.com/products/746).

In another embodiment, NIM 5322 is a high quality global navigation satellite system (GNSS) module based on the NV08C-CSM GNSS chipset advanced L1 receiver available from NVS Technologies. Besides NMEA output this board delivers raw GNSS data that can be processed with RTKLIB (http://www.rtklib.com), either on the Raspberry Pi itself or elsewhere, enabling PPP (precise point positioning) solutions up to decimeter-precision, and even centimeter-precision in RTK (real-time kinematics) mode using a reference station. This embodiment goes beyond simple latitude and longitude measurements and is more suited as a precise geo-positioning input for place zones designed for autonomous vehicles, robotics, drones or traffic tolling applications.

In another embodiment NIM 5322 includes a high quality Differential GPS like a Trimble GPS TSC1 Asset Surveyor Data Collector which uses GPS information as well as stationary land based systems to deliver accuracy of location at the sub-meter level. The Trimble GPS TSC1 Asset Surveyor Data Collector is connected via data cable via a USB port or to one or more pins of GPIO connector 5311.

GPIO connector 5311 allows for the connection of one or more modules to board 5300, such as optional altitude sensing module (ASM) 5327, optional UWB RTLS module 5328, and optional VOR transmitter receiver 5329.

Altitude Sensing Module (ASM) 5327 BMP180 Barometric Pressure/Temperature/Altitude Sensor—5 v Ready—Product ID 1603 is connected to board 5300 by via one or more pins of GPIO header 5311. The optional ASM 5327 allows the GWAP to know its altitude in real time. This precision sensor from Bosch is a low-cost sensing solution for measuring barometric pressure and temperature and because pressure changes with altitude it can be used as an altimeter and is available from Adafruit Industries (https://www.adafruit.com/product/1603).

UWB RTLS module 5328 allows for the GWAP comprising board 5300 to determine the distance from the GWAP comprising board 5300 to another GWAP or mobile device with a compatible UWB RTLS module, such as the Deca-Wave DWM1000 (http://www.decawave.com/) or a Pozy System UWB device (https://www.pozyx.io/). UWB RTLS module 5328 allows for triangulating or trilaterating the geoposition of a device with a UWB transmitter within grid of UWB receivers included within a zone. In one embodiment, ranging signals are sent or received by UWB RTLS module 5328 to calculate distances from the time of flight of the ranging signal.

VOR transmitter receiver 5329 allows for the GWAP comprising board 5300 to determine the direction to another GWAP or mobile device using compatible VOR transmitter or receiver, such as that described in "VOR Software Receiver and Decoder with dsPIC," by Joseph Statsny (available at http://www.ultman.com/KnowledgeBase/dsPIC_sw_receiver_Rev1.1.pdf). In one embodiment, ranging signals are sent or received by VOR transmitter receiver 5329 to calculate direction from the phase offset of an omnidirectional signal compared to a directional signal. The ranging signals used by VOR transmitter receiver 5329 may be different from the ranging signals used by UWB RTLS module 5328.

Combining the distance and direction information available via UWB RTLS module 5328 and VOR transmitter receiver 5329 provides for other user devices or GWAPs within the proximity of the GWAP comprising board 5300 to have precise location information.

Ethernet connector 5304 is used to connect board 5300 to switch 5324 to form an Ethernet connection. In one embodiment, switch 5324 is an Avaya ERS 2550T-PWR 50-port Ethernet switch that is connected to the Internet via one or more additional routers, switches, etc.

The GWAP of FIG. 53A can provide more accurate geo-location information to a mobile device than conventional methods. In one embodiment one or more GWAPs are used while stationary as described below. When stationary, the GWAP is an accurately geo-positioned reference point for a mobile device's navigational services.

In one embodiment, the GWAP's stationary location information can be manually input into a public database of locations for GWAPs and wireless access points' (WAPs).

In another embodiment, the location of a GWAP can be automatically input into to a database of GWAP and WAP devices by the GWAP.

In another embodiment, the GWAP can transmit its location as a beacon to other devices for their navigational service drivers.

In another embodiment, the location of GWAPs can be determined and mapped in locations where satellite-derived GPS is weak or non-existent, such as in dense urban areas or indoors. This enables mobile devices to determine their location precisely in areas where GPS satellite coverage is weak or non-existent. A GWAP publishes its location information as latitude and longitude coordinates to user devices, which then use the latitude and longitude coordinates to determine the positions of the user devices regardless of whether the devices are indoors or outdoors and when GPS satellite coverage is weak or non-existent.

In another embodiment, GWAPs are used in-motion with a moveable zone as described below.

In one embodiment, in either the in-motion mode or the stationary mode, the GWAP can optionally automatically self-publish or register its coordinates, including latitude, longitude, and altitude, to a database. The database can be the public database (i.e., a public WAP location database) or the database in the zonal system cloud. Alternatively, the coordinates of the GWAP 5300 can be manually entered into the database.

Referring to FIG. 53B, user device 530201 and GWAP 530202 are within a proximity to send and receive UWB ranging signals 530232. User device 530201 is an embodiment of user device 205 of FIG. 2A. GWAP 530202 is an embodiment of the GWAP that comprises board 5300 of FIG. 53A.

User device 530201 includes UWB RTLS module 530211, VOR receiver 530212, antenna 530213, and antenna 530214. UWB RTLS module 530211 is connected to antenna 530213 to receive ranging signals 530232 from GWAP 530202. UWB RTLS module 530211 processes ranging signal 530232 to determine the distance from user device 530201 to GWAP 530202. VOR receiver 530212 is connected to antenna 530214 to receive ranging signals 530231 from GWAP 530202. VOR receiver 530212 processes ranging signal 530231 to determine the direction of user device 530201 with respect to GWAP 530202. Antenna 530213 and antenna 530214 each include one or more antennas of appropriate dimensions and isolation to receive ranging signals 530231 and 530232 and provide ranging signals 530231 and 530232 to UWB RTLS module 530211 and VOR receiver 530212.

GWAP 530202 includes UWB RTLS module 530223 connected to antenna 530224 and includes VOR transceiver 530221 connected to antenna array 530222. UWB RTLS module 530223 is connected to antenna 530224 to transmit ranging signal 530232 to any user device within the proximity of GWAP 530202, including user device 530201. VOR receiver 530221 is connected to antenna array 530222 to transmit ranging signal 530231 to any user device within the proximity of GWAP 530202, including user device 530201.

UWB RTLS module 530223 generates ranging signal 530232 so that once received, the time of flight of ranging signal 530232 can be calculated and used to determine the distance to GWAP 530202.

VOR transceiver 530221 generates ranging signal 530231 so that once received, the phase of ranging signal 530231 can be identified and used to determine the direction to GWAP 530202. VOR antenna array 530222 includes a plurality of directional antennas that each point in a unique direction from GWAP 530202. Each antenna broadcasts a first (omnidirectional) signal that is mixed with a second (directional) signal. The directional signal rotates through each direction from GWAP 530202 with a specific phase offset from the omnidirectional signal so that a determination of the phase offset provides the direction to (or from) GWAP 530202.

Figure 53C:
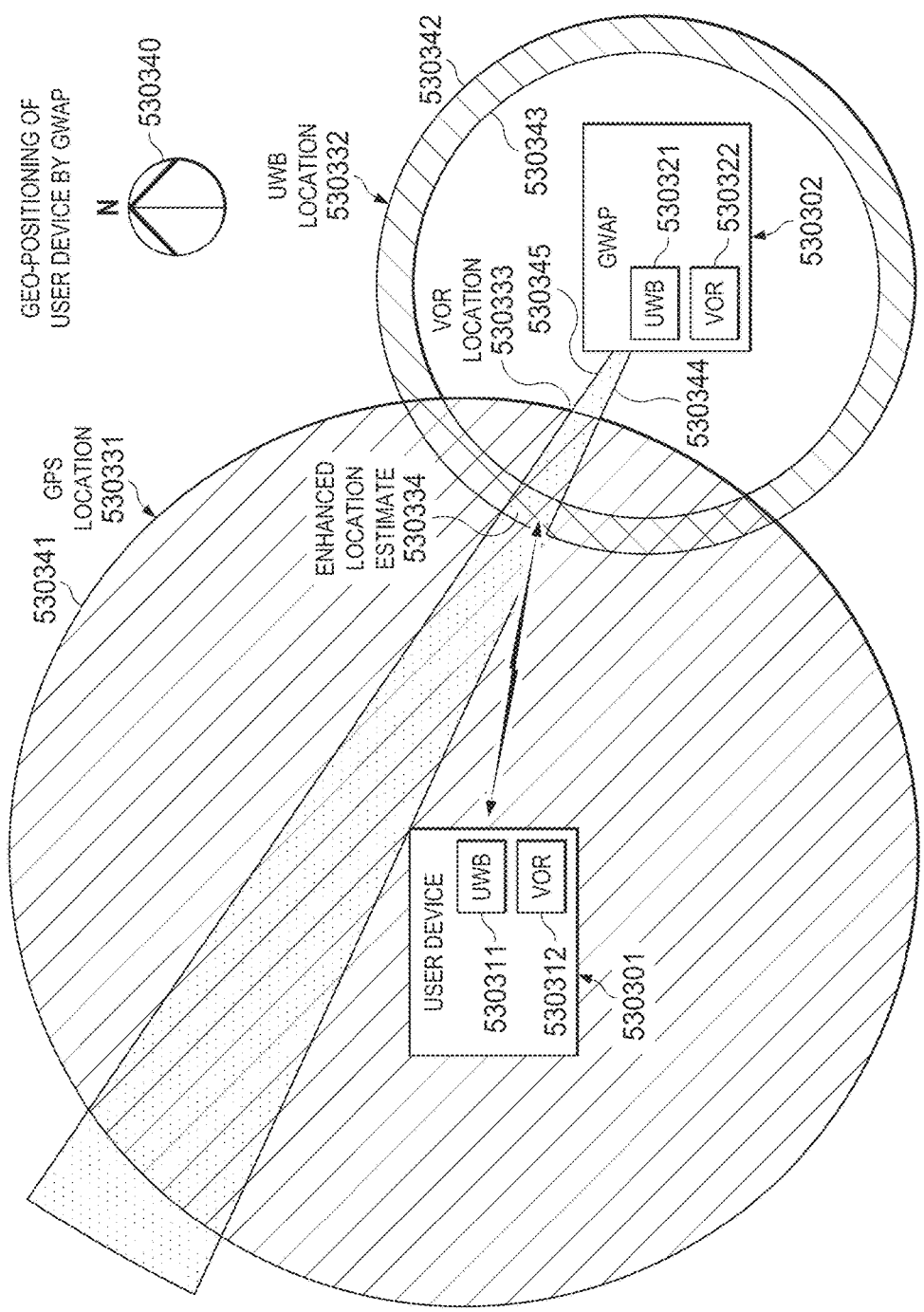
FIG. 53C is a diagram of a user device determining an enhanced location estimation.

Referring to FIG. 53C, user device 530301 receives satellite GPS signals and receives distance and direction signals from GWAP 530302. User device 530301 is an embodiment of user device 205 of FIG. 2A that includes UWB module 530311 and VOR module 530312. GWAP 530302 is an embodiment of the GWAP that comprises board 5300 of FIG. 53A and comprises UWB module 530321 and VOR module 530322.

User device 530301 receives GPS satellite navigation signals and determines that its position is within GPS location 530331. User device 530301 reports its position as being at the center of GPS location 530331, but with the limited accuracy of GPS, the actual position of user device 530301 may be anywhere within GPS location 530331.

User device 530301 receives and processes UWB RTLS signals using UWB module 530311 to determine UWB location 530332. The UWB RTLS signals were generated by UWB module 530321 of GWAP 530302 and were transmitted by GWAP 530302 to user devices that surround GWAP 530302. In processing the UWB RTLS signals, user device 530301 determines a distance between user device 530301 and GWAP 530302. Using the known location of GWAP 530302 with the distance determined from the UWB RTLS signals, user device 530301 determines that it is located somewhere within UWB location 530332. The limited accuracy of the distance calculation combined with the omnidirectional nature of the UWB RTLS signals yield UWB location 530332 forming a ring around the known location of GWAP 530302.

User device 530301 receives and processes VOR signals using VOR module 530312 to determine VOR location 530333. The VOR signals were generated by VOR module 530322 of GWAP 530302 and were transmitted by GWAP 530302 to user devices that surround GWAP 530302. In processing the VOR signals, user device 530301 determines a direction between user device 530301 and GWAP 530302.

In one embodiment, the VOR signals include an omnidirectional signal and a directional signal that sweeps or rotates through the spatial range of the omnidirectional signal. When both the omnidirectional signal and the directional signal are detected, a phase difference between the omnidirectional signal and the directional signal identifies the direction from true North. For example, compass 530341 indicates that true North is up with respect to the page and when user device 530301 receives both the omnidirectional signal and the directional signal, the phase difference is about 300 degrees (or −60 degrees). The phase difference means that the angle from true North to user device 530301 using GWAP 530302 as a vertex is about 300 degrees (or −60 degrees). The limited accuracy of the angular calculation combined with the unknown distance that the VOR signals traveled from GWAP 530302 to user device 530301 yield VOR location 530333 forming a circular sector with GWAP 530302 at the point where the two radii of the circular sector meet.

Enhanced location estimate 530334 is determined by user device 530301 from a combination of GPS location 530331, UWB location 530332, and VOR location 530333. In one embodiment, enhanced location estimate 530334 is circumscribed by outer perimeter 530342 of UWB location 530332, inner perimeter 530343 of UWB location 530332, first radius 530344 of VOR location 530333, and second radius 530345 of VOR location 530333 and is within perimeter 530341 of GPS location 530331. After determining the coordinates or boundaries of enhanced location estimate 530334, user device 530301 calculates the centroid of enhanced location estimate 530334 and reports the centroid of enhanced location estimate 530334 as the location of user device 530301.

Referring to FIG. 54, a system and method for defining and performing actions associated with a stationary GWAP and stationary zone comprises supervisor device 5401, user device 5402, stationary geo-located Wi-Fi access point (GWAP) device 5403, and zonal server 5404. Supervisor device 5401 is an embodiment of supervisor device 203 of FIG. 2A. User device 5402 is an embodiment of user device 205 of FIG. 2A. Stationary GWAP device 5403 is an embodiment of the GWAP device of FIG. 53A that comprises board 5300. Zonal server 5404 is an embodiment of VGZ system server 201 of FIG. 2A.

At step 5411, stationary zone information is sent from supervisor device 5401 and is received at zonal server 5404. The stationary zone information includes coordinates that define the geographical physical location of a stationary zone and includes a GWAP identifier, which uniquely identifies GWAP device 5403 to zonal server 5404 and to user device 5402. The zone information also includes a unique value specified by the supervisor device that can be used to limit which user devices have access to location information from GWAP device 5403, as described below. The zone information also includes a zone action that is associated with the stationary zone and can be performed when user device 5402 is within the stationary zone defined by supervisor device 5401. In one embodiment, the stationary zone information includes the geophysical location coordinates of stationary GWAP device 5403, which is located within the stationary zone.

At step 5412, zonal server 5404 determines a location encryption key based on the information received from supervisor device 5401. In one embodiment, the encryption key is created by using a hash of the GWAP identifier, the unique value, and additional zone information.

At step 5413, the location encryption key is sent from zonal server 5404 and is received by GWAP device 5403, which stores the location encryption key. In one embodiment, GWAP device 5403 does not include a navigation system and the GWAP device geophysical coordinates are also sent to the GWAP device 5403.

At step 5414, GWAP device 5403 determines location information. GWAP device 5403 periodically updates its location information in order to send the most recent information to devices that use the location information. In one embodiment, the location information is determined by a navigation information module connected to GWAP device 5403, such as the Trimble GPS TSC1 Asset Surveyor Data Collector. In an alternative or additional embodiment, the location information for GWAP device 5403 are received from zonal server 5404 and/or supervisor device 5401.

At step 5415, GWAP device 5403 encrypts the location information using the location encryption key. The location information is encrypted so that only authorized devices can make use of the location information from GWAP device 5403.

At step 5416, the encrypted location information is sent from GWAP device 5403 and is received at zonal server 5404. In one embodiment, the encrypted location information includes GPS coordinates that identify the longitude, latitude, and altitude of GWAP device 5403.

At step 5417, zonal server 5404 decrypts the encrypted location information.

At step 5419, a request for a Wi-Fi-connection is sent from user device 5402 and is received by GWAP device 5403.

At step 5420, GWAP device 5403 verifies, validates, and accepts the request for the Wi-Fi connection from user device 5402. GWAP device 5403 creates an Internet connection for user device 5402.

At step 5421, an acknowledgment of the Wi-Fi Internet connection is sent from GWAP device 5403 and is received by user device 5402.

At step 5422, user device 5402 starts the Zonal App. The Zonal App may have been previously installed or is installed after creation of the Wi-Fi connection via GWAP device 5403.

At step 5423, a login request is sent from user device 5402 and is received by zonal server 5404. The login request passes through GWAP device 5403 on its way to zonal server 5404.

At step 5424, zonal server 5404 verifies, validates, and accepts the login request from user device 5402 so that user device 5402 can use the virtual geographic zone services provided by zonal server 5404.

At step 5425, an acknowledgment of the acceptance of the login request is sent by zonal server 5404 and is received by user device 5402.

At step 5426, user device location information is determined by user device 5402. In one embodiment, user device 5402 uses a GPS module to determine the coordinates of its location.

At step 5427, a request for zone information is sent from user device 5402 and is received by zonal server 5404. The request includes the user device location information.

At step 5428, zonal server 5404 retrieves zone information based on the request received from user device 5402 and the user device location information. Zonal server 5404 determines which zones are within a threshold radius of user device 5402. In one embodiment, zonal server 5404 calculates the centroid of one or more zones, calculates the distance between the centroids and the user device location, and compares the distances to the threshold radius. When the distance from the location of user device 5402 to a centroid of the stationary zone defined by the zone information is substantially equal to or less than the threshold radius, zonal server 5404 retrieves the information relevant to the stationary zone, including the coordinates of the stationary zone, the GWAP identifier, and the decryption key that was sent to GWAP 5403.

At step 5429, the zone information is sent by zonal server 5404 and is received by user device 5402.

At step 5430, encrypted GWAP location information is sent from GWAP device 5403 and is received by user device 5402. The encrypted information includes the most recent information for the location of GWAP device 5403.

At step 5431, user device 5402 decrypts the encrypted location information.

At step 5432, one or more optional ranging signals are sent from stationary GWAP device 5403 and are received by user device 5402. In one embodiment, the ranging signals include the use of multiple UWB RTLS receivers. In one embodiment, the ranging signals additionally or alternatively include one or more VOR signals. The ranging signals are used to determine an enhanced location estimate of user device 5402. In one embodiment, the encrypted GWAP location information includes ranging signal information that describes the ranging signals to allow user device 5402 to receive and decode the ranging signals. The ranging signal information includes one or more of a modulation scheme, timing information, frequency information, and the like.

At step 5433, user device 5402 determines the location of user device 5402 relative to the location of GWAP device 5403. In one embodiment, user device 5402 calculates the differences between the longitude and latitude coordinates of both user device 5402 and GWAP device 5403. Additionally or alternatively, the differences are calculated using radial coordinates.

At step 5434, user device 5402 determines enhanced user device location information. The enhanced user device location information combines location information from user device 5402 and location information from GWAP device 5403 to form a more accurate estimate of the location of user device 5402. In one embodiment, transmissions from GWAP device 5403 include a receive signal strength indication (RSSI) that is calibrated to a specific distance so that a specific RSSI value is indicative of a specific distance between user device 5402 and GWAP device 5403. User device 5402 uses the location of GWAP device 5403 with the RSSI to form a first estimate of the location of user device 5402, also referred to as a first location information source. A second estimate of the location of user device 5402 is provided by a satellite navigation module of user device 5402, also referred to as a second location information source. A third location information source is provided by an inertial measurement module that includes one or more accelerometers, gyroscopes, and magnetometers (also referred to as a nine axis sensor) to indicate changes in position and orientation of user device 5402, which can be used to determine the location and direction of the RSSI with respect to GWAP device 5403. A fourth location information source includes distance information derived from the optional ranging signals from multiple UWB RTLS transmitters. A fifth location information source includes direction information derived from the optional ranging signals using a VOR receiver. The location information sources are combined to provide an estimated location of user device 5402 that is more accurate than any single location information source used alone.

At step 5435, user device 5402 determines the geographical coordinates of the stationary zone. In one embodiment, the stationary zone information includes longitude and latitude for a plurality of points that identify the boundaries of the stationary zone.

At step 5436, user device 5402 determines the location of user device 5402 relative to the stationary zone. In one embodiment, when user device 5402 determines that it is in the stationary zone, user device 5402 displays the zone action to the user of user device 5402 to allow the user to select the zone action.

At step 5437, a request to perform the action available within the stationary zone is sent from user device 5402 and is received by zonal server 5404. The request includes the most recent location information of user device 5402.

At step 5438, zonal server 5404 verifies, validates, and accepts the action request.

At step 5439, zonal server 5405 performs the action specified in the request.

Referring to FIG. 55, a system and method for defining and performing actions associated with an in-motion GWAP and a movable zone comprises supervisor device 5501, user device 5502, geo-located Wi-Fi access point (GWAP) device 5503, and zonal server 5504. Supervisor device 5501 is an embodiment of supervisor device 203 of FIG. 2A. User device 5502 is an embodiment of user device 205 of FIG. 2A. GWAP device 5503 is an embodiment of the GWAP device of FIG. 53A that comprises board 5300 and GWAP device 5503 is an embodiment of fixed wireless device 4602 of FIG. 46. Zonal server 5504 is an embodiment of VGZ system server 201 of FIG. 2A.

At step 5511, movable zone information is sent from supervisor device 5501 and is received at zonal server 5504. The movable zone information includes relative coordinates that define the movable zone in relation to the geophysical location and orientation of GWAP device 5503. The movable zone information also includes a GWAP identifier, which uniquely identifies GWAP device 5503 to zonal server 5504 and to user device 5502. The zone information also includes a unique value specified by the supervisor device that can be used to limit which user devices have access to location information from GWAP device 5503, as described below. The zone information also includes a zone action that is associated with the movable zone and can be performed when user device 5502 is within the movable zone defined by supervisor device 5501.

At step 5512, zonal server 5504 determines a location encryption key based on the information received from supervisor device 5501. In one embodiment, the encryption key is created by using a hash of the GWAP identifier, the unique value, and additional zone information.

At step 5513, the location encryption key is sent from zonal server 5504 and is received by GWAP device 5503, which stores the location encryption key.

At step 5514, GWAP device 5503 determines location and heading information. GWAP device 5503 continuously updates its location and heading information in order to send the most recent information to devices that use the location and heading information.

At step 5515, GWAP device 5503 encrypts the location and heading using the location encryption key. The location information is encrypted so that only authorized devices can make use of the location information from GWAP device 5503.

At step 5516, the encrypted location information is sent from GWAP device 5503 and is received at zonal server 5504. In one embodiment, the encrypted location information includes GPS coordinates that identify the longitude, latitude, and altitude of GWAP device 5503 along with orientation information that identify roll, pitch, and yaw angles of GWAP device 5503.

At step 5517, zonal server 5504 decrypts the encrypted location information.

At step 5518, zonal server 5504 determines the location and orientation of the movable zone from the decrypted location information received from GWAP device 5503 and from the zone information associated with the movable zone.

At step 5519, a request for a Wi-Fi-connection is sent from user device 5502 and is received by GWAP device 5503.

At step 5520, GWAP device 5503 verifies, validates, and accepts the request for the Wi-Fi connection from user device 5502. GWAP device 5503 creates an Internet connection for user device 5502.

At step 5521, an acknowledgment of the Wi-Fi Internet connection is sent from GWAP device 5503 and is received by user device 5502.

At step 5522, user device 5502 starts the Zonal App. The Zonal App may have been previously installed or is installed after creation of the Wi-Fi connection via GWAP device 5503.

At step 5523, a login request is sent from user device 5502 and is received by zonal server 5504. The login request passes through GWAP device 5503 on its way to zonal server 5504.

At step 5524, zonal server 5504 verifies, validates, and accepts the login request from user device 5502 so that user device 5502 can use the virtual geographic zone services provided by zonal server 5504.

At step 5525, an acknowledgment of the acceptance of the login request is sent by zonal server 5504 and is received by user device 5502.

At step 5526, user device location information is determined by user device 5502. In one embodiment, user device 5502 uses a DGPS module to determine the coordinates of its location.

At step 5527, a request for zone information is sent from user device 5502 and is received by zonal server 5504. The request includes the user device location information.

At step 5528, zonal server 5504 retrieves zone information based on the request received from user device 5502 and the user device location information. Zonal server 5504 determines which zones are within a threshold radius of user device 5502. In one embodiment, zonal server 5504 calculates the centroid of one or more zones, calculates the distance between the centroids and the user device location, and compares the distances to the threshold radius. When the distance from the location of user device 5402 to a centroid of the movable zone defined by the zone information is substantially equal to or less than the threshold radius, zonal server 5504 retrieves the information relevant to the zone, including the relative coordinates of the movable zone, the GWAP identifier, and the decryption key that was sent to GWAP 5503.

At step 5529, the zone information is sent by zonal server 5504 and is received by user device 5502.

At step 5530, encrypted GWAP location and heading information is sent from GWAP device 5503 and is received by user device 5502. The encrypted information includes the most recent information for the location and heading of GWAP device 5503.

At step 5531, user device 5502 decrypts the encrypted location and heading information.

At step 5532, one or more optional ranging signals are sent from stationary GWAP device 5503 and are received by user device 5502 that may be equipped with a UWB transceiver, such as the BeSpoon smart phone (available from http://spoonphone.com/en/). In one embodiment, the ranging signals include the use of multiple UWB RTLS receivers. In one embodiment, the ranging signals additionally or alternatively include one or more VOR signals. The ranging signals are used to determine an enhanced location estimate of user device 5502. In one embodiment, the encrypted GWAP location information includes ranging signal information that describes the ranging signals to allow user device 5502 to receive and decode the ranging signals. The ranging signal information includes one or more of a modulation scheme, timing information, frequency information, and the like.

At step 5533, user device 5502 determines the location of user device 5502 relative to the location of GWAP device 5503. In one embodiment, user device 5502 calculates the differences between the longitude and latitude coordinates of both user device 5502 and GWAP device 5503. Additionally or alternatively, the differences are calculated using radial coordinates.

At step 5534, user device 5502 determines enhanced user device location information. The enhanced user device location information combines location information from user device 5502 and location information from GWAP device 5503 to form a more accurate estimate of the location of user device 5502. In one embodiment, transmissions from GWAP device 5503 include a receive signal strength indication (RSSI) that is calibrated to a specific distance so that a specific RSSI value is indicative of a specific distance between user device 5502 and GWAP device 5503. User device 5502 uses the location of GWAP 5503 with the RSSI to form a first estimate of the location of user device 5502, also referred to as a first location information source. A second estimate of the location of user device 5502 is provided by a satellite navigation module of user device 5502, also referred to as a second location information source. A third location information source is provided by an inertial measurement module that includes one or more accelerometers, gyroscopes, and magnetometers (also referred to as a nine axis sensor) to indicate changes in position and orientation of user device 5502, which can be used to determine the location and direction of the RSSI with respect to GWAP device 5503. A fourth location information source includes distance information derived from the optional ranging signals received from one or more UWB RTLS transmitters. A fifth location information source includes direction information derived from the optional ranging signals using a VOR receiver. The location information sources are combined to provide an estimated location of user device 5502 that is more accurate than any single location information source used alone.

At step 5535, user device 5502 determines the geographical coordinates of the movable zone. The geographical coordinates of the movable zone are calculated from the relative coordinates that describe boundaries of the zone in relation to the position of GWAP device 5503 and from the location and heading information of GWAP device 5503 that user device 5502 received from GWAP device 5503. In one embodiment, the movable zone information includes longitude and latitude offsets for a plurality of points that identify the boundaries of the movable zone and includes a reference heading to identify the orientation of the zone. To calculate the location of the movable zone, the current longitude and latitude coordinates of GWAP device 5503 is combined with (added to or subtracted from) the longitude and latitude offsets of the points of the movable zone to determine intermediate values for the location of the movable zone. The intermediate values are rotated by the difference between the current heading reported by GWAP device 5503 and the reference heading for the movable zone specified in the movable zone information to determine the current location of the movable zone.

At step 5536, user device 5502 determines the location of user device 5502 relative to the movable zone. In one embodiment, when user device 5502 determines that it is in the movable zone, user device 5502 displays the zone action to the user of user device 5502 to allow the user to select the zone action.

At step 5537, a request to perform the action available within the movable zone is sent from user device 5502 and is received by zonal server 5504. The request includes the most recent location information of user device 5502.

At step 5538, zonal server 5504 verifies, validates, and accepts the action request.

At step 5539, zonal server 5505 performs the action specified in the request.

Figure 56A:
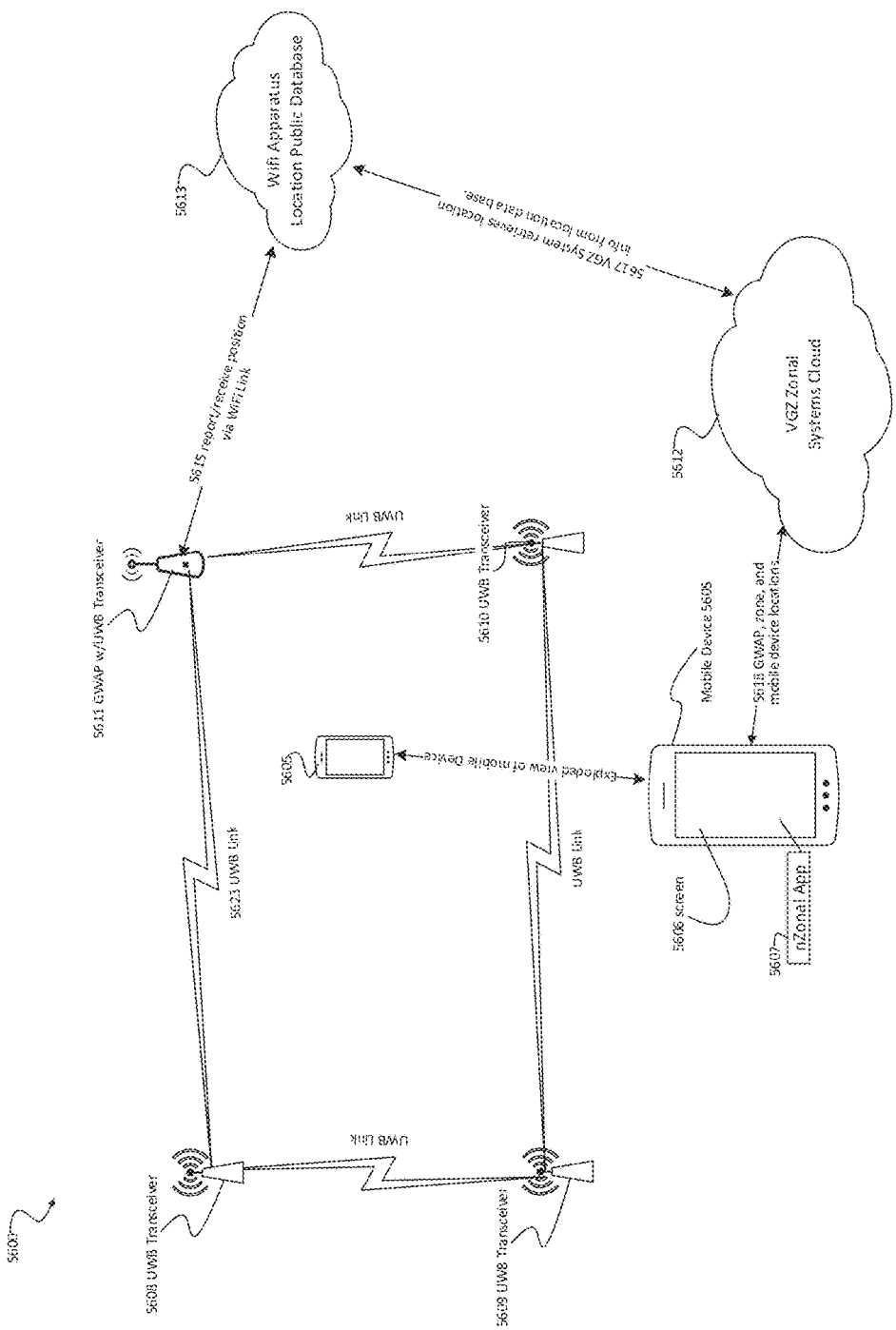
FIGS. 56A and 56B are diagrams of systems and methods for using multiple UWB transceivers and GWAPs to assist locating a mobile device in a zone.
Figure 56B:
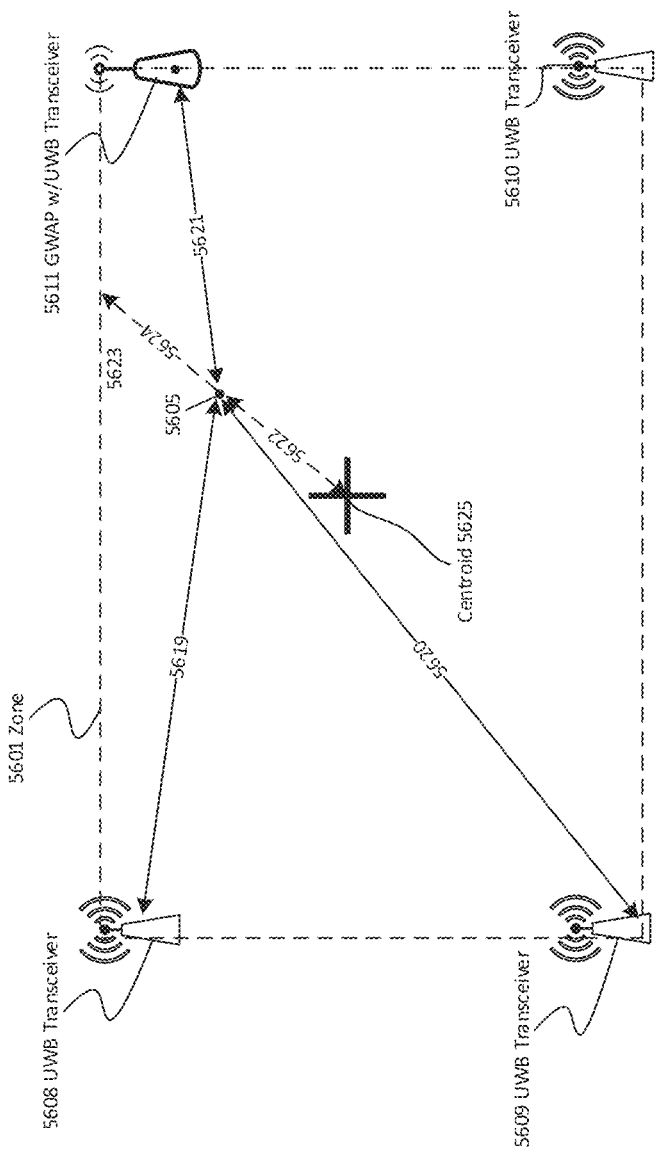

Referring to FIGS. 56A and 56B, the geo-positioning system 5600 for place zone 5601 includes UWB RTLS devices 5608 through 5610, GWAP/UWB 5611, Wi-Fi Apparatus Location Public Database 5613, VGZ Zonal Systems Cloud 5612, and mobile device 5605, which includes a UWB transmitter. UWB RTLS devices 5608, 5609, and 5610 are UWB transceivers, such as a Pozyx Labs UWB device (available at https://www.pozyx.io/) connected to an Arduino Uno device (available at https://www.arduino.cc/). GWAP/UWB device 5611 is an embodiment of the GWAP device of FIG. 53A that includes board 5300, includes the Arduino/Pozyx device connected via USB, and may optionally be an embodiment of fixed wireless device 4602 of FIG. 46. Wi-Fi Apparatus Location Public Database 5613 is a publicly accessible database of one or more of zones (such as zone 5601) and Wi-Fi apparatus, including GWAP/UWB device 5611. VGZ Zonal Systems Cloud 5612 is or includes an embodiment of VGZ System Server 201 of FIG. 2A. Mobile device 5605 is an embodiment of user device 205 of FIG. 2A and may be equipped with a UWB chipset, such as the BeSpoon smart phone (available at http://spoonphone.com/en/).

FIG. 56A depicts a system diagram. UWB RTLS devices 5608, 5609, 5610 and GWAP/UWB 5611 each determine their respective positions respectively report their positions to public database 5613 via GWAP/UWB device 5611 and link 5615. In communication 5617, zonal systems cloud 5612 retrieves the locations of UWB RTLS devices 5608, 5609, 5610, and GWAP/UWB 5611 from public database 5613. In communication 5618 between mobile device 5605 and zonal systems cloud 5612, mobile device 5605 receives GWAP/UWB and zone information from zonal systems cloud 5612 and zonal systems cloud 5612 receives mobile device location information from mobile device 5605.

Mobile device 5605 has a UWB transceiver and includes screen 5606 and runs nZonal App 5607.

FIG. 56B depicts UWB RTLS devices 5608, 5609, 5610 and GWAP/UWB 5611, respectively. Mobile device 5605 is at location 5604. Location 5604 is distance 5619 from the location of UWB transceiver device 5608, distance 5620 from the location of UWB transceiver device 5609, and distance 5621 from the location of GWAP/UWB device 5611.

In one embodiment, mobile device 5605 receives ranging signals in the form of UWB pulses from UWB transceiver devices 5608 and 5609 and from GWAP/UWB 5611. Mobile device 5605 uses these signals to determine distances 5619, 5620, and 5621.

In one embodiment, UWB transceiver devices 5608 and 5609 and GWAP/UWB 5611 receive ranging signals from mobile device 5605. UWB transceiver devices 5608 and 5609 and GWAP/UWB 5611 respectively determine distances 5619, 5620, and 5621 and UWB transceiver devices 5608 and 5609 report distances 5619 and 5620 to GWAP/UWB 5611. Alternatively, UWB transceiver devices 5608 and 5609 report the ranging signals received from mobile device 5605 to GWAP/UWB 5611 and GWAP/UWB 5611 determines each of distances 5619, 5620, and 5621 from the ranging signals reported by UWB transceiver devices 5608 and 5609 and from the ranging signal received from mobile device 5605.

Zonal app 5607 running on mobile device 5605, which is equipped with a UWB transceiver, or a NAV system of mobile device 5605 can calculate the position of mobile device 5605 to be location 5604 accurately based on the location of UWB devices 5608 and 5609 and the location of GWAP/UWB 5611. In one embodiment, the GPS coordinates (longitude, latitude, altitude) of UWB devices 5608 and 5609 and of GWAP/UWB 5611 are known and respective distances 5619, 5620, and 5621 are calculated after receiving ranging signals from UWB devices 5608 and 5609 and of GWAP/UWB 5611. The known GPS coordinate and calculated distances are combined (e.g., via triangulation or trilateration) to determine that mobile device 5605 is located at location 5604.

After determining its location at position 5604, mobile device 5605 can then determine if it is in zone 5601. In one embodiment, mobile device 5605 determines whether location 5604 is inside zone 5601 by determining of location 5604 is within an area created from edge 5623 and centroid 5625 of zone 5601. Edge 5623 is selected because it corresponds to the vertices of the zone where UWB transceiver 5608 and GWAP/UWB 5611 are located, which are the closest two vertices to location 5604. Radial 5622 extends from centroid 5625 of zone 5601 to point 5604 (the location of mobile device 5605) and has a length that is proportionate to the distance between point 5604 and centroid 5625 of zone 5601. Radial 5624 extends from centroid 5625 of zone 5601 to edge 5623 so that any point along radial 5624 is within zone 5601. Radial 5622 and radial 5624 have the same angle with respect to centroid 5625 so that the lengths of radial 5622 and radial 5624 can be compared directly. When radial 5622 is longer than radial 5624 (not shown), subtracting radial 5622 from radial 5624 yields a negative number and indicates that point 5604 is outside of zone 5601. When radial 5622 is equal to or shorter than radial 5624 (as shown), subtracting radial 5622 from radial 5624 yields a positive number or zero and indicates that point 5604 is inside of zone 5601.

UWB devices 5608, 5609, 5610 and GWAP/UWB 5611 automatically or manually report their respective positions to Wi-Fi Apparatus Location Public Database 5613, which in turn can be queried by VGZ Zonal Systems Cloud 5612.

The location of UWB devices 5608, 5609 and GWAP/UWB 5611, may be placed in a database in the VGZ cloud 5612 that is accessed by the mobile device app 5607 of FIG. 56A. Alternatively, one or more of devices 5608, 5609 and 5611 can transmit their locations as beacons using RSSI and VOR technology as described above.

The use of UWB and GWAP/UWB devices to provide Internet access and NAV system information to a place zone may be indicated on a marker on a map by a "Z+" symbol as a "Z Plus" zone, such marker may be placed at the location of the geo-located Wi-Fi apparatus that most closely approximates the center of the zone.

A user may access such a Z+ zone, by tapping the marker on touch sensitive touch screen 5606 of mobile device 5605. Tapping on the marker of a Z+ zone may deliver the location of the nearest GWAP as part of a zonal profile.

Zonal app 5607 or the NAV system of mobile device 5605 can then estimate the position of mobile device 5605 to be location 5604 accurately based on the location of GWAP devices 5608, 5609, and 5610 using the received signal strength indications (RSSI) from the GWAP devices within range based on a predicted "fingerprint" of the RSSIs, as described in "W-Fi Localization Using RSSI Fingerprinting" by Navarro, et al. (available at http://digitalcommons.calpoly.edu/cgi/viewcontent.cgi?article=1007&context=pesp) and/or by use of UWB RTLS transceivers such as those available from Pozyx Labs (https://www.pozyx.io) or in a UWB equipped phone such as a BeSpoon (available at http://spoonphone.com/en/) in conjunction with one or more GWAPs.

Figure 57A:
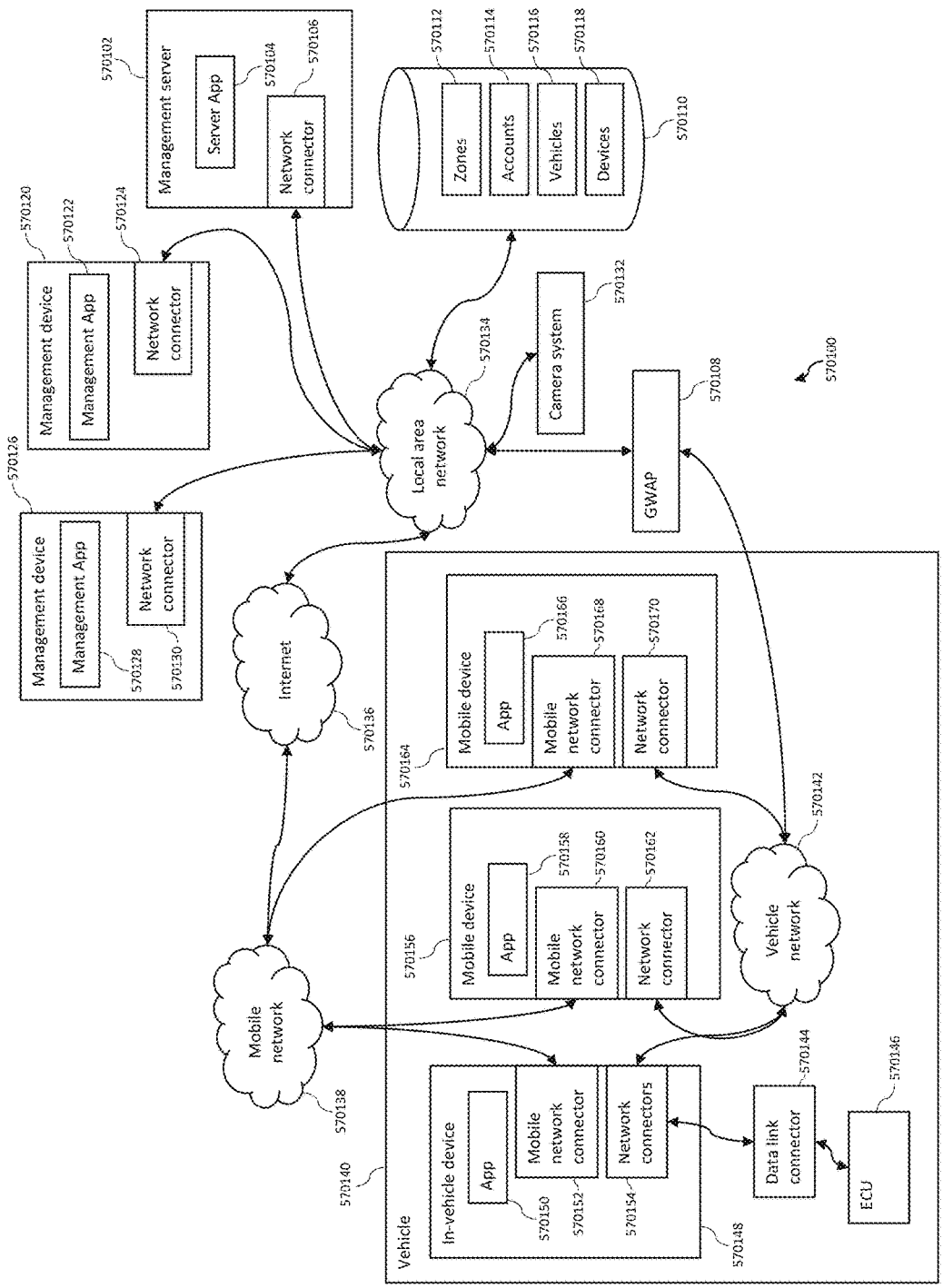
FIG. 57A is a system diagram for a toll collection system.

Referring to FIG. 57A, toll collection system 570100 is a preferred embodiment of the systems described in FIG. 2 and FIG. 40B. System 570100 is used to monitor the use of toll roads. Management devices 570120 and 570126 are used to control the system. Cameras system 570132 generates images and devices 570148, 570156, and 570164 generate positioning information relative to virtual zones. System 570100 processes the images and positioning information to generate billing information and events. System 570100 uses a scheme of alerts and device activations to control system 570100 based on information that includes information related to account information, zone information, zone update events, billing events, account update events, and account status events as well as usage history and statistics.

Management server 570102 includes memory and processors that store and execute server app 570104, which performs the functions of management server 570102. Management server 570102 also includes network connector 570106, which connects management server to the other devices of the system through one or more networks, such as local area network 570134, Internet 570136, mobile network 570138, and vehicle network 570142. Management server 570102 receives images from camera system 570132 and positioning and pairing data from devices 570148, 570156, and 570164 to determine which accounts to bill for access to a toll road. In a preferred embodiment, management server 570102 comprises multiple physical servers, virtual servers, and cloud servers that host multiple server applications, which together comprise server app 570104.

Geo-location wireless access point (GWAP) 570108 is also a part of system 570100. In a preferred embodiment, GWAP 570108 is located at a gate zone, such as an entrance or exit zone, to a toll road, which may be beyond the range of mobile network 570138. GWAP 570108 provides connectivity and location services to devices 570148, 570156, and 570164. In a preferred embodiment, GWAP 570108 connects between local area network 570134 and vehicle network 570142, which may include direct connections from GWAP 570108 to devices 570148, 570156, and 570164 using Bluetooth or Wi-Fi. With GWAP 570108, devices 570148, 570156, and 570164 can provide zone trigger alerts even when mobile network 570138 is unavailable to devices 570148, 570156, and 570164.

Data store 570110 stores information used by system 570100. In a preferred embodiment, the information used by system 570100 includes zone information 570112, account information 570114, vehicle information 570116, and device information 570118. In a preferred embodiment, individual databases are maintained for each of zone information 570112, account information 570114, vehicle information 570116, and device information 570118.

Zone information 570112 includes information about the zones of the system. Each zone includes one or more properties, parameters, and billing formula. In a preferred embodiment, the properties and parameters include a type identifier that identifies the type of zone, global positioning coordinates that identify the location of the zone (longitude, latitude, and altitude), a time schedule that identifies when the zone is active and billing rates for different times, a description that describes the zone, and a unique identifier for the zone. The billing formula identifies what information is used to calculate a toll transaction and how that transaction is calculated. For example, the billing formula for a high occupancy vehicle zone gives a discount based on the number of occupants in a vehicle and the type of vehicle.

Account information 570114 includes information about the user and management accounts that are used in conjunction with system 570100. The user accounts aggregate user contact information, vehicle information, and device information that are associated with a single account. The management account information aggregates information about the users of management devices 570126 and 570120, such as username, password, date of employment, privilege levels, and authority levels.

Vehicle information 570116 includes information about vehicles that have used system 570100, including information for vehicles that have not been associated with a user account. When a vehicle that is not associated with a user account uses a toll road, the information about that vehicle—license plate number, image of vehicle at a gate zone, date and time of toll road usage—is stored by system 570100.

Information related to all of the devices that use system 570100 and the toll roads associated with system 570100 is stored with device information 570118. Device information 570118 includes information about devices associated with user accounts and information about devices that are not associated with user accounts. Devices that are not associated with user accounts include devices that have been deactivated or removed from active use with a user account.

In a preferred embodiment, a zone for a toll road includes subzones. The subzones are sections of the toll zone that correspond to a fixed number of lanes and a distance of the toll zone. Additionally, a subzone can be identified as: a work zone that charges higher fines when speed limits are exceeded, a high occupancy vehicle zone that charges lower prices when a vehicle of a certain type includes a certain number of occupants, an electric vehicle zone that is designated for electric vehicles and gives discounts, an autonomous vehicle zone that is reserved for autonomous vehicles and charges a discounted price, and virtual gate zones that are used to access to specific parts of the toll zone. For each type of subzone, the billing formula identifies the information that needs to be verified.

System 570100 also includes the use of temporal zones or subzones that are associated with a zone or subzone and modifies the billing formula for the zone or subzone based on time, date, or a temporal schedule. For example, rush hour temporal zones increase the toll amount during a predetermined time interval at predetermined gate zones on a repeating schedule, e.g., Monday through Friday, excluding holidays. Additionally, special events such as concerts or large sporting events may necessitate the use of a nonrepeating temporal zones that adjust the toll amount before, during, and after the event. In a preferred embodiment, the toll amounts during the hour before the start of the event and during the hour after the end of the event are increased by a fixed amount and the toll amounts during the event are decreased by a fixed amount to reduce the amount of traffic congestion.

Management devices 570120 and 570126 control system 570100. Types of management devices include smartphones, tablet computers, and desktop computers. Management devices 570120 and 570126 respectively include management apps 570122 and 570128 and network connectors 570124 and 570130. Management apps 570122 and 570128 each include a set of applications stored in memory that, when executed, allow management devices 570120 and 570126 to interact with the other devices in system 570100. Management apps 570122 and 570128 can be embodied as a smartphone app, a stand-alone desktop application (a thick client), or a browser application (a thin client). Management devices 570120 and 570126 are used to specify the zone information (coordinates and times) as well as the actions for the zones. In a preferred embodiment, the actions include charging an account when a zone associated with a toll road is entered or exited. Control of system 570100 with management devices 570120 and 570126 is performed using requests, alerts, and notifications that are sent between management device 570120, management device 570126, and management server 570102. In a preferred embodiment, if management device 570120 is not connected to network 570134, an alert is sent wirelessly to management device 570126, which then connects to management device 570120 to activate management device 570120.

Camera system 570132 provides images of zones related to toll roads. Camera system 570132 includes a set of cameras that are placed so that the vehicles within the image can be clearly seen and identified. Camera system 570132 includes memory and processors to generate images, and metadata about the images, including the date and time the images were created. In a preferred embodiment, the images of camera system 570132 are a stream of video and the metadata identifying the vehicles is tagged to the stream by identify the camera that produced the stream and the image within the stream.

Local area network 570134 provides data connectivity between camera system 570132, management server 570102, and management devices 570120 and 570126. Local area network 570134 includes one or more routers and switches and provides wired or wireless connectivity.

Internet 570136, connects between local network 570134 and mobile network 570138.

Mobile network 570138 connects mobile devices to Internet 570136. In a preferred embodiment, mobile network 570138 is a cellular network that complies with one or more standards of second, third, fourth, or fifth generations (2G, 3G, 4G, 5G) of wireless mobile telecommunications technology, including Global System for Mobile Communications (GSM), Universal Mobile Telecommunications System (UMTS), and Long Term Evolution (LTE) Advanced.

Vehicle 570140 uses toll roads that are monitored by system 570100. Vehicle 570140 includes in-vehicle device 570148, Data Link Connector (DLC) 570144, and engine control unit (ECU) 570146.

Vehicle network 570142 connects in-vehicle device 570148, mobile device 570156, and mobile device 570164. Vehicle network 570142 uses one or more wired or wireless connection technologies that include USB, Bluetooth, and Wi-Fi.

Data Link Connector 570144 provides access to engine control unit 570146. In a preferred embodiment, Data Link Connector 570144 is a multi-pin diagnostic connection port and is an OBD-II compliant interface.

Engine control unit 570146 controls an engine of vehicle 570140 based on data from one or more sensors and utilizing one or more actuators. Engine control unit 570146 also stores identification information about vehicle 570140, including the vehicle identification number, date of manufacture, model year, model type, mileage, range, fuel level, and engine status.

In-vehicle device 570148 provides information about vehicle 570140 to one or more of mobile devices 570156 and 570164. In a preferred embodiment, in-vehicle device 570148 is an infotainment system that has been installed into vehicle 570140 that provides information and entertainment to occupants of vehicle 570140. In-vehicle device 570148 includes mobile network connector 570152 to connect to mobile network 570138 and network connectors 570154. App 570150 is stored in and executed by memory and processors of in-vehicle device 570148. In a preferred embodiment, app 570150 includes a zone processing code that compares the current position of vehicle 570148 to the zones identified with management devices 570120 and 570126 and used by management server 570102. In a preferred embodiment, in-vehicle device 570148 provides positioning information that identifies the current location of vehicle 570140 and provides pairing information that identifies mobile devices 570156 and 570164 as well as the connections to mobile devices 570156 and 570164.

In another preferred embodiment, in-vehicle device 570148 is a Bluetooth device that is connected to Data Link Connector 570144 and paired with mobile devices 570156 and 570164, such as a Bluetooth OBD-II dongle. In this embodiment, in-vehicle device 570148 publishes the identifying information from engine control unit 570146 directly to the apps 570158 and 570166 in mobile devices 570156 and 570164, but does not provide entertainment to the occupants of vehicle 570148.

Network connectors 570154 allow for wired and wireless connections to other devices and includes a connection to Data Link Connector 570144 and a connection to vehicle network 570142. In a preferred embodiment, the connection between Data Link Connector 570144 and one of network connectors 570154 is by an OBD-II to USB converter that connects from the an OBD-II port of Data Link Connector 570144 to a USB port of network connectors 570154.

After pairing mobile devices 570156 and 570164 to in-vehicle device 570148, mobile devices 570156 and 570164 can access the identification information from engine control unit 570146 that is available to in-vehicle device 570148 through Data Link Connector 570144. Because mobile devices 570156 and 570164 have paired with in-vehicle device 570148 and because in-vehicle device 570148 is connected to engine control unit 570146 through Data Link Connector 570144, in-vehicle device 570148 has access to the vehicle identification information and can publish that information to mobile devices 570156 and 570164. Because mobile devices 570156 and 570164 have paired with in-vehicle device 570148, mobile devices 570156 and 570164 can receive the vehicle identification information published by in-vehicle device 570148. Each one of app 570150 on in-vehicle device 570148, app 570158 on mobile device 570156, and app 570166 on mobile device 570164 can respond to a query from server 570100. Additionally, the current license plate number of vehicle 570140 can be entered into any one of apps 570150, 570158, and 570166 through interaction with a user and then shared with any one or more of the other devices 570148, 570156, and 570164. Devices 570148, 570156, and 570164 can use either or both of the license plate number and vehicle identification number to interact with toll system 570100.

Other mobile devices of other users that are in vehicle 570140 that are running a zonal app connected to server 570102 will not have a vehicle identification number available through in-vehicle device 570148 because the other mobile devices are not paired with in-vehicle device 570148.

Mobile devices 570156 and 570164 are the mobile devices of a user of system 570100. Mobile devices 570156 and 570164 can be smartphones, tablet computers, or other computing devices that can be connected to mobile network 570138. In a preferred embodiment, mobile device 570156 is a smartphone and mobile device 570164 is a tablet computer. In a preferred embodiment, each of mobile devices 570156 and 570164 are configured to determine their respective locations through navigation services and then determine their respective global positions relative to one or more zones. In a preferred embodiment, mobile devices 570156 and 570164 are activated by in-vehicle device 570148 after in-vehicle device 570148 receives an alert from management server 570102. In another preferred embodiment, alerts from management server 570102 are sent directly to mobile devices 570156 and 570164 to activate apps 570158 and 570166, respectively. In response to being activated, apps 570158 and 570166 of mobile devices 570156 and 570164 provide response alerts to server 570102 that each includes vehicle information, such as the vehicle identification number, license plate number, or both. The response alerts with the vehicle information that are received by server 570102 allows server 570102 to authorize communications and billing charges to accounts associated with mobile devices 570156 and 570164.

Server app 570104 in combination with and apps 570150, 570158, and 570166 interact through sequences of alerts and activations to provide functionality to users of system 570100. In a preferred embodiment, one application includes a billing application that charges the correct toll amount based on the type of vehicle 570140, the number of occupants in vehicle 570140, the types of lanes that vehicle 570140 is using (e.g., a high occupancy vehicle lane), the number of axles of vehicle 570140, the time of day, the day of the week, the day of the month, the month of the year, and the amount of congestion in the current zone measured by the number of vehicles entering the zone per minute, the number of vehicles exiting the zone per minute, and the average speed per vehicle.

Another application is a communication application that displays the location of other devices that are present on a toll road. Upon selection of a device displayed on the app, a message is generated with interaction from the user and sent to the other device. When the devices are within a threshold distance, the message is sent through a peer to peer connection between the devices. Alternatively, the message is sent through Internet 570136 to server 570102, which passes it along to the appropriate device.

In a preferred embodiment, the user interface of apps 570150, 570158, and 570166 shows a map with the toll zones and markers on the toll zones. In a preferred embodiment, apps 570150, 570158, and 570166 anticipate a next zone that the device is travelling towards by speed sensitive polling of the location of vehicle 570140.

Figure 57B:
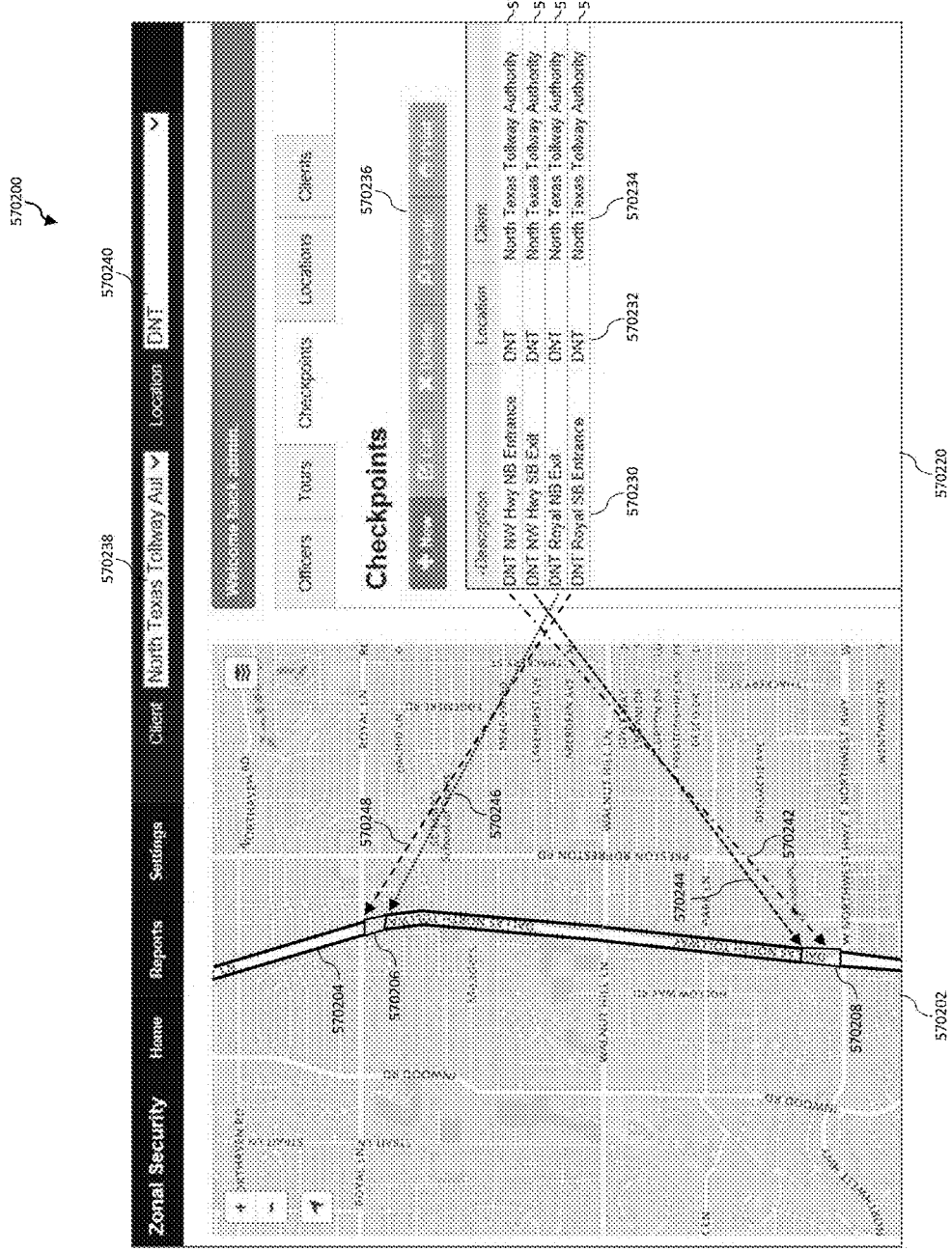
FIG. 57B is a user interface diagram displaying an augmented road map for management of a toll collection system.

Referring to FIG. 57B, user interface 570200 is part of a management application, such as management app 570122 of FIG. 57A. Client selector 570238 is used to select the client, which in this case is the toll authority that maintains and operates the toll road. Location selector 570240 selects the toll road of the selected client to be managed using user interface 570200. User interface 570200 includes map 570202 and table 570220.

Map 570202 is a road map that displays the toll road. Zone 570204 extends for the entire length of the toll road and includes zone 570206 and zone 570208. In a preferred embodiment, zones 570206 and 570208 are subzones of zone 570204. Zone 570206 includes an entrance and an exit to the toll road associated with zone 570204. Zone 570208 also includes an entrance and an exit to the toll road. Each entrance and exit to the toll road can be identified as separate zones or sub-zones that are related to or are a part of zone 570204.

Both the entrances and exits at zones 570206 and 570208 to toll zone 570204 may be embodied as combined physical and virtual gates, that are used to compel the driver to enter the toll zone lane at a specific location where there are cameras to record the tolled event. The virtual gates are further described in FIGS. 57C, 57D, 57E, and 57F. If the portion of toll zone 570204 between zones 570206 and 570208 is entered or exited at places other than zones 570206 and 570208, system 570100 may issue a citation to the account associated with the vehicle that did not use zones 570206 and 570208 to enter the portion of toll zone 570204 between zones 570206 and 570208.

The toll lane zone's existence and conditions can be temporal, meaning it can be turned on at various times, turned off completely during emergencies, or charge a different toll for peak hours, and a lesser toll for off-peak hours.

Zones and subzones used as toll zones can be configured to exclude vehicular access to some lanes, such as large trucks, via fines, and include or enable certain vehicles, such as approved electric vehicles, from designated lanes. For example, zone 570204 can optionally include a subzone for high-occupancy vehicle or electric vehicle lanes where discounts to tolls are provided to verified users of those lanes. In a preferred embodiment, verification of high-occupancy vehicle is performed by receiving zone trigger alerts from multiple mobile devices in a same vehicle. In a preferred embodiment, verification of electric vehicles is performed by checking the vehicle identification number for the vehicle make, model, and year and cross referencing the vehicle make, model, and year with previously identified vehicles that qualify as electric vehicles. The creation, identification, and enumeration of the zones and subzones used with system 570100 is done through interaction between management devices 570120 and 570126, which is shown in FIGS. 57F and 57G.

Table 570220 includes rows 570222, 570224, 570226, and 570228 that each provide information of a database record. Each row is associated with one entrance or exit to the toll road, shown in the table below. In a preferred embodiment, a database record for each row also identifies a set of zones associated with the row. For example, row 570222 is associated with zone 570204 for the toll road and associated with entry/exit zone 570208.

| Row | Entrance/Exit |
|---|---|
| row 570222 | Northbound entrance at Northwest Highway |
| row 570224 | Southbound exit at Northwest Highway |

| Row | Entrance/Exit |
|---|---|
| row 570226 | Northbound exit at Royal Lane |
| row 570228 | Southbound entrance at Royal Lane |

Table 570220 also includes columns 570230, 570232, and 570234. Column 570230 provides a description for the entrance/exit; column 570232 identifies the toll road of the client; and, column 570234 identifies the client.

Arrows 570242, 570244, 570246, and 570248 provide a visual indication that shows where the entrance or exit associated with a row is located on map 570202. In a preferred embodiment, arrows 570242, 570244, 570246, and 570248 automatically appear and disappear based on whether the zone associated with the row is visible on map 570202.

Set of buttons 570236 are used to create, edit, and delete entrances, exits, and zones. Selecting one of the buttons from set of buttons 570236 opens a sequenced set of dialog boxes that are used to gather the information to create and update the database records associated with the entrances, exits, and zones.

Figure 57C:
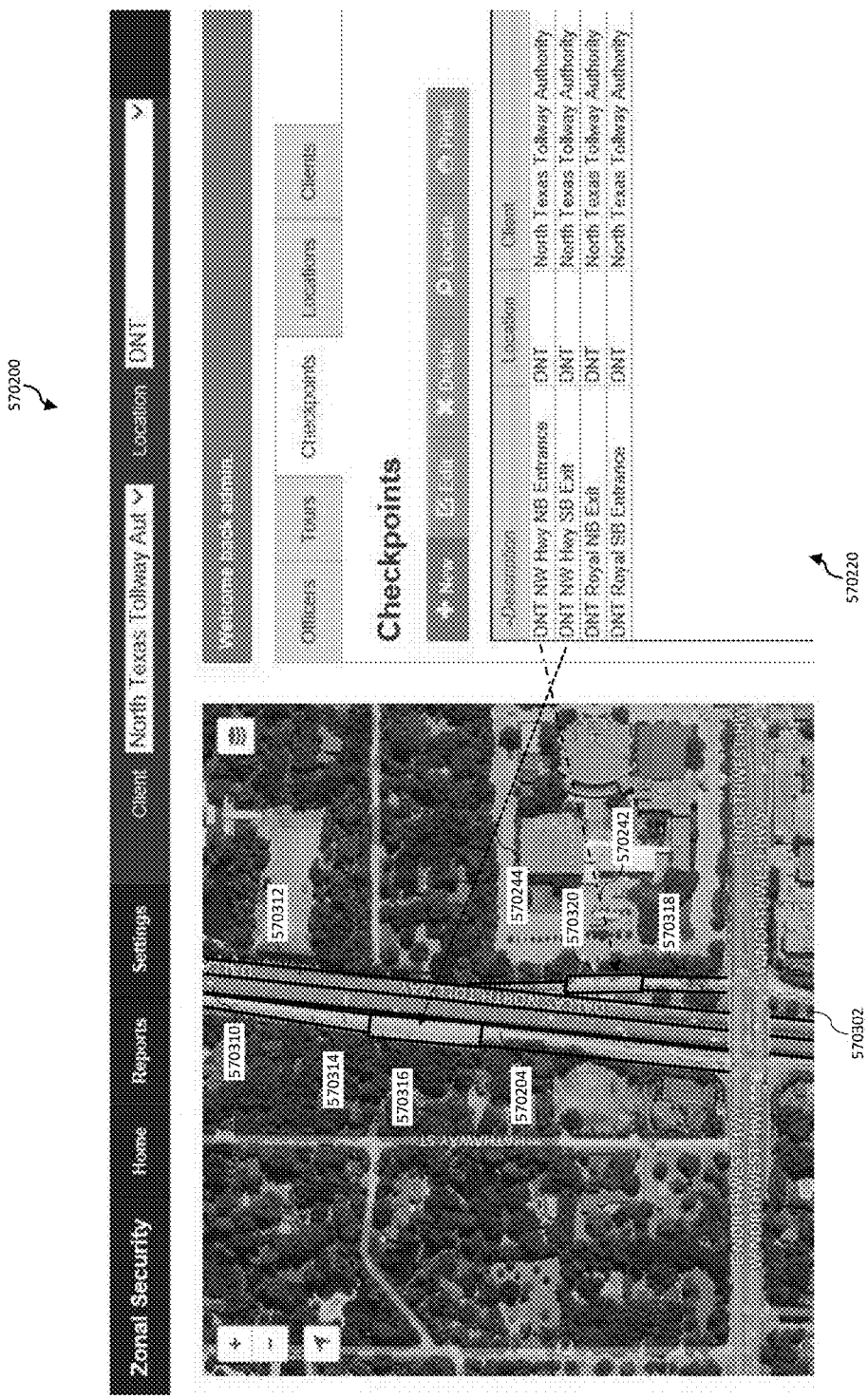
FIG. 57C is a user interface diagram displaying an augmented satellite image for management of a toll collection system.

Referring to FIG. 57C, user interface 570200 is updated to show augmented satellite map 570302 in place of road map 570202. Augmented satellite map 570302 is zoomed-in to show additional details and updates to the zones. Zone 570204 of the toll road includes zone 570310 for the Southbound lanes, and zone 570312 for the Northbound lanes. Zone 570314 is associated with the Southbound exit lanes and includes zone 570316. Zone 570316 is where the camera system is located to provide video and images of the vehicles exiting the toll road. Northbound entrance is associated with zone 570318, which also includes camera zone 570320.

Arrows 570244 and 570242 are resized to point to camera zones 570320 and 570316, respectively.

Figure 57E:
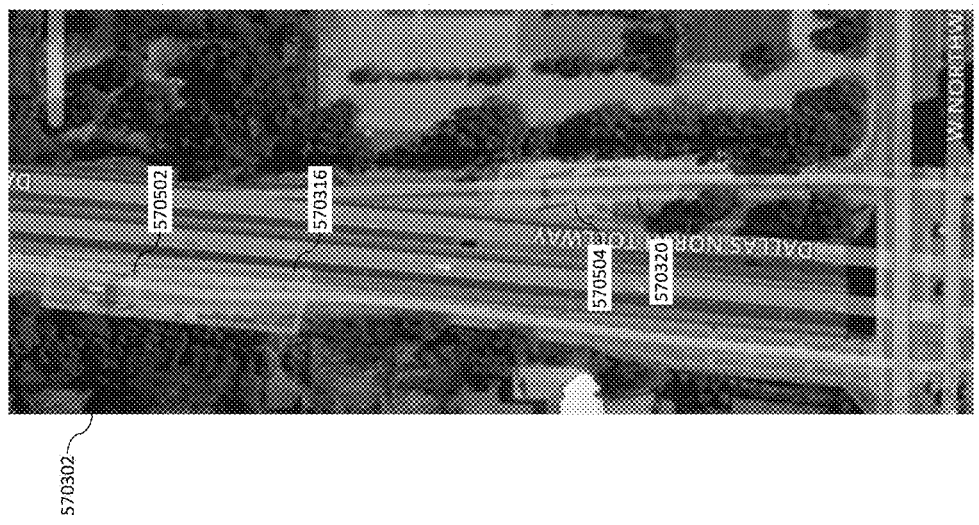
FIG. 57E is a user interface diagram displaying an augmented satellite image for zone management of a toll collection system.
Figure 57D:
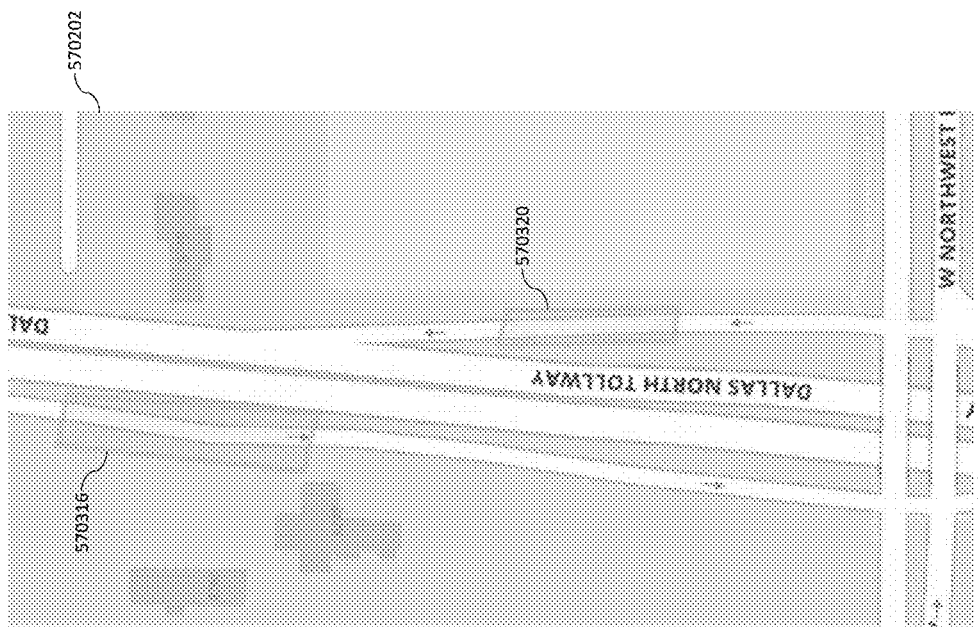
FIG. 57D is a user interface diagram displaying an augmented road map for zone management of a toll collection system.

Referring to FIG. 57D, map 570202 is enlarged even further to show additional detail of camera zones 570316 and 570320.

Referring to FIG. 57E, map 570202 is replaced with augmented satellite map 570302 and shows camera system 570502 for the Southbound exit lanes and camera system 570504 for the Northbound entrance lanes.

Referring to FIG. 57F, a schematic diagram 570600 shows a preferred embodiment of a camera system 570132 of FIG. 57A. Camera system 570602 includes cameras 570606, 570608, 570610, and 570612 mounted to support structure 570604. Cameras 570606, 570608, 570610, and 570612 respectively have fields of view 570616, 570618, 570620, and 570622. Cameras 570606, 570608, 570610, and 570612 generate images and video of the vehicles that travel through zone 570622.

GWAP 570614 is attached to support structure 570604 and provides location and connectivity services to the devices in vehicles 570626, 570636, 570646, and 570658. In a preferred embodiment where a mobile network is not available, the mobile devices store zone trigger alerts that cannot be sent due to lack of network connectivity. The zone information is transferred from the server to the mobile device so that the mobile device can continuously check its location with respect to zones identified in system 570100. When a mobile device with stored zone trigger alerts engages with GWAP 570614, connectivity with system 570100 is established and the mobile device provides stored and newly generated zone trigger alerts to system 570100. By recruiting the smart device's GPS, the device can report into a zone even when it has no cell-service or Internet access, then report the zones it has been in when cell service or Internet access is regained.

Processor 570674 is part of system 570100. In a preferred embodiment, processor 570674 interfaces between camera system 570602 and the rest of system 570100. In a preferred embodiment, processor 570674 is used to process images from one or more of cameras 570606, 570608, 570610, and 570612 to identify the vehicles passing through the gate zone and onto the toll road. One or more programs executed by processor 570674 recognize front license plates and back license plates on the vehicles passing through support structure 570604.

In an optional embodiment, physical gate 570672 is attached to support structure 570604. Physical gate 570672 prevents vehicles from proceeding through the gate zone and onto the toll road until a toll has been paid. Physical gate 570672 is manipulated and actuated in response to a toll event.

In a preferred embodiment, zone 570622 is at an entrance to a toll road. Vehicles 570626, 570636, 570646, and 570658, are within zone 570622 to enter the toll road.

Vehicle 570626 includes front license plate 570628, in-vehicle device 570630, mobile device 570632, and back license plate 570634. Vehicle 570626 has already approached and passed camera system 570602 and is in field of view 570616 of camera 570606, which provides images and video of vehicle 570626 that includes an image of back license plate 570634 of vehicle 570626. On its approach to camera system 570602, vehicle 570626 was in field of view 570618 of camera 570608.

Approaching camera 570608 is vehicle 570636. Front license plate 570638 is visible to camera 570608. Mobile device 570642 is wirelessly connected to in-vehicle device 570640 and sends a zone trigger message to a management server. The zone trigger message indicates that vehicle 570636, in-vehicle device 570640, and mobile device 570642 have entered zone 570622. In a preferred embodiment, the zone trigger message also includes authentication credentials that include the vehicle identification number and license plate number of vehicle 570636, which was transmitted from in-vehicle device 570640 to mobile device 570642 through a Data Link Connector.

Receding from camera system 570602 is vehicle 570646 with in-vehicle device 570650, mobile device 570652, and mobile device 570654. In a preferred embodiment, the toll collection system collects tolls on a per vehicle basis so the even when both mobile devices 570652 and 570654 pass through zone 570622, only the account associated with vehicle 570646 is charged. In a preferred embodiment, system 570100 checks the zone trigger messages from mobile devices 570652 and 570654 for authentication credentials received after being paired with in-vehicle device 570648. Mobile device 570652 is paired with in-vehicle device 570648 and includes authentication credentials from in-vehicle device 570648, whereas mobile device 570654 is not paired with in-vehicle device 570648 and did not include authentication credentials from in-vehicle device 570648. System 570100 generates a charge and billing alert to the account associated with mobile device 570652 based on the inclusion of the authentication credentials in the zone trigger message that was generated by mobile device 570652 and sent to server 570102.

When vehicles 570636 and 570658 and the devices within are close enough, peer network 570670 is formed between devices 570640, 570642, 570662, 570664, and 570666. In a preferred embodiment, peer network 570670 is a wireless network that uses Wi-Fi or Bluetooth. The locations of devices 570640, 570642, 570662, 570664, and 570666 are displayed by the apps running on devices 570640, 570642, 570662, 570664, and 570666. Selection of one of devices 570640, 570642, 570662, 570664, and 570666 in the app allows for communication to the selected device using the app.

In another preferred embodiment, tolls are collected per person and the accounts associated with each of mobile devices 570652 and 570654 are charged. An image of back license plate 570656 was recorded with camera 570610 and an image of front license plate was recorded with camera 570612 before vehicle 570646 passed support structure 570604 of camera system 570602.

Vehicle 570658 is moving towards support structure with front license plate 570660 being imaged by camera 570612. In-vehicle device 570662, mobile device 570664, and mobile device 570666 are interconnected with a vehicle network. Back license plate 570668 of vehicle 570658 will be imaged by at least one of cameras 570606 and 570610 of camera system 570602 after vehicle 570658 passes support structure 570604.

Referring to FIG. 57G, sequence diagram 570700 further illustrates the flow and processing of information of toll collection system 570100 of FIG. 57A. Management device 570702 is used to control operation of the system as performed by management server 570704.

At step 570712, login information is provided to management device 570702 by a user. The login information includes a user name and password.

At step 570714, a login request generated by management device is transmitted from management device 570702 to management server 570704. In a preferred embodiment, the login request includes the username and password supplied by the user along with other information that identifies the management device, such as a media access control (MAC) address, subscriber identification module (SIM) number, and international mobile equipment identity (IMEI) number.

At step 570716, management server 570704 process the login request. Management server 570704 verifies the login credentials including the username and password and activates one or more server applications to manage and handle the client application running on management device 570702. After the server applications have been activated, management server 570704 generates a login alert. The login alert identifies if the login was successful and includes instructions to activate the application on management device 570702.

At step 570718, the login alert generated by management server 570704 is transmitted by management server 570704 and is subsequently received by management device 570702.

At step 570720, management device 570702 processes the login alert received from management server 570704. When the login alert indicates that the login was successful, the instructions to activate the application on management device 570702 are executed. In a preferred embodiment, the login alert may be wirelessly received by a second management device, that when connected to management device 570702, activates the application on management device 570702.

At step 570722, zone identification information is sent from management device to management server 570704. The zone identification information was generated by management device in response to user input to management device 570702. The zone identification information identifies the zone with a unique code and coordinates of a closed polygon for the zone.

At step 570724, the zone information received by management server 570704 from management device 570702 is processed by management server 570704. Management server 570704 stores the zone information in a database and checks the zone information received from management device 570702 and determines if there are any problems with the new zone information. Examples of potential problems are a malformed zone, malformed zone identification number, or a conflict with another existing zone. If a problem is identified, then the zone alert generated by management server 570704 identifies the issue and suggests a solution when one is available. Management server 570704 generates a zone alert that indicates whether the zone information has been successfully processed.

At step 570726, management server 570704 sends the zone alert, which is subsequently received by management device 570702.

At step 570728, management device 570702 processes the zone alert. The zone alert includes instructions to activate the application running on management device 570702 and alert the user to the status of the zone processing. Management device 570702 executes the instructions, activates the application, and alerts the user.

At step 570730, management device 570702 sends subzone information that identifies one or more subzones related to a zone that has already been created and stored in the database. The user of management device 570702 provided the input used to generate the subzone information by management device 570702. The subzone information includes an identifier for the zone, an identifier for a subzone, and updated information for the subzone, such as coordinate information for the perimeter of the subzone.

At step 570732, management server 570704 receives the subzone information and generates alerts based on processing the subzone information. The subzone information is included as part of an alert from management device 570702 that activates a subzone processing application of management server 570704. The subzone processing application checks the subzone information for inconsistencies and errors. A subzone alert is created that identifies whether the subzone was successfully added to the database of zone information and, if the subzone could not be added, the subzone alert includes information describing why the subzone could not be added to the zone database.

At step 570734, the subzone alert generated by management server 570704 is sent by management server 570704 and received by management device 570702. The subzone alert includes instructions for activating the app running on management device 570702.

At step 570736, management device 570702 processes the subzone alert. The instructions in the subzone alert, when executed by management device 570702 cause management device 570702 render and display information from the subzone alert, including whether the subzone has been successfully added to the database of zone information.

At step 570738, a user of management device 570702 provides weights and rules to the system using management device 570702. The weights and rules identify how tolls are to be collected (rules) and at what rates (weights). Each zone or subzone can have different weights and rules. Toll amounts can be adjusted based on a schedule for the time of day, day of week, day of month, and special one-time events. The toll amount schedule is included with the weights and rules identified with management device 570702. In a preferred embodiment, the weights and rules are stored as one or more billing formulas that are included in the information for each zone or subzone.

At step 570740, identification of the weights and rules is sent from management device 570702 to management server 570704.

At step 570742, management server 570704 generates alerts based on the weights and rules received from management device 570702. The weight and rule alerts generated by management server 570704 identify whether the weights and rules have been successfully stored and applied to the zones.

At step 570744, the weight and rule alerts are sent from management server 570704 to management device 570702.

At step 570746, management device 570702 processes the weight and rule alerts. In a preferred embodiment, management device 570702 executes instructions in the weight and rule alerts that cause management device 570702 to wake up the client app on management device 570702 that is response to the server app running on management server 570704. The instructions in the alert cause management device 570702 to generate, render, and display information in the alert including whether the weight and rule information has been successfully stored, processed, and applied by management server 570704 to the zones stored in the database.

Referring to FIG. 57H, sequence diagram 570800 further describes the procedures and operations used to set up a user account with toll system 570100. Mobile device 570804 interacts with management server 570802 to set up a user account. Mobile device 570804 can be a smartphone, tablet computer, desktop computer, or in-vehicle computer.

At step 570812, mobile device 570804 downloads the application used by mobile device 570804 to interact with management server 570802 in a toll collection system, such as system 570100 of FIG. 57A. In a preferred embodiment, the app is one of a client application that operates in a browser application running on mobile device 570804 or a stand-alone app that is downloaded from an app store by mobile device 570804.

At step 570814, a user interacting with mobile device 570804 provides identity and password information. Mobile device 570804 takes the information provided by the user and generates login credentials that will be used by the system to identify an account of the user.

At step 570816, the login credentials generated by mobile device 570804 are sent from mobile device 570804 to management server 570802.

At step 570818, the login credentials are processed by management server 570802, which generates alerts based on the login credentials provided by mobile device 570804. For an initial account setup, management server 570802 creates a new account and stores login credential information with the account. Management server 570802 generates alerts related to the setup and login attempt that identifies if the account has been properly set up and does not interfere with other accounts.

At step 570820, the login alert generated by management server 570802 is sent to mobile device 570804. The login alert includes instructions that are used to control the operation of mobile device 570804.

At step 570822, the login alert sent from management server 570802 is processed by mobile device 570804. Mobile device 570804 executes instructions based on the information in the login alert to generate, render, and display the account and login status on mobile device 570804.

At step 570824, mobile device 570804 is interacted with by a user to identify vehicles that are to be related to the account created for the user. The interaction with the user generates sets of vehicle identification information, which in a preferred embodiment includes one or more: vehicle identification numbers, license plate numbers, insurance policy numbers, manufacturer identifiers, model identifiers, dates of manufacture, types of vehicles, and number of axles. In a preferred embodiment, mobile device 570804 pairs with another device, such as an in-vehicle device, that publishes information gathered using a Data Link Connector. The published information includes vehicle specific information, such as the vehicle information number, manufacturer identifier, model number, model type, model year, and date of manufacturer. The vehicle specific information is included in the sets of vehicle information provided by mobile device 570804 to management server 570802.

At step 570826, mobile device 570804 sends the vehicle identifications that it generated to management server 570802 and Management server 570802 receives the vehicle identifications.

At step 570828, management server 570802 processes the vehicle identifications and generates a set of vehicle alerts. Management server 570802 checks and verifies the vehicle identification information received from mobile device 570804 against the other vehicle identification information that is already stored in the database of the system, which can include the vehicle identification information from other accounts. Additionally, management server 570802 checks the vehicle identification information for data entry errors. If the vehicle identification information has not already been associated with another account and passes all checks, verifications, and validations, then the vehicle alert generated by management server 570802 indicates that the vehicle has been successfully added to the account. If the vehicle has not been successfully added, then the vehicle alert includes warnings or errors that identify the issues and how to resolve them.

At step 570830, the vehicle alerts generated by management server 570802 are sent from management server 570802 to mobile device 570804.

At step 570832, mobile device 570804 processes one or more vehicle alerts from management server 570802 that were based on the vehicle information sent by mobile device 570804. Based on the vehicle alerts, mobile device 570804 generates, renders, and displays on-screen information to the user of mobile device 570804 that indicates the success of adding a vehicle to an account along with any issues identified by management server 570802.

At step 570834, devices that are to be associated with the account are identified by the user interacting with mobile device 570804. The user can identify any number of devices to be associated with the account. The minimum device information includes an identifier for the device such as a phone number, SIM number, or IMEI number. Additional device information includes the manufacturer name, model name, serial number, and MAC address of the device as well as a user created name for the device and an identification of the relationship to the possessor of the device.

At step 570836, device indications from mobile device 570804 are sent to management server 570802. In a preferred embodiment, the device indications are sent in one or more alerts from mobile device 570804 to management server 570802 that include instructions to wake up processes and application on management server 570802 to handle the alerts with the device indications.

At step 570838, management server 570802 processes the device indications and generates device alerts based on the device indications from mobile device 570804. In a preferred embodiment, management server 570802 checks the device information for internal consistency and against other device information stored in the database of the system. If the device information is passes the checks, verifications, and validations, and is not already associated with another account, then the database is updated with the devices associated with the device indications received by management server 570804 by associated the device information with the user account. Device alerts are generated by management server 570804 that indicate the success of updating the user account with the information from the device indications.

At step 570840, the device alerts are sent by management server 570802 to mobile device 570804. The device alerts include codes and instructions that when processed and executed by mobile device 570804 cause the app running on mobile device 570804 to handle the information with the device alert. At this point, management server 570802 is ready to begin receiving zone trigger alerts from mobile device 570804, which is described in FIG. 57I.

At step 570842, mobile device 570804 processes the device alerts. In a preferred embodiment, the device alert is handled as a notification by a first app on mobile device 570804 that wakes up and activates a second app that further processes the device alert. Mobile device 570804 generates, renders, and displays information from the device alert that is received from management server 570802.

After identifying the vehicles and devices that are associated with the user account, system 570100 is ready to start processing zone trigger alerts generated by mobile device 570804, which is further described below.

Referring to FIG. 57I, sequence diagram 570900 further describes the procedures and operations that are used to charge a user account when a user passes through a toll zone to enter a toll road with toll system 570100. Camera system 570902, mobile device 570906, and in-vehicle device 570908 interact with management server 570904 by providing and consuming data and information relevant to crossing a toll zone when entering a toll road.

At step 570912, mobile device 570906 and in-vehicle device 570908 are paired. Pairing creates a data channel between mobile device 570906 and in-vehicle device 570908 and requires an exchange of codes that are unique to each device and requires that the devices are in close proximity. In a preferred embodiment, mobile device 570906 and in-vehicle device 570908 each send a paring alert as part of the pairing process to management server 570904 to activate the application that handles charging tolls to the user account associated with mobile device 570906 and in-vehicle device 570908. In a preferred embodiment, initial pairing events require user interaction for the pairing to happen, but subsequent pairing events happen automatically without user interaction. The initial pairing event may happen during account creation and subsequent pairing events may happen upon a entering and starting the vehicle to which in-vehicle device 570908 is attached. Additionally, information from the vehicle that is received by mobile device 570906 from in-vehicle device 570908 can be updated upon subsequent pairing events. The information from the vehicle can include the vehicle identification number and the license plate number associated with the vehicle. If multiple mobile devices attempt to pair with in-vehicle device 570908, in-vehicle device 570908 pairs with the first mobile device that attempts to pair. Alternatively, in-vehicle device 570908 may allow for interaction with a user to identify which mobile device to pair with and which mobile device is the default device for pairing. In a further alternative, in-vehicle device 570908 pairs a "remembered" mobile device to the exclusion of any other "not remembered" mobile device. A remembered device is a device that has previously paired with in-vehicle device 570908 and a "not remembered" is a device that either has not previously paired with in-vehicle device 570908.

At step 570914, mobile device 570906 generates a zone trigger alert. In a preferred embodiment, the zone trigger alert is generated as part of an action taken upon entering a toll gate subzone related to a toll road. Mobile device 570906 continuously monitors its position, checks and compares its position against the coordinates of nearby zones and subzones, and generates the zone trigger alert upon entering the subzone related to a toll gate subzone. The zone trigger alert includes, in a preferred embodiment, an identifier for mobile device 570904, an identifier of the zone and/or subzone that has been entered, the date and time that the zone has been entered, global positioning coordinates of the mobile device, and an identifier that indicates that mobile device 570906 is paired with in-vehicle device 570908.

At step 570916, the zone trigger alert is sent from mobile device 570906 to management server 570908. Additionally, mobile device 570906 continuously sends position update alerts that identify mobile device 570906 and its position along with the zone trigger alerts.

At step 570918, in-vehicle device 570908 also generates a zone trigger alert. In a preferred embodiment, the zone trigger alert includes identifiers for in-vehicle device 570908, mobile device 570906 to which in-vehicle device 570908 is paired, and any other device to which in-vehicle device 570908 is paired. The zone trigger alert also includes global positioning coordinates of in-vehicle device 570908, which correspond to the position of the vehicle in which in-vehicle device 570908 is installed, which is also associated with the user account in the database.

At step 570920, management server 570904 receives the zone trigger alert that is sent by in-vehicle device 570908. In-vehicle device 570908 may also continuously send position alerts to management server 570904 that identify the current position of in-vehicle device 570908.

At step 570922, camera system 570902 generates image alerts. The image alerts are generated upon recognition of a vehicle in an image or video provided by a camera of the system. In a preferred embodiment, a license plate number, make, model, year of manufacture, color and style are automatically recognized from the image and provided as metadata that is tagged with the image or video.

At step 570924, camera system 570902 sends image alerts that is received by management server 570904. In a preferred embodiment, the image alerts include images and video from one or more cameras of the toll system 570100 along with metadata that describes what is in the images and video. The images and video include images of the vehicle in which in-vehicle device 570908 is installed. The metadata includes the date and time of the images and video, as well as the license plate number, vehicle identification numbers, and user account identifiers for any vehicles within the images and video.

At step 570926, management server 570904 generates billing events and server identification alerts. System 570100 generates a sequence of hash values to track and verify all billing transactions in system 570100. System 570100 generates a transaction number for each billing event that is hashed with a random number, prior hash value, and a time stamp to generate a new hash value associated with the billing event and that will be used with the next billing event. The sequence of hash values creates a ledger of transactions to reduce the probability of a system error and disputed billing. The billing events charge the user account for an amount, which in a preferred embodiment, is based on the type of vehicle, time of day, day of week, day of month, day of year, month of year, location of toll gate, and traffic congestion conditions. In a preferred embodiment a billing formula for each zone and zone that a user utilizes or is associated with is used to calculate the toll. The billing formulas provide dynamic pricing so that the amount charged can increase or decrease base on, e.g., the time of day and the amount of congestion. In a preferred embodiment, rates are increased during rush hour with a rush hour temporal zone that increases the toll amount between 8 AM to 9 AM in the morning and 5 PM to 6 PM in the evening by a predefined monetary amount. In a preferred embodiment, toll rates increase when congestion is high and decrease when congestion is low. In a preferred embodiment, congestion is measured by the average speed of the vehicles using the toll road, which is determined by determining the time between zone entrance events and zone exit events and dividing those times by the distances between the locations of the zone entrance events and the zone exit events to determine an average speed per vehicle per section of the toll road. When the average speed is below a minimum threshold, indicating that a section of the toll road is congested, then the toll amounts are increased to encourage drivers to find alternate routes. Additional embodiments may use additional or alternative measures of congestion.

In a preferred embodiment, the correct amount is deducted from a prepaid user account. An alert for insufficient funds is provided in the server identification alert. The server identification alerts are based on the image alerts received from camera system 570902 and the zone trigger alerts received from mobile device 570906 and in-vehicle device 570908. In a preferred embodiment, the server identification alerts are generated when management server 570904 verifies that the vehicle has entered the toll zone by identifying an image with the vehicle and receiving a zone trigger alert from one or both of mobile device 570906 and in-vehicle device 570908. In a preferred embodiment, the server identification alert indicates one or more of: (1) that the vehicle has been identified in an image, (2) that a user account has been identified with the vehicle, (3) that mobile device 570906 and in-vehicle device 570908 have been identified in the toll gate zone, and (4) that mobile device 570906 is paired with in-vehicle device 570908.

In a preferred embodiment, the toll rate charged in a billing event in a virtual toll zone varies as function of traffic flow and is a dynamic toll. As traffic volume increases, the toll rate per vehicle can be increased by the zone owner, the toll authority. The traffic volume is evidenced by one or more of: the volume of zone trigger events over a fixed period of time, the number of tolled devices using the zonal app, the number of vehicles using the zonal API, and by the images and information provided by toll entrance or exit cameras.

At step 570928, a server identification alert is sent from management server 570904 to mobile device 570906. The server identification alert for mobile device 570906 includes codes and instructions that control the operation of mobile device 570906.

At step 570930, mobile device 570906 processes the server identification alert from management server by activating an application and program code. The mobile identification alert indicates that the user account associated with mobile device 570906 has been charged and mobile device 570906 generates, renders, and displays the information related to the charge to the account. The information includes an account identifier, a charged amount, an identification of the toll gate zone, an identification of the toll road, and an identification of the vehicle in which in-vehicle device 570908 is installed.

At step 570932, management server 570904 sends a server identification alert to in-vehicle device 570908.

At step 570934, in-vehicle device 570908 processes the server identification alert from management server 570904. In-vehicle device 570908 generates, renders, and displays information from the server identification alert, which in a preferred embodiment includes the charged amount, an identification of the toll gate zone, and an identification of mobile device 570906.

Referring to FIG. 57J, sequence diagram 571000 portrays an interaction within system 570100 of FIG. 57A between management server 571002 and mobile device 571004 for generating, rendering and displaying usage history including user statistics with mobile device 571004. The interaction in sequence diagram 571000 allows for alerts to be set up that notify and activate mobile device 571004 when certain actions occur, such as alerts for billing activity, low funds availability in account, the activity of the set of mobile devices associated with the user account.

At step 571012, mobile device generates a usage alert request. The usage alert request identifies the types of usage alerts that are to be generated and served to mobile device 571004. The types of usage alerts include, in a preferred embodiment, billing alerts, charging alerts, device activity alerts, and vehicle alerts.

At step 571014, the usage alert request generated by mobile device 571004 is sent by mobile device 571004 to management server 571002.

At step 571016, the usage alert request is processed by management server 571002. Management server 571002 identifies from the usage alert request the type of information for which usage alerts are to be generated and generates callback methods that will activate upon changes and updates to that information to generate the usage alerts.

At step 571018, usage alerts are generated by management server 571002. The usage alerts include information that correspond to the types of information specified in usage alert requests.

At step 571020, a usage alert is sent from management server 571002 to mobile device 571004. The usage alert includes codes and instructions that control operation of mobile device 571004.

At step 571022, mobile device 571004 processes the usage alert from management server 571002. Based on the information and instructions in the usage alert, mobile device 571004 is activated and generates, renders, and displays usage information that was sent by management server 571002.

Referring to FIG. 57K, sequence diagram 571100 depicts operations used by system 570100 to provide management alerts and statistics related to the usage of system 570100. Management device 571102 interacts with management server 571104 to generate, render, and display information about system 570100 and to operate system 570100.

At step 571112, management device 571102 generates a usage history request. The usage history request identifies the types and amounts of usage history for which management server 571104 will generate alerts. The usage history request includes codes, instructions, and information that activate and initiate processes and programs that run on management server 571104. Interaction with a user at management device 571102 specifies the usage history information indicated in the usage history request for the usage history alerts. In a preferred embodiment, the usage history request also identifies adjustments that can be made to a user account based on the usage history of the account users.

At step 571114, the usage history request is sent from management device 571102 and is received by management server 571104.

At step 571116, management server 571104 processes the usage history request. Applications and programs are activated in response to the usage history request that creates an alert system for generate usage history and adjustment alerts based on the information in the usage history request. The alert system compares updates to data in the system database rules for the alerts to determine if an update to the database merits generation of an alert.

At step 571118, the user accounts that qualify for adjustments are identified by management server 571104. In a preferred embodiment, the adjustments include volume discounts for high volume users of the system and include teaser rates for low volume users of the toll road. Additionally, a preferred embodiment gives high volume users discounts for taking alternate routes.

At step 571120, management server 571104 generates usage history alerts and adjustment alerts based on changes to the database of the systems and based on the processing of the usage history request. The usage history alerts identify the type and amount of usage that triggered the alert. The adjustment alerts identify the type and amount of adjustment that is available along with the type and amount of usage that triggered the adjustment alert.

At step 571122, the usage history alerts and adjustment alerts are sent from management server 571104 to management device 571102. The alerts include instructions that activate programs and applications on management device 571102.

At step 571124, management device 571102 processes one or more usage history and adjustment alerts. In a preferred embodiment, the processing of a usage history alert includes generating, rendering, and displaying information identified in the usage history alert and retrieved by management server 571104 that describes historical usage of toll collection system 570100. The processing of an adjustment alert, in a preferred embodiment, includes generating, rendering, and displaying usage history information along with adjustment information that were generated by management server 571104 and stored in the database of the system.

Referring to FIG. 57L, user interface 571200 is displayed on a device in system 570100, such as one of devices 570148, 570156, and 570164 in FIG. 57A. User interface 571200 shows map 571202 which includes a toll road that is associated with zone 571204. Zone 571204 includes: entrance gate subzone 571206; lane subzones 571210, 571214, 571218, and 571222; work subzone 571226, high occupancy vehicle (HOV) lane subzone 571230, and autonomous vehicle subzone 571232. In a preferred embodiment gate subzone 571206; lane subzones 571210, 571214, 571218, and 571222 are juxtaposed without overlap. Additional embodiments may have one or more of subzones 571206, 571210, 571214, 571218, and 571222 overlapping or with spaces between so as to not be in juxtaposition. User interface 571200 includes icons for devices 571234 and 571238. Device 571234 is a depiction of the device that is displaying user interface 571200. Work subzone 571226 includes a cutout portion for the location of workers 571228 on the toll road. In a preferred embodiment, the zones and subzones are longitudinal in nature extending along the length of one or more lanes each.

Entrance gate subzone 571206 is associated with marker 571208 and is an entrance gate subzone for the toll road that is associated with the physical area of the entrance gate of the toll road. Selection of marker 571208 provides additional information, including the last billing transaction associated with entrance gate subzone 571206.

Right lane subzone 571210 and work subzone 571226 are associated with the right-most lane of the toll road. Marker 571212 is associated with right lane subzone 571210 and work subzone 571226. When marker 571212 is selected by a user, user interface 571200 displays information to the user about right lane subzone 571210 and work zone 571226. In a preferred embodiment, selection of marker 571212 (1) displays a list of estimated travel times to one or more exit gates of the toll road that are ahead for right lane subzone 571210, and (2) displays information that includes a schedule of work times and alternate routes associated with work subzone 571226.

Center-right lane subzone 571214 is associated with marker 571216, which is also associated with work subzone 571226 and which is the lane that device 571234 is currently associated with and located in. Selection of marker 571216 provides (1) information about center-right lane subzone 571214, which in a preferred embodiment, includes congestion information provided as the number of vehicles per minute that are passing through the next intersection of the toll road and (2) information about work subzone 571226 including reduced speed limits and increased fine amounts, as well as the schedule of work times and alternate routes.

Placement of work subzone 571226 identifies that the center-right lane and right lane are both under construction and that workers may be present. Additional penalties may be applied with driving at a speed that is above a speed threshold for work subzone 571226, which may be different from the speed limit for the toll road.

Marker 571220 is associated with center-left lane subzone 571218 and high occupancy vehicle lane subzone 571230, which is reserved for high occupancy vehicles. Location of device 571238 is currently associated with center-right lane subzone 571214 and high occupancy vehicle lane subzone 571230. Each type of vehicle has an associated occupancy threshold that, when exceeded, will qualify the vehicle as a high occupancy vehicle for lower toll values. Additionally, higher tolls may be charged for use of high occupancy vehicle lane subzone 571230 by vehicles that do not qualify as high occupancy vehicles. Selection of marker 571220 display information that includes the amount of toll reduction and the number of occupants required based on the vehicle that is associated with the mobile device that is displaying user interface 571200.

Autonomous vehicle subzone 571232 is an inner-most lane of the toll road that is reserved exclusively for vehicles with autonomous driving capability. Vehicles that are capable of autonomous driving can use autonomous vehicle subzone 571232 and receive a discount while vehicles that are not capable of autonomous driving are fined if they go into autonomous vehicle subzone 571232. In a preferred embodiment, after a user enters the toll road in a vehicle that is capable of autonomous driving, the user can select marker 571224 to initiate the autonomous driving mode and have the vehicle make its way to autonomous vehicle subzone 571232. Marker 571224 is associated with both left lane subzone 571222 and with autonomous vehicle subzone.

Information provided by the selection of marker 571224 includes an indication of whether the vehicle associated with device 571234 is eligible to use autonomous vehicle subzone 571232 as well as any adjustments to the toll amount based on the use of autonomous vehicle subzone 571232.

Devices 571234 and 571238 are operated by users of system 570100 and, in a preferred embodiment, are embodied as one of a mobile device, an in-vehicle device, a tablet computer, a smartphone, and an infotainment system.

Marker 571236 identifies device 571234. Selection of marker 571236 activates a display of information, such as billing activity for the user account and driving statistics that includes the number of miles driven since entering the toll road. In a preferred embodiment, the information displayed also includes the type of vehicle that device 571234 is located in and associated with.

Marker 571240 identifies device 571238, which is located in a different vehicle from device 571234. Selection of marker 571240 brings up communication options that allow a user of the device 571234 to communicate with a user of device 571238, including text chat, voice chat, and video chat. If devices 571234 and 571238 are within a threshold distance for peer to peer communication and peer to peer communication is selected by the user, then the communication is performed through a direct communication between devices 571234 and 571238 over a peer to peer network.

Referring to FIG. 57M, process 571300 runs on server 570102 of system 570100, to perform step 570926 of FIG. 57I.

At step 571302, server 570102 activates based on the reception of one or more zone trigger alerts. Zone trigger alerts are provided to system 570100 when a vehicle changes zones, including when a vehicle enters or exits a zone. In a preferred embodiment, device 571234 generates zone trigger alerts when entering or exiting any one of entrance gate subzone 571206, zone 571204, right lane subzone 571210, center-right lane subzone 571214, and work subzone 571226. Each zone trigger alert individually identifies each of the one or more zones and subzones that have been entered and or exited. In a preferred embodiment, when device 571234 of FIG. 57L enters the toll road associated with zone 571204, device 571234 generates a single zone trigger alert that identifies that device 571234: entered zone 571204, entered entrance gate subzone 571206, exited entrance gate subzone 571206, entered right lane subzone 571210, exited right lane subzone 571210, entered center-right lane subzone 571214, entered work subzone 571226, and exited work subzone 571226.

At step 571304, the zone parameters that are associated with the zone trigger alerts are determined. The zone parameters identify the types of zones and subzones related to the zone trigger alerts. The types of zones include work zones, autonomous zones, electric vehicle zones, high-occupancy vehicle zones, entrance zones, and exit zones. Each zone has a different base toll amount that will be charged to a user. In the example from FIG. 57L, the zone trigger alert from device 571234 would include the charge for entering the toll road through entrance gate subzone 571206 and would not include any discounts for usage of HOV lane subzone 571230 or autonomous vehicle subzone 571232.

At step 571306, traffic parameters that are associated with the zone trigger alerts are determined. In a preferred embodiment, traffic parameters include: cars per minute per each zone, average speed per each zone, and number of cars in each zone. In the example from FIG. 57L, the cars per minute, average speed, and number of cars is determined for each of the zones identified in the zone trigger alert received from device 571234 when device 571234 the toll road. Using traffic parameters allows for dynamic toll amounts that fluctuate with the amount of traffic on the toll road. The toll is to be charged to a user account based an amount of congestion in a current zone measured by one or more of: a number of vehicles entering the current zone per minute, the number of vehicles exiting the current zone per minute, the average speed per vehicle in the current zone, and the number of vehicles in the current zone.

At step 571308, the system determines the time parameters related to the zones associated with the zone trigger alert. Each zone or subzone can have its own time schedule that provides discounts or penalties based on the time of day, day of week, day of month, day of year, and month of year. Additionally, temporal zones or subzones can be used that are in addition to the zones and subzones associated with physical locations. The times relevant to the zone trigger alerts are compared to the time schedules of the zones and subzones to identify discounts or penalties based on the date and time of the zone trigger alerts.

At step 571310, vehicle parameters are determined by the system. Vehicle parameters include the type of vehicle, the number of axles of the vehicle, the occupancy of the vehicle, and the high-occupancy threshold for the vehicle. The process checks a vehicle associated with a zone trigger alert against the vehicle parameters to identify discounts or penalties based on the zones, subzones, and vehicle parameters. In a preferred embodiment, when the vehicle is in a high-occupancy vehicle lane but the current occupancy of the vehicle (measured by one or more cameras along the toll road, or by the number of mobile devices in the vehicle reporting zone trigger alerts) does not meet the high-occupancy threshold for the vehicle, a penalty is applied. Conversely, a discount is applied when the high-occupancy threshold for the vehicle has been satisfied.

At step 571312, a billing event is generated based on the parameters and billing formulas. In a preferred embodiment, each of the parameters determined above are plugged into the billing formulas related to the zones and subzones identified in the zone trigger alerts. The billing event created takes into account each of the above parameters and the amount is charged to the user account. System 570100 generates an alert based on the billing event and sends the billing event alert to the device associated with the user account that was charged.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A method of automated payment collection comprising the steps of:
  determining an enhanced location of a mobile device;
  wherein the enhanced location is based on a global position system (GPS) location and one or more of the group of an ultra-wideband (UWB) location, a very high frequency (VHF) omnidirectional range (VOR) location, and distance measuring equipment (DME);
  identifying a virtual zone;
  identifying a virtual subzone within the zone;
  comparing the enhanced location to the virtual subzone;
  generating a mobile zone trigger alert when the comparison indicates that the enhanced location is within the virtual subzone and the virtual zone; and generating a payment event based on at least one of the location comparison and the mobile zone trigger alert.

2. The method of claim 1, further comprising the steps of:
generating an image alert by a camera system.

3. The method of claim 2, further comprising the steps of:
activating a pairing connection between the mobile device and an in-vehicle device;
generating an in-vehicle zone trigger alert; and,
activating a management server based on one or more of the mobile zone trigger alert, the in-vehicle zone trigger alert, and the image alert.

4. The method of claim 3, further comprising:
moving into or out of at least one of the virtual zone and the virtual subzone;
wherein at least one of the virtual zone and the virtual subzone is approved by a map administrator prior to the comparison; and,
wherein the virtual zone and the virtual subzone are defined by a plurality of points, each point of the plurality of points having a set of coordinates.

5. The method of claim 1, further comprising the step of:
activating the mobile device based on the payment event.

6. The method of claim 1, further comprising the steps of:
generating a zone alert based on zone identification information, the zone alert including a code to activate a management device; and,
activating the management device based on the zone alert.

7. The method of claim 1, further comprising the steps of:
generating a login alert based on login credentials; and,
activating the mobile device based on the login alert.

8. The method of claim 1, further comprising the steps of:
generating a vehicle alert based on vehicle identification information; and,
activating the mobile device based on the vehicle alert.

9. The method of claim 1, further comprising the steps of:
generating a device alert based on device identification information; and,
activating the mobile device based on the device alert.

10. The method of claim 1, further comprising the steps of:
generating a usage alert request by the mobile device; and,
activating the management server based on the usage alert request.

11. The method of claim 1, wherein the step of generating a payment event further comprises:
setting a toll amount based on one or more of the group of a traffic pattern, a vehicle speed, and a traffic congestion in the virtual zone.

12. A toll collection system using a virtual zone that identifies a toll road, the system comprising:
a management server including a first processor and a first memory;
a camera system including a second processor and a second memory;
a management device including a third processor and a third memory;
a mobile device including a fourth processor and a fourth memory;
the fourth memory including instructions that when executed by the fourth processor cause the mobile device to perform the steps of:
determining an enhanced location of the mobile device;
wherein the enhanced location is based on a global position system (GPS) location and one or more of the group of an ultra-wideband (UWB) location, a very high frequency (VHF) omnidirectional range (VOR) location, a fixed location access point and distance measuring equipment (DME);
determining a centroid of the enhanced location;
identifying the virtual zone;
comparing the centroid of the enhanced location to the virtual zone;
generating a mobile zone trigger alert when the comparison indicates that the enhanced location is within the virtual zone; and
the first memory including further instructions that when executed by the first processor cause the management server to perform the step of generating a toll event based on at least one of the comparison and the mobile zone trigger alert.

13. The toll collection system of claim 12, further comprising:
the second memory including instructions that when executed by the second processor cause the camera system to perform the step of generating an image alert by the camera system.

14. The toll collection system of claim 13, further comprising:
an in-vehicle device including a fifth processor and a fifth memory;
the fifth memory including instructions that when executed by the fifth processor cause the in-vehicle device to perform the step of generating an in-vehicle zone trigger alert; and,
the first memory including further instructions that when executed by the first processor cause the management server to perform the step of activating the management server, from a low activity state, based on one or more of the mobile zone trigger alert, the in-vehicle zone trigger alert, and the image alert.

15. The toll collection system of claim 14, further comprising:
the first memory including further instructions that when executed by the first processor cause the management server to perform the step of generating a vehicle alert based on vehicle identification information; and,
the fifth memory further including instructions that when executed by the fifth processor cause the in-vehicle device to perform the step of activating the mobile device based on the vehicle alert.

16. The toll collection system of claim 12, further comprising:
the fourth memory including instructions that when executed by the fourth processor cause the mobile device to perform the step of activating the mobile device based on the toll event.

17. The toll collection system of claim 12, further comprising:
the first memory including further instructions that when executed by the first processor cause the management server to perform the step of generating a zone alert based on zone identification information, the zone alert including a code to activate the management device; and,
the first memory including further instructions that when executed by the first processor cause the management server to perform the step of activating the management device based on the zone alert.

18. The toll collection system of claim 12, further comprising:
the first memory including further instructions that when executed by the first processor cause the management server to perform the step of generating a login alert based on login credentials; and, the fourth memory including further instructions that when executed by the fourth processor cause the mobile device to perform the step of activating the mobile device based on the login alert.

19. The toll collection system of claim 12, further comprising:

the first memory including further instructions that when executed by the first processor cause the management server to perform the step of generating a device alert based on device identification information; and, the fourth memory including further instructions that when executed by the fourth processor cause the mobile device to perform the step of activating the mobile device based on the device alert.

20. The toll collection system of claim 12, further comprising:

the fourth memory including further instructions that when executed by the fourth processor cause the mobile device to perform the step of generating a usage alert request by the mobile device; and, the first memory including further instructions that when executed by the first processor cause the management server to perform the step of activating the management server based on the usage alert request.

21. The toll collection system of claim 12, further comprising:

the first memory including further instructions that when executed by the first processor cause the management server to perform the step of setting a toll amount based on two of the group of a traffic pattern, a vehicle speed, and a traffic congestion in the virtual zone.

22. A method of roadway toll collection comprising the steps of:

determining an enhanced location of a mobile device;

wherein the enhanced location is based on a global position system (GPS) location and one or more of the group of an ultra-wideband (UWB) location, a very high frequency (VHF) omnidirectional range (VOR) location, a fixed location access point and distance measuring equipment (DME);

determining a centroid of the enhanced location;

identifying a virtual zone;

comparing the centroid of the enhanced location to the virtual zone;

generating a mobile zone trigger alert when the comparison indicates that the enhanced location is within the virtual zone; and, setting a toll amount based on one of the group of a traffic pattern, a vehicle speed, and a traffic congestion in the virtual zone; and, generating a toll event based on at least one of the comparison and the mobile zone trigger alert.

23. The method of claim 22, further comprising the step of:

generating an image alert by a camera system based on the enhanced location of the mobile device.

24. The method of claim 23, further comprising the step of:

activating the mobile device based on the toll event.

25. The method of claim 24, further comprising the step of:

generating a login alert based on the enhanced location of the mobile device in a vehicle.

26. A toll collection system using a virtual zone that identifies a roadway, the system comprising:

a management server, a camera system, a management device, and a mobile device, all connected to a network and that operate together to perform the steps of:

determining an enhanced location of the mobile device;

wherein the enhanced location is based on a global position system (GPS) location and one or more of the group of an ultra-wideband (UWB) location, a very high frequency (VHF) omnidirectional range (VOR) location, a fixed location access point and distance measuring equipment (DME);

determining a centroid of the enhanced location;

identifying the virtual zone;

comparing the centroid of the enhanced location to the virtual zone;

generating a mobile zone trigger alert when the comparison indicates that the enhanced location of the mobile device is within the virtual zone; and, setting a toll amount based on one of the group of a traffic pattern, a vehicle speed, and a traffic congestion in the virtual zone; and, generating a toll event based on at least one of the comparison and the mobile zone trigger alert.

27. The toll collection system of claim 26, further configured to perform the steps of:

generating an image alert based on at least one of the comparison and the mobile zone trigger alert;

activating the management server based on at least one of the comparison and the mobile zone trigger alert;

generating a zone alert that includes a code to activate the management device; and, activating the management device based on the zone alert.

28. The toll collection system of claim 26, further configured to perform the steps of:

generating a login alert based on login credentials; and, activating the mobile device based on the login alert.

29. The toll collection system of claim 26, further configured to perform the steps of:

generating a vehicle alert based on vehicle identification information; and, activating the mobile device based on the vehicle alert.

30. The toll collection system of claim 26, further configured to perform the steps of:

generating a device alert based on device identification information; and, activating the mobile device based on the device alert.

* * * * *